US005631935A

United States Patent [19]

Ginossar

[11] Patent Number: 5,631,935

[45] Date of Patent: May 20, 1997

[54] METHOD AND APPARATUS FOR GOVERNING INFORMATION TRANSFER USING AN EFFICIENT TRANSPORT PROTOCOL

[75] Inventor: Dror Ginossar, Tel Aviv, Israel

[73] Assignee: Run-Rad Unlimited Networking, Ltd., Tel Aviv, Israel

[21] Appl. No.: 58,975

[22] Filed: May 6, 1993

[51] Int. Cl.$^6$ ................................................. H04L 29/08
[52] U.S. Cl. ........................... 375/377; 370/232; 370/236; 395/200.13
[58] Field of Search ........................ 370/84, 79; 371/32, 371/33, 55; 178/4.1 C; 445/49.1, 51.1; 348/399; 341/51, 61; 375/225, 377; 395/200.11, 200.13; 364/166

[56] References Cited

U.S. PATENT DOCUMENTS

| | | | |
|---|---|---|---|
| 4,161,778 | 7/1979 | Getson, Jr. et al. | 364/200 |
| 4,270,205 | 5/1981 | DeShon | 371/32 |
| 4,366,573 | 12/1982 | Rauch | 375/106 |
| 4,439,859 | 3/1984 | Donnan | 371/32 |
| 4,475,192 | 10/1984 | Fernow et al. | 370/94 |

(List continued on next page.)

FOREIGN PATENT DOCUMENTS 425845  10/1990  European Pat. Off. .

OTHER PUBLICATIONS

Lin, S., and Costello, D.J., Jr., *Error Control Coding: Fundamentals and Applications*. Euglewood Cliffs, NJ: Prentice–Hall, Inc., 1983, pp. 458–465.

Dighe, R., May, C.J., and Ramamurthy, G., "Congestion Avoidance Strategies in Broadband Packet Networks," in Proc. IEEE INFOCOM '91, Apr. 7–11, 1991, Bal Harbour, FL, pp. 295–303.

Danthine, A., "A New Transport Protocol for the Broadband Environment," IFIP Transactions C, vol. C–4, 1992, pp. 337–360; also, presented at IFIP TC6 Workshop, Estoril, Portugal, Jan. 20–22, 1992.

Watson, Richard, "The Delta–t Transport Protocol: Features and Experience", Local Computer Networks, 1989 14th Conference. pp. 399–487.

Böcking, Stefan, "TEMPO: A lightweight Transport Protocol", Future Trends of Distributed Computing Systems, '91 Workshop. pp. 107–113.

Meister, Bernd, "A Performance Study of the ISO Transport Protocol", IEEE Trans on Computers. vol. 40 No. 3 Mar. 1991. pp. 253–262.

La Porta et al. "Architectures, Features and Implementations of High Speed Protocols" GLOBE Com '91: IEEE Global Telecommunications Conf. pp. 1717–1721.

Comer et al, "A rate–based Congestion Avoidance & Control Scheme for Packet Switched Network"; Proceeding the 10$^{th}$ International Conf. on Distributed Computing Systems. pp. 390–397.

Yavatker et al, "Religram: —a communications abstraction for distributed processing" Proc. of the Third IEEE Symposium on Parallel & Distributed Processes. pp. 361–368.

Long et al, "Providing performance quarantees in an FDDI Network," Proceedings the 13$^{th}$ Intersational Conf. on Distributed Computing System. pp. 328–336.

"NETBELT: A High Throughput Transport Protocol" by Clark et al.; Laboratory for Computer Science, Massachusetts Institute of Technology; pp. 353–359.

(List continued on next page.)

*Primary Examiner*—Stephen Chin
*Assistant Examiner*—Jeffrey W. Gluck
*Attorney, Agent, or Firm*—Brumbaugh, Graves, Donohue & Raymond

[57] ABSTRACT

Apparatus for governing information transfer among a plurality of data utilization elements, without rate oscillation, which apparatus is operative according to a rate based transport protocol having apparatus for determining the rate of information transfer between data utilization elements.

88 Claims, 14 Drawing Sheets

U.S. PATENT DOCUMENTS

| | | | |
|---|---|---|---|
| 4,485,438 | 11/1984 | Myrmo et al. | 364/200 |
| 4,589,111 | 5/1986 | Adachi | 371/32 |
| 4,677,616 | 6/1987 | Franklin | 370/94 |
| 4,703,478 | 10/1987 | Haselton et al. | 370/94 |
| 4,707,693 | 11/1987 | Hessel | 340/825 |
| 4,712,214 | 12/1987 | Meltzer et al. | 371/32 |
| 4,726,036 | 2/1988 | Sawyer et al. | 375/14 |
| 4,727,537 | 2/1988 | Nichols | 370/85 |
| 4,745,593 | 5/1988 | Stewart | 370/15 |
| 4,771,424 | 9/1988 | Suzuki et al. | 370/86 |
| 4,809,212 | 2/1989 | New et al. | 364/757 |
| 4,839,891 | 6/1989 | Kobayashi et al. | 370/94 |
| 4,845,656 | 7/1989 | Nishibe et al. | 364/900 |
| 4,845,664 | 7/1989 | Aichelmann, Jr et al. | 364/900 |
| 4,851,990 | 7/1989 | Johnson et al. | 364/200 |
| 4,852,127 | 7/1989 | Fraser et al. | 375/94 |
| 4,855,905 | 8/1989 | Estrada et al. | 364/200 |
| 4,860,193 | 8/1989 | Bentley et al. | 364/200 |
| 4,862,461 | 8/1989 | Blaner | 371/33 |
| 4,864,567 | 9/1989 | Giorgio | 370/118 |
| 4,873,662 | 10/1989 | Sargent | 364/900 |
| 4,875,161 | 10/1989 | Lahti | 364/200 |
| 4,882,674 | 11/1989 | Quint et al. | 364/200 |
| 4,888,684 | 12/1989 | Lilja et al. | 364/200 |
| 4,888,812 | 12/1989 | Dinan et al. | 382/7 |
| 4,897,835 | 1/1990 | Gaskill et al. | 370/94 |
| 4,905,282 | 2/1990 | McGlynn et al. | 380/48 |
| 4,908,828 | 3/1990 | Tikalsky | 371/69 |
| 4,927,288 | 5/1990 | Raswant | 404/1 |
| 4,929,939 | 5/1990 | Varma et al. | 340/825 |
| 4,930,159 | 5/1990 | Kravitz et al. | 380/23 |
| 4,935,869 | 6/1990 | Yamamoto | 364/200 |
| 4,939,731 | 7/1990 | Reed et al. | 371/32 |
| 4,951,278 | 8/1990 | Biber et al. | 370/60 |
| 4,961,221 | 10/1990 | Abiven | 380/21 |
| 4,964,046 | 10/1990 | Mehrgardt et al. | 364/200 |
| 4,965,794 | 10/1990 | Smith | 370/105 |
| 4,967,344 | 10/1990 | Scavezze et al. | 364/200 |
| 4,977,498 | 12/1990 | Rastegar et al. | 364/200 |
| 4,989,204 | 1/1991 | Shimizu et al. | 370/94 |
| 4,992,926 | 2/1991 | Janke et al. | 364/134 |
| 4,999,769 | 3/1991 | Costes et al. | 364/200 |
| 5,008,663 | 4/1991 | Adams | 340/825 |
| 5,008,879 | 4/1991 | Fischer et al. | 370/85 |
| 5,010,553 | 4/1991 | Scheller et al. | 371/35 |
| 5,036,316 | 7/1991 | Kemplin | 340/728 |
| 5,038,343 | 8/1991 | Lebizay et al. | 370/60 |
| 5,042,029 | 8/1991 | Hayakawa | 370/60 |
| 5,053,987 | 10/1991 | Genusov et al. | 364/736 |
| 5,056,058 | 10/1991 | Hirata et al. | 364/900 |
| 5,056,088 | 10/1991 | Price et al. | 370/94 |
| 5,058,005 | 10/1991 | Culley | 364/200 |
| 5,058,110 | 10/1991 | Beach et al. | 370/85 |
| 5,062,044 | 10/1991 | Asami et al. | 364/200 |
| 5,063,494 | 11/1991 | Davidowski et al. | 395/800 |
| 5,065,314 | 11/1991 | Maskovyak | 395/325 |
| 5,073,821 | 12/1991 | Juri | 358/133 |
| 5,077,677 | 12/1991 | Murphy et al. | 395/10 |
| 5,077,732 | 12/1991 | Fischer et al. | 370/85 |
| 5,084,871 | 1/1992 | Carn et al. | 371/33 X |
| 5,084,877 | 1/1992 | Netravali et al. | 371/32 |
| 5,089,982 | 2/1992 | Gran et al. | 364/726 |
| 5,097,331 | 3/1992 | Chen et al. | 358/138 |
| 5,103,447 | 4/1992 | Takiyasu et al. | 370/85 |
| 5,107,493 | 4/1992 | Eng et al. | 370/94 |
| 5,109,490 | 4/1992 | Arimill et al. | 395/325 |
| 5,109,515 | 4/1992 | Laggis et al. | 395/725 |
| 5,113,392 | 5/1992 | Takiyasu et al. | 370/85 |
| 5,113,494 | 5/1992 | Menendez et al. | 395/163 |
| 5,113,514 | 5/1992 | Albonesi et al. | 395/425 |
| 5,115,429 | 5/1992 | Hluchyj et al. | 370/84 |
| 5,115,431 | 5/1992 | Williams et al. | 370/94 |
| 5,115,432 | 5/1992 | Haas | 370/94 |
| 5,117,429 | 5/1992 | Lagoutte | 370/60 |
| 5,119,367 | 6/1992 | Kawakatsu et al. | 370/54 |
| 5,121,216 | 6/1992 | Chen et al. | 358/261 |
| 5,121,390 | 6/1992 | Farrell et al. | 370/94 |
| 5,121,479 | 6/1992 | O'Brien | 395/250 |
| 5,122,685 | 6/1992 | Chan et al. | 307/465 |
| 5,124,941 | 6/1992 | Smith | 364/759 |
| 5,124,991 | 6/1992 | Allen | 371/32 |
| 5,126,842 | 6/1992 | Andrews et al. | 358/133 |
| 5,136,584 | 8/1992 | Hedlund | 370/94 |
| 5,142,532 | 8/1992 | Adams | 370/94 |
| 5,168,497 | 12/1992 | Ozaki et al. | 371/33 X |
| 5,193,151 | 3/1993 | Jain | 395/200.06 |
| 5,224,095 | 6/1993 | Woest et al. | 371/33 X |
| 5,303,344 | 4/1994 | Yokoyama et al. | 395/200.2 |
| 5,400,329 | 3/1995 | Tokura et al. | 370/84 |

OTHER PUBLICATIONS

"Computer Networks" Second Edition by Andrew S. Tanenbaum; pp. 309–546.

"Goodness definition and goodness measure for high speed transport protocols for lightweight networking applications" by S. Isil; Lehigh University, 1992; pp. 1–213.

"Design and analysis of rate–based transport layer flow control protocol" by C. Yee–Hsiang, Ph.D.; Illinois Institute of Technology, 1990; pp. 1–124.

"A Survey of Light–Weight Transport Protocols for High–Speed Networks" by Doeringer et al; Transaction on Communications, vol. 38, No. 11, Nov. 1990; pp. 2025–2039.

"Congestion Avoidance and Control" by Van Jacobson; University of California; Lawrence Berkeley Laboratory; pp. 314–329.

"Making Transport Protocols Fast" by Alfred C. Weaver; Department of Computer Science, University of Virginia; pp. 295–300.

"Comparison of Error Control Protocols for High Bandwidth–Delay Product Networks" by Feldmeier et al.; pp. 271–295.

"Dynamical Behavior of Rate–Based Flow Control Mechanisms" by Bolot et al.; Department of Computer Science, University of Maryland; pp. 35–49.

C.L. Williamson, et al., Loss–Load Curves: Support for Rate–Based Congestion Control in High–Speed Datagram Networks, Communications Architecture & Protocols,–SIGCOMM '91 Conference.

METHOD AND APPARATUS FOR GOVERNING INFORMATION TRANSFER USING AN EFFICIENT TRANSPORT PROTOCOL

FIELD OF THE INVENTION

The present invention relates to data communication generally and more particularly to transport protocols.

BACKGROUND OF THE INVENTION

There exists a great deal of literature dealing with data communication in general and data networks in particular. The following publications represent the most relevant literature presently available to the inventor:

NETBLT: "A High Throughput Transport Protocol", by David D. Clark et al, 1988 ACM 089791-245-4;

*Computer Networks,* 2nd Edition, by Andrew S. Tannenbaum, Prentice-Hall International, 1989, pp 309–320, 370–436 and 535–546;

"Goodness Definition and Goodness Measure for High Speed Transport Protocols for Lightweight Networking Applications", by Sebuktekin, Isil, PhD Thesis Lehigh University, May, 1992;

"Design and Analysis of Rate-based Transport Layer Flow Control Protocol", by Chang, Yee-Hsiang, PhD Thesis, Illinois Institute of Technology, 1990;

"A Survey of Light-Weight Transport Protocols for High-Speed Networks", by Willibald A. Doeringer et al IEEE Transactions on Communications, Vol. 38, No. 11, November, 1990;

"Congestion Avoidance and Control", by Van Jacobson, Proc. ACM SIGCOMM 88, pp 314–329, Stanford, Calif., August, 1988;

"Making Transport Protocols Fast", by Alfred C. Weaver, Proceedings of 16th Conference on Local Computer Networks, Pages 295–300, IEEE Computer Society Press, Los Alamitos, Calif. 1991;

"Comparison of Error Control Protocols for High Bandwidth-Delay Product Networks", by David C. Feldmeier et al, Protocols for High Speed Networks II, Marjory J. Johnson, Editor, Elsevier Science Publishers, B. V. (North Holland), 1991; and "Dynamical Behavior of Rate-Based Flow Control Mechanisms" by Jean-Chrysostome Bolot et al, Computer Communication Review, Vol 20, No. 2, pp 35–49, April, 1990.

The above referenced article by Bolot et al discusses a phenomenon of state of the art rate-based flow control mechanisms, namely, the occurrence of rate oscillations which result in disadvantageous alternating occurrences of overutilization and under-utilization of the path, as illustrated, e.g., in FIGS. 2, 3(a), 3(b), 4(a) and 4(b) of the Bolot et al article.

SUMMARY OF THE INVENTION

The present invention seeks to provide an improved data network.

There is thus provided, in accordance with a preferred embodiment of the present invention, apparatus for governing information transfer between a transmitter and a receiver along a network path interconnecting the transmitter and receiver, without rate oscillation. This apparatus, which is comprised of a rate controller associated with the transmitter and a rate monitor associated with the receiver, is operative according to a rate based transport protocol having apparatus for determining the rate of information transmission of the transmitter without rate oscillation. The rate based transport protocol operates to set the rate of information transmission to be the rate that both the network path and the receiver actually sustain when the transmitter is operated without intentionally introducing delays.

There is also provided, in accordance with another preferred embodiment of the present invention, apparatus for governing information transfer between a transmitter and a receiver along a network path interconnecting the transmitter and receiver. This apparatus is operative according to a rate based transport protocol and includes apparatus for determining the information transmission rate of the transmitter based at least in part on transmission of a number of packets transmitted by a transmitter without feedback from a receiver, and measuring the actual rate at which the packets are transmitted. The rate based transport protocol operates to set the rate of information transmission to be the rate that both the network path and the receiver actually sustain when the transmitter is operated without intentionally introducing delays.

There is also provided, in accordance with another preferred embodiment of the present invention, apparatus for governing information transfer between a transmitter and a receiver along a network path interconnecting the transmitter and receiver. This apparatus is operative according to a rate based transport protocol and includes apparatus for determining an information transmission rate by measuring the actual rate of receipt at a receiver. The rate based transport protocol operates to set the rate of information transmission to be the rate that both the network path and the receiver actually sustain when the transmitter is operated without intentionally introducing delays.

There is also provided, in accordance with another preferred embodiment of the present invention, apparatus for governing information transfer between a transmitter and a receiver. This apparatus is operative to transmit a first echo request packet and to cause a plurality of packets to be transmitted by a transmitter without regard to whether an echo return responsive to the echo request packet is received from a receiver. Thereafter, if an echo return has not been received, subsequent to the first echo request packet, there will be no further transmission to transmit at least another echo request and any further data packets until receipt of an echo return.

There is also provided, in accordance with another preferred embodiment of the present invention, apparatus for governing information transfer among the plurality of data utilization elements, which apparatus is operative to govern the rate of data transmission by a transmitting data utilization element by non-continuously causing the rate of data transmission to increase such that the rate at which the data is received by a receiving data utilization element, also increases.

There is also provided, in accordance with another preferred embodiment of the present invention, apparatus for governing information transfer between a transmitter and a receiver. This apparatus is operative to govern information transfer between a transmitter and a receiver and includes apparatus operative to transmit a first echo request packet and to cause a first plurality of packets to be transmitted by a transmitter without regard to whether an echo return responsive to the echo request packet is received from a receiver; and thereafter, if an echo return has not been received, subsequent to the first echo request packet, not to transmit any further data packets until receipt of an echo return. The apparatus is also responsive to the elapsed time between transmission of an echo request packet and receipt of an echo return corresponding thereto for increasing the rate of transmission by the transmitter above the rate at which the receiver receives the data. Furthermore, the apparatus compares the rate at which the receiver receives transmissions in response to an increased rate of transmission of the transmitter with the rate at which the receiver received transmissions prior to increasing the rate of transmission.

There is also provided, in accordance with another preferred embodiment of the present invention, apparatus for governing information transfer between a transmitter and a receiver along a network path interconnecting the transmitter and receiver. This apparatus is operative to govern the data transmission rate of a transmitter and includes apparatus for sensing the relationship between the duration of transmission of a group of data packets by the transmitter and the duration of receipt of the group of data packets by a receiver. The apparatus is operative to non-continuously respond to the time durations and their relationship for initially setting a data transmission rate and later for increasing the data transmission rate above the current rate of reception of the receiver.

There is also provided, in accordance with another preferred embodiment of the present invention, apparatus for governing information transfer between a transmitter and a receiver and including apparatus for governing a flow of data in accordance with a protocol. This protocol contains separate error control and flow control mechanisms, including the transmission of echo request packets for queue control purposes.

There is also provided, in accordance with another preferred embodiment of the present invention, apparatus for governing information transfer between a transmitter and a receiver connected together by a network. This apparatus is operative to cause transmission of a selected number of data packets in a generally unarrested sequence and wherein the number of packets in the sequence is selected based at least in part on the round trip delay in the network.

There is also provided, in accordance with another preferred embodiment of the present invention, a data network including a plurality of data utilization elements, interconnection apparatus for interconnecting the plurality of data utilization elements and defining at least one network path between a transmitter and receiver; and apparatus for governing information transfer between a transmitter and a receiver, without rate oscillation. This apparatus which is comprised of a rate controller associated with the transmitter and a rate monitor associated with the receiver, operative according to a rate based transport protocol having apparatus for determining the rate of information transmission of the transmitter without rate oscillation. The rate based transport protocol operates to set the rate of information transmission of the transmitter without rate oscillation. The rate based transport protocol operates to set the rate of information transmission to be the rate that both the network path and the receiver actually sustain when the transmitter is operated without intentionally introducing delays.

There is also provided, in accordance with another preferred embodiment of the present invention, a data network including a plurality of data utilization elements, interconnection apparatus for interconnecting the plurality of data utilization elements, and apparatus for governing information transfer between a transmitter and a receiver. This apparatus is operative according to a rate based transport protocol having apparatus for determining the information transmission rate of the transmitter based at least in part on transmission of a number of packets transmitted by a transmitter without feedback from a receiver, and measuring the actual rate at which the packets are transmitted.

There is also provided, in accordance with another preferred embodiment of the present invention, a data network including a plurality of data utilization elements, interconnection apparatus for interconnecting the plurality of data utilization elements, and apparatus for governing information transfer between a transmitter and a receiver. This apparatus is operative according to a rate based transport protocol having apparatus for determining an information transmission rate by measuring the actual rate of receipt at a receiver.

There is also provided, in accordance with another preferred embodiment of the present invention, a data network including a plurality of data utilization elements, interconnection apparatus for interconnecting the plurality of data utilization elements, and apparatus for governing information transfer between a transmitter and a receiver. This apparatus is operative to transmit a first echo request packet and to cause a plurality of packets to be transmitted by a transmitter without regard to whether an echo return responsive to the echo request packet is received from a receiver. Thereafter, if an echo return has not been received, subsequent to the first echo request packet, there will be no further transmission to transmit at least another echo request and any further data packets until receipt of an echo return.

There is also provided, in accordance with another preferred embodiment of the present invention, a data network including a plurality of data utilization elements, interconnection apparatus for interconnecting the plurality of data utilization elements, a sensor for sensing the rate at which a receiver receives data packets, and apparatus for governing information transfer between a transmitter and a receiver. This apparatus is operative to govern the rate of data transmission by a transmitter by non-continuously causing the rate of data transmission to increase such that the rate at which the data is received by a receiver, also increases.

Further in accordance with a preferred embodiment of the present invention, an apparatus for governing information transfer between a transmitter and a receiver along a network path interconnecting the transmitter and the receiver. The apparatus is comprised of a rate controller associated with the transmitter and operates to govern the rate of data transmission by the transmitter for initially setting data transmission rate and later for non-continuously causing the rate of data transmission to increase. The apparatus also includes apparatus responsive to the duration of time for data transmission by the transmitter and the duration of time to receive such data by the receiver and receipt of such data by the receiving data utilization element for non-continuously increasing the rate of transmission by the transmitter above the rate at which the receiver receives the data.

There is also provided, in accordance with another preferred embodiment of the present invention, a data network including a plurality of data utilization elements, interconnection apparatus for interconnecting the plurality of data utilization elements, a sensor for sensing the rate at which a receiver receives data packets, and apparatus for governing information transfer between a transmitter and a receiver. This apparatus is operative to govern the rate of data transmission by a transmitter, and includes apparatus operative to transmit a first echo request packet and to cause a plurality of packets to be transmitted by a transmitter without regard to whether an echo return responsive to the echo request packet is received from a receiver. Thereafter, if an echo return has not been received, subsequent to the first echo request packet, there will be no further transmission to transmit at least another echo request and any further data packets until receipt of an echo return. The apparatus is also responsive to the elapsed time between transmission of an echo request packet and receipt of an echo return corresponding thereto for increasing the rate of transmission by the transmitter above the rate at which the receiver receives data. Furthermore, the apparatus is responsive to the sensor for comparing the rate at which the receiver receives transmissions in response to an increased rate of transmission of the transmitter with the rate at which the receiver received transmissions prior to increasing the rate of transmission.

Further in accordance with a preferred embodiment of the present invention, the data network also includes apparatus responsive to a sensed increased rate of receiving transmissions which are transmitted at an increased rate, for causing the transmitter to increase the rate of data packet transmission.

There is also provided, in accordance with another preferred embodiment of the present invention, a data network including a plurality of data utilization elements, interconnection apparatus for interconnecting the plurality of data utilization elements, a sensor for sensing a data receiving rate at which a receiver receives data packets, and apparatus for governing information transfer between a transmitter and a receiver. This apparatus is operative to govern the data transmission rate of a transmitter and includes apparatus for sensing the time duration of transmission of data packets by the transmitter and receipt of such data packets by the receiver. The apparatus is responsive to the time durations for initially setting data transmission rates and later for non-continuously increasing the data transmission rate above the current rate of reception of the receiver. The apparatus is also responsive to the sensor for comparing the rate at which the receiver receives transmissions in response to an increased rate of transmission of the transmitter with the rate at which the receiver received transmissions prior to increasing the rate of transmission; and providing an output indication if the rate of reception increased as the result of the increased rate of transmission. The apparatus is responsive to the output indication, by causing the transmitter to increase the rate of data packet transmission.

There is also provided, in accordance with another preferred embodiment of the present invention, a data network including a plurality of data utilization elements, interconnection apparatus for interconnecting the plurality of data utilization elements, and apparatus for governing information transfer between a transmitter and a receiver. This apparatus is operative to cause transmission of a selected number of data packets in a generally unarrested sequence according to a rate based transport protocol and wherein the number of packets in the sequence is selected based at least in part on the round trip delay in the network.

There is also provided, in accordance with another preferred embodiment of the present invention, a data network including a plurality of data utilization elements, interconnection apparatus for interconnecting the plurality of data utilization elements, and apparatus for governing information transfer among a plurality of data utilization elements, which apparatus is operative to cause transmission of a selected number of data packets in an unarrested sequence according to a rate based transport protocol and wherein the number of packets in the sequence is selected based at least in part on the round trip delay in the network.

Further in accordance with a preferred embodiment of the present invention, the generally unarrested sequence includes a sequence of packets unarrested by the lack of echo return packets.

Still further in accordance with a preferred embodiment of the present invention, the generally unarrested sequence is included in a chunk of packets whose transmission is uninterrupted by error correction activity.

Further in accordance with a preferred embodiment of the present invention, the number of packets in the chunk is based on the bandwidth of the network.

Still further in accordance with a preferred embodiment of the present invention, the apparatus for governing information also includes a sensor for sensing the number of packets which are transmitted by a transmitter prior to receipt of a queue clear indication from a receiver.

There is also provided, in accordance with another preferred embodiment of the present invention, a data communication method useful with a network comprising a plurality of data utilization elements, including at least one transmitter and at least one receiver, and interconnection apparatus for interconnecting the plurality of data utilization elements and defining at least one network path between a transmitter and a receiver. This method includes the steps for operating the transmitter without intentionally introducing delays, sensing the rate of information transfer actually sustained by both the network path and the receiver while the transmitter is operating without intentionally introducing delays and setting the rate of information transmission at the rate of information transfer actually sustained by both the network path and the receiver while the transmitter is operating without intentionally introducing delays.

There is also provided, in accordance with another preferred embodiment of the present invention, a data communication method useful with a network including a plurality of data utilization elements and interconnection apparatus for interconnecting the plurality of data utilization elements. This method includes steps for governing an information transfer rate between the transmitter and the receiver according to a rate based transport port protocol. It also includes steps for determining the rate of information transmission by the transmitter, based at least in part on selecting the number of packets that are transmitted by a transmitter without feedback from a receiver, and measuring the actual rate at which the packets are transmitted.

There is also provided, in accordance with another preferred embodiment of the present invention, a data communication method useful with a network including a plurality of data utilization elements and interconnection apparatus for interconnecting the plurality of data utilization elements. This method includes steps for governing an information transfer rate between a transmitter and a receiver according to a rate based transport protocol, wherein the step of governing includes the step of determining an information transmission rate of the transmitter measuring the actual rate of receipt at the receiver.

There is also provided, in accordance with another preferred embodiment of the present invention, a data communication method useful with a network including a plurality of data utilization elements and interconnection apparatus for interconnecting the plurality of data utilization elements. This method includes steps for governing an information transfer rate between a transmitter and a receiver, including the steps of transmitting a first echo request packet, causing a plurality of packets to be transmitted by a transmitter without regard to whether an echo return responsive to the echo request packet is received from a receiver; and thereafter, if an echo return has not been received, subsequent to the first echo request packet, there will be no further transmission to transmit at least another echo request and any further data packets until receipt of an echo return.

There is also provided, in accordance with another preferred embodiment of the present invention, a data communication method useful with a network including a plurality of data utilization elements, interconnection apparatus for interconnecting the plurality of data utilization elements and a sensor for sensing the rate at which the receiver receives data packets. The method includes the step of governing an information transfer rate between a transmitter and a receiver by non-continuously causing the rate of data transmission to increase such that the rate at which the data is received by the receiver, also increases.

Further in accordance with a preferred embodiment of the present invention, the step of governing information transfer includes non-continuously increasing the rate of transmission by the transmitter above the rate at which the receiver currently receives the data, responsive to the relationship between the duration of transmission of data by the transmitter and the time duration of receipt of such data by the receiver.

There is also provided, in accordance with another preferred embodiment of the present invention, a data communication method useful with a network including a plurality of data utilization elements, interconnection apparatus for interconnecting the plurality of data utilization elements and a sensor for sensing the rate at which a data utilization element receives data packets. This method includes the step for governing an information transfer between a transmitter and a receiver. Specifically, it includes the steps of governing the rate of data transmission by a transmitter, including transmitting a first echo request packet and a plurality of packets without regard to whether an echo return responsive to the echo request packet is received from a receiver. Thereafter, if an echo return has not been received, subsequent to the first echo request packet, transmission of any further data packets will be detained until receipt of an echo return. Governing the rate of data transmission by the transmitter also involves increasing the rate of transmission by the transmitter above the rate at which the receiver receives the data, responsive to the elapsed time between transmission of an echo request packet and receipt of an echo return corresponding thereto. Furthermore, it entails comparing the rate at which the receiver receives transmissions in response to an increased rate of transmission of the transmitter with the rate at which the receiver received transmissions prior to increasing the rate of transmission.

Additionally in accordance with a preferred embodiment of the present invention, the method also includes the step of causing the transmitter to increase the rate of data packet transmission, responsive to a sensed increased rate of receiving transmissions which are transmitted at an increased rate.

There is also provided, in accordance with another preferred embodiment of the present invention, a data communication method useful with a network including a plurality of data utilization elements, interconnection apparatus for interconnecting the plurality of data utilization elements and a sensor for sensing the rate at which a receiver receives data packets. This method includes steps for governing an information transfer between a transmitter and a receiver. It also includes the steps of governing the data transmission rate of a transmitter, including sensing the relationship of the duration of transmission of data packets by the transmitter and the time duration of receipt of such data packets by the receiver. In addition, the steps of governing the data transmission rate are responsive to the relationship between the time durations, non-continuously increasing the data transmission rate above the current rate of reception of the receiver and responsive to the sensor, by comparing the rate at which the receiver receives transmissions in response to an increased rate of transmission of the transmitter with the rate at which the receiver received transmissions prior to increasing the rate of transmission. An output indication is provided if the rate of reception increased as a result of the increased rate of transmission, and responsive to the output indication, causing the transmitter to increase the rate of data packet transmission.

There is also provided, in accordance with another preferred embodiment of the present invention, a data communication method useful with a network including a plurality of data utilization elements and interconnection apparatus for interconnecting the plurality of data utilization elements. The method includes the step of governing an information transfer rate between the transmitter and the receiver connected together by the network, including causing transmission of a selected number of data packets in a generally unarrested sequence according to a rate based transport protocol. The number of packets in the sequence is selected based at least in part on the round trip delay in the network.

There is also provided, in accordance with another preferred embodiment of the present invention, a data communication method useful with a network including a plurality of data utilization elements and interconnection apparatus for interconnecting the plurality of data utilization elements. The method includes the step of governing an information transfer among the plurality of data utilization elements including causing the transmission of a first chunk of data packets from a transmitter to a receiver without interrupting transmission due to missing, corrupted or duplicate packets or packets received out of order. It also involves the transmission of a second multiplicity of data packets from the transmitter to the receiver, without first requesting retransmission of packets from the first multiplicity of data packets and without interrupting transmission due to missing, corrupted or duplicate packets or packets received out of order in the second multiplicity of data packets. A request for retransmission of packets from the first multiplicity of data packets occurs only after at least part of the transmission of the second multiplicity of data packets.

Further in accordance with a preferred embodiment of the present invention, the number of packets that are selected are selected, based at least in part, on the round trip delay in the network.

There is also provided, in accordance with another preferred embodiment of the present invention, a data communication method useful with a network including a plurality of data utilization elements and interconnection apparatus for interconnecting the plurality of data utilization elements. The method includes the step of governing an information transfer rate between a transmitter and a receiver, including the step of causing transmission of a selected number of data packets in an unarrested sequence according to a rate based transport protocol and wherein the number of packets in the sequence is selected based at least in part on the round trip delay in the network.

Further in accordance with a preferred embodiment of the present invention, the generally unarrested sequence includes a sequence of packets uninterrupted by the lack of echo request packets.

Still further in accordance with a preferred embodiment of the present invention, the generally unarrested sequences include a chunk of packets, the transmission of which are uninterrupted by error correction activity.

Still further in accordance with a preferred embodiment of the present invention, the number of packets in the sequence are also selected based on the bandwidth of the network.

Additionally in accordance with a preferred embodiment of the present invention, the step of governing information also includes sensing the number of packets which are transmitted following an echo request packet prior to receipt of a queue clear indication from a receiver.

There is also provided, in accordance with another preferred embodiment of the present invention, a method for governing information transfer across a path including a transmitter, a receiver and an interconnecting network portion. The method includes steps for monitoring the instantaneous throughput of the path and upon detection of a non-instantaneous occurrence of the path being underutilized, determining a new rate of information transmission by the transmitter which increases path utilization without overloading the path. In addition, the method is comprised of steps for transmitting information at the new rate.

There is also provided, in accordance with another preferred embodiment of the present invention, a method for governing information transfer across a path including a transmitter, a receiver and an interconnecting network portion. The method includes steps for transmitting information at a first rate, monitoring at the transmitter the instantaneous throughput of the path and upon detection of an occurrence of reduced end-to-end effective path throughput, ceasing information transmission for a first time period and subsequently resuming information transmission at the first rate.

Further in accordance with a preferred embodiment of the present invention, the step of monitoring includes the steps of transmitting an echo request, and, without waiting for an echo return responsive to the echo request transmitting further information at least a predetermined amount of information. The step of ceasing is carried out if no echo return has been received responsive to the echo request during transmittal of the further information.

Still further in accordance with a preferred embodiment of the present invention, the step of monitoring includes the steps of transmitting an echo request, and transmitting further information without waiting for an echo return. The step of ceasing is carried out if no echo return has been received responsive to the echo request during transmittal of the further information.

Further in accordance with a preferred embodiment of the present invention, the apparatus for governing information transfer includes an information transfer governing network interface card operative to govern information transfer between a plurality of data utilization elements.

Still further in accordance with a preferred embodiment of the present invention, the information transfer governing network interface card is operative to determine a rate at which information is transferred between the plurality of data utilization elements.

Further in accordance with a preferred embodiment of the present invention, the information transfer governing network interface card is operative to change, at least once, the rate at which information is transferred among the plurality of data utilization elements.

There is also provided, in accordance with another preferred embodiment of the present invention, apparatus for governing information transfer between a transmitter and a receiver along a network path interconnecting the transmitter and the receiver. Included in the apparatus is apparatus for governing a flow of data by transmitting echo request packets for queue control purposes, comprising apparatus for transmitting echo request packets, apparatus for receiving transmitted echo request packets and providing echo response packets, and queue control apparatus for sensing receipt of echo response packets and providing queue control responsive thereto.

Further in accordance with a preferred embodiment of the present invention, the transmission of the selected number of data packets is carried out according to a rate based transport protocol.

There is also provided, in accordance with another preferred embodiment of the present invention, apparatus for governing information transfer across a path including a transmitter, a receiver and an interconnecting network portion. The apparatus includes an instantaneous path throughput monitoring unit and an information transfer rate determining apparatus operative, upon detection of a non-instantaneous occurrence of the path being underutilized along the path between the transmitter and the receiver as indicated by consecutive earlier than expected receipt of echo return responses along the path, to set a higher rate of information transfer which increases path utilization without overloading the path.

There is also provided, in accordance with another preferred embodiment of the present invention, apparatus for governing information transfer across a path including a transmitter transmitting information at a first rate, a receiver and an interconnecting network portion. The apparatus includes apparatus for monitoring at the transmitter the instantaneous throughput of the path. The apparatus also comprised of an information transmission control apparatus operative, upon detection, at the transmitter with the aid of the receiver, of an occurrence of reduced end to end effective path throughput. The result is to cause information transmission to be ceased for a first time period and to subsequently be resumed at the first rate.

Further in accordance with a preferred embodiment of the present invention, the apparatus for monitoring includes apparatus for transmitting an echo request, and apparatus causing further information, including at least a predetermined amount of information, to be transmitted without waiting for an echo return. The information transmission control apparatus is operative to cease information transmission if no echo return has been received responsive to the echo request during transmittal of the further information.

Further in accordance with a preferred embodiment of the present invention, the apparatus for monitoring includes apparatus for transmitting an echo request, and apparatus for transmitting further information without waiting for an echo return. The information transmission control apparatus is operative to cease information transmission if no echo return has been received responsive to the echo request during transmittal of the further information.

Further in accordance with a preferred embodiment of the present invention, the information transmission control apparatus is operative to cause information transmission to be resumed after receipt of the echo return.

There is also provided, in accordance with another preferred embodiment of the present invention, a data network including a plurality of data utilization elements, interconnection apparatus for interconnecting the plurality of data utilization elements and providing a path between the transmitter and the receiver, and apparatus for governing information transfer across the path. The apparatus includes an instantaneous path throughput monitoring unit, and an information transfer rate determining apparatus operative, upon detection of a non-instantaneous occurrence of the path being underutilized as indicated by consecutive earlier than expected receipt of echo responses along the path, to set a higher rate of information transmission by the transmitter which increases path utilization without overloading the path.

There is also provided, in accordance with another preferred embodiment of the present invention, a data network including a plurality of data utilization elements, interconnection apparatus for interconnecting the plurality of data utilization elements, and apparatus for governing information transfer across a path including a transmitter transmitting information at a first rate, a receiver and an interconnecting network portion. The apparatus includes apparatus for monitoring the instantaneous throughput of the path, and an information transmission control apparatus operative, upon detection at the transmitter with aid of the receiver of an occurrence of reduced end to end effective path throughput, to cause information transmission to be ceased for a first time period and to subsequently be resumed at the first rate.

Additionally in accordance with a preferred embodiment of the present invention, the apparatus for monitoring includes apparatus for transmitting an echo request, and apparatus causing further information including at least a predetermined amount of information to be transmitted without waiting for an echo return, and wherein information transmission control apparatus is operative to cease information transmission if no echo return has been received responsive to the echo request during transmittal of further information.

Further in accordance with a preferred embodiment of the present invention, the apparatus for monitoring includes apparatus for transmitting an echo request, and apparatus for transmitting further information without waiting for an echo return. The information transmission control apparatus is operative to cease information transmission if no echo return has been received responsive to the echo request during transmittal of the further information.

Further in accordance with a preferred embodiment of the present invention, the information transmission control apparatus is operative to cause information transmission to be resumed after receipt of the echo return.

Preferably, the apparatus is operative according to a rate based transport protocol.

There is also provided, in accordance with another preferred embodiment of the present invention, apparatus for governing information transfer among a plurality of data utilization elements, without rate oscillation, which apparatus is operative according to a rate based transport protocol.

There is also provided, in accordance with another preferred embodiment of the present invention, apparatus for governing information transfer among a plurality of data utilization elements. This apparatus is operative according to a rate based transport protocol and has apparatus for automatically determining the rate of information transfer among data utilization elements.

There is also provided, in accordance with another preferred embodiment of the present invention, a data network including a plurality of data utilization elements, interconnection apparatus for interconnecting the plurality of data utilization elements, and apparatus for governing information transfer among a plurality of data utilization elements, without rate oscillation. This apparatus is operative according to a rate based transport protocol.

There is also provided, in accordance with another preferred embodiment of the present invention, a data network including a plurality of data utilization elements, interconnection apparatus for interconnecting the plurality of data utilization elements, and apparatus for governing information transfer among a plurality of data utilization elements. This apparatus is operative according to a rate based transport protocol and has apparatus for automatically determining the rate of information transfer among data utilization elements.

There is also provided, in accordance with a preferred embodiment of the present invention, a data communication method including the step of governing information transfer among a plurality of data utilization elements, without rate oscillation. The method is operative according to a rate based transport protocol.

There is also provided, in accordance with another preferred embodiment of the present invention, a data communication method including the step of governing information transfer among a plurality of data utilization elements. This method is operative according to a rate based transport protocol, and includes the step of automatically determining the rate of information transfer among data utilization elements.

In one embodiment of the invention, the generally uninterrupted sequence is a sequence of packets uninterrupted by echo request packets. In another embodiment of the invention, which may co-exist with the aforesaid embodiment of the invention, the generally uninterrupted sequence is a chunk of packets, uninterrupted by error correction activity.

Preferably the number of packets in the sequence are also selected also based on the bandwidth of the network.

BRIEF DESCRIPTION OF THE DRAWINGS

The present invention will be more fully understood and appreciated from the following detailed description, taken in conjunction with the drawings in which.

LIST OF APPENDICES

Appendix A is a netlist and a parts list for a preferred embodiment of a network interface card;

Appendix B is a listing of software resident in the network interface card described with specificity in Appendix A;

Appendix C is a listing of software which is resident in the data utilization element in which the network interface card of Appendix A is located; and Appendix D is a listing of software for a software-only embodiment of the invention.

DETAILED DESCRIPTION OF A PREFERRED EMBODIMENT

Throughout the specification and claims, the following terms will be defined as follows:

"echo request" or "echo request packet"—a packet which, upon receipt thereof by a receiver, causes the receiver to send an echo return packet back to the same transmitter;

"echo return" or "echo return packet"—a packet sent from a receiver to a transmitter which is an indication that, at the time the echo return packet was sent, the receiver queue was clear of data packets received prior to the arrival of the echo request packet.

The echo request and echo return packets may have any suitable format and may be "piggybacked" with data which is irrelevant to the echo requesting and returning functions. For example, the protocol may be such that a certain number n of data packets received by a receiver results in an eventual echo return back to the transmitter, in which case the n'th data packet comprises an echo request packet even though no echo request data is actually included in the n'th data packet.

"rate based transport protocol"—a data transfer protocol which governs the rate at which a transmitter transmits data in order to achieve enhanced performance and avoid congestion.

Figure 1:
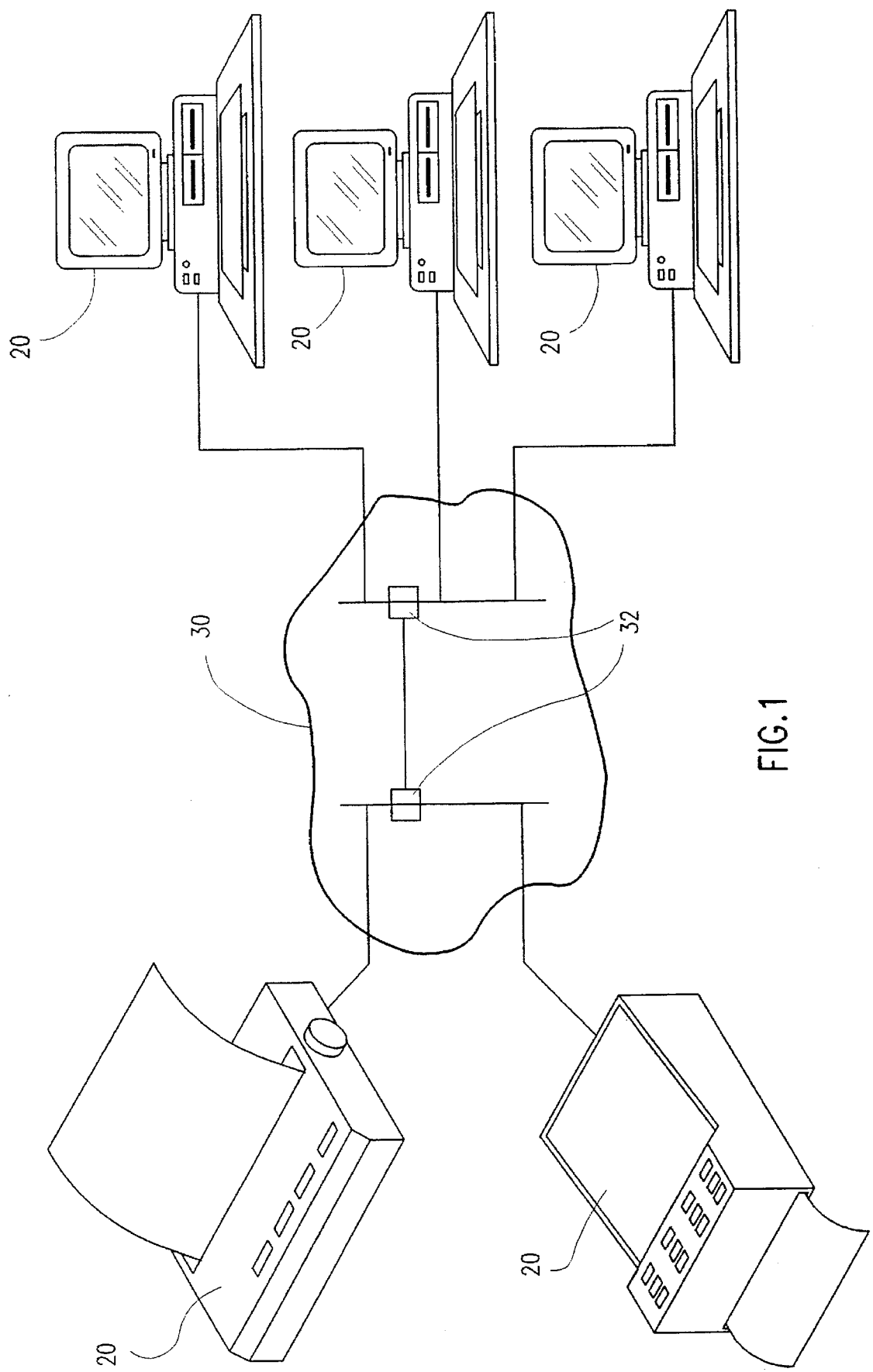
FIG. 1 is a simplified block diagram illustration of a data network environment in which the present invention is useful.

Reference is now made to FIG. 1, which illustrates a typical data network environment in which the present invention is useful. A plurality of data utilization elements 20, such as computers, computer terminals, facsimile machines, printing and pre-press apparatus, scanners, data storage devices, data storage and transmission devices and the like, are interconnected by means of a network 30. Network 30 may be any suitable type of network, such as a local area network, a wide area network, a metropolitan area network, serial communication link, public telephone system or a satellite communication network.

The terms "receiver" and "transmitter", as used hereinbelow, refer to a pair of data utilization elements 20 which are communicating via the network 30. The transmitter transmits data to the receiver, which receives the data; however, the receiver is typically capable of transmitting, and the transmitter is typically capable of receiving, control messages.

It is appreciated that an individual data utilization element 20 may function as a receiver to another data utilization element functioning as a transmitter and also as a transmitter to a third data utilization element functioning as a receiver. Furthermore, an individual data utilization element 20 may function as a receiver and/or as a transmitter to a plurality of data utilization elements 20 functioning as transmitters or receivers. Certain data utilization elements are capable of functioning only as a receiver or only as a transmitter, apart from transmission or receipt of control messages. For example, most conventional printer units are capable of functioning only as a receiver and most conventional scanning units are capable of functioning only as a transmitter.

Examples of various types of such networks are Token Ring Network, Arcnet, Ethernet, LocalTalk (AppleTalk), ISDN, FDDI and Fast Ethernet and combinations thereof. The network 30 typically comprises a plurality of routers 32. The data may be carried over public or private dedicated lines or a combination thereof.

The network 30 is typically characterized in that it has inherent constraints in terms of available bandwidth. It is also characterized by congestion and resulting delays between transmission and receipt which vary over time. Delays may be inherent in the distances across which transmission occurs and in the routers, bridges, repeaters and other network devices. Additional delays are produced by the operation of the data utilization elements 20.

Figure 2:
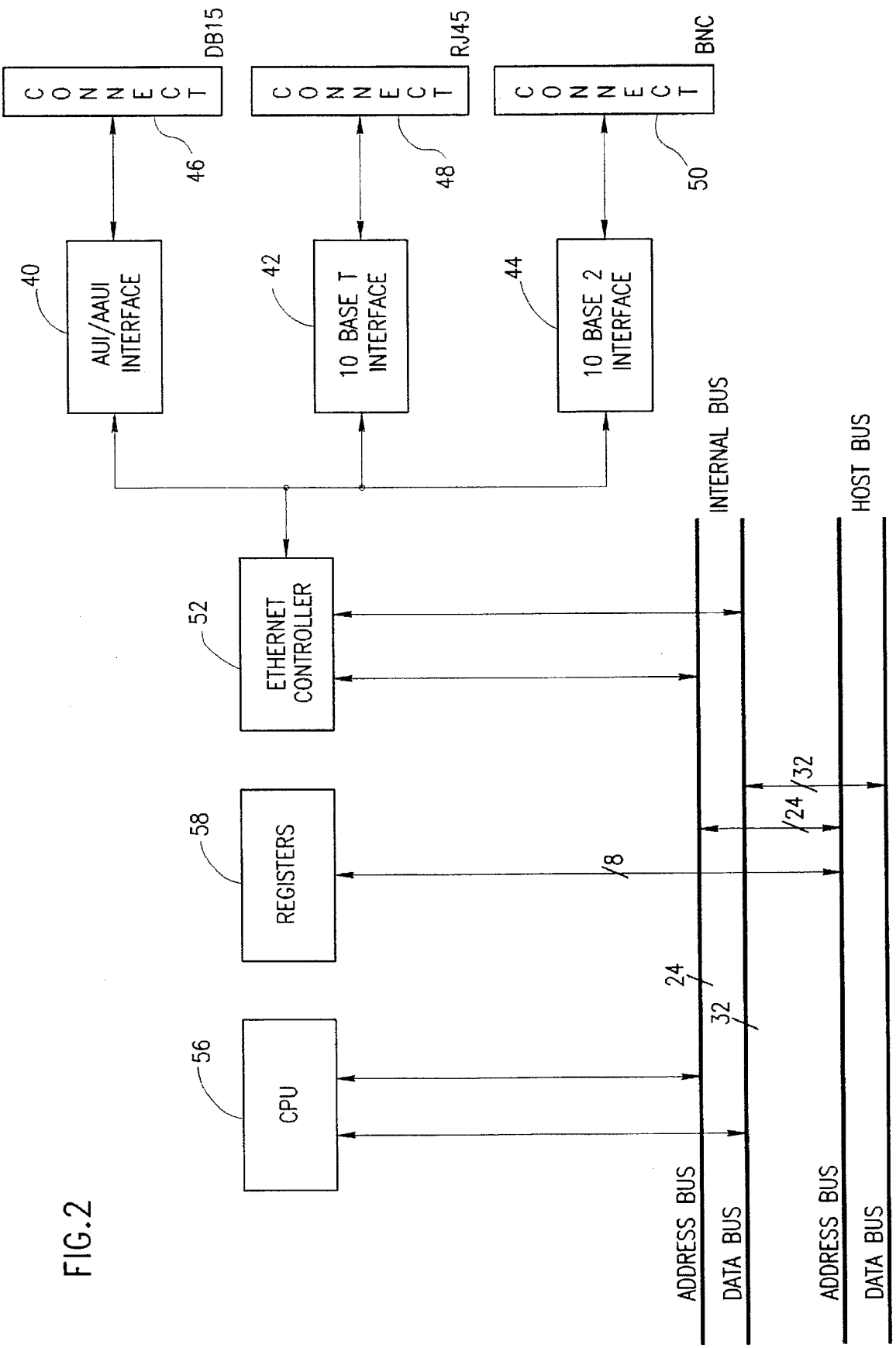
FIG. 2 is a simplified block diagram of a network interface card constructed and operative in accordance with a preferred embodiment of the present invention.

Reference is now made to FIG. 2 which is a block diagram illustration of a network interface card constructed and operative in accordance with a preferred embodiment of the present invention and which is designed to reside within a data utilization element 20. Alternatively a network interface card may be provided for connection external to the data utilization element 20.

The network interface card comprises a plurality of electrical interfaces 40, 42 and 44, each arranged in association with a corresponding mechanical connector 46, 48 and 50. All of the electrical interfaces 40, 42 and 44 are interconnected with a conventional commercially available Ethernet controller 52 which communicates via an address bus and a data bus with the remaining elements of the card and via a host bus with the data utilization element.

It is to be noted that although the invention is illustrated in FIG. 2 with reference to an Ethernet network, any other suitable type of network may be employed instead.

The network interface card also comprises a CPU 56 and a plurality of registers 58 which are employed in communication with the data utilization element.

A netlist and a parts list for a preferred embodiment of an Ethernet interface card are set forth in Appendix A. The Ethernet interface card of Appendix A interfaces via a NuBus to a Macintosh computer. Macintosh is a trademark of Apple Computers, Inc. A listing of software resident in the Ethernet interface card described with specificity in Appendix A is set forth in Appendix B. A listing of software which is resident in the data utilization element in which the Ethernet interface card of Appendix A is located is set forth in Appendix C. The embodiment of Appendices A, B and C is operative in conjunction with Macintosh computers, running Operating System 7, serving as receivers and transmitters.

According to an alternative embodiment of the invention, the apparatus of the present invention, in either or both of the receiver and the transmitter, may be implemented entirely in software resident in the receiver and/or the transmitter, rather than being implemented in the network interface card of the receiver and/or transmitter. A listing of such software, which is particularly suitable for utilization in a Macintosh computer, running Operating System 7, is set forth in Appendix D.

A particular advantage of the first smart card-residing implementation of Appendices A, B and C, relative to the second data utilization element-residing implementation of Appendix D is that the following three entities operate independently, such that serial delays therebetween do not occur within chunks:

a. The CPU of the transmitter;
b. the CPU of the receiver; and
c. the transmitter and receiver cards.

It is appreciated that Appendices A, B, C and D are attached herewith merely to provide an extremely detailed disclosure of two preferred embodiments of the present invention and are not, however, intended to limit the invention.

Figure 3:
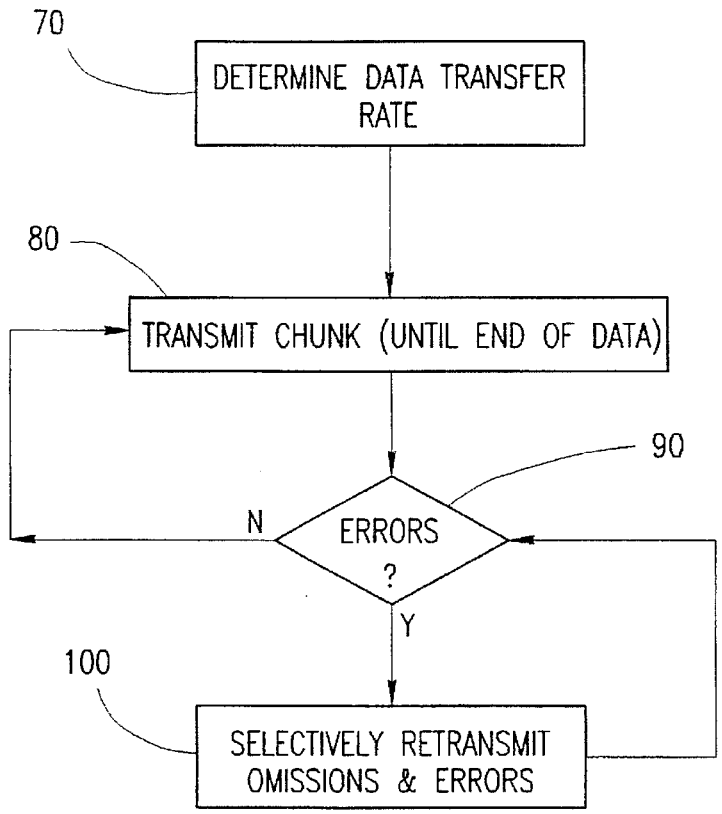
FIG. 3 is a generalized flow chart illustrating the overall operation of the invention.

Reference is now made to FIG. 3 which is a generalized flowchart illustrating an overall file transfer operation according to a preferred embodiment of the present invention. A unit of data transfer for error correction purposes is referred to as a chunk, i.e. a multiplicity of packets that is to be sent in one continuous uninterrupted sequence. The chunk is uninterrupted by error correction activity, and only echo request packets are transmitted and echo return packets are received during the course of transmission of the chunk.

Data transfer normally begins with data transfer rate determination (step 70) or with a decision not to employ rate determination. A preferred technique for data transfer rate determination is described hereinbelow in greater detail with reference to FIGS. 6A, 6B and 7.

The first chunk is loaded from storage in the data utilization element to a buffer which normally is part of the main memory of the data utilization element.

The first chunk is transmitted along the network 30 (step 80).

A check is made (step 90) to determine whether any errors occurred in the transmission of the first chunk to the receiver. If no errors are detected, a check is made whether any chunks remain in the file to be transmitted. If any chunks remain, they are sequentially loaded and transmitted, as described hereinabove with reference to step 80.

Upon completion of the transmission of an entire file and in the absence of errors, the procedure is terminated.

If errors are detected in transmission of a chunk, a retransmission chunk containing only missing or corrupted packets is prepared and subsequently transmitted (step 100). A further error check is carried out and retransmission occurs until an error-free chunk transmission is realized.

Preferably, error checks are carried out only after completion of the transmission of a chunk and not during its transmission and the error check takes place only after at least a portion of a subsequent chunk is transmitted.

If omissions are detected, it is sometimes desirable to decrease the value of the parameter Z, which is discussed in more detail below with reference to FIG. 8A.

Figure 4A:
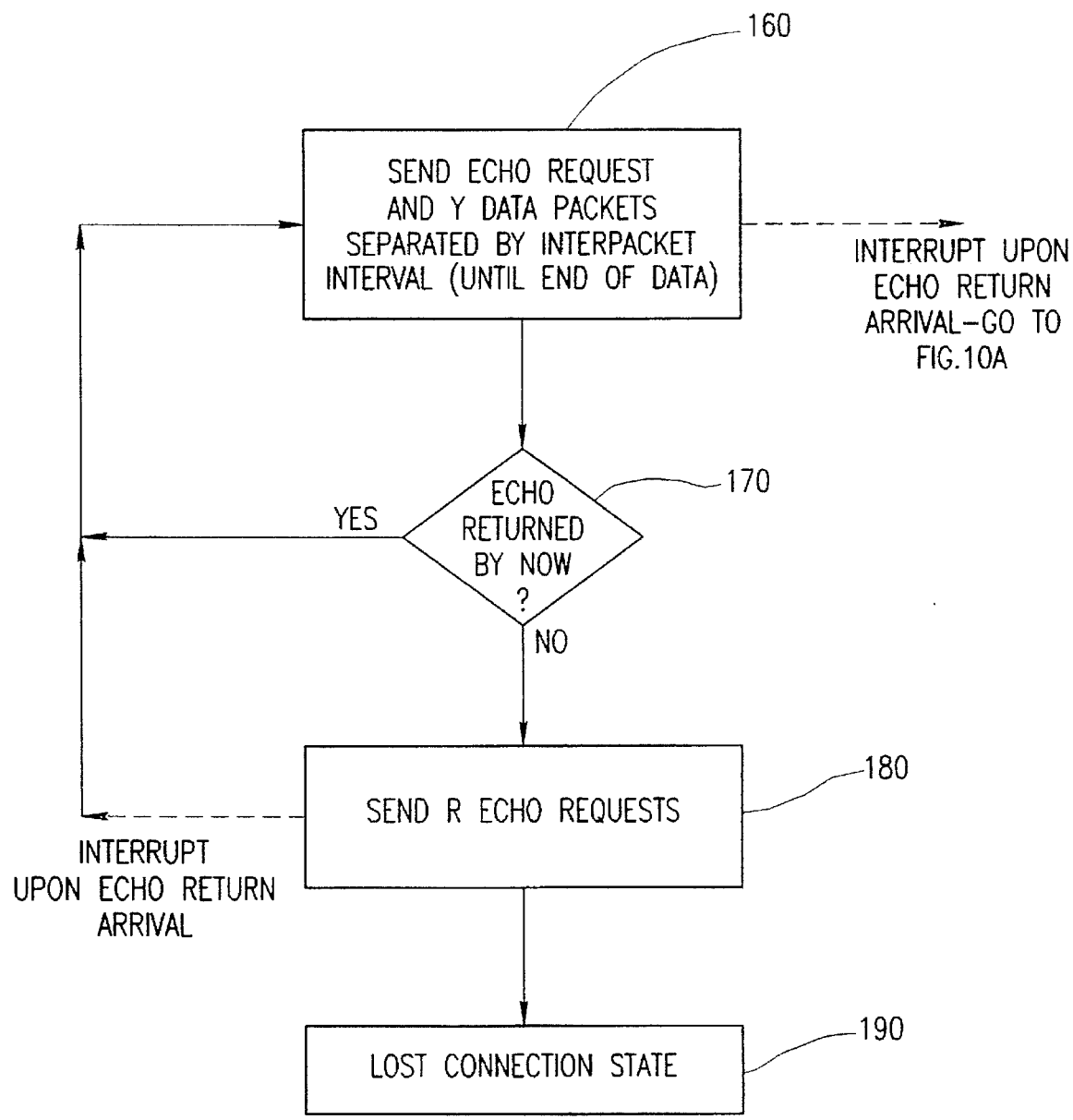
FIGS. 4A and 4B are generalized flow charts illustrating flow control operation of a transmitter and receiver respectively.
Figure 4B:
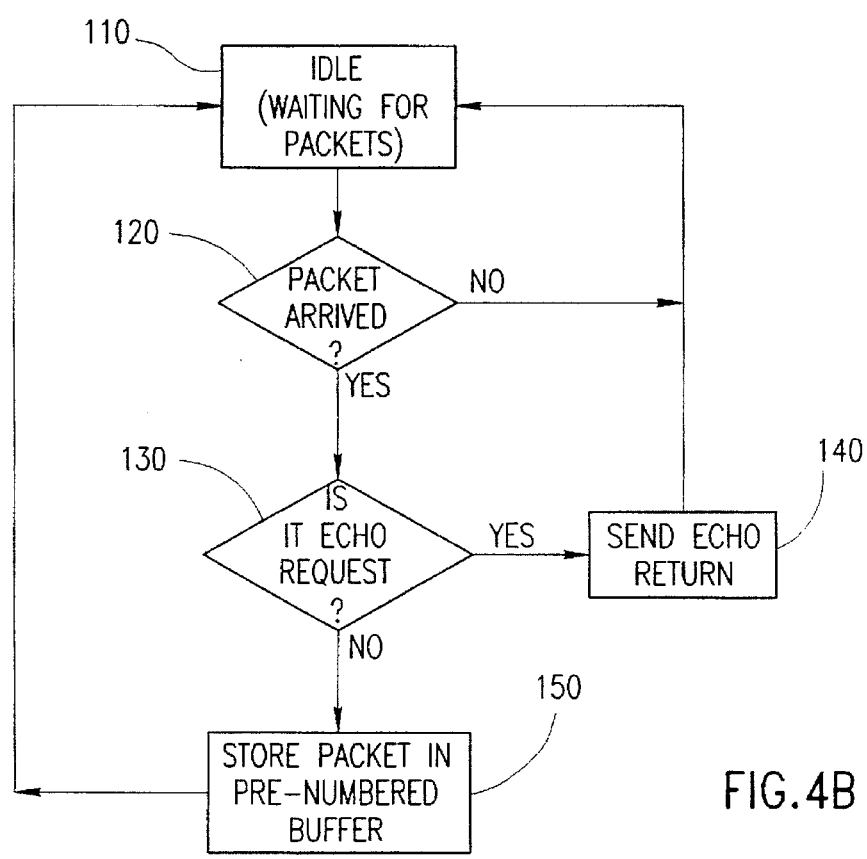

Reference is now made to FIGS. 4A and 4B which illustrate a preferred embodiment of the flow control operation of the invention. Preferred timeline diagrams for three different types of instances are provided in FIGS. 5A–5C. A transmitter initially sends an echo request packet which is a request for an echo return packet. The echo return packet, when received back at the transmitter, indicates that data transmitted prior to said echo request has been cleared from the receiver queue by the time the echo response was generated.

Transmission of the initial echo request packet is followed by transmission of a plurality of Y data packets regardless of whether or not an echo return packet has been received (step 160). In this case, 2Y is the total sum at the receiver and along the network of data packets which may accumulate for any given path and under any circumstances.

A preferred method for selecting Y is described hereinbelow with reference to FIGS. 8A, 8B and 9. Preferably, Y is selected such that:

a. Y is selected to be large enough to prevent "receiver starvation" which might occur due to round trip delay of the echo.
b. On the other hand, Y is not too large, so that, most of the time, the accumulated queue does not cause overflow of the input buffers.

The Y data packets are transmitted with a predetermined time separation therebetween, termed hereinbelow "the interpacket interval". The interpacket interval is preferably determined as described hereinbelow with reference to FIG. 6A, 6B and 7.

Alternatively, in a mode of operation wherein rate determined flow control is not provided, the time separation among each of the Y data packets is not predetermined and is determined by the transmitting data utilization element.

Upon completion of transmission of the Y data packets, a check (step 170) is made to determine whether an echo return packet in respect of the above-mentioned echo request packet has been received. If so, a further transmission of an echo request packet followed by Y data packets takes place and so on.

If the echo return has not been received by the completion of transmission of the Y data packets, further echo request packets are transmitted (step 180), such as a predetermined number R of echo request packets each separated by a predetermined time interval, such as 10 interpacket intervals, until an echo return packet in respect of either the initial echo request packet or the further echo request packets is received. Thereupon normal operation of the apparatus and transmission of data packets resumes. R may be any suitable integer such as 20. If no echo return is received, the connection is deemed to be lost (step 190).

The receiver is initially in an idle state (step 110) and is interrupted upon receipt of a packet (step 120). If (step 130) the received packet is an echo request packet, the receiver sends back an echo return packet to the transmitter of the echo request packet (step 140). If the received packet is not an echo request packet, the receiver stores the received packet in a prenumbered buffer (step 150).

Figure 5A:
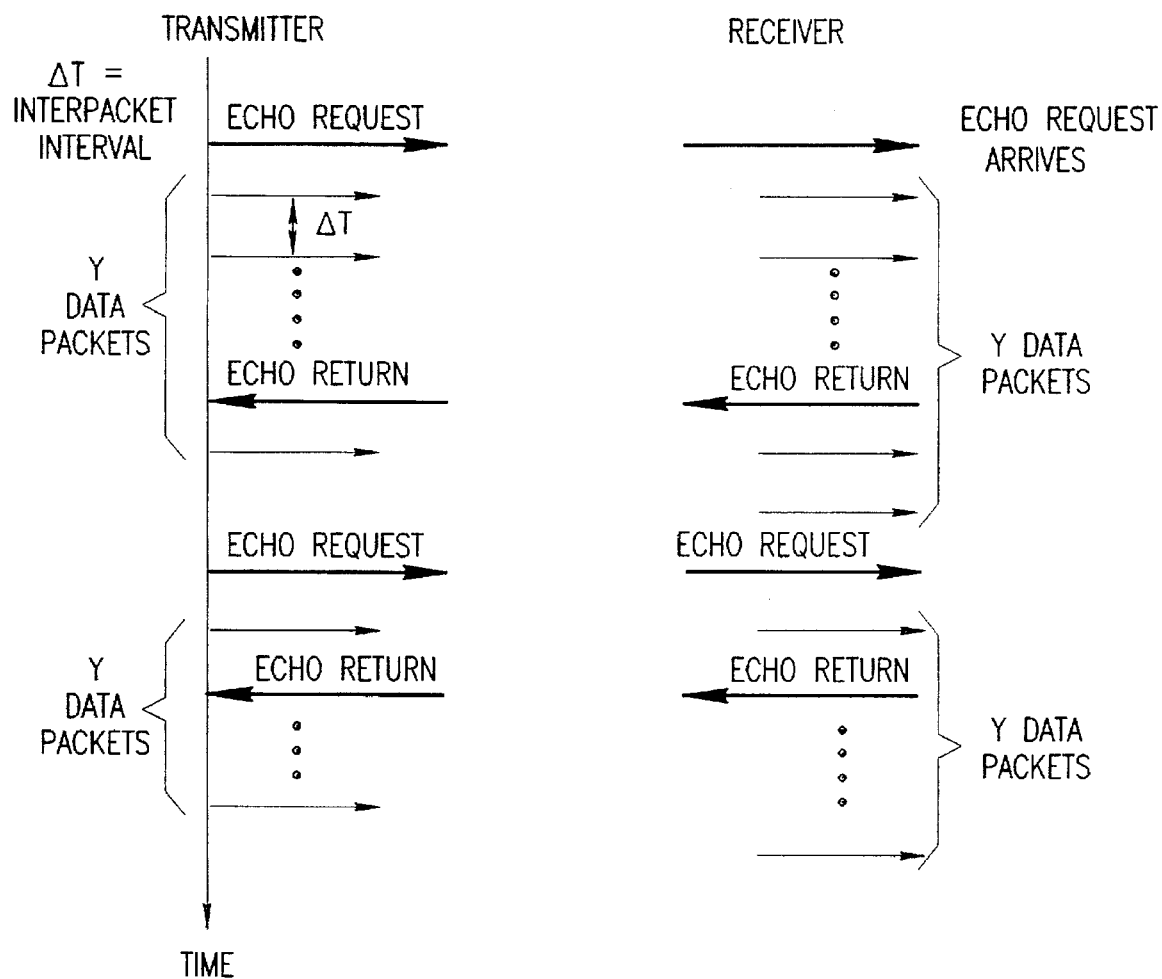
FIGS. 5A, 5B and 5C are simplified diagrams illustrating the data transfer mechanism employed in the operations illustrated in FIGS. 4A and 4B for three different operational situations.

FIG. 5A illustrates the behavior of the apparatus in a case in which no errors are encountered and the echo return packets are received before the end of the transmission of the Y data packets.

Figure 5B:
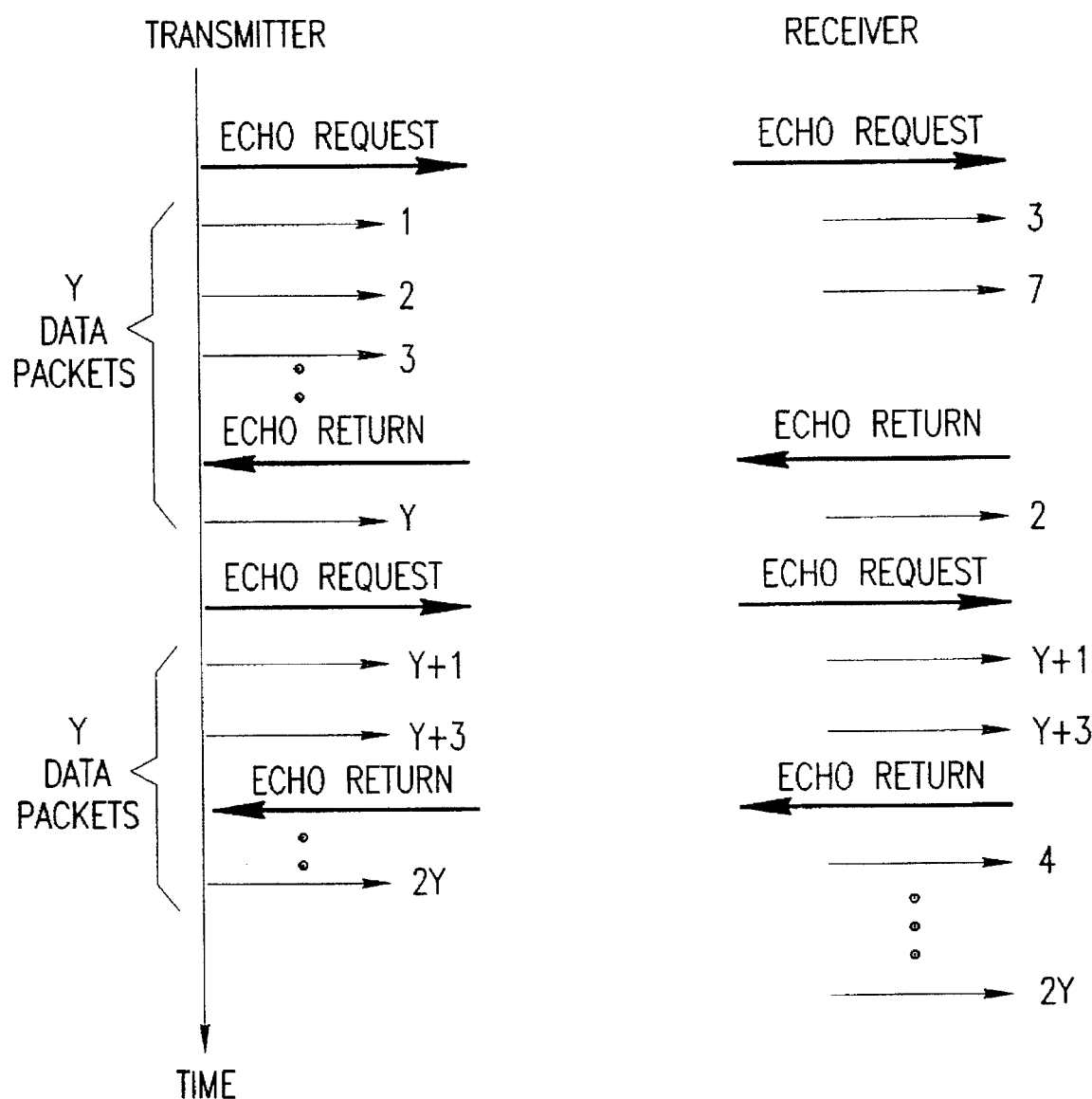

FIG. 5B illustrates behavior of the apparatus in a case in which data packet omissions and out of order receipt of data packets are encountered. As shown, no error correction procedure is initiated since the end of the chunk has not yet occurred.

Figure 5C:
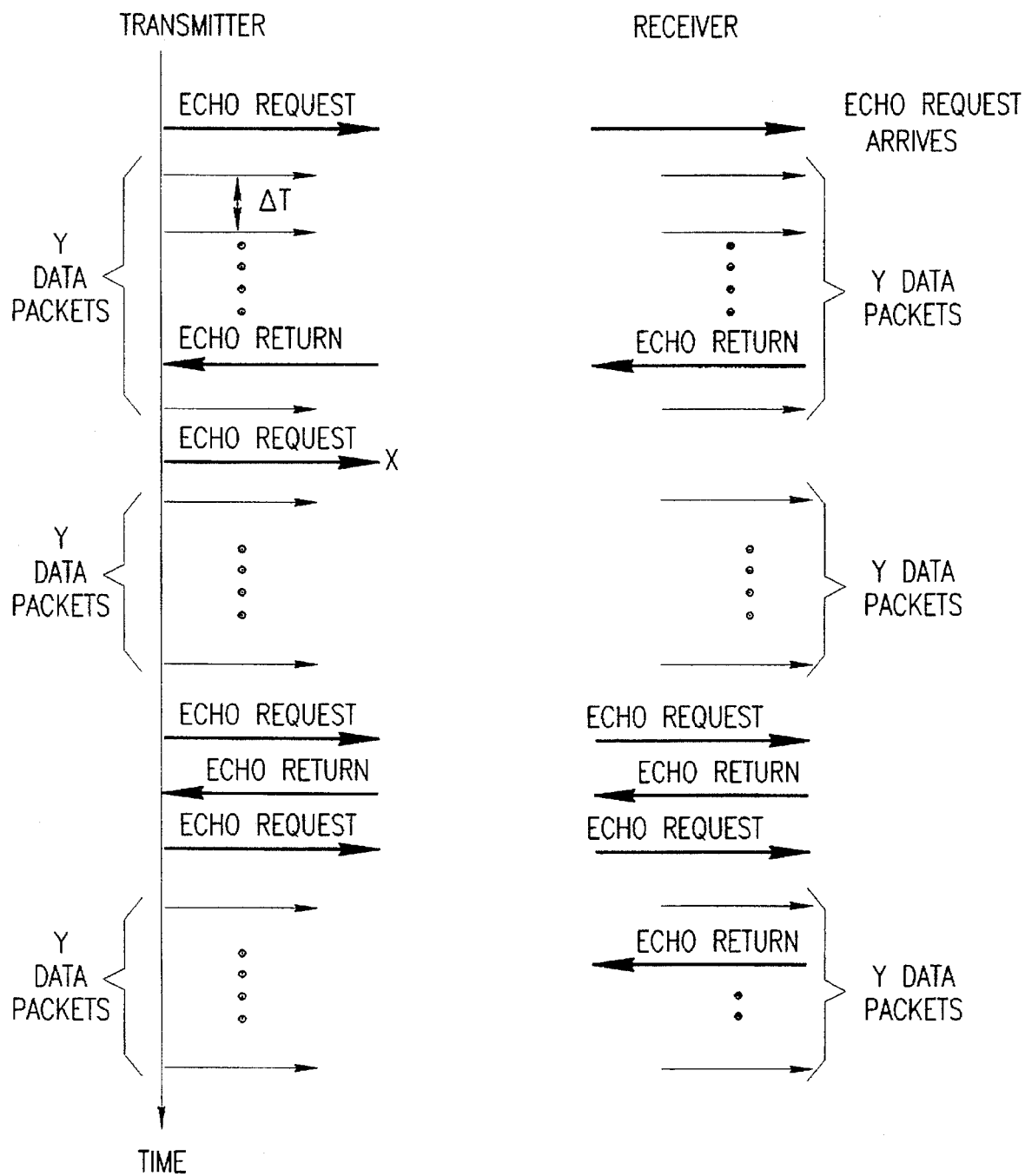

FIG. 5C illustrates behavior of the apparatus in a case in which echo return omissions are encountered. An echo request which is not received, for example, due to transmission failure, is designated by an "x". As shown, an echo return omission, unlike a data packet omission, does result in a corrective procedure in which an additional echo request is transmitted.

Figure 6A:
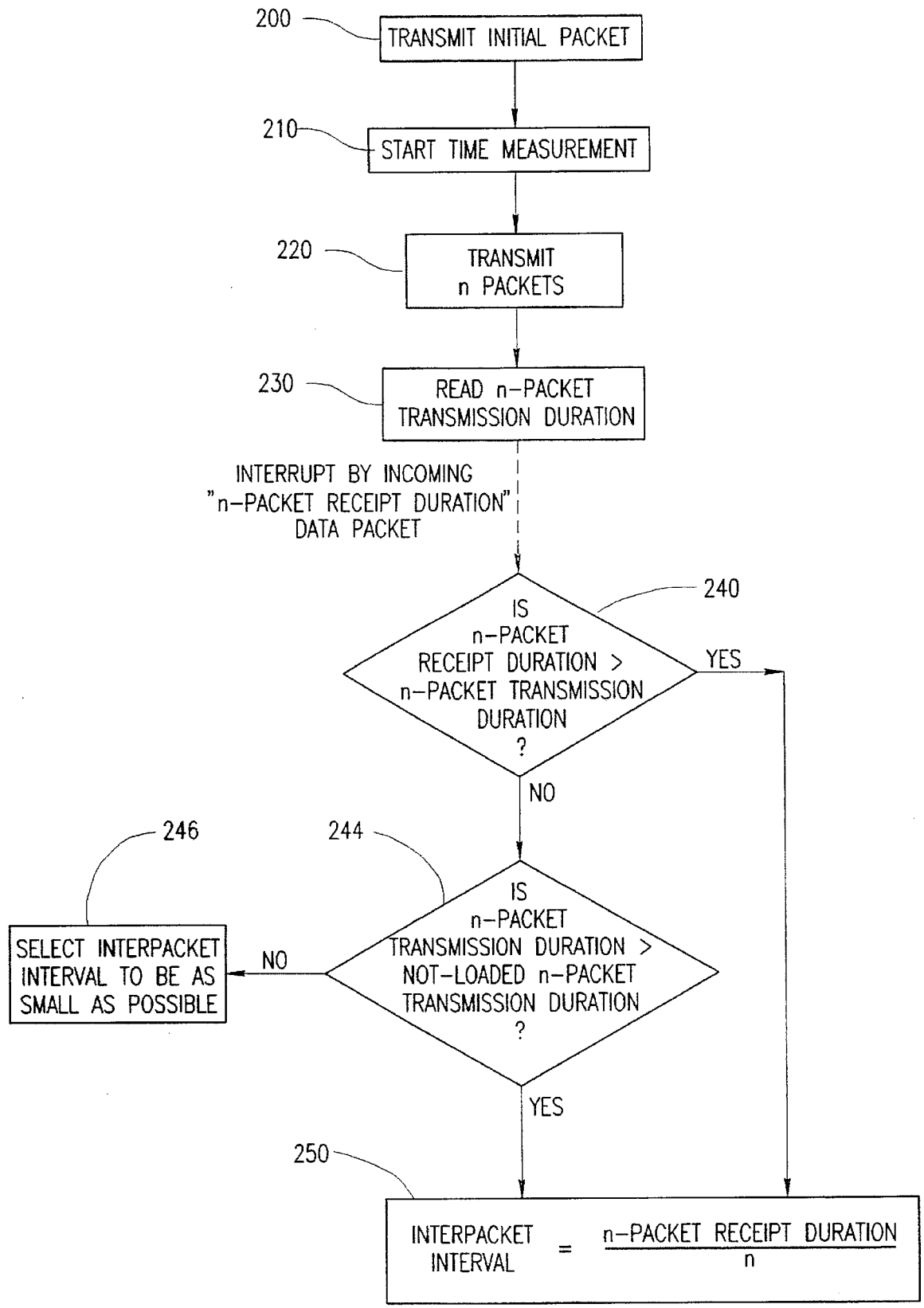
FIGS. 6A and 6B are generalized flow charts illustrating rate determination operation of a transmitter and receiver respectively.
Figure 6B:
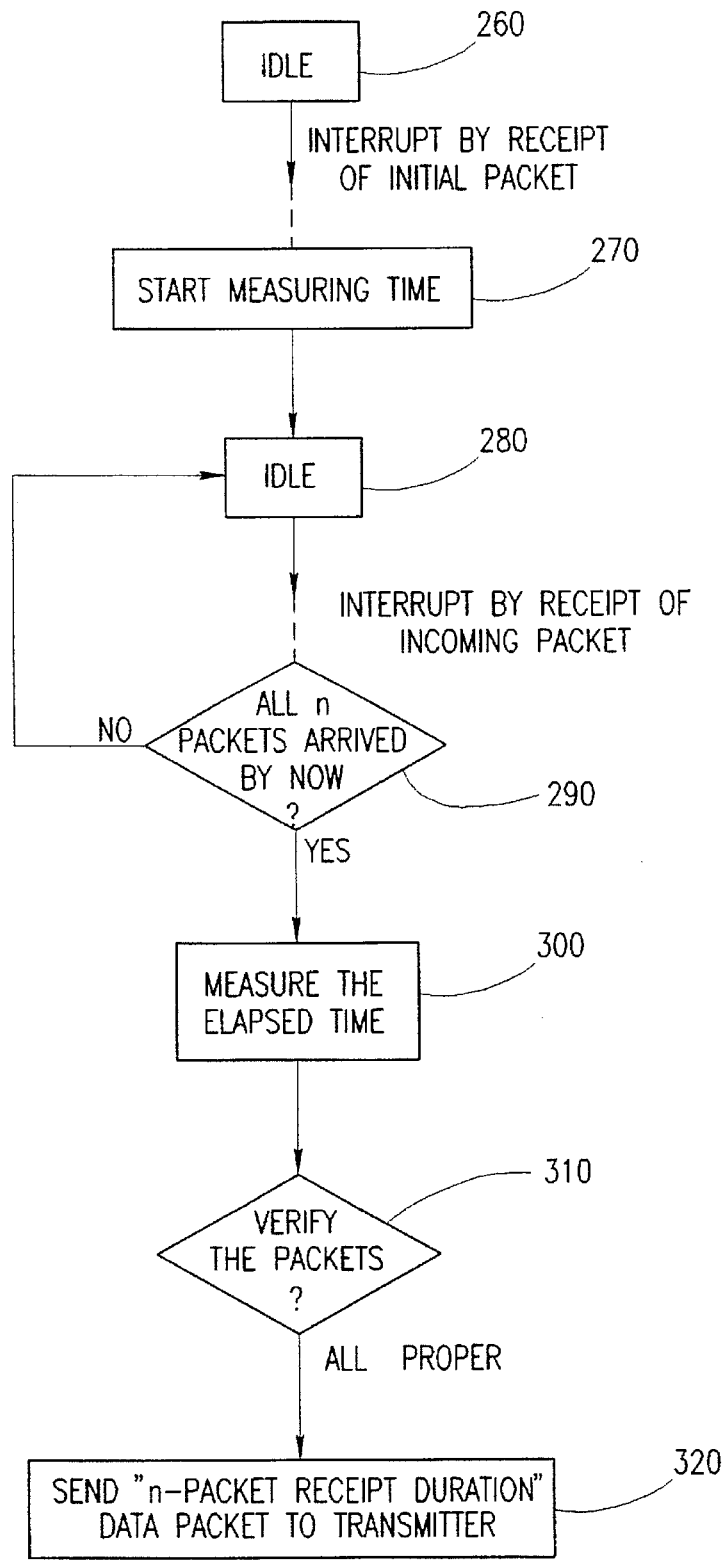
Figure 7:
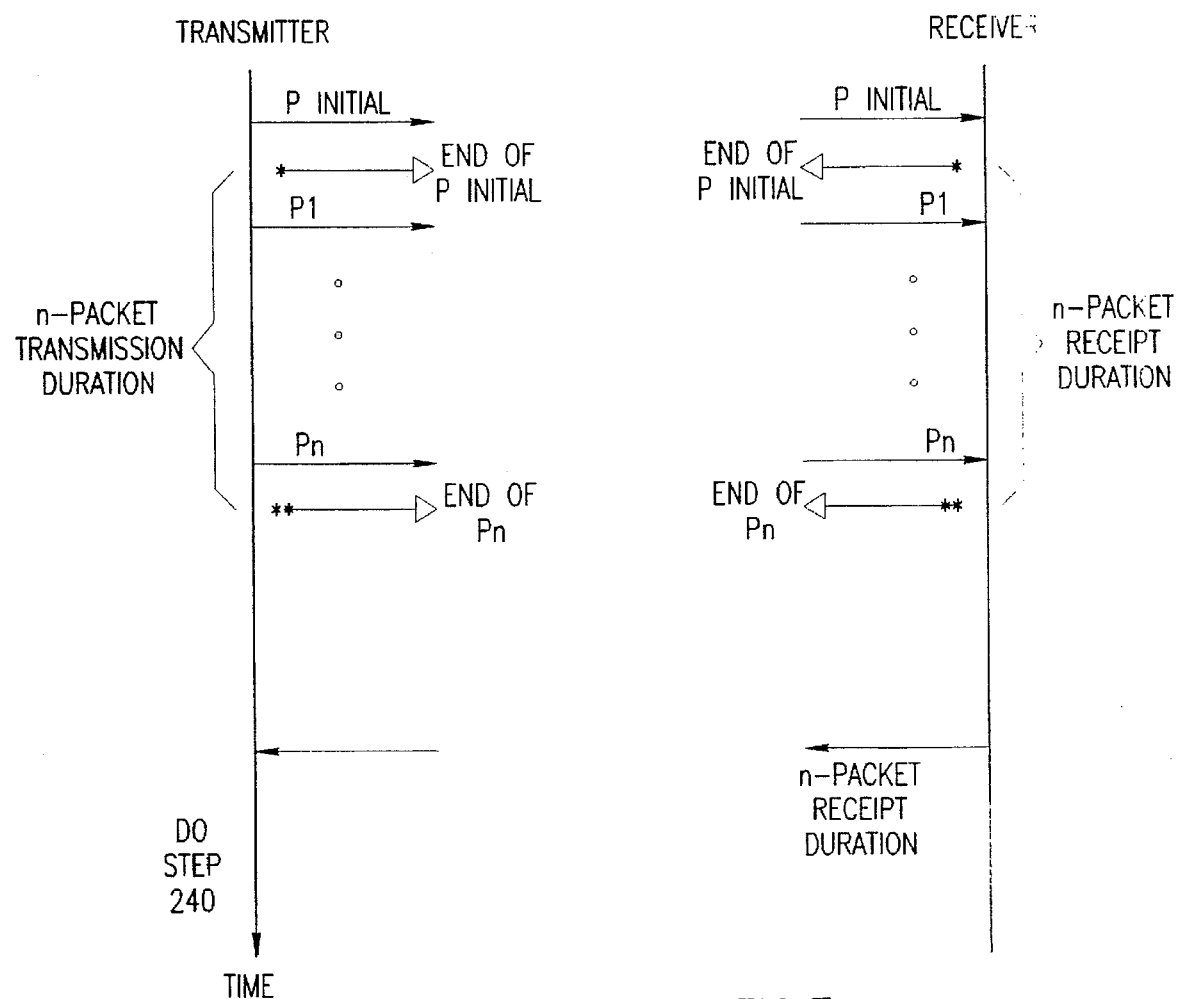
FIG. 7 is a simplified diagram illustrating the rate determination mechanism employed in the operations illustrated in FIGS. 6A and 6B.

Reference is now made to FIGS. 6A, 6B and 7, illustrating a preferred method for rate determination. FIGS. 6A and 6B illustrate steps in the operation of a transmitter and a receiver respectively. As indicated in FIG. 6A, the transmitter transmits an initial packet (step 200) and measures the elapsed time from the end of transmission of the initial packet (step 210). A plurality of packets, comprising a predetermined number, n, of packets, such as 2–8 packets, is then transmitted as fast as possible, i.e., without intentionally introducing delays (step 220). The total elapsed time until completion of transmission of the last of the n packets is measured (step 230). This total elapsed time is termed hereinbelow "the n-packet transmission duration".

The transmitter then remains in an idle state until it is interrupted by receipt of a data packet which contains information as to the measured duration between end of receipt of the initial packet, i.e., the packet sent before the plurality of n packets, and end of receipt of the last of the n packets, which time interval is termed herein "the n-packet receipt duration".

The n-packet transmission duration and the n-packet receipt duration are compared (step 240). If the n-packet receipt duration is longer than the n-packet transmission duration, or the n-packet transmission duration is longer than a reference value which represents the n-packet transmission duration when the transmitter is not loaded by other activities that prevent it from dedicating all its resources to that activity, then the n-packet receipt duration is divided by n to compute a new interpacket interval for subsequent transmissions of data packets (step 250).

If the n-packet receipt duration is shorter or nearly equal to the n-packet transmission duration, then the interpacket interval is not set, but rather determined by the transmitting data utilization element, independently of the receiving data utilization element (step 246).

It is noted that the subroutine described hereinabove with reference to FIG. 6A is not limited to application at the beginning of the first chunk, but rather is applicable throughout the transmission of a file.

A particular feature of the method of FIG. 6A is that a new rate of information transmission is normally determined or computed which increases path utilization without overloading the path.

As illustrated in FIG. 6B, the receiver is in an idle state (step 260) until interrupted by receipt of the initial packet. A time measurement is initiated upon termination of this receipt (step 270), and the receiver returns to an idle state (step 280). The receiver is interrupted from time to time by receipt of the plurality of n packets. When the last of the n packets is received (step 290), the receiver measures the elapsed time from the end of receipt of the initial packet to the end of receipt of the last of the n packets, i.e., the n-packet receipt duration (step 300).

The receiver then verifies the content, identity and number of the n packets (step 310). If all n packets are found to be valid, the receiver provides to the transmitter the aforesaid data packet which contains information as to the n-packet receipt duration (step 320).

FIG. 7 illustrates in even greater detail the time relationship of the communication of packets and the time duration measurements.

Figure 8A:
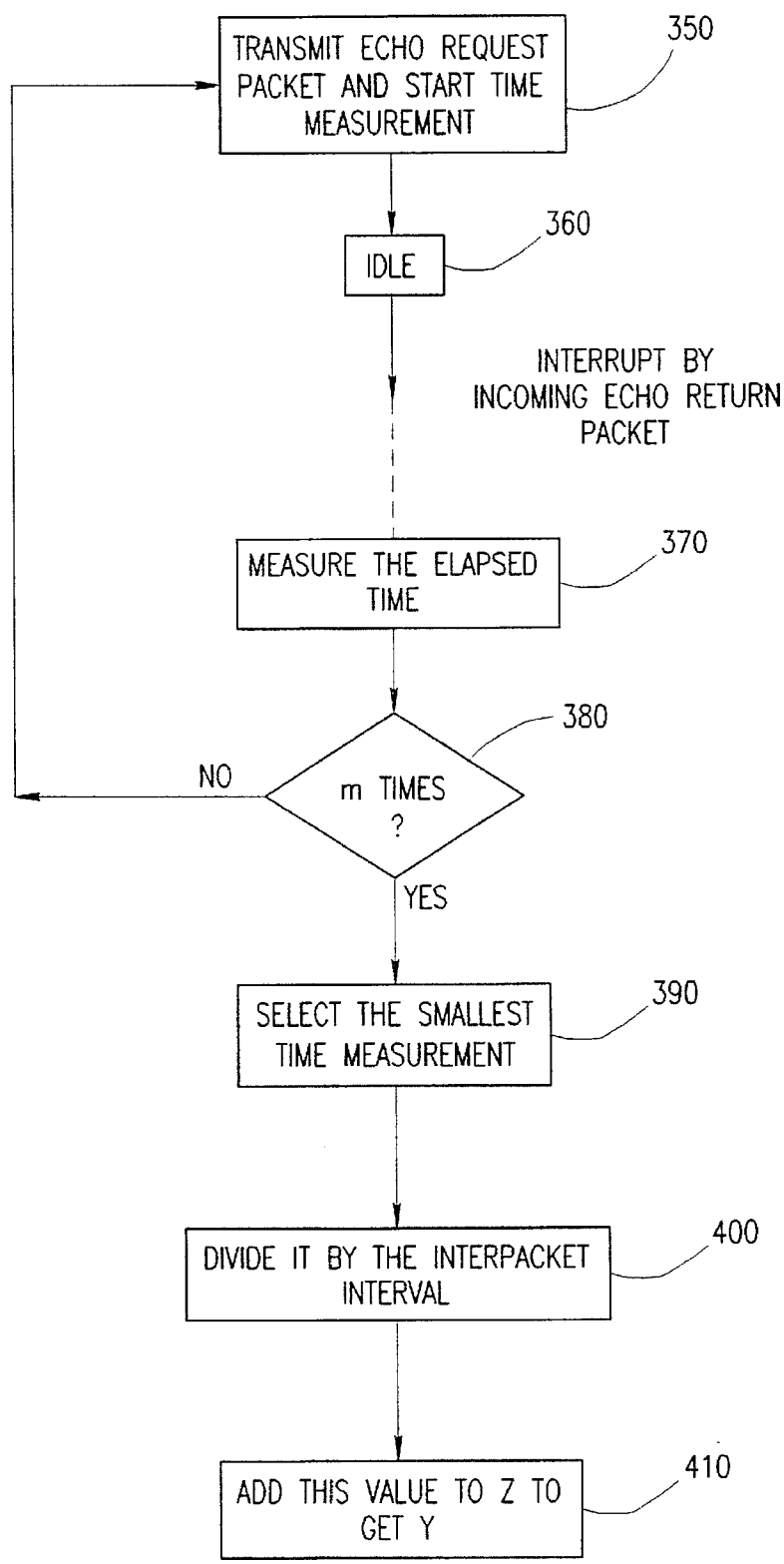
FIGS. 8A and 8B are generalized flow charts illustrating packet number selection operation of a transmitter and receiver respectively.
Figure 8B:
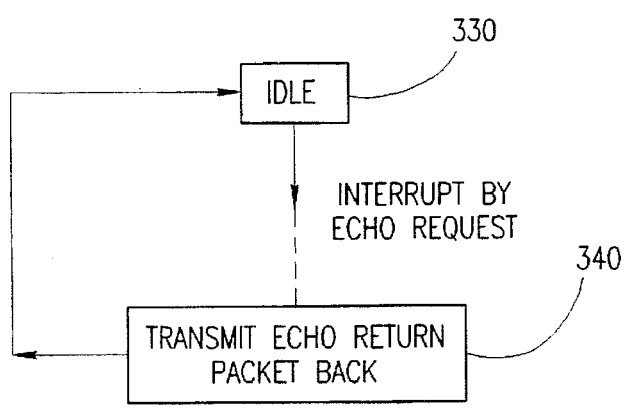
Figure 9:
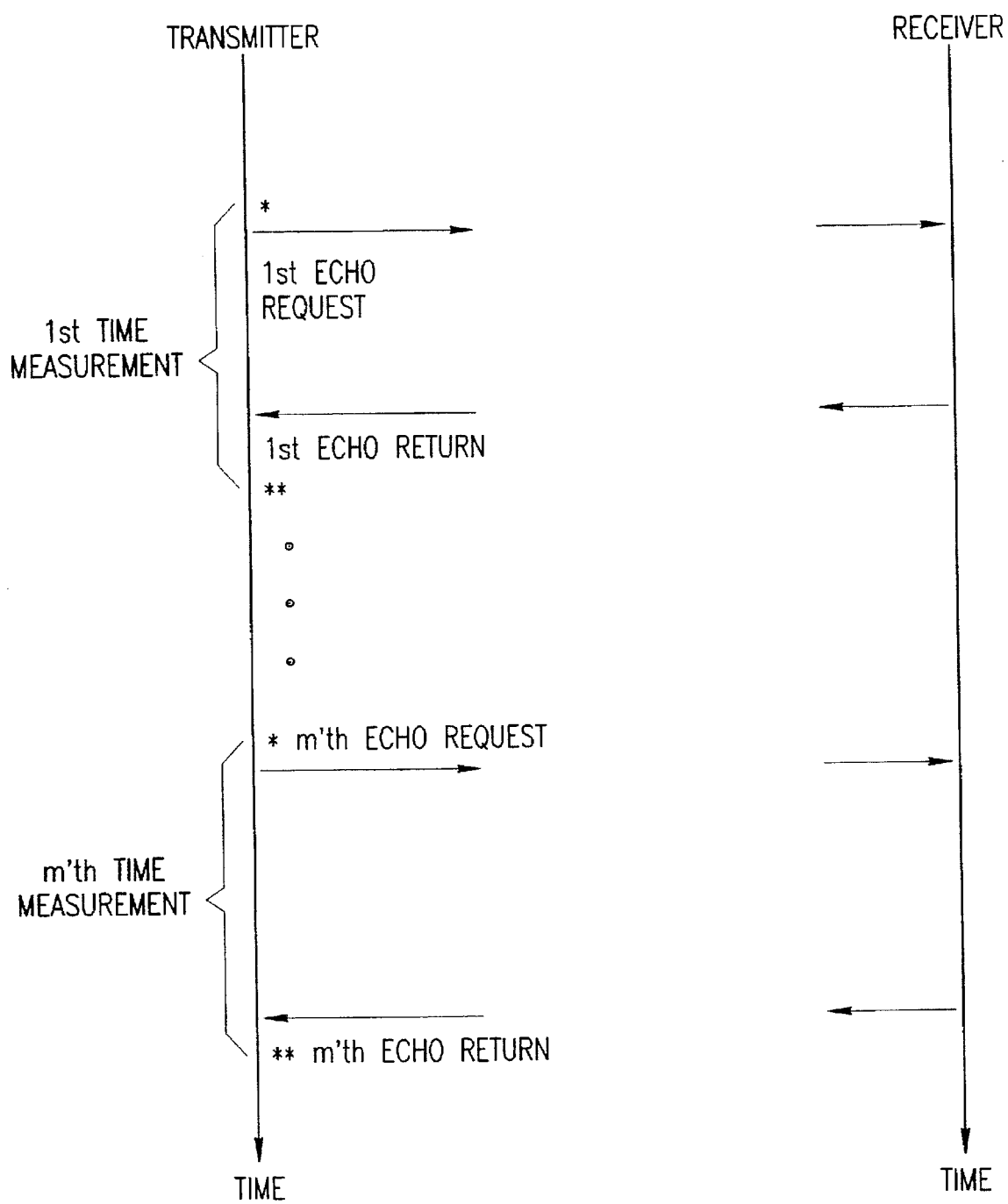
FIG. 9 is a simplified diagram illustrating the packet number selection mechanism employed in the operations illustrated in FIGS. 8A and 8B.

Reference is now made to FIGS. 8A, 8B and 9 which illustrate a preferred method for selection of a value for Y. An echo request packet is transmitted by the transmitter and a time measurement is started at as nearly as possible the same time (step 350). The transmitter then goes into an idle state (step 360) until interrupted by a received echo return packet. The elapsed time between transmission of the echo request packet and the receipt of the echo return packet is measured (step 370). This elapsed time is termed herein "the round-trip delay".

Preferably, the above procedure is repeated a few times in succession, such as m=3 times (step 380), and the smallest of the measured round-trip delays, also termed herein "the minimal round-trip delay", is selected (step 390). The minimal round-trip delay is then divided (step 400) by the interpacket interval, which is determined as described hereinabove.

The resulting quotient is added (step 410) to a typically predetermined number Z of packets, to provide a corrected number of packets, Y, which is transmitted among successive echo requests. Z corresponds to the maximum number of packets which it is safe to assign to receipt of data from the transmitter so as not to create congestion on the network path or overrun the buffers at the receiver. Z typically depends on the packet size, the size of the input buffer of the individual receiver or of elements in the network en route between the individual receiver and the individual transmitter, and the maximum proportion of the available input buffer space which may be dedicated to reception of data from the individual transmitter.

A preferred method for determining Z on an empirical basis is as follows:

a. A value for Z may be selected from an existing protocol. For example, the value Z=8 is used by ATP of AppleTalk as the maximum number of packets which may be sent without receiving acknowledgement. AppleTalk is a trademark of Apple Computers, Inc.

b. Preferably, trial and error experimentation is carried out on higher values of Z so as to empirically determine whether larger values of Z enhance performance without resulting in receiver overflow or in overflow of a data network element en route between transmitter and receiver which has a small buffer relative to its processing speed.

For example, a value of Z=10 has been found to be suitable for LocalTalk networks with Macintosh computers. A value of Z=20 has been found to be suitable for Ethernet networks with Macintosh computers.

As illustrated in FIG. 8B, the receiver remains idle until interrupted by a received echo request packet. Upon receipt of the echo request packet, the receiver transmits an echo return packet.

FIG. 9 illustrates in even greater detail the time relationship of the communication of echo request and return packets and the elapsed time measurements between transmission of echo request packets and receipt of echo return packets.

In the timing diagrams of FIGS. 5A–5C, 7 and 9, each arrow in the transmitter column indicates the point in time at which transmission of a particular packet begins. The point in time at which transmission of each packet ends is not indicated. Similarly, each arrow in the receiver column indicates the point in time at which receipt of a particular packet begins. The point in time at which receipt of each packet ends is not indicated.

For simplicity, the point in time at which a particular packet is received is shown to be identical to the point in time at which the same packet is transmitted. In fact, there is always a delay between transmittal and receipt which typically varies in length as a function of congestion, distance between transmitter and receiver, the load on the transmitter, the receiver, and on routers, bridges, repeaters and other network devices situated en route, and other factors, as explained above.

Figure 10A:
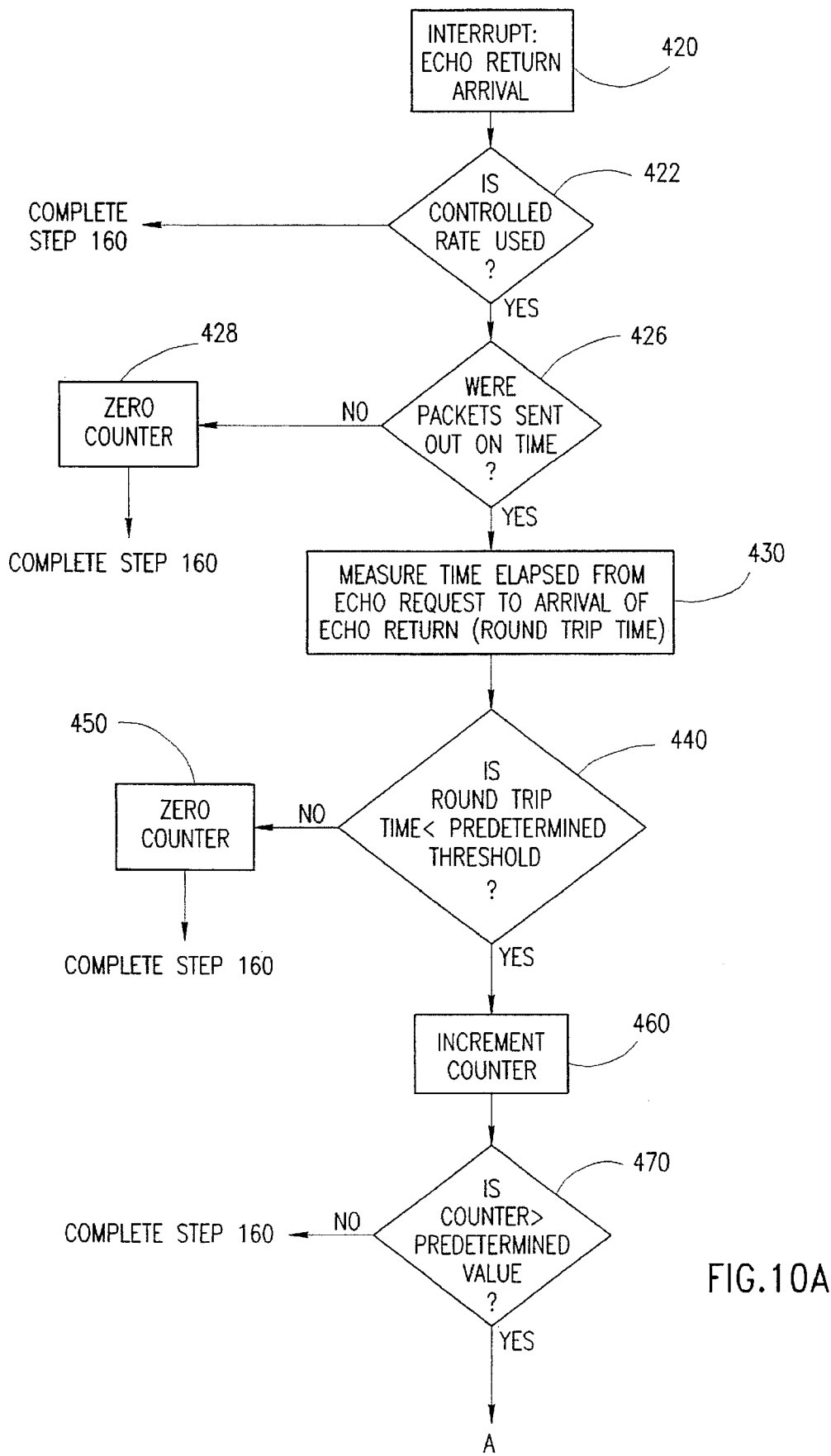
FIGS. 10A and 10B, taken together, are a simplified flowchart of a rate monitoring method which may be employed upon arrival of an echo return to identify noninstantaneous occurrences of network path being underutilized which may justify increasing the rate of information transmission.
Figure 10B:
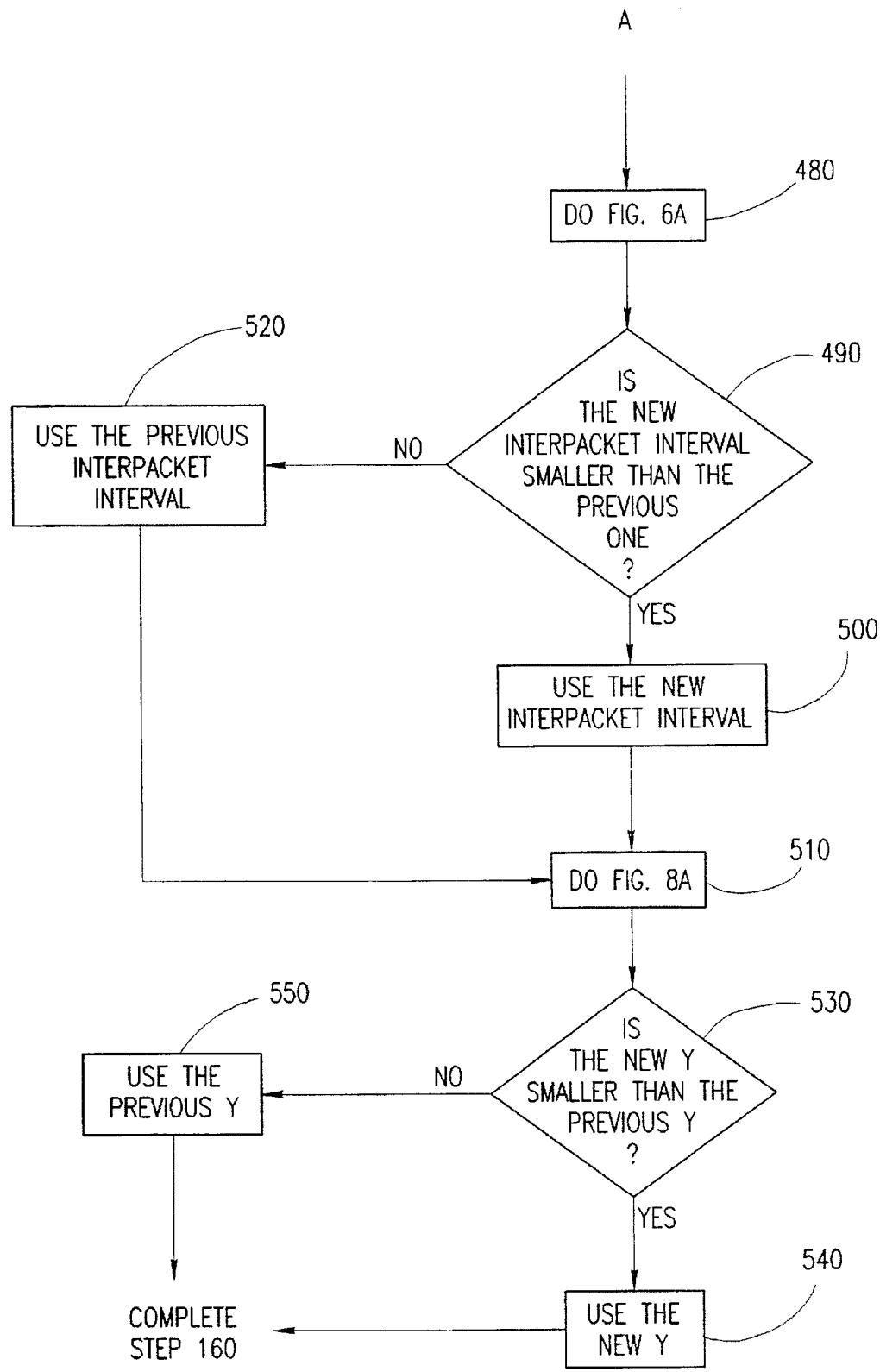

FIGS. 10A and 10B, taken together, are a simplified flowchart of a preferred rate monitoring method which may be employed upon arrival of an echo return (step 420) to identify noninstantaneous occurrences of network path being underutilized which may justify increasing the rate of information transmission.

If (step 422) the current interpacket interval has been selected to be as small as possible, as described above with reference to step 246 of FIG. 6A, the method of FIG. 10A is terminated by a return to FIG. 4A to complete step 160 where it was left off.

Otherwise, if (step 426) at least one of the last Y packets sent thus far in the course of carrying out step 160 was not sent on time, i.e., if, at least once in the course of carrying out step 160, the interpacket interval exceeded that computed in step 250 of FIG. 6A, then zero an underutilization counter (step 428).

If all of the last Y packets were sent on time, then the round trip time is measured (step 430). If the round trip time is large, e.g., relative to a predetermined threshold, then the network portion connecting and containing the transmitter and the receiver is not underutilized and therefore (step 450) the underutilization counter is zeroed.

If the round trip time is small, e.g., relative to the predetermined threshold, then (step 460) the underutilization counter is incremented.

If (step 470) the underutilization counter is less than a predetermined value such as 3, no further action is taken and the method returns to FIG. 4A to complete step 160 where it was left off. If the underutilization counter reaches the predetermined value, such as 3, the method of FIG. 6A is carried out (step 480), in which it is determined that the current situation justifies an increase in the transmission rate and, if so, to what level.

In step 490, if the interpacket interval computed in step 480 is found to be not smaller than the previously employed interpacket interval, then the previously employed interpacket interval is used for the next Y data packets (step 520). Otherwise (step 500), the newly computed interpacket interval is used for the next Y data packets.

In step 510, a new level is determined for Y which is employed (step 540) if (step 530) the new level of Y is smaller than the old level of Y. If the old level of Y is smaller, the old level of Y is employed (step 550).

The method of FIG. 10B eventually returns to the method of FIG. 4A and completes step 160, the interruption of which instigated the method of FIG. 10B.

A particular feature of the apparatus and methods shown and described hereinabove is that data transmission substantially without rate oscillation is provided.

It will be appreciated by persons skilled in the art that the present invention is not limited by what has been particularly shown and described hereinabove. Rather the scope of the present invention is defined only by the claims which follow:

APPENDIX A
*** copy of netlist given to UniCad on: 29-Nov-92  (Oded)    ***
% NuBus ETHERNET card                    Revised:  November 26, 1992
% SH1.SCH                                Revision:
% R.A.N  RAD Advanced Networks
%
%
%
%
BOARD = ORCAD.PCB;
PARTS
.01           = C57;   % .01
.01/500V      = C61;   % .01/500V
.1            = C1,    % .1
                C2,    % .1
                C3,    % .1
                C4,    % .1
                C5,    % .1
                C6,    % .1
                C7,    % .1
                C8,    % .1
                C9,    % .1
                C10,   % .1
                C11,   % .1
                C12,   % .1
                C13,   % .1
                C14,   % .1
                C15,   % .1
                C16,   % .1
                C17,   % .1
                C18,   % .1
                C19,   % .1
                C20,   % .1
                C21,   % .1
                C22,   % .1
                C23,   % .1
                C24,   % .1
                C25,   % .1
                C26,   % .1
                C27,   % .1
                C28,   % .1
                C29,   % .1
                C30,   % .1
                C31,   % .1
                C32,   % .1
                C33,   % .1
                C34,   % .1
                C35,   % .1
                C36,   % .1
                C37,   % .1
                C38,   % .1
                C39,   % .1
                C40,   % .1
                C41,   % .1
                C42,   % .1
                C43,   % .1
                C44,   % .1
                C45,   % .1

|              |     | C46, | % .1 |
|--------------|-----|------|------|
|              |     | C47, | % .1 |
|              |     | C48, | % .1 |
|              |     | C53, | % .1 |
|              |     | C54, | % .1 |
|              |     | C55, | % .1 |
|              |     | C56, | % .1 |
|              |     | C59, | % .1 |
|              |     | C60, | % .1 |
|              |     | C62, | % .1 |
|              |     | C64, | % .1 |
|              |     | C65, | % .1 |
|              |     | C66; | % .1 |
| 1.5K         | =   | R2,  | % 1.5K |
|              |     | R3,  | % 1.5K |
|              |     | R4,  | % 1.5K |
|              |     | R5,  | % 1.5K |
|              |     | R29; | % 1.5K |
| 100          | =   | R12; | % 100 |
| 16.67MHZ     | =   | U41; | % 16.67MHZ |
| 16V8-15      | =   | U21, | % 16V8-15 |
|              |     | U22, | % 16V8-15 |
|              |     | U42; | % 16V8-15 |
| 1K           | =   | R1;  | % 1K |
| 1M 1/4W      | =   | R21; | % 1M 1/4W |
| 1N4002       | =   | D3;  | % 1N4002 |
| 1N4150       | =   | D2;  | % 1N4150 |
| 2.2K         | =   | R23, | % 2.2K |
|              |     | R30; | % 2.2K |
| 20MHZ        | =   | U5;  | % 20MHZ |
| 20V8-15      | =   | U18, | % 20V8-15 |
|              |     | U39, | % 20V8-15 |
|              |     | U40; | % 20V8-15 |
| 22UF         | =   | C49, | % 22UF |
|              |     | C50, | % 22UF |
|              |     | C51, | % 22UF |
|              |     | C52, | % 22UF |
|              |     | C63; | % 22UF |
| 22V10-15     | =   | U19, | % 22V10-15 |
|              |     | U20; | % 22V10-15 |
| 24.3K        | =   | R25; | % 24.3K |
| 270          | =   | R6,  | % 270 |
|              |     | R7;  | % 270 |
| 27C1024-15D  | =   | U37A,| % 27C1024-15D |
|              |     | U29, | % 27C1024-15D |
|              |     | U30; | % 27C1024-15D |
| 27S19        | =   | U32; | % 27S19 |
| 324          | =   | R10, | % 324 |
|              |     | R11; | % 324 |
| 330          | =   | R13; | % 330 |
| 39           | =   | R15, | % 39 |
|              |     | R16, | % 39 |
|              |     | R17, | % 39 |
|              |     | R18, | % 39 |
|              |     | R22, | % 39 |
|              |     | R26, | % 39 |
|              |     | R27, | % 39 |
|              |     | R28, | % 39 |
|              |     | R31, | % 39 |
|              |     | R32; | % 39 |

```
4.7U              = C58;    % 4.7U
51                = R20;    % 51
57.6              = R8,     % 57.6
                    R9;     % 57.6
74ACT08           = U1;     % 74ACT08
74F04             = U17;    % 74F04
74F244            = U23;    % 74F244
74F32             = U33;    % 74F32
74FCT138          = U38;    % 74FCT138
74FCT374          = U15,    % 74FCT374
                    U16,    % 74FCT374
                    U31;    % 74FCT374
74FCT521          = U7;     % 74FCT521
74FCT651          = U8,     % 74FCT651
                    U9,     % 74FCT651
                    U10,    % 74FCT651
                    U11,    % 74FCT651
                    U12,    % 74FCT651
                    U13,    % 74FCT651
                    U14;    % 74FCT651
74HC05            = U24;    % 74HC05
768               = R14;    % 768
78                = R19,    % 78
                    R24;    % 78
96 PIN CONECTOR   = P1B,    % 96 PIN CONECTOR
                    P1A,    % 96 PIN CONECTOR
                    P1C;    % 96 PIN CONECTOR
9X4.7K            = RN1,    % 9X4.7K
                    RN2,    % 9X4.7K
                    RN3,    % 9X4.7K
                    RN4,    % 9X4.7K
                    RN5,    % 9X4.7K
                    RN6,    % 9X4.7K
                    RN7,    % 9X4.7K
                    RN8,    % 9X4.7K
                    RN9;    % 9X4.7K
AM79C100          = U6;     % AM79C100
BNC               = J1;     % BNC
DA15S             = P1;     % DA15S
DHA-RC14          = J3;     % DHA-RC14
DP8392            = U3;     % DP8392
DP83932           = U2;     % DP83932
DS1232            = U37;    % DS1232
FL1012            = T2;     % FL1012
FUSE 1/2AMP       = F1;     % FUSE 1/2AMP
HC40103           = U34,    % HC40103
                    U35;    % HC40103
JP-2              = JP4,    % JP-2
                    JP5,    % JP-2
                    JP6;    % JP-2
JP-3              = JP8;    % JP-3
JP-5              = JP7;    % JP-5
JP-6F             = JP9;    % JP-6F
JP-7              = JP1,    % JP-7
                    JP2,    % JP-7
                    JP3;    % JP-7
LED GREEN         = D1;     % LED GREEN
MC68EC020         = U36;    % MC68EC020
MDC1000M          = GAP1;   % MDC1000M
PM7102            = U4;     % PM7102
```

```
RAM 128KX8      = U25,       % RAM 128KX8
                  U26,       % RAM 128KX8
                  U27,       % RAM 128KX8
                  U28;       % RAM 128KX8
RJ-45           = J2;        % RJ-45
ST7033          = T1;        % ST7033

NETS

_SPV_7    = P1A/3 ;
_SP_7     = P1A/4 ;
_PFW_7    = P1C/23 ;
N00004    = R12/1 T2/1 U6/18 ;
N00005    = R12/2 U6/17 T2/3 ;
N00006    = R24/2 JP1/5 U6/11 ;
N00007    = R24/1 JP1/6 U6/12 ;
N00008    = R25/2 U6/14 ;
N00009    = T2/16 J2/6 ;
N00010    = T2/2 C66/1 ;
N00011    = JP1/1 U6/1 ;
N00012    = T2/14 J2/3 ;
N00013    = JP1/2 U6/2 ;
N00014    = JP1/3 U6/3 ;
N00015    = U6/28 R9/1 ;
N00016    = R9/2 R11/2 T2/6 R14/2 ;
N00017    = T2/11 J2/2 ;
N00018    = JP1/4 U6/4 ;
N00019    = U6/26 R11/1 ;
N00020    = T2/7 C65/1 ;
N00021    = J2/1 T2/9 ;
N00022    = T2/8 R10/2 R8/2 R14/1 ;
N00023    = U6/25 R10/1 ;
N00024    = JP1/7 U6/13 R23/1 ;
N00025    = U6/27 R8/1 ;
N00026    = U6/20 JP6/1 ;
N00027    = U6/8 D1/1 ;
N00028    = D1/2 R13/1 ;
N00029    = F1/1 P1/13 ;
CI-_6     = J3/6 T1/15 JP3/2 R18/1
            P1/9 ;
DO+_6     = J3/13 T1/10 JP3/5 P1/3 ;
CI+_6     = J3/5 T1/16 JP3/1 R15/1
            P1/2 ;
DO-_6     = J3/12 T1/9 JP3/6 P1/10 ;
DI-_6     = J3/3 T1/12 JP3/4 R16/1
            P1/12 ;
DI+_6     = J3/2 T1/13 JP3/3 R17/1
            P1/5 ;
N00036    = T1/1 U2/25 ;
N00037    = U2/24 T1/2 ;
N00038    = U2/23 T1/4 ;
N00039    = U2/22 T1/5 ;
N00040    = U2/17 T1/7 R7/1 ;
N00041    = U2/16 T1/8 R6/1 ;
N00042    = R16/2 R17/2 C60/1 ;
N00043    = R18/2 R15/2 C59/1 ;
N00044    = R19/1 JP2/5 U3/7 ;
N00045    = R19/2 JP2/6 U3/8 ;
N00046    = JP2/1 R2/1 U3/1 ;
N00047    = U3/15 D2/1 ;
```

```
N00048    = D2/2 U3/14 D3/2 R20/1 ;
N00049    = JP2/2 U3/2 R3/1 ;
N00050    = RN1/2 JP5/1 U2/32 ;
N00051    = JP2/3 R4/1 U3/3 ;
N00052    = RN1/3 JP4/1 U2/31 ;
N00053    = JP2/4 R5/1 U3/6 ;
N00054    = R20/2 J1/CENTER ;
N00055    = U3/12 R1/1 ;
N00056    = C62/1 C63/1 JP2/7 U4/1
            U4/24 ;
N00057    = U3/16 U3/9 U3/10 R21/1
            C57/2 U4/11 U4/14 D3/1
            C61/1 GAP1/1 J1/SHIELD ;
N00058    = U2/4 R22/1 ;
N00059    = U3/11 R1/2 ;
N00060    = R3/2 R2/2 R4/2 R5/2
            U3/4 U3/5 U3/13 U4/10
            C57/1 U4/15 ;
N00061    = R22/2 U5/5 ;
ARB2OE_4  = U22/16 ;
_ARBCY_4  = U19/22 U22/6 U18/1 ;
ARB1OE_4  = U22/17 ;
ARB0OE_4  = U22/18 ;
GRANT_4   = U22/19 U19/2 ;
N00067    = U21/14 U19/3 U20/3 ;
N00068    = U19/20 U18/3 ;
START_4   = U17/6 U1/4 U19/5 U21/2 ;
_OWNER_4  = U19/19 U18/4 ;
ACK_4     = U19/6 U18/14 U21/3 U17/4
            U1/9 ;
N00072    = U19/18 ;
Q1_4      = U19/17 ;
TM_OE_4   = U18/21 ;
_WR_CY_4  = U19/15 U18/10 ;
RTRY_4    = U24/1 U24/3 U21/13 ;
CLKB_4    = U1/10 U21/1 R28/2 U1/5 ;
N00078    = U23/2 R26/2 U17/1 ;
N00079    = U23/18 R27/1 ;
N00080    = U17/2 R28/1 ;
N00081    = U31/9 JP7/1 ;
N00082    = U31/12 JP7/2 ;
N00083    = U31/15 JP7/3 ;
N00084    = U31/16 JP7/4 ;
N00085    = U31/19 JP7/5 ;
N00086    = U34/14 U35/3 ;
N00087    = U35/14 U33/1 ;
N00088    = U34/3 U17/8 ;
N00089    = U38/14 JP9/1 ;
_AS_D_2   = U40/15 U39/1 ;
N00091    = U38/9 U40/10 ;
N00092    = U39/21 U38/5 ;
_RSTRT_2  = U40/16 U39/11 ;
_U_INT_2  = U42/5 JP9/5 ;
_CKO_2    = R31/1 U17/11 U40/1 ;
_WRITE_2  = U40/17 U33/5 ;
N00097    = RN1/6 U36/15 ;
_BG_2     = U36/2 U40/5 ;
N00099    = U40/19 ;
_BR_2     = U40/22 U36/1 ;
RST_2     = U37/5 U40/6 ;
```

```
N00102     = U36/65 U42/14 ;
N00103     = U36/66 U42/13 ;
N00104     = U36/67 U42/12 ;
N00105     = U37/7 JP8/2 ;
N00106     = U17/10 R32/1 ;
Q0_2       = U42/16 ;
N00108     = R31/2 U41/5 ;
Q1_2       = U42/17 ;
Q2_2       = U42/18 ;
_SN_BG_1   = U2/33 U40/21 ;
AD1_L_1    = U12/14 U18/19 U20/7 ;
_SN_BR_1   = U2/44 U40/7 RN3/2 ;
N00114     = U2/37 U38/15 ;
AD0_L_1    = U12/13 U18/20 U20/8 ;
_BERR_1    = U2/28 U24/2 RN1/7 U36/19 ;
DB_STB_1   = U8/23 U9/23 U10/23 U11/23
             U24/9 U24/5 U19/16 ;
N00118     = U2/45 U42/2 ;
_AS_1      = U2/38 U2/54 U20/10 U21/8
             U20/17 U38/4 U39/10 R30/1
             U36/23 U40/2 U33/4 ;
DB_EN_1    = U8/3 U9/3 U10/3 U11/3
             U20/15 ;
CKO_1      = U2/34 R32/2 U36/5 ;
TM1_L_1    = U2/30 U2/51 U15/6 U18/13
             U20/5 U19/8 U36/25 RN1/5
             U40/4 JP9/3 ;
SLAVE_1    = U13/3 U14/3 U12/3 U18/9
             U21/15 U20/4 ;
N00124     = U2/42 U24/6 RN1/8 U36/17
             U39/15 JP9/2 ;
N00125     = U2/41 U24/8 RN3/3 U36/18
             U39/22 ;
N00126     = U9/21 U8/21 U10/21 U11/21
             U18/22 ;
N00127     = U9/1 U8/1 U10/1 U11/1
             U1/8 ;
_DS_1      = U2/39 U2/53 U20/16 U36/16
             U36/24 RN1/9 U40/3 ;
N00129     = U14/21 U16/1 U13/21 U12/21
             U19/21 U18/2 ;
SIZ1_1     = U2/9 U20/19 U18/5 U36/14
             U39/9 ;
N00131     = U14/1 U13/1 U15/11 U12/1
             U1/6 ;
SIZ0_1     = U2/13 U20/18 U18/6 U36/13
             U39/8 ;
_NB_BG_1   = U9/2 U8/2 U10/2 U11/2
             U8/22 U9/22 U10/22 U11/22
             U15/1 U21/7 U39/13 U40/20 ;
N00134     = U7/19 U21/6 ;
_RESET_1   = U2/29 U19/7 U20/2 U21/4
             R29/2 U36/6 U37/6 JP9/4 ;
_TM1_1     = P1A/5 U15/7 U18/17 U19/9 ;
TM0_L_1    = U15/9 U18/11 U20/6 ;
_TM0_1     = P1C/5 U15/8 U18/18 U19/10 ;
_NB_BR_1   = U21/19 U40/8 ;
_CLK_1     = P1C/32 R26/1 ;
_CLKB_1    = U19/1 U20/1 R27/2 U42/1 ;
_RQST_1    = P1A/30 U18/15 U19/4 ;
```

```
_START_1   = P1C/28 U18/16 U17/5 ;
N00144     = U31/6 U42/3 ;
_WR_1      = U25/29 U26/29 U27/29 U28/29
             U33/6 ;
_HALT_1    = U24/4 RN1/10 U36/22 ;
_RD_1      = U25/24 U26/24 U30/20 U29/20
             U37A/20 U27/24 U28/24 U40/18 ;
_ACK_1     = P1A/28 U20/20 U17/3 ;
N00149     = P1C/1 U37/1 ;
_T_OUT_1   = U33/3 U17/9 U42/4 ;
_NMRQ_1    = P1A/31 U31/2 ;
N00152     = U31/5 JP8/1 ;
N00153     = U30/2 U29/2 U37A/2 U39/16 ;
N00154     = U32/15 U38/7 ;
N00155     = U34/9 U35/9 U38/10 ;
N00156     = U34/1 U35/1 U33/2 U42/19
             JP8/3 ;
_ID0_1     = P1C/26 RN2/5 U7/17 U22/5 ;
_ID1_1     = P1A/26 RN2/4 U7/15 U22/4 ;
_ID2_1     = P1C/27 RN2/3 U7/13 U22/3 ;
_ID3_1     = P1A/27 RN2/2 U7/11 U22/2 ;
A0_1       = U2/8 U20/22 U18/8 U36/99
             U39/6 ;
A1_1       = U2/89 U20/21 U18/7 U37A/21
             U36/98 U39/7 ;
A2_1       = U2/131 U2/88 U12/15 U32/10
             U37A/22 U29/21 U30/21 U28/12
             U27/12 U26/12 U25/13 U36/73
             RN4/2 ;
A3_1       = U2/130 U2/87 U12/16 U32/11
             U37A/23 U29/22 U30/22 U28/11
             U27/11 U26/11 U25/11 U36/74
             RN4/3 ;
A4_1       = U2/129 U2/86 U12/17 U32/12
             U37A/24 U29/23 U30/23 U28/10
             U27/10 U26/10 U25/10 U36/75
             RN4/4 ;
A5_1       = U2/128 U2/85 U12/18 U32/13
             U37A/25 U29/24 U30/24 U28/9
             U27/9 U26/9 U25/9 U36/76
             RN4/5 ;
A6_1       = U2/127 U2/84 U12/19 U32/14
             U37A/26 U29/25 U30/25 U28/8
             U27/8 U26/8 U25/8 U36/77
             RN4/6 ;
A7_1       = U2/126 U2/83 U12/20 U37A/27
             U29/26 U30/26 U28/7 U27/7
             U26/7 U25/7 U36/78 RN4/7 ;
A8_1       = U2/82 U13/13 U37A/28 U29/27
             U30/27 U28/6 U27/6 U26/6
             U25/6 U36/80 RN4/8 ;
A9_1       = U2/79 U13/14 U37A/29 U29/28
             U30/28 U28/5 U27/5 U26/5
             U25/5 U36/81 RN4/9 ;
A10_1      = U2/78 U13/15 U37A/31 U29/29
             U30/29 U28/27 U27/27 U26/27
             U25/27 U36/82 RN4/10 ;
A11_1      = U2/77 U13/16 U37A/32 U29/31
             U30/31 U28/26 U27/26 U26/26
             U25/26 U36/83 RN5/2 ;
```

```
A12_1    = U2/76 U13/17 U37A/33 U29/32
           U30/32 U28/23 U27/23 U26/23
           U25/23 U36/84 RN5/3 ;
A13_1    = U2/75 U13/18 U37A/34 U29/33
           U30/33 U28/25 U27/25 U26/25
           U25/25 U36/85 RN5/4 ;
A14_1    = U2/74 U13/19 U37A/35 U29/34
           U30/34 U28/4 U27/4 U26/4
           U25/4 U36/86 RN5/5 ;
A15_1    = U2/73 U13/20 U37A/36 U29/35
           U30/35 U28/28 U27/28 U26/28
           U25/28 U36/87 RN5/6 ;
A16_1    = U2/72 U14/13 U37A/37 U29/36
           U30/36 U28/3 U27/3 U26/3
           U25/3 U36/88 RN5/7 ;
A17_1    = U2/71 U14/14 U29/37 U30/37
           U28/31 U27/31 U26/31 U25/31
           U36/91 RN5/8 ;
A18_1    = U2/70 U14/15 U28/2 U27/2
           U26/2 U25/2 U36/92 RN5/9
           U38/1 ;
A19_1    = U2/69 U14/16 U28/30 U27/30
           U26/30 U25/30 U36/93 RN5/10
           U38/2 ;
A20_1    = U2/68 U14/17 U28/1 U27/1
           U26/1 U25/1 U36/94 RN7/7
           U39/2 U38/3 ;
A21_1    = U2/67 U14/18 U36/95 RN7/8
           U39/3 ;
A22_1    = U2/66 U15/5 U14/19 U36/96
           RN7/9 U39/4 ;
A23_1    = U2/65 U15/2 U20/9 U21/5
           U36/97 RN7/10 U39/5 ;
_AD0_1   = P1C/6 U12/11 U11/11 ;
_AD1_1   = P1A/6 U12/10 U11/10 ;
_AD2_1   = P1C/7 U12/9 U11/9 ;
_AD3_1   = P1A/7 U12/8 U11/8 ;
_AD4_1   = P1C/8 U12/7 U11/7 ;
_AD5_1   = P1A/8 U12/6 U11/6 ;
_AD6_1   = P1C/9 U12/5 U11/5 ;
_AD7_1   = P1A/9 U12/4 U11/4 ;
_AD8_1   = P1C/10 U13/11 U10/11 ;
_AD9_1   = P1A/10 U13/10 U10/10 ;
_AD10_1  = P1C/11 U13/9 U10/9 ;
_AD11_1  = P1A/11 U13/8 U10/8 ;
_AD12_1  = P1C/12 U13/7 U10/7 ;
_AD13_1  = P1A/12 U13/6 U10/6 ;
_AD14_1  = P1C/13 U13/5 U10/5 ;
_AD15_1  = P1A/13 U13/4 U10/4 ;
_AD16_1  = P1C/14 U14/11 U9/11 ;
_AD17_1  = P1A/14 U14/10 U9/10 ;
_AD18_1  = P1C/15 U14/9 U9/9 ;
_AD19_1  = P1A/15 U14/8 U9/8 ;
_AD20_1  = P1C/16 U14/7 U9/7 ;
_AD21_1  = P1A/16 U14/6 U9/6 ;
_AD22_1  = P1C/17 U15/4 U14/5 U9/5 ;
_AD23_1  = P1A/17 U15/3 U9/4 U16/19 ;
_AD24_1  = P1C/18 U7/18 U8/11 U16/16 ;
_AD25_1  = P1A/18 U7/16 U8/10 U16/15 ;
_AD26_1  = P1C/19 U7/14 U8/9 U16/12 ;
```

```
_AD27_1   = P1A/19 U7/12 U8/8 U16/9 ;
_AD28_1   = P1C/20 U7/9 U8/7 U16/6 ;
_AD29_1   = P1A/20 U7/7 U8/6 U16/5 ;
_AD30_1   = P1C/21 U7/5 U8/5 U16/2 ;
_AD31_1   = P1A/21 U14/4 U7/3 U8/4 ;
D0_1      = U2/125 U8/13 U34/4 U30/19
            U25/13 RN6/2 U36/64 ;
D1_1      = U2/124 U8/14 U34/5 U30/18
            U25/14 RN6/3 U36/63 ;
D2_1      = U2/123 U8/15 U34/6 U30/17
            U25/15 RN6/4 U36/62 ;
D3_1      = U2/122 U8/16 U34/7 U30/16
            U25/17 RN6/5 U36/61 ;
D4_1      = U2/121 U8/17 U34/10 U30/15
            U25/18 RN6/6 U36/60 ;
D5_1      = U2/120 U8/18 U34/11 U30/14
            U25/19 RN6/7 U36/56 ;
D6_1      = U2/119 U8/19 U34/12 U30/13
            U25/20 RN6/8 U36/55 ;
D7_1      = U2/118 U8/20 U34/13 U30/12
            U25/21 RN6/9 U36/54 ;
D8_1      = U2/115 U9/13 U35/4 U30/10
            U26/13 RN6/10 U36/53 ;
D9_1      = U2/114 U9/14 U35/5 U30/9
            U26/14 RN7/2 U36/51 ;
D10_1     = U2/113 U9/15 U35/6 U30/8
            U26/15 RN7/3 U36/50 ;
D11_1     = U2/112 U9/16 U35/7 U30/7
            U26/17 RN7/4 U36/49 ;
D12_1     = U2/111 U9/17 U35/10 U30/6
            U26/18 U36/48 RN7/5 ;
D13_1     = U2/110 U9/18 U35/11 U30/5
            U26/19 U36/47 RN7/6 ;
D14_1     = U2/109 U9/19 U35/12 U30/4
            U26/20 RN9/2 U36/46 ;
D15_1     = U2/108 U9/20 U35/13 U30/3
            U26/21 RN9/3 U36/45 ;
D16_1     = U2/107 U10/13 U16/3 U37A/19
            U29/19 U27/13 RN9/4 U36/42 ;
D17_1     = U2/106 U10/14 U16/4 U37A/18
            U29/18 U27/14 RN9/5 U36/41 ;
D18_1     = U2/105 U10/15 U16/7 U37A/17
            U29/17 U27/15 RN9/6 U36/40 ;
D19_1     = U2/104 U10/16 U16/8 U37A/16
            U29/16 U27/17 RN9/7 U36/39 ;
D20_1     = U2/103 U10/17 U16/13 U37A/15
            U29/15 U27/18 RN9/8 U36/38 ;
D21_1     = U2/102 U10/18 U16/14 U37A/14
            U29/14 U27/19 RN9/9 U36/37 ;
D22_1     = U2/101 U10/19 U16/17 U37A/13
            U29/13 U27/20 RN9/10 U36/36 ;
D23_1     = U2/100 U10/20 U16/18 U37A/12
            U29/12 U27/21 RN8/2 U36/35 ;
D24_1     = U2/97 U11/13 U32/1 U37A/10
            U29/10 U31/3 U28/13 RN8/3
            U36/34 ;
D25_1     = U2/96 U11/14 U32/2 U37A/9
            U29/9 U31/4 U28/14 RN8/4
            U36/33 ;
D26_1     = U2/95 U11/15 U32/3 U37A/8
```

```
                        U29/8 U31/7 U28 15 RN8/5
                        U36/32 ;
D27_1         = U2/94 U11/16 U32/4 U37A/7
                U29/7 U31/8 U28 17 RN8/6
                U36/31 ;
D28_1         = U2/93 U11/17 U32/5 U37A/6
                U29/6 U31/13 U28/18 U36/30
                RN8/7 ;
D29_1         = U2/92 U11/18 U32/6 U37A/5
                U29/5 U31/14 U28/19 U36/29
                RN8/8 ;
D30_1         = U2/91 U11/19 U32/7 U37A/4
                U29/4 U31/17 U28/20 U36/28
                RN8/9 ;
D31_1         = U2/90 U11/20 U32/9 U37A/3
                U29/3 U31/18 U28/21 U36/27
                RN8/10 ;
N00249        = U25/22 U39/17 ;
N00250        = U26/22 U39/18 ;
N00251        = U27/22 U39/19 ;
N00252        = U28/22 U39/20 ;
_ARB0_1       = P1C/24 U22/15 ;
_ARB1_1       = P1A/24 U22/14 ;
_ARB2_1       = P1C/25 U22/13 ;
_ARB3_1       = P1A/25 U22/12 ;
N00257        = U2/43 U40/9 RN1/4 ;
N00258        = U16/11 U31/11 U38/11 ;
VCC           = J1/14 P1C/30 P1C/29 P1B/29
                P1A/29 C37/1 C38/1 C39/1
                C40/1 C41/1 C42/1 C43/1
                C44/1 C45/1 C46/1 C47/1
                C48/1 C56/1 C52/1 C25/1
                C26/1 C27/1 C28/1 C29/1
                C30/1 C31/1 C32/1 C33/1
                C34/1 C35/1 C36/1 C55/1
                C51/1 C13/1 C14/1 C15/1
                C16/1 C17/1 C18/1 C19/1
                C20/1 C21/1 C22/1 C23/1
                C24/1 C54/1 C50/1 C1/1
                C2/1 C3/1 C4/1 C5/1
                C6/1 C7/1 C8/1 C9/1
                C10/1 C11/1 C12/1 C53/1
                C49/1 P1B/28 P1B/7 P1B/6
                P1B/5 P1C/4 P1B/4 P1C/3
                U5/8 U2/27 U2/6 JP3/7
                U2/35 RN1/1 U2/36 J3/7
                J3/14 R13/2 U2/46 U2/62
                U2/80 U2/98 U2/116 U2/21
                U2/20 U2/19 U2/132 C64/1
                U6/23 C58/1 U6/24 U6/19
                R25/1 U12/24 U11/24 U13/24
                U10/24 U15/20 U14/24 U9/24
                U14/2 U13/2 U12/2 U7/20
                U16/20 U8/24 RN2/1 U23/20
                U20/24 U21/20 U17/14 U24/14
                U18/24 U19/24 U22/20 U34/15
                U34/2 U35/15 U35/2 U32/16
                U33/14 U37A/39 U37A/1 U37A/40
                U29/39 U29/1 U29/40 U30/39
                U30/1 U30/40 U31/20 U28/32
```

```
              U27/32  U26/32  U25/32  U35/16
              U34/16  U41/8   U42/20  RN3/1
              U37/8   R29/1   U37/2   U27/3
              U40/24  R30/2   RN8/1   RN9/1
              RN6/1   RN7/1   U39/24  U36/90
              U36/71  U36/70  U36/57  U36/44
              U36/8   U36/7   U38/8   U38/16
              RN4/1   RN5/1 ;
GND         = U1/7    U1/1    U1/2    P1C/31
              P1B/31  P1B/30  C38/2   C37/2
              C39/2   C40/2   C41/2   C42/2
              C43/2   C44/2   C45/2   C46/2
              C47/2   C48/2   C56/2   C52/2
              C26/2   C25/2   C27/2   C28/2
              C29/2   C30/2   C31/2   C32/2
              C33/2   C34/2   C35/2   C36/2
              C55/2   C51/2   C14/2   C13/2
              C15/2   C16/2   C17/2   C18/2
              C19/2   C20/2   C21/2   C22/2
              C23/2   C24/2   C54/2   C50/2
              C2/2    C1/2    C3/2    C4/2
              C5/2    C6/2    C7/2    C8/2
              C9/2    C10/2   C11/2   C12/2
              C53/2   C49/2   P1B/23  P1A/23
              P1C/22  P1B/22  P1A/22  P1B/21
              P1B/20  P1B/19  P1B/18  P1B/17
              P1B/16  P1B/15  P1B/14  P1B/13
              P1B/12  P1B/3   P1B/2   C62/2
              C63/2   U4/12   U4/13   U5/4
              R21/2   C61/2   GAP1/2  U2/18
              U2/2    U2/1    JP4/2   JP5/2
              U2/5    U2/11   U2/47   U2/63
              U2/81   U2/99   U2/117  R7/2
              R6/2    C60/2   C59/2   P1/8
              P1/14   P1/6    P1/4    P1/11
              P1/1    J3/4    J3/11   JP6/2
              R23/2   U6/22   U6/21   U6/5
              U6/6    U6/10   C66/2   C65/2
              C58/2   C64/2   U12/12  U12/23
              U12/22  U11/12  U13/12  U13/23
              U13/22  U10/12  U15/10  U15/13
              U15/14  U15/17  U15/18  U14/12
              U14/23  U14/22  U9/12   U7/10
              U7/1    U14/20  U8/12   U16/10
              U7/4    U7/2    U7/6    U7/8
              U23/1   U23/10  U20/12  U20/11
              U20/13  U21/9   U21/11  U21/10
              U17/7   U18/12  U18/23  U24/7
              U19/11  U19/13  U19/12  U22/10
              U22/1   U22/7   U22/8   U22/9
              U22/11  U32/8   U33/7   U37A/11
              U29/30  U29/11  U30/30  U30/11
              U31/10  U31/1   U28/16  U27/16
              U26/16  U25/16  U35/8   U34/8
              U42/10  U42/6   U42/7   U42/8
              U42/9   U42/11  U41/4   U37/4
              U40/12  U40/11  U40/13  U40/14
              U40/23  U36/89  U36/72  U36/69
              U36/68  U36/59  U36/58  U36/43
              U36/26  U36/21  U36/20  U36/4
```

```
                U36/3 U36/100 U39/12 U39/14
                U39/23 U38/8 ;
-12V    = P1B/1 P1A/1 ;
+12V    = P1B/32 P1A/32 F1/2 ;
```

ETHER BOM  1/4/93  13:46

| TYPE | Part | Quan. | Reference | Description | Remark |
|---|---|---|---|---|---|
| SMD 3.2L/1.6W | C-12065C104KATJ | 62 | C1-C48,C53-C56,C59, C60,C62,C64-C66, C70,C74,C100,C101 | 0.1UF | |
| SMD 3.2L/1.6W | C-12065C103KATJ | 1 | C57 | 10nF/50V | |
| SMD CASE B | C-TAJD685K010R | 7 | C49-C52,C58,C63,C71 | 6.8UF/10V | |
| ELECTROLIT | 100MF-S-10-10E | 1 | C73 | 100UF/10V | |
| CERAMIC | GP110 | 1 | C61 | 10nF/1000V | |
| SMD 3.2L/1.6W | C-12065C470KATJ | 18 | CF1-CF18 | 47PF | |
| | LED GREEN | 1 | LD1 | LED GREEN | |
| | LED RED | 1 | LD2 | LED RED | |
| | LED YELLOW | 1 | LD3 | LED YELLOW | |
| SMD | D-1N4151-F-T | 1 | D2 | 1N4151 | |
| | 1N4002 | 1 | D3 | DIODE RECTIFIER | |
| 1/4W | 251.500 | 1 | F1 | FUSE 1/2A | 275.500 |
| | MDC1000M | 1 | GAP1 | | |
| | | 2 | L1,L2 | INDUCTOR | |
| JP-7 | 8624-14 | 4 | JP1-JP3,JPx | WAFER 2x7 | |
| JP-2 | AW108/2 | 3 | JP4-JP6 | | |
| JP-5 | AW108/5 | 1 | JP7 | | |
| JP-3 | AW108/3 | 1 | JP8 | | |
| JP-6 | AW108/6 | 1 | JP9 | | |
| | 414284-1 | 1 | J1 | BNC | AMP |
| | SS-6488S-NF | 1 | J2 | RJ-45 | |
| | DHA-RC14-R112N | 1 | J3 | 14P CONNECTOR | |
| | H4R15RA29CS | 1 | P1 | D-TYPE 15P | |
| | C133714A96P | 1 | P2 | 96P CONNECTOR | |
| | 9*4.7K/C | 7 | RN1,RN4-RN9 | RES. NETWORK | |
| SMD 0805 1% | R-2012F1001MNT | 3 | R1,R41,R51 | 1K | |
| SMD 0805 | R-2012J152MNT | 7 | R2-R5,R23,R27,R29 | 1.5K | |
| SMD 0805 | R-2012J271MNT | 5 | R6,R7,R13,R46,R47 | 270 | |
| SMD 0805 | | 2 | R8,R9 | 57.6 | |
| 1/8W 1% | | 2 | R10,R11 | 324 | SMD Option |
| SMD 0805 1% | R-2012F1000MNT | 1 | R12 | 100 | |
| 1/8W 1% | | 1 | R14 | 768 | SMD Option |

ETHER BOM  1/4/93  13:46

| TYPE | Part | Quan. | Reference | Description | Remark |
|---|---|---|---|---|---|
| SMD 0805 | R-2012J390MNT | 9 | R15-R18,R22,R26, R28,R31,R32 | 39 | |
| SMD 0805-1% | 78R7 | 2 | R19,R24 | 78.7 | SMD Option |
| 1/4 W | 1M-45 | 1 | R21 | 1M | |
| 1/8W 1% | 24.3K | 1 | R25 | 24.3K | SMD Option |
| SMD 0805 | R-2012J472MNT | 10 | R30,R40,R42-R45, R48-R50,R52 | 4.7K | |
| SMD 16 SOIC | ST7033 | 1 | T1 | | |
| DIP 16 | FL1012 | 1 | T2 | | |
| DIP 16 | VX-4231-20MHZ | 1 | OSC1 | 20MHZ | |
| DIP 16 | VX-4231-16MHZ | 1 | OSC2 | 16MHZ | |
| SMD | IC-74ACT08D | 1 | U1 | | |
| PQFP 132 PIN | DP83932BVF | 1 | U2 | SONIC | |
| DIP 16 PIN | DP83C92 | 1 | U3 | | |
| DIP 24 PIN -0.6" | PM7102 | 1 | PS1 | | |
| PLCC 28 PIN | AM79C100JC | 1 | U6 | | |
| SMD | IC-74FCT521D | 1 | U7 | | |
| SMD | IC-74FCT651D | 7 | U8-U14 | | |
| SMD | IC-74FCT534D | 2 | U15,U16 | | |
| SMD | IC-74F04D | 1 | U17 | | |
| DIP | PALCE20V8Q15 | 3 | U18,U39,U40 | | 24P SKT |
| DIP | PALCE22V10Q-15 | 2 | U19,U20 | | 24P SKT |
| DIP | PALCE16V8Q-15 | 1 | U21 | | 20P SKT |
| DIP | PALCE16V8Q-25 | 2 | U22,U42 | | 20P SKT |
| SMD | IC-74FCT540D | 1 | U23 | | |
| SMD | IC-74ACT05D | 1 | U24 | | |
| SMD | KM681000ALG-8 | 4 | U25-U28 | RAM 128Kx8 | IC-581001M-85L |
| DIP | AM27C1024-150DC | 2 / 1 | U29,U30 / U37A | EPROM | 40P SKT |
| SMD | IC-74FCT374D | 1 | U31 | | |
| SMD | IC-74ACT32D | 1 | U33 | | |
| PQFP 100 PIN | MC68EC020FG16 | 1 | U36 | PROCESSOR | |
| DIP 8 | DS1232 | 1 | U37 | | |
| SMD | IC-74ACT138D | 1 | U38 | | |
| DIP 40 | 210-92-640 | 1 | FOR U37A | | 40P SKT |
| DIP 20 | 210-92-320 | 3 | FOR U21,U22,U42 | | 20P SKT |
| DIP 24 | 210-92-324 | 5 | FOR U18-U20,U39,U40 | | 24P SKT |

APPENDIX B
4/5/93 12:49 PM     YARON'S DISKET:untitled folder:copyrights.'§     Page 1
```
/*****************************************************************/
/*
;_____
;
; Copyright RAN, Inc. 1990-1992
; All rights reserved.
;
; Created By :   Yaron Segev July 1992
;
;_____
*/
/*****************************************************************
```

```
4/5/93 12:03 PM        YARON'S DISKET:untitled folder:DIR.DOC.§        Page 1

Volume in drive A has no label
Directory of A:\

MN32B1     C      9215 30 03 93   16:42
PRTCL1     C      6967 10 02 93   14:13
SMLT       C      7697 29 01 93   18:47
SNC32B1    C     41303 02 03 93   13:13
SR32B2     C     38341 01 03 93   17:27
UTILS32B   C      5700 28 01 93    9:20
TRM2       CMD    5117 21 02 93   15:25
COMP_OPT   H       939 24 02 93   18:38
CONST1     H       737 10 02 93   19:02
DEC_ROM    H      2228 10 12 92   11:21
DEF32B     H      4503 28 01 93   10:05
GLOBAL1    H      4069 01 03 93   17:25
RANNET1    H      4354 15 02 93   14:38
SMLT       H       528 17 01 93   16:10
SNC32B     H     20038 03 02 93   20:17
DIR        DOC       0 31 03 93   17:02
     16 file(s)     151736 bytes
                   1057792 bytes free
```

```
4/5/93 12:05 PM     YARON'S DISKET:untitled folder:COMP_OPT.H.§      Page 1

/************ HARDWARE DEFINITIONs *********/
/*#define cpu68302    /* decide cpu 68000/68020 */
#define VER0_0    /* paging reg. d16-d23,  */
#define Clk16M     /* set compiler options acording to CPU rate */
#define XRAY       /* program is running in RAM under XRAY      */
/************ SIMULATE ********************/
/**** SMLT MAC ******/
/*#define SMLT_MAC/* simulate: transmit from or to CARD mem. instead of mac.*/
#ifdef SMLT_MAC
    #define NUBUS_OFF  /* simulate transmit/rcv without using nubus */
/* #define DMA_TEST    /* simulate "dma" from or to mem. (without rcv) */
#endif
/************ TESTING ********************/
#define TEST       /* transmit without MAC gWDS */
/*#define TEST_SELF   /* make full self test */
#define DEBUG      /* DEBUG mode- looking for BUGS, values records etc. */
#define NuBus_Test  /* in order to call the NuBus Test    */
/*******************************************/
```

```
4/5/93 12:06 PM        YARON'S DISKET:untitled folder:CONST1.H.§              Page 1
#define   MAX_PACKET_LEN      760 /* Maximum Packet Length in LONG(32bit mode)*/
#define   EOL                 1   /* lsb bit in link field markes end of link */
#define   CSR_DONE            0x01
#define   NUM_MAC_RCV_BUF     2
#define MaxTdaDesc   200       /* number of TDA descriptors */
#define MaxRdaDesc   200       /* number of RDA descriptors */
#define MAX_DmaBuf   MaxRdaDesc  /* num of records in dmaBuf */
#define TRS_BUFF_SIZE          131072  /* buff size in Byte (20000h)  */
#define REC_BUFF_SIZE          131072  /* buff size in Byte           */

/*- csCode / seqNum -*/
#define MAX_CsCODE   50
#define MAX_SeqNUM   2048
#define MAX_LNGTH    10     /* max array cells for length */
/*-------------------*/
```

```
4/5/93 12:06 PM     YARON'S DISKET:untitled folder:DEC_ROM.H.§          Page 1
#define LONG unsigned long
#define WORD unsigned short
define BYTE unsigned char /************ Define EtherNet_Address        **********/
    typedef struct {
        BYTE              EtherNet_Address[6];
        WORD              reserved1;
    } EtherNet_AddressRec;
/************** Define Format block            ************/
    typedef struct {
        unsigned long     Directory_offset;
        unsigned long     ROM_Size;
        unsigned long     CRC;
        unsigned char     RevLevel;
        unsigned char     Format;
        unsigned long     TestPattern;
        unsigned char     Reserved;
        unsigned char     ByteLanes;
    } Format_BlockRec;

/************** Define sResource Directory     ************/
    typedef struct {
        unsigned long     Board_sResource;
        unsigned long     Ethernet_sResource;
        unsigned long     End_of_list;
    } sResource_DirRec;

/************** Define Board sResource         ************/
    typedef struct {
        LONG              sRsrcType;
        LONG              sRsrcName;
        LONG              BoardId;
        LONG              VendorInfo;
        LONG              End_of_list;
    } sResource_BoardRec;

typedef struct {
        WORD              CatBoard;
        WORD              TypBoard;
        WORD              DrSWBoard;
        WORD              DrHWBoard;
    } sRsrcTypeBrdRec;

typedef struct {
        LONG              VendorId;
        LONG              RevLevel;
        LONG              PartNumber;
        LONG              Date;
        LONG              End_of_list;
    } VendorInfoRec;

typedef struct {
        BYTE              cString1[80];
        BYTE              cString2[80];
        BYTE              cString3[80];
        BYTE              cString4[80];
    } cStringDataRec;

typedef struct {
```

4/5/93 12:06 PM     YARIN'S DISKET:untitled folder:DEC_RCH.H.§

```c
        sRsrcTypeBrdRec    sRsrcTypeBrd;
        BYTE               NameCstring[80];
        VendorInfoRec      VendorInfo;
        cStringDataRec     cStringData;
    } BoardDataRec;

/************** Define Ethernet sResource              ************/
typedef struct {
        LONG       sRsrcType;
        LONG       sRsrcName;
        LONG       MinorBaseOS;
        LONG       EtherNet_Address;
        LONG       End_of_list;
    } sResource_EtherNetRec;

typedef struct {
        WORD       CatNetWork;
        WORD       TypEtherNet;
        WORD       DrvrSWApple;
        WORD       DrvrHW3Com;
    } sRsrcTypeFunRec;

typedef struct {
        sRsrcTypeFunRec    sRsrcTypeFun;
        BYTE               cString[80];
        LONG               MinorBaseOS_data;
    } EtherNetDataRec;
/*********************************************************************/
```

```
4/5/93 12:12 PM    YARON'S DISKET:untitled folder:DEF32B.H.§           Page 1

/******************************************************************************
|                              DEF.h                                           |
|------------------------------------------------------------------------------|
| Company: RAN                              Project : Nubus card               |
|                                                                              |
| Subproject:                                                                  |
|                                                                              |
| Programmer Name: Yaron Segev             Last Update By:                     |
|                                          Update :                            |
|                                                                              |
|------------------------------------------------------------------------------|
| TYPEDEF & CONSTANT                                                           |
| FUNCTION PROTOTYPE                                                           |
| IMPORTS                                                                      |
| GLOBAL DATA                                                                  |
|------------------------------------------------------------------------------|
| ABSTRACT:                                                                    |
|                                                                              |
| CHANGES CONTROL:                                                             |
|   Date:                                                                      |
|   CHANGES:                                                                   |
|                                                                              |
*******************************************************************************/

/******************************************************************************
| TYPEDEF & CONSTANT                                                           |
******************************************************************************/
#define BYTE_AT_ADDR  *(unsigned char *)
#define WORD_AT_ADDR  *(unsigned short *)
#define LONG_AT_ADDR  *(unsigned long *)

#define BYTE unsigned char
#define WORD unsigned short
define LONG unsigned long define PSTR unsigned char * define B (unsigned char)
define W (unsigned short)
#define L (unsigned long)

#define BP (unsigned char *)
#define WP (unsigned short *)
#define LP (unsigned long *)

/* for WORD operands */
#define LST_BYTE(a)   (*((BYTE*)(&a) + 1))
#define MST_BYTE(a)   (* (BYTE*)(&a)     )
 /* for LONG operands */
#define LSB_LSW( a)   (*((BYTE*)(&a) + 3))
#define MSB_LSW( a)   (*((BYTE*)(&a) + 2))
#define LSB_MSW( a)   (*((BYTE*)(&a) + 1))
#define MSB_MSW( a)   (* (BYTE*)(&a)     )

#define LSW( a    )           (*((WORD*)(&a) + 1)         )
#define MSW( a    )           (* (WORD*)(&a)              )
#ifndef NUBUS_OFF
   #define nbsMSW( a )        ((* (WORD*)(&a)) | 0x8000   )
#else
   #define nbsMSW( a )        (* (WORD*)(&a)              )
#endif
```

4/5/93 12:12 PM        YARON'S DISKET:untitled folder:DEF32E.H.s           Page 2

```
#define TRUE    1
#define FALSE   0
define NULL    (LONG*)0x0000 define BIT0    (WORD)1
define BIT1    (WORD)2
#define BIT2    (WORD)4
#define BIT3    (WORD)8
#define BIT4    (WORD)16
#define BIT5    (WORD)32
#define BIT6    (WORD)64
#define BIT7    (WORD)128
#define BIT8    (WORD)256
#define BIT9    (WORD)512
#define BIT10   (WORD)1024
#define BIT11   (WORD)2048
#define BIT12   (WORD)4096
#define BIT13   (WORD)8192
#define BIT14   (WORD)16384
#define BIT15   (WORD)32768
#define BIT16   (LONG)65536
#define BIT17   (LONG)131072
#define BIT18   (LONG)262144
define BIT19   (LONG)524288 struct Port16Pin
    {
        unsigned    p15  :1;
        unsigned    p14  :1;
        unsigned    p13  :1;
        unsigned    p12  :1;
        unsigned    p11  :1;
        unsigned    p10  :1;
        unsigned    p9   :1;
        unsigned    p8   :1;
        unsigned    p7   :1;
        unsigned    p6   :1;
        unsigned    p5   :1;
        unsigned    p4   :1;
        unsigned    p3   :1;
        unsigned    p2   :1;
        unsigned    p1   :1;
        unsigned    p0   :1;
    };

/**********************************************************************
| FUNCTION PROTOTYPE                                                  |
**********************************************************************/

/**********************************************************************
| GLOBAL DATA                                                         |
**********************************************************************/
```

```
4/5/93 12:19 PM    YARON'S DISKET:untitled folder:GLOBAL1.H.§           Page 1

/****************************************************************************
|                         GLOBAL1.h                                          |
|---------------------------------------------------------------------------|
| Company: RAN                         Project : Nubus card                 |
|                                                                           |
| Subproject:                                                               |
|                                                                           |
| Programmer Name: Yaron Segev         Last Update By:                      |
|                                      Update :                             |
|                                                                           |
|---------------------------------------------------------------------------|
| TYPEDEF & CONSTANT                                                        |
| FUNCTION PROTOTYPE                                                        |
| IMPORTS                                                                   |
| GLOBAL DATA                                                               |
|---------------------------------------------------------------------------|
| ABSTRACT:                                                                 |
|                                                                           |
|                                                                           |
| CHANGES CONTROL:                                                          |
|   Date:                                                                   |
|   CHANGES:                                                                |
|                                                                           |
*****************************************************************************/
/****************************************************************************
| IMPORTS                                                                    |
*****************************************************************************/

/*--- RanNet protocoll: from adr. 2000h (has to be 1st !!!  ---------*/
#ifndef LOCATION_FIXED
    extern RNet_DrvHdrRec     *ptrRNet_DrvHdrTrs;
    extern RNet_DrvHdrRec     *ptrRNet_DrvHdrRcv[NUM_MAC_RCV_BUF];
#endif
/*#define ptrRNet_DrvHdrTrs (RNet_DrvHdrRec *)0x2000
#define ptrRNet_DrvHdrRcv (RNet_DrvHdrRec *)0x2004*/
/******* for DEBUG ***********************************************/
#ifdef DEBUG
    #define MAX_DBG_INDX    1024
    extern WORD dbg_indx;
    extern WORD dbg[MAX_DBG_INDX];
#endif
/****************************************************************/

/*-------------- RanNet protocoll ---------*/ extern WORD   Seq_No_rcvd ;
extern LONG   rcvd_size, dma_done,num_pckts_in_chunk ;
extern WORD   *tBlk_ptr,*rBlk_ptr;
extern LONG   tBlk_size,rBlk_size;
extern BYTE   rPtr_indx ;
extern WORD   pckt_size ;

extern BYTE               my_DATA_sckt_num,
                          my_CTRL_sckt_num;

typedef struct {
        WORD  trs_ok       :1;/* end of trs. */
        WORD  rcv_ok       :1;/* end of rcv. */
        WORD  EOBrcvd      :1;/* EndOfBlock received */
        WORD  EOBtrnsfrd   :1;/* last pckt in block was transfered to Mac. Mem.*/
        WORD  EOFrcvd      :1;/* EndOfFile  received */
        WORD  stop_dma     :1;/* en. DMA operation    */
        WORD  transfer     :1;/* DMA on operation     */
```

```
4/5/93 12:19 PM      YARON'S DISKET:untitled folder:GLOBAL1.H.§          Page 2

WORD    MacBlk_OvrFlw:1;
        WORD    reservd     :8;
        } flags_rec;
extern flags_rec flags;
extern RNet_DrvHdrRec          *rMACmemPtr;
extern BYTE            seqNumTbl[ MAX_SeqNUM ];

/*------------ DMA managment on RCV --------*/
typedef struct {
        LONG    *dst_Lptr;
        LONG    *src_Lptr;
        WORD    size;
} DmaBuf_rec ;
extern DmaBuf_rec     DmaBuf[ MAX_DmaBuf ],
                      *ptrDmaBuf_Wrt,
                      *ptrDmaBuf_Rd,
                      *ptrDmaBuf_MAX;
/*------------ SONIC- DESCRIPTORS & MAC ADDRESSES -------*/
extern rda_str        *ptrRdaUsed ;      /* current Rda ptr which is used */
extern LONG           *LptrNextTda;      /* next Tda ptr to be used */
extern MacAdd         SncMacAdd ;        /* structure that holdes SONIC MAC add */
extern MacAdd         DstSession_add;    /* Destination addr. */
extern Desc_rec       Desc_buf ;         /* phisical location of descriptors */
extern Desc_rec       *Snc_Desc ;        /* pointer that will point to
                                            phisical location of descriptors */

/*-------------- STATISTICS ----------*/
typedef struct {
    WORD rcv_ok;
    WORD trs_ok;
    WORD trnsfrd;
    WORD reserved1;
    WORD reserved2;
} stat_cnt_rec;

typedef struct {
    WORD pckt_rcv;       /* CRC error or- Not ALIGNED */
    WORD trs;
    WORD rcv_fifo_o_r;
    WORD MacBlk_OvrFlw;  /* no more memory block free in MAC     */
    WORD MACbuf_OvrFlw;  /* memory block in MAC exceeded         */
    WORD DmaBuf_OvrFlw;  /* over flow in DMA buf. on card        */
    WORD seqNum;         /* this "seqNum" in block was already received */
    WORD SncBus_retry;
    WORD dma_not_done;
    WORD bug_warning;
    WORD resered2;
} err_cnt_rec;

extern stat_cnt_rec   stat_cnt; /* statistics : trs/rcv ok */
extern err_cnt_rec    err_cnt;  /* statistics : trs/rcv errors */
/*------------ IO PORTs ----*/
extern struct ioBits_GP_rec {
        BYTE    dbg4            :1;
        BYTE    dbg3            :1;
        BYTE    dbg2            :1;
        BYTE    dbg1            :1;
        BYTE    dbg0            :1;
        BYTE    nbs2cpu_int     :1;
        BYTE    wd_clear        :1;
        BYTE    cpu2nbs_int     :1;
} ioBits_GP ;
```

```
4/5/93 12:19 PM    YARON'S DISKET:untitled folder:GLOBAL1.H.§        Page define YlwLed dbg4
define RedLed dbg3
#define ledON  0
#define ledOFF 1
define io_GP      *(BYTE*)AioBits_GP /*--- define GPreg values ---*/
/* to be changed ... *
#define nbs2cpu_intON    0
#define nbs2cpu_intOFF   1
#define cpu2nbs_intON    0
#define cpu2nbs_intOFF   1
#define ylw_led_ON       0
#define ylw_led_OFF      1
#define red_led_ON       0
#define red_led_OFF      1
*/ extern LONG    page_main, /* store main_page address(bits a23-a0),
                             in format of REGISTER*/
               page_1st, page_2nd,pages_border; /* addres of page */
/**********************************************************************/
```

```
4/5/93 12:24 PM    YARON'S DISKET:untitled folder:RANNET1.H.§           Page 1

/****************************************************************
;*
;_____
;
; Copyright RAN, Inc. 1990-1992
; All rights reserved.
;
; Created By :   Yaron Segev July 1992
;
;_____
*/
/******************************************************************
/******************************************************************
|                         RanNet1.h                               |
|-----------------------------------------------------------------|
| Company: RAN                         Project : Nubus card       |
|                                                                 |
| Subproject:                                                     |
|                                                                 |
| Programmer Name: Yaron Segev         Last Update By:            |
|                                      Update :                   |
|                                                                 |
|-----------------------------------------------------------------|
| TYPEDEF & CONSTANT                                              |
| FUNCTION PROTOTYPE                                              |
| IMPORTS                                                         |
| GLOBAL DATA                                                     |
|-----------------------------------------------------------------|
| ABSTRACT:                                                       |
|                                                                 |
|                                                                 |
| CHANGES CONTROL:                                                |
|  Date:                                                          |
|   CHANGES:                                                      |
|                                                                 |
*******************************************************************/
/***************************** AplTlk defined *************/
typedef struct {
    WORD            Net;
    BYTE            Node;
    BYTE            Socket;
    } AddrBlock ;

typedef struct {
    unsigned short   csCode;          /* $ - Sonic Defined */
    AddrBlock        senderAddress;
    unsigned short   sessionId;
    unsigned short   fileFork;
    unsigned short   blockNum;
    unsigned long    seqNum;          /* $ - Sonic Defined */
    unsigned short   len;             /* $ - Sonic Defined */
    } RanNet_hdrRec ;
extern RanNet_hdrRec       RanNet_hdr;
define sizeof_RanNet_hdr 18 typedef struct {
    unsigned short   csCode;
    AddrBlock        senderAddress;
    unsigned short   sessionId;
    unsigned long    seqNum;
    unsigned short   len;
    } RanNet_CtrlHdrRec ;
extern RanNet_CtrlHdrRec       RanNet_CtrlHdr;
```

4/5/93 12:24 PM     YARON'S DISKET:untitled folder:RANNET1.H.§     Page

```
define sizeof_RanNet_CtrlHdr 14 extern WORD RNet_csCode[   MAX_CsCODE];
extern LONG RNet_seqNum[   MAX_SeqNUM ];
extern BYTE PAD_Data[60];      /* pad data for short (less 60 bytes) packets */ typedef struct {
   WORD   eLngth;
   WORD   dLngth;
   WORD   rLngth;
         } RNet_lngthRec;
extern RNet_lngthRec RNet_Lngth[ MAX_LNGTH ];

extern LONG *WptrRNet_seqNum;
extern WORD *WptrRNet_Data;     /* start of data block              */ typedef struct {
      BYTE  Dst_SAP          ;
      BYTE  Src_SAP          ;
      BYTE  Ctrl_SAP         ;
      BYTE  SNAP_AplTlk[5]   ;
   } SNAP_headerRec;
extern SNAP_headerRec SNAP_header;
define sizeof_SNAP_header 8 typedef struct {
      WORD lngth       ;
      WORD chksum      ;
      WORD DstNet      ;
      WORD SrcNet      ;
      BYTE DstNode     ;
      BYTE SrcNode     ;
      BYTE DstSockt    ;
      BYTE SrcSockt    ;
      BYTE type        ;
   } DDP_headerRec;
extern  DDP_headerRec DDP_header;
define sizeof_DDP_header 13 typedef struct {
   LONG   blkSize;
   LONG   drv_cmd_trsRcv;
   LONG   reserved1[10];
   LONG   reserved2[ 6];
   } RNet_DrvHdrRec;
#define sizeof_RNet_DrvHdr 18 /* in longs */

/*-- CONSTANTS as additions to word_ptr in DDP\SNAP headers --*/
#define h_wPtr_SAP_NUMmst   12+2+2
#define h_wPtr_SAP_NUM1st   12+2+2+4
#define h_wPtr_DDP_DST_SKT  12+2+8+10
#define h_wPtr_RNET_csCode  12+2+8+13

/****************************************************************/
/*
** who is active :
** this status is specified in a global var gWhoIsActive
** to reflects the identity of active entity at any given
** time.
**
** When the application is just started gWhoIsActive is
** set to kSocketListner.
*/
```

4/5/93 12:24 PM    YARON'S DISKET:untitled folder:RANNET1.H.§      Page 3

```
#define kSocketListner    1     /* I am in listening mode */
#define kServer           2     /* I am a server */
#define kClient           3     /* I am a client (I got an ACK to a kOpenSession?

/* csCode
--------------*/
/* session information
------------------------*/
#define kcOpenSessionReq   1    /* issued by client */
#define ksOpenSessionAck   2    /* issued by server */
#define kcListFilesReq     3    /* issued by client */
#define ksStartFileListAck 4    /* issued by server */
#define ksNextFileListAck  5    /* issued by server */
#define ksLastFileListAck  6    /* issued by server */
#define kcAckFileList      7    /* issued by client */
#define kcGetFileInfoReq   8    /* issued by client */
#define ksFileFinderInfo   9    /* issued by server */
/*-------------------------*/
define kcStartSendingFile 10   /* issued by client */ define ksGetFirstPacketReq 11  /* issued by server */
define ksGetNextPacketReq  12  /* issued by server */
define ksGetLastPacketReq  13  /* issued by server */ define kcAckChunk         14   /* issued by client */
define kcCorrectionReq    15   /* issued by client */
#define ksEndOfFile        16   /* issued by client */
/*-------------------------*/
#define kcCloseSessionReq  17   /* issued by client */
#define ksCloseSessionAck  18   /* issued by server */
#define kcClientSessionDone 19  /* issued by client */
#define kNACK              20   /* issued by client */

/* file forks */
#define kDataFork      1
#define kResourcFork   2

/*- RanCard csCode-*/
#define EOB ksGetLastPacketReq
#define EOF ksEndOfFile
/**************************************************************/
```

4/5/93 12:26 PM    YARON'S DISKET:untitled folder:SMLT.H.§    Page 1

```
/*******************************************************************
/*
;_____
;
;  Copyright RAN, Inc. 1990-1992
;  All rights reserved.
;
;  Created By :   Yaron Segev July 1992
;
;_____
;
*/
/*******************************************************************
|                            SMLT.h                                 |
|-------------------------------------------------------------------|
|  Company: RAN                          Project :  Nubus card      |
|                                                                   |
|  Subproject:                                                      |
|                                                                   |
|  Programmer Name: Yaron Segev      Last Update By:                |
|                                    Update :                       |
|                                                                   |
|-------------------------------------------------------------------|
|  TYPEDEF & CONSTANT                                               |
|  FUNCTION PROTOTYPE                                               |
|  IMPORTS                                                          |
|  GLOBAL DATA                                                      |
|-------------------------------------------------------------------|
|   ABSTRACT:                                                       |
|                                                                   |
|                                                                   |
|   CHANGES CONTROL:                                                |
|     Date:                                                         |
|     CHANGES:                                                      |
|                                                                   |
*******************************************************************/

/*****************************************************************/
extern LONG file_size, trsd_size;
extern WORD blk_num;
/*****************************************************************/
```

4/5/93 12:28 PM    YARON'S DISKET:untitled folder:SNC32B.H.§         Page 1

```
/*******************************************************************************
|                        SNC32B.h                                              |
|------------------------------------------------------------------------------|
| Company: RAN                          Project : Nubus card                   |
|                                                                              |
| Subproject:                                                                  |
|                                                                              |
| Programmer Name: Yaron Segev          Last Update By:                        |
|                                       Update :                               |
|------------------------------------------------------------------------------|
| TYPEDEF & CONSTANT                                                           |
| FUNCTION PROTOTYPE                                                           |
| IMPORTS                                                                      |
| GLOBAL DATA                                                                  |
|------------------------------------------------------------------------------|
| ABSTRACT:                                                                    |
|                                                                              |
|                                                                              |
| CHANGES CONTROL:                                                             |
|   Date:                                                                      |
|   CHANGES:                                                                   |
|                                                                              |
*******************************************************************************/
/*******************************************************************************
*              global defenitions                                              *
*******************************************************************************/

/***************************************************
*         REGISTERS OF SONIC
****************************************************/
/* NOTE for SONIC ADDRESS maping:
   ~~~~~~~~~~~~~~~~~~~~~~~~~~~~~
    - sonic reg. are memory mapped in jumps of 32 bit,
      but are 16 bit width(D0:D15).
    - the processor 68020 acsess data (D16:D31) in word transfer
      while long read/write align,
      so the address must be not long aligned, acsesses (D0:D15).
*******************************************************************************/
define   SONIC_cr     WORD_AT_ADDR(0x140002)    /* Command */
define   SONIC_dcr    WORD_AT_ADDR(0x140006)    /* Data Configuration */
define   SONIC_rcr    WORD_AT_ADDR(0x14000a)    /* Receive Control */
define   SONIC_tcr    WORD_AT_ADDR(0x14000e)    /* Transmit Control */
define   SONIC_imr    WORD_AT_ADDR(0x140012)    /* Interrupt Mask */
define   SONIC_isr    WORD_AT_ADDR(0x140016)    /* Interrupt Status */
define   SONIC_dcr2   WORD_AT_ADDR(0x1400fe)    /* Data configuration 2*/

/* Transmit registers */
define   SONIC_utda   WORD_AT_ADDR(0x14001a)    /* Upper Transmit Descriptor Addr
define   SONIC_ctda   WORD_AT_ADDR(0x14001e)    /* Current Transmit Descriptor Ad
/*define   SncUtdaCtda LONG_AT_ADDR(0x14000c)    /* form 32 bit utda:ctda*/

/* Receive registers */
define   SONIC_urda   WORD_AT_ADDR(0x140036 )   /* Upper Receive Descriptor Addr
define   SONIC_crda   WORD_AT_ADDR(0x14003a )   /* Current Receive Descriptor Add /*#define  SncUrdaCrda LONG_AT_ADDR(0x14001a)       /* form 32 bit urda:crda */
/*#define  SncCrba     LONG_AT_ADDR(0x14001e)       /* 32 bit ( in INTEL STYLE )

define   SONIC_eobc   WORD_AT_ADDR(0x14004e )   /* End of Buffer Word Count */ define   SONIC_urra   WORD_AT_ADDR(0x140052)    /* Upper Receive Resource Addr */
define   SONIC_rsa    WORD_AT_ADDR(0x140056)    /* Resource Start Addr */
```

```
4/5/93 12:28 PM       YARON'S DISKET:untitled folder:SNC32E.H.§       Page 1

/*#define  SncUrraRsa    LONG_AT_ADDR(0x140028 )      * form 32 bit Urra:Rsa * define  SONIC_rea    WORD_AT_ADDR(0x14005a )     /* Resource End Addr */
define  SONIC_rrp    WORD_AT_ADDR(0x14005e )     /* Resource Read Addr */
#define  SONIC_rwp    WORD_AT_ADDR(0x140062 )     /* Resource Write Addr */
#define  SONIC_rsc    WORD_AT_ADDR(0x1400ae )     /* Receive Sequence Counter */
#define  SONIC_rbwc0  WORD_AT_ADDR(0x140046 )     /* remaining buffer word count0 *
#define  SONIC_rbwc1  WORD_AT_ADDR(0x14004a )     /* remaining buffer word count0 *
#define  SONIC_crba0  WORD_AT_ADDR(0x14003e )     /* current receive buffer address
define  SONIC_crba1  WORD_AT_ADDR(0x140042 )     /* current receive buffer address /* Cam registers */
define  SONIC_cep    WORD_AT_ADDR(0x140086 )     /* CAM entry Point */
#define  SONIC_cap2   WORD_AT_ADDR(0x14008a )     /* CAM Address Port 2 */
#define  SONIC_cap1   WORD_AT_ADDR(0x14008e )     /* CAM Address Port 1 */
#define  SONIC_cap0   WORD_AT_ADDR(0x140092 )     /* CAM Address Port 0 */
#define  SONIC_ce     WORD_AT_ADDR(0x140096 )     /* CAM Enable */
#define  SONIC_cdp    WORD_AT_ADDR(0x14009a )     /* CAM Descriptor Pointer */
#define  SONIC_cdc    WORD_AT_ADDR(0x14009e )     /* CAM Descriptor Count */

/* Tally counters */
#define  SONIC_crct   WORD_AT_ADDR(0x1400b2 )     /* CRC Error Tally */
#define  SONIC_faet   WORD_AT_ADDR(0x1400b6 )     /* FAE Error Tally */
#define  SONIC_mpt    WORD_AT_ADDR(0x1400ba )     /* Missed Packet Tally */

/* Watchdog counters */
#define  SONIC_wt0    WORD_AT_ADDR(0x1400a6    )/* Watchdog Timer 0 */
#define  SONIC_wt1    WORD_AT_ADDR(0x1400aa    )/* Watchdog Timer 1 */
/*#define  SonicWt1Wt0 LONG_AT_ADDR(0x140052  )/* the all 32 bit timer*/

/* Silicon revision */
#define  SONIC_sr WORD_AT_ADDR(0x1400a2      ) /* Silicon Revision */

/************************************************************************
*                                                                       *
*    structures and bit defenitions conserning sonic reg                *
*                                                                       *
*                                                                       *
*                                                                       *
*                                                                       *
*                                                                       *
*                                                                       *
*************************************************************************/

/************************************************************************
*
* Bits in the SONIC Command Register    (CR = Add 0 )
*
*************************************************************************/
#define CMD_LCAM   0x0200    /* Load CAM */
#define CMD_RRRA   0x0100    /* Read RRA */
#define CMD_RST    0x0080    /* Software Reset */
#define CMD_ST     0x0020    /* Start Timer */
#define CMD_STP    0x0010    /* Stop Timer */
#define CMD_RXEN   0x0008    /* Receive Enable */
#define CMD_RXDIS  0x0004    /* Receive Disable */
#define CMD_TXP    0x0002    /* Transmit Packet */
```

```
4/5/93 12:28 PM     YARON'S DISKET:untitled folder:SNC326.H.8          Page 2 define CMD_HTX    0x0001   /* Halt Transmission */ define SOFT_RST1  0x0094   /* CR after Hardware reset */
define SOFT_RST2  0x00a4   /* CR after soft reset */

/****************************************************************
*
* Bits in the SONIC Data Configuration Register  (DCR = Add 1 )
*
* !!!!! this reg can be writen only when the sonic is in reset mode !!!!
*
****************************************************************/

/* bits 15 (EXBUS) and 13 (LBR) not defined */ define DCR_LBR     0x2000   /* 1:sonic leaves BUS until BRT pin =1 & bit BR in ISR
define DCR_PO0     0x0000   /* Define The Logic Of USR0,USR1 Pins When    */
#define DCR_PO1     0x0800   /* The Sonic Is Bus Master                    */
#define DCR_PO2     0x1000   /*                                            */
define DCR_PO3     0x1800   /*                                            */ define DCR_SBUS0   0x0000   /* Asynchronous DMA Mode (Min 3 Bus Clocks)  */
define DCR_SBUS1   0x0400   /* Synchronous  DMA Mode (Min 2 Bus Clocks)  */ define DCR_USR0    0x0000   /* The Two Bits Report Logic Level On Pins .....*/
define DCR_USR1    0x0100   /* USR0,USR1  After Hardware Reset(Done Once).  */
#define DCR_USR2    0x0200   /* Those Two Pins Are Output During Dma Transfer */
define DCR_USR3    0x0300   /* And theire Logic Is Determind By Bits PO0,PO1 */ define DCR_WC0     0x0000   /* Additional DMA Bus Cycles:Zero Bus Cycles Added */
define DCR_WC1     0x0040   /* Additional DMA Bus Cycles:One Bus Cycles Added */
#define DCR_WC2     0x0080   /* Additional DMA Bus Cycles:Two Bus Cycles Added */
define DCR_WC3     0x00c0   /* Additional DMA Bus Cycles:Three Bus Cycles Added */ define DCR_DW16    0x0000   /* 16-Bit Data Width */
define DCR_DW32    0x0020   /* 32-Bit Data Width */ define DCR_BMS0    0x0000   /* Empty/Fill Mode:Tx & Rec DMA untill empty */
define DCR_BMS1    0x0010   /* Block Mode:Tx & Rec DMA Size According To Def Bellow */ define DCR_RFT2    0x0000   /* 2 Words Receive FIFO Threshold */
define DCR_RFT4    0x0004   /* 4 Words Receive FIFO Threshold */
#define DCR_RFT8    0x0008   /* 8 Words Receive FIFO Threshold */
define DCR_RFT12   0x000c   /* 12 Words Receive FIFO Threshold */ define DCR_TFT4    0x0000   /* 4 Words Transmit FIFO Threshold */
define DCR_TFT8    0x0001   /* 8 Words Transmit FIFO Threshold */
#define DCR_TFT12   0x0002   /* 12 Words Transmit FIFO Threshold */
define DCR_TFT14   0x0003   /* 14 Words Transmit FIFO Threshold */ define DCR_EXBUS   0x8000   /* set extanded bus mode */

/****************************************************************
*
* Bits in the SONIC Receive Control Register  (RCR = 2 )
*
****************************************************************/
#define RCR_ERR     0x8000   /* Accept Packet With CRC & COL Errors   */
#define RCR_RNT     0x4000   /* Accept Runt Packet                    */
```

4/5/93 12:28 PM     YARON'S DISKET:untitled folder:SNC32B.H.§         Page 4

```
#define RCR_BRD     0x2000    /* Accept Broadcast Packet                     */
#define RCR_PRO     0x1000    /* Promiscuous Mode (en all phisical add/norm)*/
define RCR_AMC     0x0800    /* Accept All Multicast Packet                 */ define RCR_LB0     0x0000    /* No Loopback:Normal Operation        */
define RCR_LB1     0x0200    /* MAC Loopback                        */
#define RCR_LB2     0x0400    /* ENDEC Loopback                      */
define RCR_LB3     0x0600    /* TRANSCEIVER Loopback                */ define RCR_MC      0x0100    /* Multicast Packet Received ---------          */
define RCR_BC      0x0080    /* Broadcast Packet Received                    */
#define RCR_LPKT    0x0040    /* Last Packet In RBA                           */
#define RCR_CRS     0x0020    /* Carrier Sense Activity            flags      */
#define RCR_COL     0x0010    /* Collision Occured During Reception reported */
#define RCR_CRCR    0x0008    /* CRC Error                         by the    */
#define RCR_FAER    0x0004    /* FAE Error( Frame Alignment Error) sonic     */
#define RCR_LBK     0x0002    /* Loopback Packet Received                     */
#define RCR_PRX     0x0001    /* Packet Received ok        ----------         */

/*****************************************************************************
 *
 * Bits in the SONIC Transmit Control Register   (TCR = 3 )
 *
 *****************************************************************************/
#define TCR_PINT    0x8000    /* Programmable Int (enable int after each tran)*/
#define TCR_POWC    0x4000    /* Program "Out Of Window" Timer */
#define TCR_CRCI    0x2000    /* CRC Inhibit */
#define TCR_EXDIS   0x1000    /* disable deferral timer  */
#define TCR_EXD     0x0400    /* Excessive Deferal         ----------        */
#define TCR_DEF     0x0200    /* Deferred Transmission            |          */
#define TCR_NCRS    0x0100    /* No CRS                           |flags     */
#define TCR_CRSL    0x0080    /* CRS Lost                         |report    */
#define TCR_EXC     0x0040    /* Excessive Collisions             |by        */
#define TCR_OWC     0x0020    /* Out of Window Collisions         |sonic     */
#define TCR_PMB     0x0008    /* Transmitted Packet Not Received OK |        */
#define TCR_FU      0x0004    /* FIFO Underrun                    |          */
#define TCR_BCM     0x0002    /* Byte Count Mismatch(Frag Count<> Size)|     */
#define TCR_PTX     0x0001    /* Packet Transmitted OK(No Errors------       */

/*****************************************************************************
 *
 * Bits in the SONIC Interrupt Mask Register   (IMR = 4 )
 *
 *****************************************************************************/ define IMR_BREN    0x4000    /* Enable Int When A Bus Retry Operation Is Requested
define IMR_HBLEN   0x2000    /* Enable Int When Heartbeat Lost*/
#define IMR_LCDEN   0x1000    /* Enable Int When the LOAD CAM Command Finished*/
#define IMR_PINTEN  0x0800    /* Programmable Interrupt Enable */
#define IMR_PRXEN   0x0400    /* Packet Received Enable */
#define IMR_PTXEN   0x0200    /* Packet Transmitted OK Enable */
#define IMR_TXEREN  0x0100    /* Transmit Error Enable */
#define IMR_TCEN    0x0080    /* Timer Complete Enable */
#define IMR_RDEEN   0x0040    /* Receive Descriptors Exhausted Enable */
#define IMR_RBEEN   0x0020    /* Receive Buffers Exhausted Enable */
#define IMR_RBAEEN  0x0010    /* RBA Exceeded Enable */
#define IMR_CRCEN   0x0008    /* CRC Tally Counter Overflow Enable */
#define IMR_FAEEN   0x0004    /* FAE Tally Counter Overflow Enable */
#define IMR_MPEN    0x0002    /* MP Tally Counter Overflow Enable */
#define IMR_RFOEN   0x0001    /* Receive FIFO Enable */
```

4/5/93 12:28 PM       YARON'S DISKET:untitled folder:SNC32F.H.§        Page 5

```
/*******************************************************************
*
* Bits in the SONIC ISR Register       (ISR = 5 )
*
********************************************************************/
#define ISR_BREN    0x4000  /* Bus Retry Operation Is Requested*/
#define ISR_HBLEN   0x2000  /* When Heartbeat Lost*/
#define ISR_LCDEN   0x1000  /* LOAD CAM Command Finished*/
#define ISR_PINT    0x0800  /* Programmable Interrupt */
#define ISR_PKTRX   0x0400  /* Packet Received */
#define ISR_TXDN    0x0200  /* Transmission Done */
#define ISR_TXER    0x0100  /* Transmission Error */
#define ISR_TC      0x0080  /* Timer Complete */
#define ISR_RDE     0x0040  /* Receive Descriptors Exhausted */
#define ISR_RBE     0x0020  /* Receive Buffers Exhausted */
#define ISR_RBAE    0x0010  /* RBA Exceeded */
#define ISR_CRC     0x0008  /* CRC Tally Counter Rollover */
#define ISR_FAE     0x0004  /* FAE Tally Counter Rollover */
#define ISR_MP      0x0002  /* Missed Packet Counter Rollover */
define ISR_RFO     0x0001  /* Receive FIFO Overrun */ define ISR_IMASK 0xffff   /* Interrupt mask */

/*******************************************************************
*
* Bits in the SONIC DCR2 Register      (DCR2 = 3Fh )
* !!!! this reg can be written only when the sonic is in reset mode !!!!!
*
********************************************************************/
       /* BITS 12-15 =EXPOC-3 NOT DEFINED */ define DCR2_PH    0x0010
define DCR2_LRDY  0x0008
#define DCR2_PCM   0x0004
#define DCR2_PCNM  0x0002
#define DCR2_RJCM  0x0001  /* Reject Packet On Cam Match */

/*******************************************************************
*
* Receive Resorce Address Format ( RRA )
*
********************************************************************/ typedef struct {
    unsigned long  RXrsrc_buff_ptr0;
    unsigned long  RXrsrc_buff_ptr1;
    unsigned long  RXrsrc_buff_wc0;
    unsigned long  RXrsrc_buff_wc1;
} RecResorce ;
/*******************************************************************
*
* Recive Descriptor Format  ( RDA )
*
********************************************************************/

/* RDA data structure */
typedef struct {
    unsigned long  status;
    unsigned long  byte_count;
```

```
4/5/93 12:28 PM    YARON'S DISKET:untitled folder:SNC32E.H.§         Page 6 unsigned long  pkt_ptr0;    /* 16 lsb bits */
    unsigned long  pkt_ptr1;    /* 16 msb bits */
    unsigned long  seq_no;
    unsigned long  pkt_link;
    unsigned long  in_use;
}rda_str ;
/******************************************************************
 *
 * Transmit Descriptor Format    ( TDA )
 *
 ******************************************************************/

/* One fragment TDA data structure */
typedef struct  {
    unsigned long  status;
    unsigned long  config;
    unsigned long  pkt_size;
    unsigned long  frag_count;

/*-- fragment for: Destination add.  --*/
    unsigned long  frag1_ptr0;  /* 16 lsb bits */
    unsigned long  frag1_ptr1;  /* 16 msb bits */
    unsigned long   frag1_size;

/*-- fragment for: Source       add.  --*/
    unsigned long  frag2_ptr0;  /* 16 lsb bits */
    unsigned long  frag2_ptr1;  /* 16 msb bits */
    unsigned long   frag2_size;

/*-- fragment for: Length             --*/
    unsigned long  frag3_ptr0;  /* 16 lsb bits */
    unsigned long  frag3_ptr1;  /* 16 msb bits */
    unsigned long   frag3_size;

/*-- fragment for: SNAP header        --*/
    unsigned long  frag4_ptr0;  /* 16 lsb bits */
    unsigned long  frag4_ptr1;  /* 16 msb bits */
    unsigned long   frag4_size;

/*-- fragment for: DDP_header         --*/
    unsigned long  frag5_ptr0;  /* 16 lsb bits */
    unsigned long  frag5_ptr1;  /* 16 msb bits */
    unsigned long   frag5_size;

/*-- fragment for: RanNet_header_1    --*/
    unsigned long  frag6_ptr0;  /* 16 lsb bits */
    unsigned long  frag6_ptr1;  /* 16 msb bits */
    unsigned long   frag6_size;

/*-- fragment for: RanNet_header_2    --*/
    unsigned long  frag7_ptr0;  /* 16 lsb bits */
    unsigned long  frag7_ptr1;  /* 16 msb bits */
    unsigned long   frag7_size;

/*-- fragment for: RanNet_header_3    --*/
    unsigned long  frag8_ptr0;  /* 16 lsb bits */
    unsigned long  frag8_ptr1;  /* 16 msb bits */
    unsigned long   frag8_size;

/*-- fragment for: RanNet_header_4    --*/
    unsigned long  frag9_ptr0;  /* 16 lsb bits */
    unsigned long  frag9_ptr1;  /* 16 msb bits */
    unsigned long   frag9_size;
```

4/5/93 12:28 PM     YARON'S DISKET:untitled folder:SNC32B.H.§          Page 7

```c
    /*-- fragment for: RanNet_data     --*/
    unsigned long   frag10_ptr0;  /* 16 lsb bits */
    unsigned long   frag10_ptr1;  /* 16 msb bits */
    unsigned long   frag10_size;

/*-- fragment for: resrved        --*/
    unsigned long   frag11_ptr0;  /* 16 lsb bits */
    unsigned long   frag11_ptr1;  /* 16 msb bits */
    unsigned long   frag11_size;

/*-- fragment for: resrved        --*/
    unsigned long   frag12_ptr0;  /* 16 lsb bits */
    unsigned long   frag12_ptr1;  /* 16 msb bits */
    unsigned long   frag12_size;

/*-- fragment for: resrved        --*/
    unsigned long   frag13_ptr0;  /* 16 lsb bits */
    unsigned long   frag13_ptr1;  /* 16 msb bits */
    unsigned long   frag13_size;

/*-- fragment for: resrved        --*/
    unsigned long   frag14_ptr0;  /* 16 lsb bits */
    unsigned long   frag14_ptr1;  /* 16 msb bits */
    unsigned long   frag14_size;

/*-- fragment for: resrved        --*/
    unsigned long   frag15_ptr0;  /* 16 lsb bits */
    unsigned long   frag15_ptr1;  /* 16 msb bits */
    unsigned long   frag15_size;

/*-- fragment for: resrved        --*/
    unsigned long   frag16_ptr0;  /* 16 lsb bits */
    unsigned long   frag16_ptr1;  /* 16 msb bits */
    unsigned long   frag16_size;

/*-- fragment for: resrved        --*/
    unsigned long   frag17_ptr0;  /* 16 lsb bits */
    unsigned long   frag17_ptr1;  /* 16 msb bits */
    unsigned long   frag17_size;

/*-- fragment for: resrved        --*/
    unsigned long   frag18_ptr0;  /* 16 lsb bits */
    unsigned long   frag18_ptr1;  /* 16 msb bits */
    unsigned long   frag18_size;

/*-- Link                         --*/
    unsigned long   link;
}tda_str ;

#define MAX_FRAGS_ALLOWED  18

/***************************************************************
 *
 * Cam descriptor Area Format *
 ***************************************************************/
struct CamDesc {
    unsigned long Entry ;
    unsigned long Add0 ;
    unsigned long Add1 ;
    unsigned long Add2 ;
} ;
```

4/5/93 12:28 PM     YARON'S DISKET:untitled folder:SNC32B.H.s            Page 6

```c
/* Structure of a single CAM entry */ typedef struct {
    struct CamDesc Cam[16];
    unsigned long ValidCam;
}cam_str ;

/****************************************************************
 *
 *   SONIC MAC ADD FORMAT
 ****************************************************************/ typedef struct {
    WORD MsbWord  ;
    WORD MidWord  ;
    WORD LsbWord  ;
} MacAdd ;

/****************************************************************
 *                                                               *
 *   struct that holds all the descriptors that are supoused to be *
 *   in the same 64k block ( will be placed by pointer )         *
 ****************************************************************/ typedef struct {
    RecResorce   SncRra              ;
    cam_str      SncCam              ;
    rda_str      SncRda[MaxRdaDesc]  ;
    tda_str      SncTda[MaxTdaDesc]  ;
} Desc_rec;
/****************************************************************
 *                                                               *
 *   struct that holds the order and size of rec buff and frame to transmit*
 ****************************************************************/
union RTba_union {
        BYTE SncRba[ REC_BUFF_SIZE ]; /* rec.  frames are stored here */
        BYTE SncTba[ TRS_BUFF_SIZE ]; /* trs.  frames are stored here */
} RTba;
/****************************************************************/ extern BYTE WrtPort_GP ; /* write port- genearl pupose */
extern BYTE ioReg_Swap_ROM_RAM ; /* write to reg. (dont care data) -
                                change ram to bottom of memory map */
extern LONG ioRegPage; /* value will be : LONG(addr)/PTR to NBS shr7 */

/*---------------------------*/
```

```
4/5/93 12:29 PM    YARON'S DISKET:untitled folder:MN32B1.C.§         Page 1

/*****************************************************************************
ver. Notes:
as main.c with:
    1. include "sonic5.h"/"globall.h" (updated);
as main1.c with: ( sonic 32 bit & 68ec020 ) (created 18/1/93)
-----------------------------------------------------------------------------

/*****************************************************************************
|                              MAIN.C                                         |
|----------------------------------------------------------------------------|
| Company: RAN                            Project : NuBus Card               |
|                                                                            |
| Subproject: HardWare Sonic Test                                            |
|                                                                            |
| Programmer Name: Yaron                  Last Update By:                    |
|                                         Update :                           |
|                                                                            |
|----------------------------------------------------------------------------|
| IMPORTS                                                                    |
| INTERNAL TYPEDEF & CONSTANT                                                |
| INTERNAL FUNCTION PROTOTYPE                                                |
| LOCAL DATA                                                                 |
|----------------------------------------------------------------------------|
| Function List:                                                             |
| ---------------                                                            |
| main()                                                                     |
|----------------------------------------------------------------------------|
|  ABSTRACT:                                                                 |
|                                                                            |
|  CHANGES CONTROL:                                                          |
|    Date:                                                                   |
|    CHANGES:                                                                |
|                                                                            |
*****************************************************************************/

/*****************************************************************************
| EXTERNALS
*****************************************************************************/
void interrupt int_err();
/*****************************************************************************
| IMPORTS
*****************************************************************************/
include "def32b.h"
include "comp_opt.h"

undef XRAY include "const1.h"
include "snc32b.h"      /* sonicreg + structures + functions prototypes*/

/** declare all GLOBALs variabls ****/ define extern              /* cancel "extern" string */
define LOCATION_FIXED      /* for absulote positions of some vars in global.c */
#include "RanNet1.h"
include "globall.h"

#ifdef SMLT_MAC
    #include "smlt.h"
endif
/*********************************/

/*****************************************************************************
```

4/5/93 12:29 PM    YARON'S DISKET:untitled folder:MN32B1.C.8          Page 1

```
; INTERNAL TYPEDEF & CONSTANT                                              |
***************************************************************************/
/**************************************************************************
| INTERNAL FUNCTION PROTOTYPE                                              |
***************************************************************************/
void interrupt Null_Int0();
void interrupt Null_Int1();
void interrupt Null_Int2();
void interrupt Null_Int3();
void interrupt Null_Int4();
void interrupt Null_Int5();
void interrupt Null_Int6();
void interrupt Null_Int7();
/**************************************************************************
| LOCAL DATA                                                               |
***************************************************************************/
LONG Loop;
WORD *Wptrl;

/**************************************************************************
| main()                                                                   |
|-------------------------------------------------------------------------|
| Abstract:                                                                |
| Parameters:                                                              |
|     None                                                                 |
|                                                                          |
| Returns:                                                                 |
|     None                                                                 |
***************************************************************************/
void main()
{
   asm("         move #$2700,sr")       ; /* disable int from all levels */
   ioReg_Swap_ROM_RAM = 0x00; /* after RESET //in RESTART  */ ifndef XRAY
   /*-- init extrnal int. vectors  to Null Int ---*/
   *(LONG *)0x07c = (LONG)int_err; /*set int vector for IRQ7   */
   *(LONG *)0x078 = (LONG)int_err; /*set int vector for IRQ6   */
   *(LONG *)0x074 = (LONG)int_err; /*set int vector for IRQ5   */
   *(LONG *)0x06c = (LONG)int_err; /*set int vector for IRQ3   */
   *(LONG *)0x068 = (LONG)int_err; /*set int vector for IRQ2   */
   *(LONG *)0x064 = (LONG)int_err; /*set int vector for IRQ1   */
   *(LONG *)0x060 = (LONG)int_err; /*set int vector for IRQ0   */
   *(LONG *)0x070 = (LONG)int_err; /*set int vector for IRQ4   */
#else
   *(LONG *)0x070 = (LONG)Null_Int4; /*set int vector for IRQ4 *
#endif
   /***** end: Init 68020 *****/

/*-------------------------------------------------------------------
module SONIC created a pointer named sncl_Desc to a speacul strcture
named 'DescRec'. this structure combines all SONIC1 Rra ,Cam , Tda , Rda
descriptors which has to be located  in the same 64 k RAM ..
defining the value of this pointer , defines where all the descriptors
will be placed in RAM memory :
ram    version : EPROM xxxxx - xxxxx     RAM  00000 - 7fff
eprom version : EPROM 00000 - 1ffff      RAM  80000 - 100000
-------------------------------------------------------------------*/ ifdef XRAY
  asm(" XREF ????STACKTOP      ");
  asm(" move.l #?????STACKTOP,sp ");
#endif
```

```
4/5/93 12:29 PM      YARON'S DISKET:untitled folder:MN32B1.C.§         Page 3

Snc_Desc = (Desc_rec *)0x70000 ;

SONIC_cr = CMD_RST;      /* stop SONIC */
   SONIC_imr = 0;           /* dis. all int. */
   SONIC_isr = 0xffff;      /* ack. all int. */

/*------------------------------------*/

WrtPort_GP = io_GP = 0x87 ; /* 0x87 - clear all ints,Led Red On, Led Yell On */
#ifdef VERC_0
   ioRegPage = (0x00000000 >> 7); /* NBS page = 0x00xxxxxx;  */
#else
   ioRegPage = 0x00000000 ;       /* NBS page = 0x00xxxxxx;  */
endif asm("          move #$2000,sr") ;  /* allow int from lowet level */

/*-- init GLOBAL symbols --*/ for (Wptr1 = (WORD*)&stat_cnt;
        Wptr1 < (WORD*)((LONG)&stat_cnt+sizeof(stat_cnt)); Wptr1--) *Wptr1 = 0;
   for (Wptr1 = (WORD*)&err_cnt;
        Wptr1 < (WORD*)((LONG)&err_cnt+sizeof(err_cnt)); Wptr1++) *Wptr1 = 0;
   *(WORD*)&flags = 0;

/*---- DEBUG inits & ROMID crc check ------*/ ifdef DEBUG
      for (Loop=0; Loop< MAX_DBG_INDX   ; Loop++) dbg[Loop]= 0xffff;
      dbg_indx=0;

/*#define CRC_COMPUTE*/
#ifdef CRC_COMPUTE
   Loop = 0;
   Loop = crc();
endif endif
   /*------------------------------------*/
#ifdef TEST

/*--- update Src\Dst no. -----*/
   DstSession_add.MsbWord  = 0x0900;
   DstSession_add.MidWord  = 0x07ff;
   DstSession_add.LsbWord  = 0xffff;/* dest = AplTlk multicast */

SncMacAdd.LsbWord = 0x1221;
   SncMacAdd.MidWord = 0x3443;
   SncMacAdd.MsbWord = 0x5665;

pckt_size = 512; /* RanNet data size in bytes  */ ifdef TEST_SELF
      SelfTest();
      WrtPort_GP = io_GP = 0x47 ;   /* 0x47 - clear all ints,Led Red Off, Led Yell
#endif
#ifdef DMA_TEST
      dma_test();
endif endif
```

4/5/93 12:29 PM    YARON'S DISKET:untitled folder:MN32B1.C.S    Page 4

```
  InitRanNet();

InitSnc2Work(
     RCR_LB0|
     RCR_PRO|    /* sonic1 accept all phisical address (promiscurus mode ) */
     RCR_BRD ,   /* sonic1 accept brodcast & multycast */
     4       ,   /* sonic1 accept on cam match + lower PCOMP pin on internal Cam ma
     1 ) ;       /* enable sonic1/2 int   */ while(1) snd_get_file();

} /* end main */
/*****************************************************************************
*   Null Int                                                                 *
*****************************************************************************/
void interrupt Null_Int0(){ while (1) ; /* end_less loop */}
void interrupt Null_Int1(){ while (1) ; /* end_less loop */}
void interrupt Null_Int2(){ while (1) ; /* end_less loop */}
void interrupt Null_Int3(){ while (1) ; /* end_less loop */} void interrupt Null_Int4(){ while (1) ; /* end_less loop */} void interrupt Null_Int5(){ while (1) ; /* end_less loop */}
void interrupt Null_Int6(){ while (1) ; /* end_less loop */}
void interrupt Null_Int7(){ while (1) ; /* end_less loop */}
/******************/
```

```
4/5/93 12:30 PM      YARON'S DISKET:untitled folder:PRTCL1.C.§        Page 1

/*********************************************************************
ver. Notes:
1. include "sonic5.h"/"globall" (updated);
2. cancel MULTICAST dst. addr. - because while transmiting the standard
   ethernet card of the same MACINTOSH is receiving.
/*********************************************************************
|                            prtcl.c                                  |
|---------------------------------------------------------------------|
| Company: RAN                          Project : NuBus Card          |
|                                                                     |
| Subproject:                                                         |
|                                                                     |
|                                                                     |
| Programmer Name: Yaron                Last Update By:               |
|                                       Update :                      |
|                                                                     |
|---------------------------------------------------------------------|
| IMPORTS                                                             |
| INTERNAL TYPEDEF & CONSTANT                                         |
| INTERNAL FUNCTION PROTOTYPE                                         |
| LOCAL DATA                                                          |
| GLOBAL DATA                                                         |
|---------------------------------------------------------------------|
| Function List:                                                      |
| --------------                                                      |
|                                                                     |
|---------------------------------------------------------------------|
| ABSTRACT:                                                           |
|                                                                     |
| CHANGES CONTROL:                                                    |
|   Date:                                                             |
|   CHANGES:                                                          |
|                                                                     |
**********************************************************************/

/*********************************************************************
| IMPORTS                                                             |
**********************************************************************/ include "def32b.h"
include "comp_opt.h"

include "const1.h"
#include "snc32b.h"
/*#include "util.prc"*/ include "RanNet1.h"
include "globall.h"

/*********************************************************************
| INTERNAL TYPEDEF & CONSTANT                                         |
**********************************************************************/
/*********************************************************************
| INTERNAL FUNCTION PROTOTYPE                                         |
**********************************************************************/
/*********************************************************************
| LOCAL DATA                                                          |
**********************************************************************/
/*********************************************************************
| GLOBAL DATA                                                         |
**********************************************************************/
SNAP_headerRec SNAP_header = { 0xAA, 0xAA, 0x03, 0x08, 0x00, 0x07, 0x80, 0x9b};
```

4/5/93 12:30 PM    YARON'S DISKET:untitled folder:PRTCL1.C.§    Page 2

```
/************************************************************
   InitRanNet()                                               |
  ----------------------------------------------------------- |
   Abstract: init. RanNet protocoll                           |
   Parameters: None                                           |
   Returns:   None                                            |
************************************************************/ define COMMENT
ifndef COMMENT
void InitRanNet()
{  WORD Loop;
   BYTE *Bptr;

/*-- init. SERVER --*/ for (Loop = 1,WptrRNet_seqNum = RNet_seqNum; Loop <=MAX_SeqNUM; Loop++)
                                *WptrRNet_seqNum++ = Loop;
   for (Bptr = PAD_Data ; Bptr < PAD_Data +60 ; Bptr++) *Bptr = 0;
   for (Loop = 0; Loop <=MAX_CsCODE; Loop++) RNet_csCode[Loop]= Loop;

DDP_header.lngth    = 2;
   DDP_header.chksum   = 0;
   DDP_header.DstNet   = 0;
   DDP_header.SrcNet   = RanNet_hdr.senderAddress.Net    = 0;
   DDP_header.DstNode  = 0xff; /* broadcast */
   DDP_header.SrcNode  = RanNet_hdr.senderAddress.Node   = 0xf0;
   DDP_header.DstSockt = 0xfe;
   DDP_header.SrcSockt = RanNet_hdr.senderAddress.Socket = 0xfe;
   DDP_header.type     = 0x04;

RanNet_hdr.csCode = 0;
   RanNet_hdr.sessionId = 0x11;
   RanNet_hdr.fileFork = 0x11;
   RanNet_hdr.blockNum = 0x01;
   RanNet_hdr.seqNum = 0;
   RanNet_hdr.len = 0;

/*-- init. CLIENT --*/
   Seq_No_rcvd = 0;
}
endif
undef COMMENT void InitRanNet()
{  WORD Loop;
   BYTE *Bptr;

/*-- init. SERVER --*/
   WptrRNet_seqNum = RNet_seqNum;
   for (Loop = 1; Loop <=MAX_SeqNUM; Loop++)
   {
      *WptrRNet_seqNum++ = Loop;
      seqNumTbl[Loop] = 0xff; /* assign "seqNum" as "was'nt writen" */
   }
   for (Bptr = PAD_Data ; Bptr < PAD_Data +60 ; Bptr++) *Bptr = 0;
   for (Loop = 0; Loop <=MAX_CsCODE; Loop++) RNet_csCode[Loop]= Loop;

my_CTRL_sckt_num= 0xf4;
   my_DATA_sckt_num= 0xf5;
```

4/5/93 12:30 PM        YARON'S DISKET:untitled folder:PRTCL1.C.§         Page 2

```
        DDP_header.lngth    = 2;
        DDP_header.chksum   = 0;
        DDP_header.DstNet   = 0xff37;
        DDP_header.SrcNet   =
              RanNet_hdr.senderAddress.Net     =
              RanNet_CtrlHdr.senderAddress.Net    =
                                                 0xff5e;
        DDP_header.DstNode  = 0x59;
        DDP_header.SrcNode  =
              RanNet_hdr.senderAddress.Node    =
              RanNet_CtrlHdr.senderAddress.Node   =
                                                 0x0c;
        DDP_header.DstSockt = 0xf5;
        DDP_header.SrcSockt =
              RanNet_hdr.senderAddress.Socket  =
              RanNet_CtrlHdr.senderAddress.Socket =
                    my_DATA_sckt_num;
        DDP_header.type     = 0x04;

RanNet_hdr.csCode = 0;
        RanNet_hdr.sessionId = 0x01;
        RanNet_hdr.fileFork = 0x01;
        RanNet_hdr.blockNum = 0x01;
        RanNet_hdr.seqNum = 0;
        RanNet_hdr.len = 0;

RanNet_CtrlHdr.csCode = 0;
        RanNet_CtrlHdr.sessionId = 0x01;
        RanNet_CtrlHdr.seqNum = 0;
        RanNet_CtrlHdr.len = 0;

/*-- init. CLIENT --*/
        Seq_No_rcvd = 0;

/*--- update Src\Dst no. -----*/
        DstSession_add.MsbWord   = 0x1221;
        DstSession_add.MidWord   = 0x3443;
        DstSession_add.LsbWord   = 0x5665;/* dest */

SncMacAdd.MsbWord = 0x7887;
        SncMacAdd.MidWord = 0x9aa9;
        SncMacAdd.LsbWord = 0xbccb;
}
/*****************************************************************/
```

```
4/5/93 12:30 PM      YARON'S DISKET:untitled folder:SMLT.C.§        Page 1

/****************************************************************************
|                           simulate.c                                       |
|--------------------------------------------------------------------------- |
| Company: RAN                          Project : NuBus_Card                 |
|                                                                            |
| Subproject:                                                                |
|                                                                            |
| Programmer Name: Yaron                Last Update By:                      |
|                                       Update :                             |
|                                                                            |
|--------------------------------------------------------------------------- |
| IMPORTS                                                                    |
| INTERNAL TYPEDEF & CONSTANT                                                |
| INTERNAL FUNCTION PROTOTYPE                                                |
| LOCAL DATA                                                                 |
| GLOBAL DATA                                                                |
|--------------------------------------------------------------------------- |
| Function List:                                                             |
| --------------                                                             |
|--------------------------------------------------------------------------- |
| ABSTRACT:                                                                  |
|    this module used for software/hardware simulation.                      |
|                                                                            |
| CHANGES CONTROL:                                                           |
|   Date:                                                                    |
|   CHANGES:                                                                 |
|                                                                            |
****************************************************************************/

/****************************************************************************
| IMPORTS                                                                    |
****************************************************************************/
#include "def32b.h"
include "comp_opt.h"

include "const1.h"
#include "snc32b.h"
#include "ranNet1.h"

#include "global1.h"
#ifdef SMLT_MAC
    #include "smlt.h"
endif

/****************************************************************************
| INTERNAL TYPEDEF & CONSTANT                                                |
****************************************************************************/
/****************************************************************************
| INTERNAL FUNCTION PROTOTYPE                                                |
****************************************************************************/

/****************************************************************************
| LOCAL DATA                                                                 |
****************************************************************************/
RNet_DrvHdrRec  *ptrRH;

/****************************************************************************
| GLOBAL DATA                                                                |
****************************************************************************/
/****************************************************************************
| DmaTest()                                                                  |
|--------------------------------------------------------------------------- |
| Abstract:                                                                  |
```

```
4/5/93 12:30 PM        YARON'S DISKET:untitled folder:SMLT.C.§        Page 2

| Parameters:                                                                    |
|     None                                                                       |
| Returns:                                                                       |
|     None                                                                       |
**********************************************************************/
void dma_test()
{ LONG *Lptr1,*Lptr2,order,start_order;
define BYTE_PCKT_SIZE      512 order= 0;
  for (Lptr1 = (LONG*)0x00000000; Lptr1 < (LONG*)(0x20000/0x200) ; Lptr1++)
  {
     flags.stop_dma = 0;            /* DMA is enable */
     flags.transfer = 0 ;           /* DMA not on opperation */
     /*- init. DMA ptr.s -*/
     ptrDmaBuf_MAX = DmaBuf + MAX_DmaBuf-1;
     ptrDmaBuf_Wrt = DmaBuf; /* DmaBuf not empty */
     ptrDmaBuf_Rd  = ptrDmaBuf_MAX;

DmaBuf->size = BYTE_PCKT_SIZE;              /* num. of bytes to be transferred*/
     DmaBuf->src_Lptr = (LONG*)RTba.SncTba; /* src.   start addr. */
     start_order = order;
     for (Lptr2 = DmaBuf->src_Lptr ;
          Lptr2 < (DmaBuf->src_Lptr + BYTE_PCKT_SIZE / 4 ); Lptr2++)
     {
        *Lptr2 = order++;
     }
#ifdef NUBUS_OFF
     DmaBuf->dst_Lptr = (LONG*)RTba.SncTba; /* dst.   start addr. */
#else
     DmaBuf->dst_Lptr = (LONG*)0x00100000 ;/* dest.  start addr.*/
#endif
     DmaTransfer();
     (LONG)DmaBuf->dst_Lptr |= 0x00800000;
     for (Lptr2 = DmaBuf->dst_Lptr;
          Lptr2 < (DmaBuf->dst_Lptr + BYTE_PCKT_SIZE / 4 ); Lptr2++)
     {
        if (*Lptr2 != start_order++)
            while (1) ; /* DMA FAIL */
     }
  }
} ;

/*********** MAC chunk trs simulation *******************************/
/*********************************************************************
| MACsmlt_start_snd_chunk
|---------------------------------------------------------------------|
| Abstract:                                                           |
|         simulate MACINTOSH transmit chunk.                          |
| Parameters: None                                                    |
| Returns:    None                                                    |
**********************************************************************/
void MACsmlt_start_snd_chunk()
{ WORD  *Wptr1;

blk_num++;

#ifdef NUBUS_OFF
   ptrRH = (RNet_DrvHdrRec*)&RTba.SncTba;
#else
   ptrRH = (RNet_DrvHdrRec*)0x100000;
                 /*-- set memory page ---*/
```

```
4/5/93 12:30 PM        YARON'S DISKET:untitled folder:SMLT.C.S              Page :
    #ifdef VERC_0
                        page_main = (LONG)ptrRH >> 7;
    #else
                        page_main = (LONG)ptrRH ;
    #endif
    ioRegPage = page_main;
    (LONG)ptrRH |= 0x00800000; /* for NuBus:(a23=1)*/
    /*--------------------*/
endif pckt_size = 128; /* RanNet data size in bytes  */
    tBlk_ptr = (WORD*)((LONG*)ptrRH + sizeof_RNet_DrvHdr);
    tBlk_size = 0x0001f400; /* size of chunk = 125k(125*1024)*/
    for (Wptr1 = tBlk_ptr;  Wptr1 < tBlk_ptr + (tBlk_size >>1);  Wptr1++ )
            { *Wptr1 = blk_num; };

ptrRH->blkSize = 0x0001f400;   /* size of chunk = 125k(125*1024)*/
    ptrRH->drv_cmd_trsRcv  = 1; /* start trs. */
    ptrRNet_DrvHdrTrs = ptrRH;
};
/*************************************************************************
| MACsmlt_snd_file                                                        |
|-------------------------------------------------------------------------|
| Abstract:                                                               |
|        simulate MACINTOSH transmit file.                                |
| Parameters: None                                                        |
| Returns:    None                                                        |
*************************************************************************/
void MACsmlt_stop_snd_chunk()
{

/*  while (ptrRNet_DrvHdrTrs->drv_cmd_trsRcv  == 1) ; /* wait until EOB */ if ( tBlk_size != 0)
    { /* not EOF */
     trsd_size += tBlk_size;
     if (file_size > trsd_size) MACsmlt_start_snd_chunk();
     else {
            ptrRH->blkSize = 0;
            ptrRH->drv_cmd_trsRcv  = 2; /* start EOF */
            ptrRNet_DrvHdrTrs = ptrRH;
        }
    }
};
/*************************************************************************/
```

4/5/93 12:31 PM     YARON'S DISKET:untitled folder:SNC32B1.C.§          Page 1

```
/*******************************************************************
 UPDATEs:
 1. sonic.c : dma BLOCK mode -> FILL/EMPTY mode
 2. Load Cam changed to end of "InitSnc2Work".
/*3. flag Rcv_ok added in SonicInt.* as SONIC41.c with:
 ---------------------
 4. DMAbuf is in OFF-CARD memory ( in the MAC memory ).

as SONIC42.c with:
 ---------------------
 5. ISR clearence at Interrupt procedure beggining.

as SONIC43.c with (created: 5/11/92):
 ---------------------
 6. Blk mngmnt in MAC mem.
 7. DMA operation on all pckts rcvd.
 8. determantion on the block position and DMA opr. acording to that .

as SONIC5.c with: (created: 26/11/92):
 ---------------------
 1. check all Rda that were used.
 2. addition of dma_counters for stat.
 3. before each Rda check - clear ISR_pcktRcv bit.
 as SONIC51.c with:
 ---------------------
    1. on DMA overRun - start dma right after end of over run
 as SONIC52.c with: ( created 7/12/92) :
 ---------------------
    1. SONIC_imr TX not en.
 as SONIC53.c with: ( created 12/01/93) :
 ---------------------
    1.
 as SONIC54.c with: ( sonic 32 bit & 68ec020 ) (created 18/1/93):
 ---------------------
 as snc32b.c with:

1. nubus cpu acsesses with paging (main_page,a23=1).
    sonic acsesses acording paging(a31=1).
 2. bug correction- retransmit check in EOB (not valid yet).

/*******************************************************************
|                           sonic.c                                |
|------------------------------------------------------------------|
| Company: RAN                    Project : NuBus_Card             |
|                                                                  |
| Subproject:                                                      |
|                                                                  |
| Programmer Name: Yaron          Last Update By:                  |
|                                 Update :                         |
|                                                                  |
|------------------------------------------------------------------|
| IMPORTS                                                          |
| INTERNAL TYPEDEF & CONSTANT                                      |
| INTERNAL FUNCTION PROTOTYPE                                      |
| LOCAL DATA                                                       |
| GLOBAL DATA                                                      |
|------------------------------------------------------------------|
| Function List:                                                   |
| --------------                                                   |
|------------------------------------------------------------------|
| ABSTRACT:                                                        |
|                                                                  |
```

```
4/5/93 12:31 PM        YARON'S DISKET:untitled folder:SNC32B1.C.8              Page 2

CHANGES CONTROL:
    Date:
    CHANGES:

*********************************************************************/

/*********************************************************************
  IMPORTS
*********************************************************************/
#include "def32b.h"
include "comp_opt.h"

include "const1.h"
#include "snc32b.h"
#include "ranNet1.h"

#include "global1.h"
#ifdef SMLT_MAC
    #include "smlt.h"
endif

/*********************************************************************
  INTERNAL TYPEDEF & CONSTANT
*********************************************************************/
/*********************************************************************
  INTERNAL FUNCTION PROTOTYPE
*********************************************************************/
void InitSnc2Work(WORD SncRecFrmt,WORD SncCamRej,WORD  EnInt);
void InitSonicVar();
void LoadSonicCam();
void Update_Cam_DstAddr();
void ConvAddToSonicCamFormat( WORD *Wptr );
void interrupt SonicInt();
void InitDma();
DmaTransfer(LONG srcPtr, LONG dstPtr, WORD byteCount );
void /*interrupt*/ DmaTransferDone();

/*********************************************************************
  LOCAL DATA
*********************************************************************/
   LONG Cnt;
   LONG *ptrSrc,
        *ptrDst;

/*********************************************************************
  GLOBAL DATA
*********************************************************************/
/*********************************************************************
  InitSnc2Work()
---------------------------------------------------------------------
  Abstract:
      define DCR register (data configuration reg ).
      define DCR2 register ( reject/accept on cam match )
      define IMR register ( interrupt mask reg ).
      define RCR register .
      load CAM addresses ( ALL CAM ADDRESSES HAS TO BE DEFINED )
      define RRA:the number of RBA for each sonic is set by MaxRecBuff
      define low boundery of RBA,below it next RBA is used
      define RDA:link them in circle,mark all RDA as available to sonic
      define TDA:mark fragment.
      clear TALLY counters.
```

4/5/93 12:31 PM    YARON'S DISKET:untitled folder:SNC328I.C.S    Page 2

```
| Parameters:
|
|     1>VldSncCamCells:
|        this par defines which of the CAM add cells (0-15) of SONIC
|        are active . VldSncCamCells.lsb refers to CAM0 ,
|        and MSB referes to CAM15 ( 1 = active , 0 = disabled ) .
|
|     2>SncRecFrmt:
|        this par define what type of frames will be accepted:
|        RCR_ERR: Accept Packet With CRC & COL Errors
|        RCR_RNT: Accept Runt Packet
|        RCR_BRD: Accept Broadcast Packet
|        RCR_PRO: Promiscuious Mode (en all phisical add/norm)
|        RCR_AMC: Accept All Multicast Packet
|        eny combination is alowd.
|        @ NOTE : selecting RCR_AMC will couse Broadcast Packet
|                 to be accepted regardless of RCR_BRD .
|
|     3>SncCamRej:
|        this parameter defines if packet will be acepted or rejected
|        on cam match .
|        DCR2_RJCM: reject on cam match .
|        0        : accept on cam match .
|        @ NOTE : any type of frame reception which is defined in
|                 parameter SncRecFrmt ( RCR_BRD , RCR_PRO , RCR_AMC )
|                 overites CAM desision .
|
|                 for instence , if RCR_PRO is selected , then all
|                 frames with normal add will be accepted regardless
|                 of CAM match/mismatch . only multicast/broadcast
|                 add which match to one of the CAM add bey be rejected
|
|        examples:
|
|        DCR2_RJCM , 0        : receive enithing ! .
|          can reject normal , multicast , broadcast add that match
|          to sonic CAM add.
|
|        DCR2_RJCM , RCR_BRD : receive mulicast,broadcast,normal add.
|          can reject normal add , multicast add that match to sonic
|          CAM add .
|          cant reject broadcast add .
|
|     4>EnInt    : 0 - dis. SONIC intterupt , including timer
| Returns:
|     None
|*********************************************************************/
void InitSnc2Work(WORD SncRecFrmt,WORD SncCamRej,WORD  EnInt)
{
WORD Loop ;
LONG HelpVar ;

*(LONG *)0x74 = (LONG)SonicInt;   /*set int vector for IRQ5 */

SONIC_cr  = CMD_RXDIS ;             /* stop receiving */
SONIC_imr = 0x0;                    /* disable all sonic int*/
SONIC_cr  = CMD_RST;                /* sonic software reset */
SONIC_isr = 0xffff ; /* clear all int bits */

/*****************************************************************
  |       RESET SONIC , DEFINE SONIC DCR , DCR2 REGISTERS           |
```

4/5/93 12:31 PM     YARON'S DISKET:untitled folder:SNC32EL.C.§        Page 4

```
/* !!!! SONIC_dcr reg must be accesed during reset !!!! */
#ifdef Clk16M        /* if CPU run on 16.67mhz */
  SONIC_dcr = DCR_EXBUS |    /* extanded bus mode */
             DCR_DW32   |    /* 32 bit data mode           */
             DCR_RFT8   |    /* rec DMA TRASHHOLD will be 8 word    */
             DCR_TFT8   ,    /* transmit DMA TRASHHOLD will 8 word  */
             DCR_WC2    ;    /* 2 wait state in dma acsess          */
     /* LBR=0 LATCH BusRet OFF, PO0/1= 0, SBUS = 0 ASINC,
        USR0/1=0, BMS=0 EMPTY/FILL, */
#else                /* cpu run on 20.00mhz */
  SONIC_dcr = DCR_EXBUS | DCR_DW32 | DCR_RFT8 | DCR_TFT8
             DCR_WC3   |    /* 3 wait state in dma acsess         *
#endif
     /* !!!! SONIC_dcr2 reg must be accesed during reset !!!! *
  SONIC_dcr2 = 0 + (0xC001 & SncCamRej) ;/*addr. types to be rejected/accepted
                                         on cam match*/
  SONIC_cr  = 0 ;     /* exit sonic from reset */
#ifdef SONIC_TIMER
/*  SONIC_cr = CMD_ST ;     /* enable sonic timer to run */
  /*SncWt1Wt0 = SncTimer ;  /* load SONIC timer */
endif SONIC_rcr = SncRecFrmt ; /* define which type of frames will be accepted */

InitSonicVar() ; /* initialize all SONIC relevent var */
  if ( EnInt )    /* if interrupt is enabled */
  {
#ifdef TEST
     SONIC_imr = IMR_PRXEN  | /* int on each packet reception *
              /* IMR_PTXEN  | /* for some reason transmission has ended */
                 IMR_BREN   | /* enable int when pin BRT is broth low (exit ileagl
                 IMR_RDEEN ;  /* enable int when last RDA is reched (EOL =1 ) */
#else
/*.. changes has to be done on Int. routine.. */
     SONIC_imr = IMR_PRXEN  | /* int on each packet reception *
                 IMR_PTXEN  | /* for some reason transmission has ended */
                 IMR_BREN   | /* enable int when pin BRT is broth low (exit ileagl
                 IMR_rFifo    /* enable int when last RDA is reched (EOL =1 ) */
                 IMR_         /* enable int when last RDA is reched (EOL =1 ) */
                 IMR_RDEEN ;  /* enable int when last RDA is reched (EOL =1 ) */
#endif
  }

/*-----------------------------------------------------------------*
|         DEFINE DIFERENT PARAMETERS CONCERNING RRA                |
*-----------------------------------------------------------------*/
/* point reg Urra:Rsa to begining of receive recorce descriptors       */
/* ( reg URRA function also as 16 msb of CAM descriptor address pointer) */

SONIC_urra = (WORD)(((LONG)&Snc_Desc->SncRra.RXrsrc_buff_ptr0 ; >> 16) ;
  SONIC_rsa  = (WORD)(&Snc_Desc->SncRra.RXrsrc_buff_ptr0 );

SONIC_rea = (WORD)&Snc_Desc->SncRra.RXrsrc_buff_ptr0 + sizeof(RecResource) ;/* po
                     to end of Rra table ( must be in same 64k modulu)*/
  SONIC_rrp = SONIC_rsa;/* init. "next avail. Rra" - to first Rra */
  SONIC_rwp = (WORD)&Snc_Desc->SncRra.RXrsrc_buff_ptr0 + sizeof(RecResource) +2;/*s
                     Rea to prevent int. caused by all rra exosted.
                     the circular option of the Rra is used !!! */
/*-----------------*/
/* update the rra fields of SONIC to point to the diferent rec buffers & fill si
  HelpVar = (LONG)&RTba.SncRba[0] ; /* get 32 bit SncRba pointer */
```

4/5/93 12:31 PM     YARON'S DISKET:untitled folder:SNC32E1.C.§     Page 5

```c
/* set the 16 lsb pointer & then the 16 msb pointer */
Snc_Desc->SncRra.RXrsrc_buff_ptr0 = (WORD)( HelpVar );
Snc_Desc->SncRra.RXrsrc_buff_ptr1 = (WORD)((HelpVar & 0xffff0000) >> 16);
HelpVar = ( REC_BUFF_SIZE >> 1 ) - 1 ;  /* buff size in word */
Snc_Desc->SncRra.RXrsrc_buff_wc0 = (WORD)( HelpVar );
Snc_Desc->SncRra.RXrsrc_buff_wc1 = (WORD)((HelpVar & 0xffff0000) >> 16);

/*-- load RRA --*/

SONIC_cr = CMD_RRRA ; /* initialize the rra */
while( SONIC_cr & CMD_RRRA ) ; /* wait for compleation of rra load */

/*-------------------------------------------------------------*
|       DEFINE LOW BOUNDERY OF RBA                             |
*-------------------------------------------------------------*/

/* define the max expected packet in reg EOBC.if space left in rba
     is less then EOBC then the next Rba is taken */
SONIC_eobc = (WORD)(MAX_PACKET_LEN ) ;/* length in WORD */

/*-------------------------------------------------------------*
|       DEFINE DIFERENT PARAMETERS CONCERNING RDA              |
*-------------------------------------------------------------*/

/*-- point reg URDA:CRDA to begining of Rda ( receive descriptors ) --*/
SONIC_urda = (WORD)(((LONG)&Snc_Desc->SncRda) >> 16);
SONIC_crda = (WORD)(&Snc_Desc->SncRda[0]);
/*-------------------------------------------------------------*/
for (Loop = 0 ; Loop < MaxRdaDesc ; Loop++)
{
   Snc_Desc->SncRda[Loop].status      = 0x0000 ;
   Snc_Desc->SncRda[Loop].byte_count  = 0x0000 ;
   Snc_Desc->SncRda[Loop].pkt_ptr0    = 0x0000 ;
   Snc_Desc->SncRda[Loop].pkt_ptr1    = 0x0000 ;
   Snc_Desc->SncRda[Loop].seq_no      = 0x0000 ;
   Snc_Desc->SncRda[Loop].pkt_link =
         (WORD)&Snc_Desc->SncRda[Loop+1].status ;/* Rda buff. in circle */
   Snc_Desc->SncRda[Loop].in_use = 0xffff ;/* avail. to SONIC (after
                                         reception "in_use" become 0 ) */
}
Snc_Desc->SncRda[MaxRdaDesc - 1].pkt_link =
     (WORD)&Snc_Desc->SncRda[0].status; /* cyclic loop not marked as last */

/*-- point Reg Utda:Ctda to begining of transmit descriptor (TDA) --*/

SONIC_utda = (WORD)(((LONG)&Snc_Desc->SncTda) >> 16);
SONIC_ctda = (WORD)(&Snc_Desc->SncTda);

/*--- LOAD CAM  ---*/

LoadSonicCam();
Update_Cam_DstAddr();

/*-- claer TALLY COUNTERS (CRC,FAE,MISSED PACKET ) --*/
SONIC_crct = 0xffff;   /* clear to zero crc error tally counter */
SONIC_faet = 0xffff;   /* clear frame-alignment error tally counter */
SONIC_mpt  = 0xffff;   /* clear missed packet error counter */
/*-------------------------------------------------------------*/

InitDma(); /* temporary for DMA dbg. */
}
/***************************************************************
```

```
4/5/93 12:31 PM     YARON'S DISKET:untitled folder:SNC32E1.C.S         Page 6
| void InitSonicVar()                                                              |
|----------------------------------------------------------------------------------|
| Abstract: initiate all the relevent var concerning SONIC                         |
| Parameters: None                                                                 |
| Returns    : None                                                                |
*********************************************************************************/
void InitSonicVar()
{
  ptrRdaUsed = &(Snc_Desc->SncRda[0]); /* ptr to Rda which is last used by sonic(i
  LptrNextTda = (LONG*)&Snc_Desc->SncTda;
}
/*********************************************************************************
| LoadSonicCamAdd()                                                                |
|----------------------------------------------------------------------------------|
| Abstract: loads CAM add.                                                         |
|                                                                                  |
|    Snc_Desc->SncCam.Cam[ x ].Add0                                                |
|    Snc_Desc->SncCam.Cam[ x ].Add1                                                |
|    Snc_Desc->SncCam.Cam[ x ].Add2                                                |
|                                                                                  |
| Parameters: None                                                                 |
| Returns    : None                                                                |
*********************************************************************************/
void LoadSonicCam()
{
  WORD Loop ;

for ( Loop = 0 ; Loop < 16; Loop++)
    {
      Snc_Desc->SncCam.Cam[ Loop ].Entry = Loop ;
    }

/* load LAN mac add in CAM
  ---------------------------------------*/
  Snc_Desc->SncCam.Cam[ 0 ].Add0 = SncMacAdd.MsbWord ;
  Snc_Desc->SncCam.Cam[ 0 ].Add1 = SncMacAdd.MidWord ;
  Snc_Desc->SncCam.Cam[ 0 ].Add2 = SncMacAdd.LsbWord ;
  ConvAddToSonicCamFormat( (WORD *)&Snc_Desc->SncCam.Cam[ 0 ].Add0 ) ;
  /* load multicast AplTlk- 0x090007ffffff in CAM
  ---------------------------------------*/
  Snc_Desc->SncCam.Cam[ 1 ].Add0 =0x0900;
  Snc_Desc->SncCam.Cam[ 1 ].Add1 =0x07ff;
  Snc_Desc->SncCam.Cam[ 1 ].Add2 =0xffff;
  ConvAddToSonicCamFormat( (WORD *)&Snc_Desc->SncCam.Cam[ 1 ].Add0 ) ;

Snc_Desc->SncCam.ValidCam = 3; /* only 2 of the 16 internal CAM are valid */

SONIC_cdp = ( WORD )(&Snc_Desc->SncCam );/*add. of cam desc. (16msb)*/
  SONIC_cdc = 2; /* define the number of cells */
  /*---------------*/
  SONIC_cr = CMD_LCAM ; /* force sonic to read the CAM add */
  while ( ( SONIC_cr & CMD_LCAM ));/* wait for 'load cam' to finish */
  SONIC_isr = ISR_LCDEN ; /* clear 'load cam' int bit */
  /*---------------*/
}
/*********************************************************************************
| Update_Cam_DstAddr()                                                             |
|----------------------------------------------------------------------------------|
| Abstract: this function is called whenever the MAC addr. of the                  |
|           destination is changed.  The Dst. addr. in Cam[2]                      |
| Parameters: None                                                                 |
| Returns    : None                                                                |
*********************************************************************************/
```

4/5/93 12:31 PM    YARON'S DISKET:untitled folder:SNC32B1.C.8              Page 7

```c
void Update_Cam_DstAddr()
{
    /* load destination LAN mac add in CAM
    ----------------------------------*/
    Snc_Desc->SncCam.Cam[ 2 ].Add0 = DstSession_add.MsbWord ;
    Snc_Desc->SncCam.Cam[ 2 ].Add1 = DstSession_add.MidWord ;
    Snc_Desc->SncCam.Cam[ 2 ].Add2 = DstSession_add.LsbWord ;
    ConvAddToSonicCamFormat( (WORD *)&Snc_Desc->SncCam.Cam[ 2 ].Add0 ) ;
    /*------------------------------*/
    Snc_Desc->SncCam.ValidCam = 7 ; /* only 3 of the 16 internal CAM is valid */

SONIC_cdp = ( WORD )(&Snc_Desc->SncCam );/*add. of cam desc. (16msb);
            NOTE: it must to point to entry_0 in order to init. SONIC_ce
                  in LCAM command */
    SONIC_cdc = 3;/* define the number of cells */

/*---------------*/
    SONIC_cr = CMD_LCAM ; /* force sonic to read the CAM add */
    while ( ( SONIC_cr & CMD_LCAM ));/* wait for 'load cam' to finish */
    SONIC_isr = ISR_LCDEN ; /* clear 'load cam' int bit */
    /*---------------*/
}
/****************************************************************************
| ConvAddToSonicCamFormat                                                    |
|---------------------------------------------------------------------------|
| Abstract: convert MAC add to SONIC CAM format                              |
|                                                                            |
| @ NOTE : the format of the add to be placed in the sonic CAM is            |
|          as folowing :                                                     |
|     example:                                                               |
|        an add '123456789abc (hex)' on the SNIFER will be written to the    |
|        CAM structure in the folowing maner :                               |
|                                                                            |
|        SncCam.Cam[x].Add0 = 0x3412 ;(lsb- always sended first               |
|        SncCam.Cam[x].Add1 = 0x7856 ;                                        |
|        SncCam.Cam[x].Add2 = 0xbc9a ;                                       |
|                                                                            |
|        multicast add on the SNIFER is written as :                         |
|   XXXX XXX1 XXXX XXXX   XXXX XXXX XXXX XXXX   XXXX XXXX XXXX XXXX (bin)   |
|                                                                            |
|        so to the CAM it will be written as :                               |
|                                                                            |
|        SncCam.Cam[x].Add0 = XXX1XXXX XXXXXXXX (bin )                        |
|        SncCam.Cam[x].Add1 = XXXXXXXX XXXXXXXX                              |
|        SncCam.Cam[x].Add2 = XXXXXXXX XXXXXXXX                              |
|                                                                            |
| Parameters:                                                                |
|        <1> word pointer to add to be converted                             |
|                                                                            |
| Returns: None                                                              |
****************************************************************************/
void ConvAddToSonicCamFormat( WORD *Wptr )
{
        *Wptr = ( ( *Wptr & 0x00ff ) << 8 ) | ( ( *Wptr & 0xff00 ) >> 8 ) ;
Wptr++ ;*Wptr = ( ( *Wptr & 0x00ff ) << 8 ) | ( ( *Wptr & 0xff00 ) >> 8 ) ;
Wptr++ ;*Wptr = ( ( *Wptr & 0x00ff ) << 8 ) | ( ( *Wptr & 0xff00 ) >> 8 ) ;
}
/****************************************************************************
| SonicInt()                                                                 |
|---------------------------------------------------------------------------|
| Abstract: SONIC INT HANDELING RUTINE                                       |
| Parameters: None                                                           |
| Returns   : None                                                           |
```

4/5/93 12:31 PM     YARON'S DISKET:untitled folder:SNC32B1.C.8        Page 2

```
*****************************************************************
spciel NOTEs:
1. paging on interrupt handler is not allowed.

*****************************************************************/
void interrupt SonicInt()
{ WORD    tmpSONIC_isr;
  LONG    seqNum;

register BYTE   *regCrntRda;       /* tmp. pointer to current RDA data buffer*/
  RanNet_hdrRec   *ptrCrntRNetHdr;   /* tmp. pointer to current data - RNet hdr*/
  WORD            *Wptr;             /* tmp. pointer to current RDA desc. */
  LONG            Loop;
  WORD            Wtmp;
  /*----------------*/
#ifdef DEBUG
  WORD            do_Rda_cnt;
    ioBits_GP.dbg0 = 1 ;  /* toggle debug pin */
    WrtPort_GP = io_GP;
endif do
    {
     tmpSONIC_isr= SONIC_isr;    /* store SONIC_isr */
     SONIC_isr = 0xffff;         /* clear SONIC_isr */ ifdef DEBUG
     if (dbg_indx < MAX_DBG_INDX-1) dbg[dbg_indx++ ]= tmpSONIC_isr;
#endif
      /*---------------------------------------------------------*|
      |              SONIC Rcv FIFO over run                      |
      *----------------------------------------------------------*/
      if ( tmpSONIC_isr & 0x0001 )
      { /* rcv fifo overRun */
        err_cnt.rcv_fifo_o_r++;   /* inc. stat. counter */
#ifdef DEBUG
     ioBits_GP.dbg1 = 1 ;  /* toggle debug pin */
     WrtPort_GP = io_GP;
     ioBits_GP.dbg1 = 0 ;  /* toggle debug pin */
     WrtPort_GP = io_GP;
endif
      }
      /*---------------------------------------------------------*|
      |              SONIC PACKET RECEIVED                        |
      *----------------------------------------------------------*/
      if ( tmpSONIC_isr & ISR_PKTRX )
      {
        do_Rda_cnt = 0;
        do
        {       /* do.. while Rda is used */
#ifdef DEBUG
   do_Rda_cnt++;  /* counter for eliminating num. of loops in do..while */
#endif
         if (!(ptrRdaUsed->status & 0x0001 )) /* check rcvd pckt status */
         { /* rcved ERROR pckt */
           err_cnt.pckt_rcv-+;
         } /* end: rcved ERROR pckt */
         else
         { /* rcved  GOOD pckt */
#ifdef cpu68302
           regCrntRda =
               (BYTE*)(Swap32Bit ( *(LONG*)&(ptrRdaUsed->pkt_ptr0:));/* read pckt pt
```

4/5/93 12:31 PM    YARON'S DISKET:untitled folder:SNC32E1.C.§    Page 9

```c
else
        regCrntRda = (BYTE*)(((WORD)ptrRdaUsed->pkt_ptr1 << 16 |
                              (WORD)ptrRdaUsed->pkt_ptr0);/* read pckt ptr */
endif
        ptrCrntRNetHdr = (RanNet_hdrRec*)((BYTE*) regCrntRda +
            12 + 2 +
            sizeof_SNAP_header +
            sizeof_DDP_header);/* read ptr to RanNet header in current pckt */
        if((*(LONG*)(regCrntRda + h_wPtr_SAP_NUMmst) == 0x03080007 ) &&
           (*(WORD*)(regCrntRda + h_wPtr_SAP_NUMlst) == 0x809B1       )
           if (*(BYTE*)(regCrntRda + h_wPtr_DDP_DST_SKT) == my_DATA_sckt_num)
           { /* then: applTlk type SNAP num & RanNet DATA pckt */
            /* check which are the seq. no. & block no. of this pckt ;
               enter DMA_FIFO for use to IDMA\simple copy to move pckt from
               RBA to Mac Memory range .
            ~~~~~~~~~~~~~~~~~~~~~~~~~~~~~~~~~~~~~~~~~~~~~~~~~~~~~~~~~~~~~~*/
ifdef cpu68302
            if ( LST_BYTE(ptrCrntRNetHdr->csCode) == EOB) /* if End Of Block */
else
            if ( ptrCrntRNetHdr->csCode == EOB) /* if End Of Block */
endif
            { /* EOB rcvd : try to get new block */
                flags.EOBrcvd = 1;
            } ifdef TEST
            else
            { /* not EOB , clear flag if set */
                flags.EOBtrnsfrd = 0;
            }
        #endif ifdef cpu68302
            LSB_LSW(seqNum) = LSB_LSW(ptrCrntRNetHdr->seqNum);
            MSB_LSW(seqNum) = MSB_LSW(ptrCrntRNetHdr->seqNum);
            LSB_MSW(seqNum) = LSB_MSW(ptrCrntRNetHdr->seqNum);
            MSB_MSW(seqNum) = MSB_MSW(ptrCrntRNetHdr->seqNum);
else
            seqNum = ptrCrntRNetHdr->seqNum;
endif
            if (seqNumTbl[seqNum] == 0xff)
            { /* seqNum was'nt writen */
ifdef cpu68302
            LST_BYTE(Wtmp) = LST_BYTE(ptrCrntRNetHdr->len);
            MST_BYTE(Wtmp) = MST_BYTE(ptrCrntRNetHdr->len);
            if (rBlk_size < (rcvd_size + Wtmp) )
else
            if (rBlk_size < (rcvd_size + ptrCrntRNetHdr->len) )
endif
            { /* discard the rcvd pckt */
                err_cnt.MACbuf_OvrFlw ++; /* for DEBUG only */
ifdef DEBUG
                err_cnt.bug_warning |= 0x8000;
                while (1) {} ; /* DEBUG HALT !!! */
endif
            }
            else
            { /* MAC buf has enough free space for data -
                 - insert pckt's ptrs to DMA_buf */
                if (ptrDmaBuf_Wrt >= ptrDmaBuf_MAX) ptrDmaBuf_Wrt = DmaBuf;
                else ptrDmaBuf_Wrt ++;
                if ( ptrDmaBuf_Wrt == ptrDmaBuf_Rd )
                { /* over flow on DmaBuf - discard the rcvd pckt */
```

```
4/5/93 12:31 PM    YARON'S DISKET:untitled folder:SNC32B1.C.§       Page 10 err_cnt.DmaBuf_OvrFlw ++;
                           if (ptrDmaBuf_Wrt <= DmaBuf) ptrDmaBuf_Wrt = ptrDmaBuf_MAX
                           else ptrDmaBuf_Wrt --;
                         }
                         else
                         { /* not over flow on DmaBuf */
                           ptrDmaBuf_Wrt->dst_Lptr = (LONG*)(rBlk_ptr +
                              (((seqNum-1) * pckt_size) >> 1));/* assign ptr to MACmem
                           ptrDmaBuf_Wrt->src_Lptr =
                              (LONG*)((BYTE*)ptrCrntRNetHdr- sizeof_RNet_DrvHdr);
#ifdef cpu68302
                           MST_BYTE(ptrDmaBuf_Wrt->size) = MST_BYTE(ptrCrntRNetHdr->l
                           LST_BYTE(ptrDmaBuf_Wrt->size) = LST_BYTE(ptrCrntRNetHdr->l
                           rcvd_size            += Wtmp;
#else
                           ptrDmaBuf_Wrt->size = ptrCrntRNetHdr->len;
                           rcvd_size += ptrCrntRNetHdr->len;
#endif
                           num_pckts_in_chunk ++;
                           seqNumTbl[ seqNum ] = 0x00; /* seqNum was writen */
                         } /* end: not over flow on DmaBuf */
                       }
                     } /* end: seqNum was'nt writen */
                     else
                     { /* seqNum was aleay writen */
                       err_cnt.seqNum ++;
                     }
                   } /* end: applTlk type SNAP num & RanNet DATA pckt */
                   else if (*(BYTE*)(regCrntRda + h_wPtr_DDP_DST_SKT) ==
                                                           my_CTRL_sckt_num)
                   { /* then: applTlk type & RanNet CNTRL pckt */

/*... handel the pckt or SEND to STANDARD DRIVER ...
                                                               ....*/
                     flags.EOFrcvd = 1;
                   }
                   else
                   { /* then: applTlk type & Not RanNet pckt */

/*... SEND to STANDARD DRIVER ...
                                                       ... */

}
       stat_cnt.rcv_ok ++;     /* update statistic counter */
    } /* end: GOOD pckts rcvd */

/*-- init RDA[ current ] to be valid again ( RRA is cyclic ) --*/
         /*---------...
         /* Wptr = (WORD*)&Snc_Desc->SncRda[RdaUsed];
            for (Loop = 0 ; Loop < 5 ; Loop++) *Wptr++ = 0;
         *(++Wptr) = 0xffff ;/* mark "in_use" field as avail. to SONIC
                     ....--------*/ ptrRdaUsed->in_use = 0x5555;/* mark "in_use" field as avail. to SONIC */ if (ptrRdaUsed >= &(Snc_Desc->SncRda[MaxRdaDesc -1]))
              ptrRdaUsed = &(Snc_Desc->SncRda[0]);/* last RDA */
    else ptrRdaUsed++;
    SONIC_isr = ISR_PKTRX;  /* clear bit - check directly to Rdas */
  }     /* do.. while Rda is used */
  while (ptrRdaUsed->in_use == 0x0000) ;
         /*    (do_Rda_cnt < 4 ); */
```

```
4/5/93 12:31 PM      YARON'S DISKET:untitled folder:SNC32B1.C.5       Page 11
#ifdef DEBUG
      if (do_Rda_cnt > 1)
        {
          dbg[0]++;
        }
endif
      /*-- end:  init RDA[ current ] -- */

}                       /* end received packet */
    /*-----------------------------------------------------------------*|
    |           SONIC TRANSMITION DONE                                  |
    *-----------------------------------------------------------------*/
    if ( tmpSONIC_isr & ISR_TXDN)
    {
      if ( tmpSONIC_isr & ISR_TXER )
      {          /* transmit error occered- end of transmition */
         SONIC_cr = CMD_TXP   ;/* retansmit the same frame again */
         err_cnt.trs ++;
      }
      else /* trs. ended because last frame , or by software rec shutdown */
      {
         stat_cnt.trs_ok ++;
         flags.trs_ok = 1;
      }
    }
    /*-----------------------------------------------------------------*|
    |           SONIC REACHED LAST RDA                                  |
    *-----------------------------------------------------------------*/
    if ( tmpSONIC_isr & ISR_RDE )
    {
      /* SONIC_cr = CMD_RXDIS ; /* stop reception until all previus RDA served */
    }
    /*-----------------------------------------------------------------*|
    |           SONIC ACCESED ILLEAGEL ADDRESS                          |
    *-----------------------------------------------------------------*/
    if ( tmpSONIC_isr & ISR_BREN )    /* bus retry */
    {
      err_cnt.SncBus_retry ++;
    }

} /* if SONIC IRQ pin is still Low and imr is en. then do the loop again */
  while ( SONIC_isr & SONIC_imr );

#ifdef DEBUG
    ioBits_GP.dbg0 = 0 ; /* toggle debug pin */
    WrtPort_GP = io_GP;
endif
}   /* end sonic int rutine */
/*******************************************************************************
| InitDma()                                                                     |
|------------------------------------------------------------------------------|
| Abstract:  init. Dma transfer NuBus Card to Macintosh internal memory.        |
|                                                                               |
| Parameters: None                                                              |
|                                                                               |
| Returns: None                                                                 |
*******************************************************************************/
void InitDma()
{
#ifdef DEBUG
 WORD   *ptrTmp;
   dbg[0] = dbg[1]= dbg[2] = dbg[3]=0;
   dbg_indx = 4;
```

4/5/93 12:31 PM    YARON'S DISKET:untitled folder:SNC32B1.C.§    Page 10

```
endif flags.stop_dma = 0;      /* flag start DMA operation */
    flags.transfer = 0; /*  DMA not on opperation */

/*- init. DMA ptr.s -*/.
    ptrDmaBuf_MAX = DmaBuf - MAX_DmaBuf-1;
    ptrDmaBuf_Wrt = ptrDmaBuf_MAX;
    ptrDmaBuf_Rd  = ptrDmaBuf_MAX;
/*--------------*/
#ifdef cpu68302
    /* define CPU - IDMA reg for internal DMA at FULL BUS BANDWIDTH with
                    interrupt on end of transfer or transfer with errors */
    CMR = BIT13 |   /* gen INT on normal end of transfer ( DONE set in CSR reg ) */
          BIT12 |   /* gen INT on error termination( DONE=0 and BES or BED are 1)*/
          BIT10 |   /* transfer in one burst - full bus bandwidth */
          BIT9  |   /* increment source add after each DMA      */
          BIT8  |   /* increment destenation add after each DMA*/
          BIT7  |   /* destenation is WORD                      */
          BIT5  ;   /* source is WORD                           */

FCR = 0xee ;                /* generate function code 6 on FC2-0 pins */
    CSR = 0xff ;                /* clear all IDMA ststus bits */ ifdef XRAY
    *(LONG *)0x3ac = (LONG)DmaTransferDone;   /*set int vector for IDMA */
endif IPR = BIT11 ; /* clear int from IDMA */
    IMR |= BIT11 ; /* enable int from IDMA */
/*--------------*/
#else
    /* .. load cache with DMA_loop code..*/
#endif
}
/****************************************************************
| DmaTransfer()                                                   |
|----------------------------------------------------------------|
| Abstract:  Dma transfer from NuBus Card to Macintosh internal memory. |
|                                                                 |
| Parameters:                                                     |
|  <1-2> srcPtr, dstPtr: pointers to start of memory blocks       |
|                        in source/destination                    |
|  <3> byteCount: byte counter of block .                         |
|                                                                 |
| Returns: None                                                   |
****************************************************************/
DmaTransfer()
{ LONG   Cnt_pckt,
         fragmented_page_flg;

if ( flags.stop_dma == 0 ;
  {    /* DMA is enable */
     if ( flags.transfer == 0 )
     { /* DMA not on opperation */
       if ( ptrDmaBuf_Wrt != ptrDmaBuf_Rd )
       { /* DmaBuf not empty */
         flags.transfer = 1; /*  DMA on opperation */
         if (ptrDmaBuf_Rd >= ptrDmaBuf_MAX) ptrDmaBuf_Rd = DmaBuf;
         else ptrDmaBuf_Rd ++;
         Cnt     = ptrDmaBuf_Rd->size;/* num. of bytes to be transferred*/
         if (Cnt != 0)
```

4/5/93 12:31 PM    YARON'S DISKET:untitled folder:SNC32B1.C.§    Page 13

```c
    { /* start transfer MemCopy */
ifdef DEBUG
   ioBits_GP.dbg2 = 1 ; /* toggle debug pin */
   WrtPort_GP = io_GP;
endif
        if (Cnt%4 == 0) Cnt >>= 2;
        else Cnt = (Cnt >> 2) + 1;/* num. of Long to be transferred*/
        ptrSrc = ptrDmaBuf_Rd->src_Lptr ; /* src.    start addr. */
        ptrDst = ptrDmaBuf_Rd->dst_Lptr;

if ((LONG)ptrDst < pages_border) {
           ioRegPage = page_1st; /* set page register */
           if ((LONG)(ptrDst +Cnt-1) > pages_border) fragmented_page_flg = 1;
           else fragmented_page_flg = 0;
        }
        else { /* only 2nd page */
           ioRegPage = page_2nd; /* set page register */
           fragmented_page_flg = 0;
        } if ( fragmented_page_flg == 0)
        { /* whole DMA transfer to the same 8M page
          ~~~~~~~~~~~~~~~~~~~~~~~~~~~~~~~~~~~~~~~*/
           /*.. start transfer with proccesor ( cash has to be locked ) */

/*-------- assembly loop --------
        assembly loop:   while (regCnt --) { *ptrRegDst+- = *ptrRegSrc++; }
        ~~~~~~~~~~~~~~~~~~~~~~~~~~~~~~~~~~~~~~~~~~~~~~~~~~~~~~~~~~~~~~~~~~*/
        (LONG)ptrDst |= 0x00800000; /* dest.  start addr. ;for NuBus:(a23=1) */
        asm (
             "           movem.l d0/a2/a3,-(sp)",
             "           move.l  _Cnt,d0    ;/* num. of longs to be transferred ",
             "           movea.l _ptrSrc,a2    ; /* source start addr. */",
             "           movea.l _ptrDst,a3    ; /* dest   start addr. */",
             "           bra.s   Y2",
             "Y1:    move.l  (a2)+,(a3)+",
             "Y2:    dbf     d0,Y1",
             "           movem.l (sp)+,d0/a2/a3"
        );
        }
        else
        { /* two pages fragmented to the DMA transfer
          ~~~~~~~~~~~~~~~~~~~~~~~~~~~~~~~~~~~~~~~~~~*/
           Cnt_pckt = Cnt;
           Cnt = (0x00800000 - ( (LONG)ptrDst & 0x007fffff) ) >> 2;

/*-------- assembly loop --------
        assembly loop: while (regCnt --) { *ptrRegDst++ = *ptrRegSrc++ };
        ~~~~~~~~~~~~~~~~~~~~~~~~~~~~~~~~~~~~~~~~~~~~~~~~~~~~~~~~~~~~~~~~*/
        (LONG)ptrDst |= 0x00800000; /* dest.  start addr. ;for NuBus:(a23=1) */
        asm (
             "           movem.l d0/a2/a3,-(sp)",
             "           move.l  _Cnt,d0    ;/* num. of longs to be transferred ",
             "           movea.l _ptrSrc,a2    ; /* source start addr. */",
             "           movea.l _ptrDst,a3    ; /* dest   start addr. */",
             "           bra.s   Y4",
             "Y3:    move.l  (a2)+,(a3)+",
             "Y4:    dbf     d0,Y3"
        );

Cnt = Cnt_pckt - Cnt;
           ioRegPage = page_2nd; /* change to next page */
```

```
        asm {
        "    ;-- dest. addr.;for NuBus:(a23=1) --",
        "          move.l   a3,d0              ",
        "          ori.l    #$00800000,d0  ",
        "          move.l   d0,a3              ",
        ";----------------------------------------",
        "          move.l   _Cnt,d0       ;/* num. of longs to be transferred ",
        "          bra.s    Y6",
        "Y5:       move.l   (a2)+,(a3)+",
        "Y6:       dbf      d0,Y5",
        "          movem.l  (sp)+,d0/a2/a3"
        };
    }
    } /* end: of transfer */

/* end of transfer
    ~~~~~~~~~~~~~~~~~~~~~~~~~~*/
        ioRegPage = page_main;
ifdef DEBUG
 ioBits_GP.dbg2 = 0 ;  /* toggle debug pin */
 WrtPort_GP = io_GP;
endif DmaTransferDone();

} /* end: DmaBuf not empty */
   } /* end: DMA not on opperation */
  }  /* end: DMA is enable */ else
  {   /* DMA is disable */

/*- WARNING: ! THIS POLLING MAY CAUSE THE NUBUS TO BE BUSY TOO MUCH
    ~~~~~~~~~~~~~~~~~~~~~~~~~~~~~~~~~~~~~~~~~~~~~~~~~~~~~~~~~~~~~~~~~~~*/
    if ( flags.MacBlk_OvrFlw )
    { /* Mac mem block is now ready */
     if (rMACmemPtr->drv_cmd_trsRcv == 0) /* MAC memory isn't BLOCK OVER FLOW */
     {
       flags.stop_dma = 0; /* en. DMA oparation   */
       flags.MacBlk_OvrFlw = 0;
       get_new_MAC_blk();
     }
    } /* end: Mac mem block is not ready */
  }   /* end: DMA is disable */
}
/***********************************************************************
| DmaTransferDone()                                                     |
|----------------------------------------------------------------------|
| Abstract: /*interrupt**                                               |
|           end of Dma transfer from NuBus Card to Macintosh            |
| internal memory.                                                      |
|                                                                       |
| Parameters: None                                                      |
|                                                                       |
| Returns: None                                                         |
************************************************************************/
void /*interrupt*/ DmaTransferDone()
{   RNet_DrvHdrRec  *ptrCrntRNethdr ;
    WORD            tmp, Loop;
    /*----------------------*/
```

```
    flags.transfer = 0 ;    /* DMA not on opperation */
  { /* pckt transfer was finished */
   dma_done++;
   if (flags.EOBrcvd)
      if ( ptrDmaBuf_Wrt == ptrDmaBuf_Rd )
      { /* DmaBuf is empty - all pckts were transfered */

/* ...make pckt check list of
             the whole block .. *..
             if (dma_done >= num_pckts_in_chunk) */ flags.EOBtrnsfrd = 1;
          flags.EOBrcvd = 0;

/* try to get new block */
          rMACmemPtr ->blkSize       = rcvd_size ;

#ifdef DEBUG
    ioBits_GP.dbg1 = 0  ;  /* toggle debug pin */
    WrtPort_GP = io_GP;
endif rMACmemPtr ->drv_cmd_trsRcv = 1; /* mark block buf. as FULL */ rPtr_indx ++;
          rPtr_indx %= NUM_MAC_RCV_BUF;/* inc. IndxPtr to next rcv. buf in MAC */
          rMACmemPtr = ptrFNet_DrvHdrRcv[ rPtr_indx ]; /* update new ptr */
          if (rMACmemPtr->drv_cmd_trsRcv != 0)
          { /* MAC memory BLOCK OVER FLOW */
             err_cnt.MacBlk_OvrFlw ++;
             flags.stop_dma = 1;
             flags.MacBlk_OvrFlw = 1;
          }
          else
          { /* MAC memory BLOCK not overflow */
             get_new_MAC_blk();
          } /* end: try to get new block */
      } /* end: last pckt in BLOCK was transfered to MAC mem */
      else
      { /* BUG was found */
#ifdef DEBUG
          err_cnt.bug_warning |= 0x4000;
          while (1) {} ; /* DEBUG HALT !!! */
endif
      }
   } /* end: pckt transfer was finished */
}
/****************************************************************/
```

4/5/93 12:32 PM      YARON'S DISKET:untitled folder:SR32B1.0.6          Page 1

```
/*****************************************************************************
ver. Notes:
as sndbk3mt.c with:
    1. delay after transmiting each pecket.
    2. BUG correction: update SONIC_ctda before each start transmiting operation.
as sndrcv.c with:
    1.   cntrl pckt with differnt stracture.
as sndrcv1.c with:
    1.   transmit end on polling (not interrupt).
as sndrcv11.c with:
    1.   changes of delays before transmiting.
    2.   change INCLUDE files.
as SNDRCV12.c with: ( sonic 32 bit & 68ec020 ) (created 18/1/93 :
~~~~~~~~~~~~~~~~~~~~~~~~~~~~~~~~~~~~~~~~~~~~~~~~~
as sr32b.c with:
_____
1. nubus cpu acsesses with paging (main_page,a23=1).
   sonic acsesses acording paging(a31=1).
2. cancel delay 10 msec after each chunk.

as sr32b2.c with:
~~~~~~~~~~~~~~~~
    1.   transmit 100% performance.
    2.   transmit SONIC in high page.( and 0xff7fffff was corrected).
    3.   for VER1_0 : swap of addresses a31-24 for page_reg.
/*****************************************************************************
|                              send.c                                         |
|-----------------------------------------------------------------------------|
|  Company: RAN                        Project : NuBus Card                   |
|                                                                             |
|  Subproject: send block 1 mbyte                                             |
|                                                                             |
|                                                                             |
|  Programmer Name: Yaron              Last Update By:                        |
|                                      Update :                               |
|                                                                             |
|-----------------------------------------------------------------------------|
|  IMPORTS                                                                    |
|  INTERNAL TYPEDEF & CONSTANT                                                |
|  INTERNAL FUNCTION PROTOTYPE                                                |
|  LOCAL DATA                                                                 |
|  GLOBAL DATA                                                                |
|-----------------------------------------------------------------------------|
|  Function List:                                                             |
|  --------------                                                             |
|                                                                             |
|-----------------------------------------------------------------------------|
|  ABSTRACT:                                                                  |
|                                                                             |
|  CHANGES CONTROL:                                                           |
|    Date:                                                                    |
|    CHANGES:                                                                 |
|                                                                             |
*****************************************************************************/

/*****************************************************************************
| IMPORTS                                                                     |
*****************************************************************************/ include "def32b.h"
include "comp_opt.h"

include "const1.h"
```

```
4/5/93 12:32 PM     YARON'S DISKET:untitled folder:SR32B1.C.§        Page 2 include "snc32b.h"

include "RarNet1.h"
#include "globall.h"
#ifdef SMLT_MAC
    #include "smlt.h"
endif /*******************************************************************
| INTERNAL TYPEDEF & CONSTANT                                       |
********************************************************************/
/*******************************************************************
| INTERNAL FUNCTION PROTOTYPE                                       |
********************************************************************/
void send_block();
WORD TransmitBlock();
void Init_Tdas_DataTrs(WORD p1,WORD p3, WORD *p4,WORD *p5,WORD *p6,WORD *p7);
void Init_Tdas_CtrlTrs(WORD p1,WORD p3, WORD *p4,WORD *p5,WORD *p6,WORD *p7);
WORD check_endOf_trs();
void trs_EOF_pckt();

/*******************************************************************
| LOCAL DATA                                                        |
********************************************************************/

WORD Fail    ;
LONG Loop    ;
static LONG LptrTmp;

RNet_DrvHdrRec      *ptrRN_HdrTrs_cpuAcsess;

/*******************************************************************
| GLOBAL DATA                                                       |
********************************************************************/
WORD EndOfFile;

/*******************************************************************
| get_new_MAC_blk()                                                 |
|------------------------------------------------------------------ |
| Abstract:  gets new Macintosh's memory rcv block (chunk).         |
|                                                                   |
| Parameters: None                                                  |
| Returns: None                                                     |
********************************************************************/
void get_new_MAC_blk()
{ LONG Ltmp;

#ifdef DEBUG
    ioBits_GP.dbg1 = 1  ; /* toggle debug pin */
    WrtPort_GP = io_GP;
endif rBlk_ptr = (WORD*)((LONG*)rMACmemPtr + sizeof_RNet_DrvHdr);
    rBlk_size = rMACmemPtr->blkSize;
    stat_cnt.trnsfrd += dma_done;
    num_pckts_in_chunk = dma_done = rcvd_size = 0;
    for (Ltmp = 1; Ltmp <=MAX_SeqNUM; Ltmp++)
    {
        seqNumTbl[Ltmp] = 0xff; /* assign "seqNum" as "was'nt writen" */
    }
```

```
 4/5/93 12:32 PM     YARON'S DISKET:untitled folder:SR32B2.0.s         Page :

/*-- calculate memory paging values --*/
        Ltmp = (LONG)rBlk_ptr - 0x800000;
        #ifdef VER0_0
          page_1st =
                  (((((((
                    (((LONG)rBlk_ptr & 0x40000000) >> 14) /*a30->a16*/
                  | (((LONG)rBlk_ptr & 0x20000000) >> 12))/*a29->a17*/
                  | (((LONG)rBlk_ptr & 0x10000000) >> 10))/*a28->a18*/
                  | (((LONG)rBlk_ptr & 0x08000000) >>  8))/*a27->a19*/
                  | (((LONG)rBlk_ptr & 0x04000000) >>  6))/*a26->a20*/
                  | (((LONG)rBlk_ptr & 0x02000000) >>  4))/*a25->a21*/
                  | (((LONG)rBlk_ptr & 0x01000000) >>  2))/*a24->a22*/
                  | ( (LONG)rBlk_ptr & 0x00800000)         );/*a23    */
          page_2nd =
                  (((((((
                    ((Ltmp & 0x40000000) >> 14) /*a30->a16*/
                  | ((Ltmp & 0x20000000) >> 12))/*a29->a17*/
                  | ((Ltmp & 0x10000000) >> 10))/*a28->a18*/
                  | ((Ltmp & 0x08000000) >>  8))/*a27->a19*/
                  | ((Ltmp & 0x04000000) >>  6))/*a26->a20*/
                  | ((Ltmp & 0x02000000) >>  4))/*a25->a21*/
                  | ((Ltmp & 0x01000000) >>  2))/*a24->a22*/
                  | ( Ltmp & 0x00800000)         );/*a23    */
        #else
          page_1st = (LONG)rBlk_ptr;
          page_2nd = Ltmp;
        #endif pages_border = (Ltmp & 0xff800000);
          /*------------------------------------*/
}
/***************************************************************************
| get_file()                                                                |
|--------------------------------------------------------------------------|
| Abstract:                                                                |
|    get file                                                              |
| Parameters:                                                              |
|    None                                                                  |
|                                                                          |
| Returns:                                                                 |
|                                                                          |
***************************************************************************/
void get_file()
{
   rPtr_indx = 0;  /* ptr Index to next rcv. buf in MAC */
   rMACmemPtr = ptrRNet_DrvHdrRcv[ 0 ]; /* update new ptr */
   *(WORD*)&flags = 0;    /* init. flags */
   dma_done = 0;

get_new_MAC_blk();

/*---------------------*/
   SONIC_cr = CMD_RXEN; /* start rcv. the frames  */ while ( ! flags.EOFrcvd )
   {
     DmaTransfer();
   }
   SONIC_cr = CMD_RXDIS; /* stop rcv. the frames  */ while ( ! ((flags.EOFrcvd) && (flags.EOBtrnsfrd))) DmaTransfer();
    /*&& (flags.chk_list_ok)*/
    /*..else EOferr..*/
```

4/5/93 12:32 PM   YARON'S DISKET:untitled folder:SR32B1.C.§    Page 4

```c
  { /* EOF & EOB */
     rMACmemPtr ->blkSize       = rcvd_size ;
     rMACmemPtr->drv_cmd_trsRcv = 2; /* mark block buf. as FULL & EOF */
     flags.stop_dma = 1;     /* flag don't start new DMA transfer */
  }
  while (rMACmemPtr ->drv_cmd_trsRcv == 2)  ;  /* wait until FILE write in MAC */
  flags.EOFrcvd = 0;
}
/******************************************************************************
| TransmitBlock()
|-----------------------------------------------------------------------------|
| Abstract:                                                                   |
|    transmits 1 block from MAC , waites  for block to finish                 |
|    and returns the status of the transmitted block                          |
| Parameters: None                                                            |
| Returns:    WORD : status of transmitted block                              |
******************************************************************************/
WORD TransmitBlock()
{
/*  WORD *wptr1;*/
  LONG Loop, Loop1 ;
  WORD No_bytes_InLast_pckt; /* remainder of bytes in last pckt   */
  WORD No_pckts;             /* total pckts no. in block          */
  WORD No_pckts_InLast_loop ;/* remainder of pckts in last loop   */
  WORD No_loops ;            /* total no. of loops to update trs. dscrptors*/

EndOfFile = 0;

/*-- point Reg Utda:Ctda to begining of transmit descriptor (TDA) --*/

SONIC_utda = (WORD)(((LONG)&Snc_Desc->SncTda) >> 16);
  SONIC_ctda = (WORD)(&Snc_Desc->SncTda[0]);

/* Update lengthes of "lngth" fields for "STANDARD PECKET SIZE"
   ~~~~~~~~~~~~~~~~~~~~~~~~~~~~~~~~~~~~~~~~~~~~~~~~~~~~~~~~~~~~~
     /* update Lengths array : ELAP length, DDP length , RanNet length :
        RanNet length : "lngth" field not included in the RanNet length;
        DDP    length : "lngth" field included in the DDP length ;
        ELAP   length : "lngth" field not   included in ELAP length
   ~~~~~~~~~~~~~~~~~~~~~~~~~~~~~~~~~~~~~~~~~~~~~~~~~~~~~~~~~~~~~*/
  RNet_Lngth[0].rLngth = pckt_size ;                   /* RanNet length */
  RNet_Lngth[0].dLngth = pckt_size                     /* DDP length */
                         + sizeof_DDP_header + sizeof_RanNet_hdr ;
  RNet_Lngth[0].eLngth = pckt_size - sizeof_SNAP_header  /* ELAP length */
                         + sizeof_DDP_header + sizeof_RanNet_hdr ;

do
{   /* trs. until eof */ while ((LONG*)ptrRNet_DrvHdrTrs == NULL) ;  /* wait until MAC block is valid */ ifdef DEBUG
    ioBits_GP.dbg1 = 1  ; /* toggle debug pin */
    WrtPort_GP = io_GP;
endif ifndef NUBUS_OFF
 (LONG)ptrRN_HdrTrs_cpuAcsess =
                (LONG)ptrRNet_DrvHdrTrs | 0x00800000; /* for NuBus:(a23=1)*/
else
  (LONG)ptrRN_HdrTrs_cpuAcsess = (LONG)ptrRNet_DrvHdrTrs ;
```

```
4/5/93 12:32 PM     YARON'S DISKET:untitled folder:SR32B1.C.S         Page 5
#endif
   while ( ! ptrRN_HdrTrs_cpuAcsess->drv_cmd_trsRcv ) ; /* wait until block is Raedy
   tBlk_ptr  = (WORD*) ((LONG*)ptrRNet_DrvHdrTrs + sizeof_RNet_DrvHdr);
   tBlk_size = ptrRN_HdrTrs_cpuAcsess->blkSize;

if ( tBlk_size == 0)
   {
     if ( ptrRN_HdrTrs_cpuAcsess->drv_cmd_trsRcv == 2)
       {
         EndOfFile = 1;
         trs_EOF_pckt(); /* trs. empty pckt with csCode of endOfFile  */
       }
     else
       {
         return (FALSE) ; /* return status of EndOfBlock */
       };
   }
   else
   {
   /*--- claculate parameters for Tda init. to whole chunk(block)
    ----------------------------------------------------------------*/
   No_bytes_InLast_pckt = tBlk_size % pckt_size;
   if (No_bytes_InLast_pckt != 0)
       No_pckts = (tBlk_size / pckt_size) + 1;
   else {
       No_pckts = tBlk_size / pckt_size;
       No_bytes_InLast_pckt = pckt_size;
   }

No_pckts_InLast_loop = No_pckts % MaxTdaDesc;
   if (No_pckts_InLast_loop != 0)
       No_loops = (No_pckts / MaxTdaDesc) + 1;
   else {
       No_loops = No_pckts / MaxTdaDesc;
       No_pckts_InLast_loop = MaxTdaDesc;
   }

WptrRNet_Data    = tBlk_ptr;       /* ptr to start of data blk to be trs. */
   WptrRNet_seqNum  = RNet_seqNum;    /* ptr to seqNum[0]==1)                */

/* .. inc. block no. ...
                        ...      */

/* Update lengthes of "lngth" fields for "SIZE of LAST PECKET in block "
    ----------------------------------------------------------------
     /* update Lengths array : ELAP length, DDP length , RanNet length :
         RanNet length : "lngth" field not included in the RanNet length;
         DDP    length : "lngth" field included in the DDP length ;
         ELAP   length : "lngth" field not     included in ELAP length
    ----------------------------------------------------------------*/
   RNet_Lngth[1].rLngth = No_bytes_InLast_pckt     ; /* RanNet length */
   RNet_Lngth[1].dLngth = No_bytes_InLast_pckt
           + sizeof_DDP_header + sizeof_RanNet_hdr ; /* DDP length */
   RNet_Lngth[1].eLngth = No_bytes_InLast_pckt    + sizeof_SNAP_header +
           + sizeof_DDP_header + sizeof_RanNet_hdr ;/* ELAP length */

/*--- initialize Tdas to trs. whole chunk(block) ---
    ----------------------------------------------------------------*/
   LptrNextTda = (LONG*)&Snc_Desc->SncTda; /* init. tmp. ptr */
   if ( No_loops == 1)
```

```
{
if ( No_pckts_InLast_loop == 1 )
{ /* trs. LAST pckt ( only one pckt in whole block ) */
    Init_Tdas_DataTrs(
            1 ,                         /* num of pckts/Tdas to be initialize */
            No_bytes_InLast_pckt ,      /* pckt size in bytes */
            (WORD*)&RNet_Lngth[1].eLngth,  /* ELAP length */
            (WORD*)&RNet_Lngth[1].dLngth,  /* DDP  length */
            (WORD*)&RNet_Lngth[1].rLngth,  /* RanNet length */
            (WORD*)&RNet_csCode[ksGetLastPacketReq]
                    );  /* csCode: 1st pckt*/
}
else
{
    Init_Tdas_DataTrs(  /* init. for trs. 1st pecket of block */
        1 ,             /* no. of pckts/Tdas to be initialize */
        pckt_size ,     /* pckt size in bytes */
        (WORD*)&RNet_Lngth[0].eLngth,  /* ELAP length */
        (WORD*)&RNet_Lngth[0].dLngth,  /* DDP  length */
        (WORD*)&RNet_Lngth[0].rLngth,  /* RanNet length */
        (WORD*)&RNet_csCode[ksGetFirstPacketReq]
                    );  /* csCode: 1st pckt*/
    No_pckts_InLast_loop--;

Init_Tdas_DataTrs(  /* init. for trs. all pecket of block except the last*/
        No_pckts_InLast_loop-1,  /* no. of Tda to be initialize */
        pckt_size ,     /* pckt size in bytes */
        (WORD*)&RNet_Lngth[0].eLngth,  /* ELAP length */
        (WORD*)&RNet_Lngth[0].dLngth,  /* DDP  length */
        (WORD*)&RNet_Lngth[0].rLngth,  /* RanNet length */
        (WORD*)&RNet_csCode[ksGetNextPacketReq]  /* csCode: next pckt*/
                    );
    Init_Tdas_DataTrs(  /* init. for trs. LAST pecket of block */
            1 ,                         /* no. of pckts/Tdas to be initialize */
            No_bytes_InLast_pckt ,      /* pckt size in bytes */
            (WORD*)&RNet_Lngth[1].eLngth,  /* ELAP length */
            (WORD*)&RNet_Lngth[1].dLngth,  /* DDP  length */
            (WORD*)&RNet_Lngth[1].rLngth,  /* RanNet length */
            (WORD*)&RNet_csCode[ksGetLastPacketReq]
                    );  /* csCode: 1st pckt*/
}
}
else
{ /* more then 1 loop for Tda initializion */

/* 1st Loop
---------------*/
Init_Tdas_DataTrs(  /* init. for trs. 1st pecket of block */
    1 ,             /* no. of pckts/Tdas to be initialize */
    pckt_size ,     /* pckt size in bytes */
    (WORD*)&RNet_Lngth[0].eLngth,  /* ELAP length */
    (WORD*)&RNet_Lngth[0].dLngth,  /* DDP  length */
    (WORD*)&RNet_Lngth[0].rLngth,  /* RanNet length */
    (WORD*)&RNet_csCode[ksGetFirstPacketReq]
                );  /* csCode: 1st pckt*/
Init_Tdas_DataTrs(  /* init. for trs. 1st pecket of block */
    MaxTdaDesc-1,   /* no. of pckts/Tdas to be initialize */
    pckt_size ,     /* pckt size in bytes */
    (WORD*)&RNet_Lngth[0].eLngth,  /* ELAP length */
    (WORD*)&RNet_Lngth[0].dLngth,  /* DDP  length */
    (WORD*)&RNet_Lngth[0].rLngth,  /* RanNet length */
    (WORD*)&RNet_csCode[ksGetNextPacketReq]
                );  /* csCode: 1st pckt*/
```

```
4/5/93 12:32 PM    YARON'S DISKET:untitled folder:SR32B1.C.8         Page 7
   /* all other Loops
   ~~~~~~~~~~~~~~~~~~*/
   for ( Loop1 = 2; Loop1 < No_loops ; Loop1++)
   {
      LptrNextTda = (LONG*)&Snc_Desc->SncTda; /* init. tmp. ptr */
      Init_Tdas_DataTrs(
            MaxTdaDesc,     /* no. of Tda to be initialize */
            pckt_size ,     /* pckt size in bytes */
            (WORD*)&RNet_Lngth[0].eLngth, /* ELAP length */
            (WORD*)&RNet_Lngth[0].dLngth, /* DDP  length */
            (WORD*)&RNet_Lngth[0].rLngth, /* RanNet length *
            (WORD*)&RNet_csCode[ksGetNextPacketReq] /* csCode: 1st pckt from se
                    );
   }
   /* LAST Loop
   ~~~~~~~~~~~~~*/
   LptrNextTda = (LONG*)&Snc_Desc->SncTda; /* init. tmp. ptr */

Init_Tdas_DataTrs(   /* init. for trs. all pecket of block except the last*/
         No_pckts_InLast_loop-1,  /* no. of Tda to be initialize *
         pckt_size ,     /* pckt size in bytes */
         (WORD*)&RNet_Lngth[0].eLngth,  /* ELAP length */
         (WORD*)&RNet_Lngth[0].dLngth,  /* DDP  length */
         (WORD*)&RNet_Lngth[0].rLngth,  /* RanNet length */
         (WORD*)&RNet_csCode[ksGetNextPacketReq] /* csCode: next pckt*/
                  );
   Init_Tdas_DataTrs( /* init. for trs. LAST pecket of block */
         1 ,                    /* no. of pckts/Tdas to be initialize */
         No_bytes_InLast_pckt , /* pckt size in bytes */
         (WORD*)&RNet_Lngth[1].eLngth, /* ELAP length */
         (WORD*)&RNet_Lngth[1].dLngth, /* DDP  length */
         (WORD*)&RNet_Lngth[1].rLngth, /* RanNet length */
         (WORD*)&RNet_csCode[ksGetLastPacketReq]
                  );/* csCode: 1st pckt*/
  }
 } ifdef DEBUG
   ioBits_GP.dbg1 = 0 ;  /* toggle debug pin */
   WrtPort_GP = io_GP;
endif (LONG*)ptrRNet_DrvHdrTrs = NULL;
  ptrRN_HdrTrs_cpuAcsess->drv_cmd_trsRcv = 0;/*clear RanNet appliction flag "end o /*  Delay(10);*/ ifdef SMLT_MAC
   MACsmlt_stop_snd_chunk();
endif

}
while ( ! EndOfFile ); /* trs. until EOF */
/*-------------------------------------------------------*/ return (TRUE) ;   /* return status of EndOfBlock */
}
/**************************************************************************
| Init_Tdas_DataTrs(..)                                                   |
|-------------------------------------------------------------------------|
| Abstract:                                                               |
|    init. Tdas for transmiting .                                         |
| Parameters:                                                             |
```

```
4/5/93 12:32 PM    YARON'S DISKET:untitled folder:SR32E1.C.§        Page 2
| 1. No_of_Tdas:                                                             |
|    no. of pckts to be init. now for transmit.                              |
| 2. No_Bytes_in_pckt:                                                       |
|    no. of bytes to be transmited in each pckt.                             |
| 3. Wptr_ELAP_lngth:                                                        |
|    the "length" field in ELAP to be transmited in each pckt.               |
| 4. Wptr_DDP_lngth:                                                         |
|    the "length" field in DDP  to be transmited in each pckt.               |
| 5. Wptr_RNet_lngth:                                                        |
|    the "length" field in RanNet to be transmited in each pckt.             |
| 6. Wptr_RNet_csCode:                                                       |
|    the "csCode" field in RanNet to be transmited in each pckt.             |
|                                                                            |
| Returns: None.                                                             |
|                                                                            |
| Globals in use:                                                            |
| 1. WptrRNet_Data :                                                         |
|    pointer to next packet in the Data Block to be transmitted now          |
| 2. WptrRNet_seqCode:                                                       |
|    pointer to the "csCode" field in RanNet to be transmited                |
|    in each pckt.                                                           |
| 3. LptrNextTda:                                                            |
|    ptr ("to long" type) which points to Next Tda to be initialize.         |
|                                                                            |
****************************************************************************/
void Init_Tdas_DataTrs(No_of_Tdas, No_Bytes_in_pckt,WptrELAP_lngth, WptrDDP_lngth, WORD No_of_Tdas; WORD No_Bytes_in_pckt;
WORD *WptrELAP_lngth, *WptrDDP_lngth, *WptrRNet_lngth, *WptrRNet_csCode;
{ LONG Loop;

SONIC_ctda=(WORD)LptrNextTda ;/* point ctda reg. to begining of TDAs*/
  for ( Loop = 0 ; Loop < No_of_Tdas; Loop++)
    {

*( LptrNextTda     ) = 0            ;  /* mark this TDA as occupied */
    *( LptrNextTda + 1 ) = 0            ;  /* transmit with CRC */
    *( LptrNextTda + 2 ) = 6+ 6+ 2+
             + sizeof_SNAP_header  /* = 8 */
             + sizeof_DDP_header   /* = 13 */
             - sizeof_RanNet_hdr
             - No_Bytes_in_pckt          ;  /* compleet pckt size */
    *( LptrNextTda + 3 ) = 11           ;  /* frags count */
#ifdef DEBUG
    if ((WORD)*( LptrNextTda + 3 ) > MAX_FRAGS_ALLOWED ) /* max frags in tda_str*/
     { while (1) { } }  /* halt for debug pupose */
#endif
    /*-- SOURCE/DEST addr. -----*/

LptrTmp = (LONG)&DstSession_add;
    *(( WORD *) LptrNextTda + 9 ) =  LSW(LptrTmp);
    *(( WORD *) LptrNextTda + 11) =  MSW(LptrTmp);
/*  *(( WORD *) LptrNextTda + 11) =  nbsMSW(LptrTmp);*/
    *( LptrNextTda + 6 ) = 6                 ;  /* frag1 size */

LptrTmp = (LONG)&SncMacAdd;
    *(( WORD *) LptrNextTda + 15) =  LSW(LptrTmp);
    *(( WORD *) LptrNextTda + 17) =  MSW(LptrTmp);
/*  *(( WORD *) LptrNextTda + 17) =  nbsMSW(LptrTmp);*/

*( LptrNextTda + 9 ) = 6                 ;  /* frag2 size */
```

4/5/93 12:30 PM     YARON'S DISKET:untitled folder:SR32BD.C.§      Page 3

```c
    /*-- ELAP header       -----*/
    LptrTmp = (LONG)WptrELAP_lngth;
    *(( WORD *) LptrNextTda + 21) = LSW(LptrTmp);
    *(( WORD *) LptrNextTda + 23) = MSW(LptrTmp);

*( LptrNextTda + 12) = 2;                  ; /* frag3 size */

LptrTmp = (LONG)&SNAP_header;
    *(( WORD *) LptrNextTda + 27) = LSW(LptrTmp);
    *(( WORD *) LptrNextTda + 29) = MSW(LptrTmp);
/*  *(( WORD *) LptrNextTda + 29) = nbsMSW(LptrTmp);*/
    *( LptrNextTda + 15) = sizeof_SNAP_header ;   /* frag4 size = 8 bytes */

/*-- DDP header        -----*/
    LptrTmp = (LONG)WptrDDP_lngth;
    *(( WORD *) LptrNextTda + 33) = LSW(LptrTmp);
    *(( WORD *) LptrNextTda + 35) = MSW(LptrTmp);
    *( LptrNextTda + 18) = 2                   ; /* frag5 size */

LptrTmp = (LONG)&DDP_header.chksum;
    *(( WORD *) LptrNextTda + 39) = LSW(LptrTmp);
    *(( WORD *) LptrNextTda + 41) = MSW(LptrTmp);
/*  *(( WORD *) LptrNextTda + 41) = nbsMSW(LptrTmp);*/
    *( LptrNextTda + 21) = sizeof_DDP_header -2; /* frag6 size */

/*-- RanNet header 1   -----*/
    LptrTmp = (LONG)WptrRNet_csCode ;
    *(( WORD *) LptrNextTda + 45) = LSW(LptrTmp);
    *(( WORD *) LptrNextTda + 47) = MSW(LptrTmp);
    *( LptrNextTda + 24) = sizeof( RanNet_hdr.csCode );  /* frag7 size */

/*-- RanNet header 2   -----*/
    LptrTmp = (LONG)&RanNet_hdr.senderAddress;
    *(( WORD *) LptrNextTda + 51) = LSW(LptrTmp);
    *(( WORD *) LptrNextTda + 53) = MSW(LptrTmp);
/*  *(( WORD *) LptrNextTda + 53) = nbsMSW(LptrTmp);*/
    *( LptrNextTda + 27) = sizeof_RanNet_hdr
                           - sizeof(RanNet_hdr.csCode )
                           - sizeof(RanNet_hdr.seqNum )
                           - sizeof(RanNet_hdr.len   )  ; /* frag8 size */

/*-- RanNet header 3   -----*/
    LptrTmp = (LONG)WptrRNet_seqNum ;
    *(( WORD *) LptrNextTda + 57) = LSW(LptrTmp);
    *(( WORD *) LptrNextTda + 59) = MSW(LptrTmp);
    *( LptrNextTda + 30) = sizeof( RanNet_hdr.seqNum );  /* frag9 size */

/*-- RanNet header 4   -----*/
    LptrTmp = (LONG)WptrRNet_lngth ;
    *(( WORD *) LptrNextTda + 63) = LSW(LptrTmp);
    *(( WORD *) LptrNextTda + 65) = MSW(LptrTmp);
    *( LptrNextTda + 33) = sizeof( RanNet_hdr.len )      ; /* frag10 size */

/*-- RanNet DATA       -----*/
    LptrTmp = (LONG)WptrRNet_Data;
    *(( WORD *) LptrNextTda + 69) = LSW(LptrTmp);
    *(( WORD *) LptrNextTda + 71) = nbsMSW(LptrTmp);
    *( LptrNextTda + 36) = No_Bytes_in_pckt              ; /* frag11 size */

/*-- link Tda's        -----*/
    *((WORD*) LptrNextTda + 75) = ((WORD) (LptrNextTda + (sizeof(tda_str) >> 2));
```

```
4/5/93 12:32 PM     YARON'S DISKET:untitled folder:SR32B2.C.§         Page 10

LptrNextTda += (sizeof(tda_str) >> 2);
   WptrRNet_Data += (No_Bytes_in_pckt >> 1);
   WptrRNet_seqNum ++;

/*--- check if end of TRANSMIT ---*/
   check_endOf_trs();
    /* Delay(0); */
   SONIC_cr = CMD_TXP ; /* start transmit the next frames   */
   /*---------------*/
   }
   check_endOf_trs();
}
/***********************************************************************
| Init_Tdas_CtrlTrs(..)                                                 |
|---------------------------------------------------------------------- |
| Abstract:                                                             |
|     init. Tdas for transmiting .                                      |
| Parameters:                                                           |
|  1. No_of_Tdas:                                                       |
|       no. of pckts to be init. now for transmit.                      |
|  2. No_Bytes_in_pckt:                                                 |
|       no. of bytes to be transmited in each pckt.                     |
|  3. Wptr_ELAP_lngth:                                                  |
|       the "length" field in ELAP to be transmited in each pckt.       |
|  4. Wptr_DDP_lngth:                                                   |
|       the "length" field in DDP  to be transmited in each pckt.       |
|  5. Wptr_RNet_lngth:                                                  |
|       the "length" field in RanNet to be transmited in each pckt.     |
|  6. Wptr_RNet_csCode:                                                 |
|       the "csCode" field in RanNet to be transmited in each pckt.     |
|                                                                       |
| Returns: None.                                                        |
|                                                                       |
| Globals in use:                                                       |
|  1. WptrRNet_Data :                                                   |
|       pointer to next packet in the Data Block to be transmitted now  |
|  2. WptrRNet_seqCode:                                                 |
|       pointer to the "csCode" field in RanNet to be transmited        |
|       in each pckt.                                                   |
|  3. LptrNextTda:                                                      |
|       ptr ("to long" type) which points to Next Tda to be initialize. |
|                                                                       |
************************************************************************/
void Init_Tdas_CtrlTrs(No_of_Tdas, No_Bytes_in_pckt,WptrELAP_lngth, WptrDDP_lngth, WORD No_of_Tdas; WORD No_Bytes_in_pckt;
WORD *WptrELAP_lngth, *WptrDDP_lngth, *WptrRNet_lngth, *WptrRNet_csCode;
{ LONG Loop;

SONIC_ctda=(WORD)LptrNextTda ;/* point ctda reg. to begining of TDAs*/
 for ( Loop = 0 ; Loop < No_of_Tdas; Loop++)
   {
   *( LptrNextTda     )  = 0            ; /* mark this TDA as occupied */
   *( LptrNextTda + 1 )  = 0            ; /* transmit with CRC */
   *( LptrNextTda + 2 )  = 6+ 6+ 2+
           + sizeof_SNAP_header   /* = 8 */
           + sizeof_DDP_header    /* = 13 */
           + sizeof_RanNet_CtrlHdr
           + No_Bytes_in_pckt     ; /* compleet pckt size */

*( LptrNextTda + 3 )  = 11           ; /* frags count */
#ifdef DEBUG
```

```
4/5/93 12:30 PM     YARON'S DISKET:untitled folder:SR32B1...S        Page 11 if ((WORD)*( LptrNextTda - 3 )  > MAX_FRAGS_ALLOWED )  /* max frags in tda_str*/
   { while (1) { } }    /* halt for debug pupose */
endif /*-- SOURCE/DEST addr. -----*/
   LptrTmp = (LONG)&DstSession_add;
   *(( WORD *) LptrNextTda +  9) =  LSW(LptrTmp);
   *(( WORD *) LptrNextTda + 11) =  MSW(LptrTmp);
/*  *(( WORD *) LptrNextTda + 11) =  nbsMSW(LptrTmp);*/
   *( LptrNextTda +  6 )  = 6                 ;  /* frag1 size */
   LptrTmp = (LONG)&SncMacAdd ;
   *(( WORD *) LptrNextTda + 15) =  LSW(LptrTmp);
   *(( WORD *) LptrNextTda + 17) =  MSW(LptrTmp);
/*  *(( WORD *) LptrNextTda + 17) =  nbsMSW(LptrTmp);*/
   *( LptrNextTda +  9 )  = 6                 ;  /* frag2 size */

/*-- ELAP  header      -----*/
   LptrTmp = (LONG)WptrELAP_lngth ;
   *(( WORD *) LptrNextTda + 21) =  LSW(LptrTmp);
   *(( WORD *) LptrNextTda + 23) =  MSW(LptrTmp);
   *( LptrNextTda + 12)  = 2;                   ;  /* frag3 size */
   LptrTmp = (LONG)&SNAP_header;
   *(( WORD *) LptrNextTda + 27) =  LSW(LptrTmp);
   *(( WORD *) LptrNextTda + 29) =  MSW(LptrTmp);
/*  *(( WORD *) LptrNextTda + 29) =  nbsMSW(LptrTmp);*/
   *( LptrNextTda + 15)  = sizeof_SNAP_header ;  /* frag4 size = 8 bytes */

/*-- DDP   header      -----*/
   LptrTmp = (LONG)WptrDDP_lngth ;
   *(( WORD *) LptrNextTda + 33) =  LSW(LptrTmp);
   *(( WORD *) LptrNextTda + 35) =  MSW(LptrTmp);
   *( LptrNextTda + 18)  = 2                  ;  /* frag5 size */

LptrTmp = (LONG)&DDP_header.chksum ;
   *(( WORD *) LptrNextTda + 39) =  LSW(LptrTmp);
   *(( WORD *) LptrNextTda + 41) =  MSW(LptrTmp);
/*  *(( WORD *) LptrNextTda + 41) =  nbsMSW(LptrTmp);*/
   *( LptrNextTda + 21)  = sizeof_DDP_header -2;  /* frag6 size */

/*-- RanNet header 1    -----*/
   LptrTmp = (LONG)WptrRNet_csCode ;
   *(( WORD *) LptrNextTda + 45) =  LSW(LptrTmp);
   *(( WORD *) LptrNextTda + 47) =  MSW(LptrTmp);
   *( LptrNextTda + 24)  = sizeof( RanNet_CtrlHdr.csCode );  /* frag7 size */

/*-- RanNet header 2    -----*/
   LptrTmp = (LONG)&RanNet_CtrlHdr.senderAddress;
   *(( WORD *) LptrNextTda + 51) =  LSW(LptrTmp);
   *(( WORD *) LptrNextTda + 53) =  MSW(LptrTmp);
/*  *(( WORD *) LptrNextTda + 53) =  nbsMSW(LptrTmp);*/
   *( LptrNextTda + 27)  = sizeof_RanNet_CtrlHdr
                         - sizeof(RanNet_CtrlHdr.csCode )
                         - sizeof(RanNet_CtrlHdr.seqNum )
                         - sizeof(RanNet_CtrlHdr.len    )   ;  /* frag8 size */

/*-- RanNet header 3    -----*/
   LptrTmp = (LONG)WptrRNet_seqNum ;
   *(( WORD *) LptrNextTda + 57) =  LSW(LptrTmp);
   *(( WORD *) LptrNextTda + 59) =  MSW(LptrTmp);
   *( LptrNextTda + 30)  = sizeof( RanNet_CtrlHdr.seqNum );  /* frag9 size */

/*-- RanNet header 4    -----*/
```

```
4/5/93 12:32 PM     YARON'S DISKET:untitled folder:SR32B1.C.§        Page 12
    LptrTmp = (LONG)WptrRNet_lngth ;
    *(( WORD *) LptrNextTda + 63) =  LSW(LptrTmp);
    *(( WORD *) LptrNextTda + 65) =  MSW(LptrTmp);
    *( LptrNextTda + 33)  = sizeof( RanNet_CtrlHdr.len )     ; /* frag10 size */

/*-- PAD- NULL DATA -----*/
    LptrTmp = (LONG)PAD_Data ;
    *(( WORD *) LptrNextTda + 69) =  LSW(LptrTmp);
    *(( WORD *) LptrNextTda + 71) =  MSW(LptrTmp);
    *( LptrNextTda + 36)  = No_Bytes_in_pckt        ; /* frag11 size */

/*-- link Tda's       -----*/
    *((WORD*) LptrNextTda + 75) = ((WORD) (LptrNextTda + (sizeof(tda_str) >> 2)) ; |

LptrNextTda += (sizeof(tda_str) >> 2);
    WptrRNet_seqNum ++;

/*--- check if end of TRANSMIT ---*/
    check_endOf_trs();
    /*  Delay(0);  */
    SONIC_cr = CMD_TXP ; /* start transmit the next frames  */
    /*---------------*/
  }
  check_endOf_trs();
}
/***********************************************************************
| check_endOf_trs();                                                    |
|----------------------------------------------------------------------|
| Abstract:                                                             |
|    check if end of transmit.                                          |
| Parameters: None                                                      |
| Returns:    WORD : status of transmitted block                        |
***********************************************************************/
WORD check_endOf_trs()
{ LONG Loop;
  register LONG tmp_trs_err_cnt ;

/*--- START TRANSMIT ---*/
     /* .... init 1/2 tba_desc to PINT ..(if not last sequence )
                ....     */
     flags.trs_ok = 0;
     tmp_trs_err_cnt = 0;

if (SONIC_cr & CMD_TXP)
     { /* if transmit is activ now */
        Loop = 0;
        while (SONIC_cr & CMD_TXP)
           if (Loop > 500000)
           {
               /* end of loop - TIMEOUT error */
               tmp_trs_err_cnt = 1;

#ifdef DEBUG
                err_cnt.bug_warning++;
                { while (1) {} } /* BUG was found - DEBUG HALT !! */
               #endif break;
           }
     }
     if ( ! tmp_trs_err_cnt)
     {
        if ( SONIC_isr & ISR_TXDN)
```

```
4/5/93 12:32 PM     YARON'S DISKET:untitled folder:SR32E1.C.§        Page 1

{
        if ( SONIC_isr & ISR_TXER )
        {         /* transmit error occered- end of transmition */
            tmp_trs_err_cnt ++;
            SONIC_isr = (ISR_TXDN | ISR_TXER ) ;  /* clear SONIC_ISR */
            err_cnt.trs ++;
        #ifdef DEBUG
            if (SONIC_tcr & 0x0002)
            { while (1) {} } /* BUG was found - DEBUG HALT !! */
            else
        #endif
            if (tmp_trs_err_cnt <= 5)
                SONIC_cr = CMD_TXP   ;/* retansmit the same frame again */
            else
            {
              return(FALSE);
            }
         }
         else /*  trs. ended because last frame , or by software rec shutdown */
         {
             SONIC_isr = (ISR_TXDN | ISR_TXER ) ;  /* clear SONIC_ISR */
             stat_cnt.trs_ok ++;
             flags.trs_ok = 1;
             /*Delay(1);*/
             return(TRUE);
         }
      }   /* end: if SONIC_isr & ISR_TXDN */
    } /* end: if  ! tmp_trs_err_cnt */
 return(FALSE);
}
/******************************************************************************
| trs_EOF_pckt                                                                |
|----------------------------------------------------------------------------|
| Abstract:                                                                   |
|       trs. empty pckt with csCode of endOfFile                              |
| Parameters: None                                                            |
| Returns:    None                                                            |
******************************************************************************/
void trs_EOF_pckt()
{ /*WORD *Wptrl;*/
  WORD loop;

/* Update lengthes of "lngth" fields for "EMPTY (64 bytes) PECKET SIZE"
   ( CONTROL PECKETS )
   ~~~~~~~~~~~~~~~~~~~~~~~~~~~~~~~~~~~~~~~~~~~~~~~~~~~~~~~~~~~~~~~~~~~~~~~~~~*/
   /* update Lengths array : ELAP length, DDP length , RanNet length :
      RanNet length : "lngth" field not included in the RanNet length;
      DDP    length : "lngth" field included in the DDP length ;
      ELAP   length : "lngth" field not    included in ELAP length
   ~~~~~~~~~~~~~~~~~~~~~~~~~~~~~~~~~~~~~~~~~~~~~~~~~~~~~~~~~~~~~~~~~~~~~~~~~~*/
   RNet_Lngth[2].rLngth = 0 +sizeof_RanNet_CtrlHdr ;  /* RanNet length */
   RNet_Lngth[2].dLngth = 0 +
         +sizeof_DDP_header + sizeof_RanNet_CtrlHdr ; /* DDP length */
   RNet_Lngth[2].eLngth = 0 + sizeof_SNAP_header +
         + sizeof_DDP_header - sizeof_RanNet_CtrlHdr ;/* ELAP length */
/*---------------------------------------------------------------------------*/

DDP_header.DstSockt--;
DDP_header.SrcSockt =
       RanNet_CtrlHdr.senderAddress.Socket =
              my_CTRL_sckt_num;

for (loop= 0; loop<3; loop++)
```

```
4/5/93 12:32 PM     YARON'S DISKET:untitled folder:SR32B2.C.§      Page 14
  {
Delay(10);
  LptrNextTda = (LONG*)(&Snc_Desc->SncTda); /* init. tmp. ptr */

WptrRNet_seqNum = RNet_seqNum;  /* ptr to seqNum[0]==1)              */

Init_Tdas_CtrlTrs(
            1,                            /* no. of pckts/Tdas to be initialize */
            60-                           /* Empty pckt size in bytes */
            (6+ 6+ 2+ sizeof_SNAP_header + sizeof_DDP_header
             + sizeof_RanNet_CtrlHdr ),
            (WORD*)&RNet_Lngth[2].eLngth, /* ELAP length */
            (WORD*)&RNet_Lngth[2].dLngth, /* DDP  length */
            (WORD*)&RNet_Lngth[2].rLngth, /* RanNet length */
            (WORD*)&RNet_csCode[ksEndOfFile]
                     );/* csCode: end of file */

*( LptrNextTda+ (sizeof(tda_str) >> 2)- 1) = /*cyclic tda & mark last */
        (LONG)(&Snc_Desc->SncTda) | 0x0001;

/*--- TRANSMIT ---*/
/*  StartTrs();*/
  /*---------------*/
  }
  ptrRN_HdrTrs_cpuAcsess->drv_cmd_trsRcv = 0;     /* change RanNet appliction fl
                                                     "end of trs".*/
   DDP_header.DstSockt ++; /* return to data socket */
}
/*****************************************************************************
| snd_get_file                                                                |
|----------------------------------------------------------------------------|
| Abstract:                                                                   |
|       checks if trs. or rcv. process is activ                               |
| Parameters: None                                                            |
| Returns:    None                                                            |
*****************************************************************************/
void snd_get_file()
{ WORD Loop;

(LONG*)ptrRNet_DrvHdrTrs = NULL;
    for( Loop = 0; Loop < NUM_MAC_RCV_BUF; Loop++)
         (LONG*)ptrRNet_DrvHdrRcv[Loop]= NULL;

#ifdef SMLT_MAC
    blk_num = 0;
    file_size = 3000*1024 ; /* 3 MRAN size of file */
    trsd_size = 0;
    MACsmlt_start_snd_chunk();
endif while (1)
      {
        if ((LONG*)ptrRNet_DrvHdrTrs != NULL)
           {
#ifndef NUBUS_OFF
          /*-- transmit from NUBUS --*/

/*-- set memory page ---*/
             (LONG)ptrRN_HdrTrs_cpuAcsess =
                 (LONG)ptrRNet_DrvHdrTrs | 0x00800000; /* for NuBus:(a23=1)*/
```

```
    #ifdef VER0_0
       page_main = 
          ((((((
          (((LONG)ptrRNet_DrvHdrTrs & 0x40000000) >> 14) /*a30->a16*/
         | (((LONG)ptrRNet_DrvHdrTrs & 0x20000000) >> 12))/*a29->a17*/
         | (((LONG)ptrRNet_DrvHdrTrs & 0x10000000) >> 10))/*a28->a18*/
         | (((LONG)ptrRNet_DrvHdrTrs & 0x08000000) >>  8))/*a27->a19*/
         | (((LONG)ptrRNet_DrvHdrTrs & 0x04000000) >>  6))/*a26->a20*/
         | (((LONG)ptrRNet_DrvHdrTrs & 0x02000000) >>  4))/*a25->a21*/
         | (((LONG)ptrRNet_DrvHdrTrs & 0x01000000) >>  2))/*a24->a22*/
         | ( (LONG)ptrRNet_DrvHdrTrs & 0x00800000)        );/*a23      */
    #else
       page_main = (LONG)ptrRNet_DrvHdrTrs ;
    #endif
       ioRegPage = page_main;
       /*----------------------*/
    #else
       (LONG)ptrRN_HdrTrs_cpuAcsess = (LONG)ptrRNet_DrvHdrTrs ;
    #endif
                TransmitBlock();
                (LONG*)ptrRNet_DrvHdrTrs = NULL;
          }

Fail = 1;
       for( Loop = 0; Loop < NUM_MAC_RCV_BUF; Loop++)
       {
         if ((LONG*)ptrRNet_DrvHdrRcv[Loop] != NULL)
           {
    #ifndef NUBUS_OFF
           /*-- set memory page ---*/
       #ifdef VER0_0
          page_main = 
             ((((((
             (((LONG)ptrRNet_DrvHdrRcv[Loop] & 0x40000000) >> 14) /*a30->a16*/
            | (((LONG)ptrRNet_DrvHdrRcv[Loop] & 0x20000000) >> 12))/*a29->a17*/
            | (((LONG)ptrRNet_DrvHdrRcv[Loop] & 0x10000000) >> 10))/*a28->a18*/
            | (((LONG)ptrRNet_DrvHdrRcv[Loop] & 0x08000000) >>  8))/*a27->a19*/
            | (((LONG)ptrRNet_DrvHdrRcv[Loop] & 0x04000000) >>  6))/*a26->a20*/
            | (((LONG)ptrRNet_DrvHdrRcv[Loop] & 0x02000000) >>  4))/*a25->a21*/
            | (((LONG)ptrRNet_DrvHdrRcv[Loop] & 0x01000000) >>  2))/*a24->a22*/
            | ( (LONG)ptrRNet_DrvHdrRcv[Loop] & 0x00800000)        );/*a23      */
       #else
          page_main = (LONG)ptrRNet_DrvHdrRcv[Loop] ;
       #endif
          ioRegPage = page_main;

(LONG)ptrRNet_DrvHdrRcv[Loop] |= 0x00800000; /* for NuBus:(a23=1)*/
             /*----------------------*/
    #endif
             if (ptrRNet_DrvHdrRcv[Loop]->drv_cmd_trsRcv != 0)
               {
                Fail = 1;
                break;
               }
             else
               {
                Fail = 0;
    #ifdef DEBUG
             ptrRNet_DrvHdrRcv[Loop]->reserved1[ 0 ] = (LONG)&io_GP;
    #endif
               }
           }
       }
```

```
            }
        if ( ! Fail)
        {
            get_file();
            for( Loop = 0; Loop < NUM_MAC_RCV_BUF; Loop++)
                (LONG*)ptrRNet_DrvHdrRcv[Loop]= NULL;

/*.. check over flow of counters ..*/
        }
    }
};
/*******************************************************************/
```

```
4/5/93 12:32 PM    YARON'S DISKET:untitled folder:UTILS32B.C.§         Page 1

/***********************************************************************
|                             util.c                                    |
|-----------------------------------------------------------------------|
| Company: RAN                         Project : NBC                    |
|                                                                       |
| Subproject:                                                           |
|                                                                       |
| Programmer Name: Yaron               Last Update By:                  |
|                                      Update :                         |
|                                                                       |
|-----------------------------------------------------------------------|
| IMPORTS                                                               |
| INTERNAL TYPEDEF & CONSTANT                                           |
| INTERNAL FUNCTION PROTOTYPE                                           |
| LOCAL DATA                                                            |
| GLOBAL DATA                                                           |
|-----------------------------------------------------------------------|
|                                                                       |
| Function List:                                                        |
| --------------                                                        |
|                                                                       |
|-----------------------------------------------------------------------|
| ABSTRACT:                                                             |
|                                                                       |
| CHANGES CONTROL:                                                      |
|   Date:                                                               |
|   CHANGES:                                                            |
|                                                                       |
***********************************************************************/

/***********************************************************************
| IMPORTS                                                               |
***********************************************************************/
#include "def32b.h"
include "comp_opt.h"

include "const1.h"
#include "snc32b.h"
#include "ranNet1.h"

#include "globall.h"
#ifdef SMLT_MAC
    #include "smlt.h"
endif
/***********************************************************************
| INTERNAL TYPEDEF & CONSTANT                                           |
***********************************************************************/

/***********************************************************************
| INTERNAL FUNCTION PROTOTYPE                                           |
***********************************************************************/

LONG Swap32Bit( LONG SwapVar);
void Delay( WORD DelayTime);
void BlinkError();

/***********************************************************************
| LOCAL DATA                                                            |
***********************************************************************/

/***********************************************************************
```

4/5/93 12:32 PM    YARON'S DISKET:untitled folder:UTILS3?S.C.? Page 2

```
| GLOBAL DATA                                                                  |
********************************************************************************/
/*******************************************************************************
| Delay()                                                                       |
|------------------------------------------------------------------------------|
| Abstract:                                                                     |
|     execute a delay in ms                                                     |
| Parameters:                                                                   |
|     WORD delay in ms                                                          |
| Returns:                                                                      |
|     None                                                                      |
********************************************************************************/
void Delay( WORD DelayTime)
{
  WORD Loop ;

while ( DelayTime-- )
    {
#ifdef Clk16M
    for ( Loop = 0 ; Loop < 688 ; Loop++ ) ;
#else
    for ( Loop = 0 ; Loop < 550 ; Loop++ ) ;
#endif
    }
}
/*******************************************************************************
| BlinkError()                                                                  |
|------------------------------------------------------------------------------|
| Abstract:                                                                     |
|     light LED's in circle  one time                                           |
| Parameters:                                                                   |
|     None                                                                      |
|                                                                               |
| Returns:                                                                      |
|     None                                                                      |
********************************************************************************/
void BlinkError()
{
  WORD Delay ;

WrtPort_GP = 0xC7 ;   /* 0x87 - clear all ints,Led Red Off, Led Yell Off*/
  for ( Delay = 0 ; Delay < 50000 ; Delay++ ) ;
  WrtPort_GP = 0x87 ;   /* 0x87 - clear all ints,Led Red On , Led Yell Off*/
  for ( Delay = 0 ; Delay < 50000 ; Delay++ ) ;
}
/*******************************************************************************/
```

```
 4/5/93 12:33 PM     YARON'S DISKET:untitled folder:TRM2.CMD.§         Page 1

;sonic - address 0x140000;<ra0-5> in sonic pins = <a2-a7> in bus
; for example: IMR in SONIC is at addr. 0x140010+2 // see snc32b.h note
;************************************************************************
;
;      MCC68K V4 Default Linker Command File
;
;listabs publics,internals
;extern  ENTRY        ; force load of initialization routine
;
; If linking with MCC68K 3.x objs, enable the next 3 lines:
;
;
; alias code,9        ; 9 was default value of $CODESEG in 3.x
; alias zerovars,14   ; 14 was default value of $DATASEG in 3.x
; alias vars,13       ; 13 was default value of $INITSEG in 3.x
; alias heap,15       ; 15 was heap section in 3.x
;----------------------------- listmap publics,internals
format  ieee

;-----------------------------

;************************************************************************
;      resered RANGES in memory MAP
;************************************************************************ resadd  $000000,$0003ff ;reserve memory location for Interrupt vectors
resadd  $000400,$001fff ;reserve memory location for XRAY code (8K)

;************************************************************************
;      SONIC ACTUAL REGISTER VARIABLES LOCATION
;************************************************************************ resadd  $140000,$14ffff ;reserve memory location of SONIC memory maped reg

;************************************************************************
;      MEMORY MAPED I/O ADDRESS
;************************************************************************ public  _ioReg_Swap_ROM_RAM  0x090000 ; after RESET //in RESTART
public  _WrtPort_GP          0x080000 ; general purpose reg.
public  _ioRegPage           0x0a0000 ; paging register
;~~~~~~~~~~~~~~~~~~~~~~~~~~~~~~~~~~~~~~~~~~~~~~~~~~~~~~~~~~~~~~~~~~~~~~~
; FOR CRC check add:
;1.  sect RomId to .cmd file
;2.  add load commands in bottom of file .
;2a. del "format IEEE" from .cmd file.
;3.  compile main.c with "#define CRC_COMPUTE".
;4.  read the CRC result from var. Loop in main on break point.
;5.  NOTE: the IdRom is untill addr. 0x80000 in MLB-E card on XRAY.
;          to be changed in CRC.c the const of : TOP_OF_ROM.
;~~~~~~~~~~~~~~~~~~~~~~~~~~~~~~~~~~~~~~~~~~~~~~~~~~~~~~~~~~~~~~~~~~~~~~~

;public  ????STACKTOP=$7fff0
;resmem  $7f800,$800       ; reserve stack area
public   ????STACKTOP=$6fff0
resmem   $6f800,$800       ; reserve stack area
;sect    RomId=$7f98c
;~~~~~~~~~~~~~~~~~~~~~~~~~~~~~~~~~~~~~~~~~~~~~~~~~~~~~~~~~~~~~~~~~~~~~~~
;~~~~~~~~~~~~~~~~~~~~~~~~~~~~~~~~~~~~~~~~~~~~~~~~~~~~~~~~~~~~~~~~~~~~~~~ resmem   $70000,$f7ff      ; for SONIC descriptors -
```

```
4/5/93 12:33 PM     YARIN'S DISKET:untitled folder:TRM2.CMD.§         Page 2
       ; protect this part of mem from linker sect    code=$60000     ; in XRAY mode (DOWN LOAD to RAM)
public _ptrRNet_DrvHdrTrs= $2000
public _ptrRNet_DrvHdrRcv= $2004
sect    vars=$2100
order code,initfini,const,literals,strings   ; ROM sections
order ??INITDATA                ; ROM section for init values
order vars,zerovars,ioports,heap     ; RAM sections
;--------------------------------

START = $60000

;--------------------------------
; If using A5-relative data addressing, enable the next 2 lines:
;
;   index ?a5,vars,$8000 ; A5 will be pointed to sect vars in entry
;   load  /usr/mri/lib/mcc68ka5XX.lib   ; Modify to access correct library
;
; If using run-time initialization of RAM, enable the next 3 lines (also need
; to recompile csys68k.c using the command line switch "-D_INITDATA".):
;
;               ; put init values in ??INITDATA
;   initdata vars
;   load    csys68k.o    ; modify to call __initcopy
;   load        /usr/mri/lib mcc68kXX.lib   ; Modify to access correct library
;
; If re-entrant libraries are required, enable the next set of commands.
; Remove the "order" commands above.  Adjust the value of ????STACKSIZE to
; reflect the amount of memory required by the stack. Modify entry.s
; according to instruction in that file. If using run-time initialization of
; RAM, the initdata command must be made active, if not, the initdata command
; should not be used.  Also, if run-time initialization of RAM is used,
; csys68k.c must to be recompiled using the command line switch "-D_INITDATA".
;
;   public   ????STACKSIZE=$1000     ; size of stack
;   merge A5    vars,zerovars
;   index ?A5,A5,$8000
;               ; initialize data in A5 section
;   initdata vars
;
;   order vars          ; address of vars will be 0
;   order literals,strings,const,code    ; ROM sections
;   order ??INITDATA         ; ROM section for init values
;   order ioports,heap          ; RAM sections
;
;   load obj\entry.obj          ; modify according to
;                ; instructions in entry.s
;   load csys68k.o     ; recompile w. "-D_INITDATA" switch
;   load /usr/mri/lib/mcc68ka5XX.lib   ; Modify to load correct library ;~~~~~~~~~~~~~~~~~~~~~~~~~~~~~~~~~~~~
; FOR CRC check add: sect RomId to .cmd file
;~~~~~~~~~~~~~~~~~~~~~~~~~~~~~~~~~~~~
;load \decromc\decrom.obj
;load \decromc\crc.obj
;~~~~~~~~~~~~~~~~~~~~~~~~~~~~~~~~~~~~
;~~~~~~~~~~~~~~~~~~~~~~~~~~~~~~~~~~~~ load obj\mn32b.obj
load obj\snc32b1.obj
```

4/5/93 12:33 PM     YARON'S DISKET:untitled folder:TRM2.CMD.§        Page 1

```
load obj\sr32b2.obj
load obj\prtcl1.obj
load obj\utils32b.obj
load obj\stst32c.obj
;load obj\smlt.obj
load \mcc68k\68020\mcc68kab.lib
;--------- END -----------------
```

APPENDIX C

```
Version NOTES:
cardcon sE/rE51- as verif with:-
    1. debugStr, dcReport were canceled.
cardcon sE/rE51- as verif with:-
    1. in receive: dataPtr was initialized.
cardcon sE.rE53- as verif with:-
    1. virtual memory & data cache locked.
cardcon sE/rE53- as verif with:-
    1. virtual memory & data cache correction by liran.
**)

PROGRAM UNothing;

{$MC68020-}                               { The main program must be universal code }
{$MC68881-}

USES
        { + MacApp }
        Packages,
        Resources,
        Files,
        Errors,
        Traps,   { GF Addition }
        Memory,  { GF Addition }

UMacApp,
        UPrinting,
        UTEView,
        UDialog,
        UList,
        UDebug, { + Implementation Use }
        Fints;

CONST kSignature       = 'CARD';              { Application signature. }
        kFileType        = 'TEXT';              { File-type code used for document files
                                                  created by this application }
        kAlertTheUserViewID = 10000;

kDataFork        = 1;
        kResourceFork    = 2;

kFSRead          = 1;
        kPBRead          = 3;

kFSWrite         = 2;
        kPBWrite         = 4;

kSendTest        = 4096;
        kRecvTest        = 4097;

kCardTransAddress     = $FE010000;
        kCardRecvBuf1Address  = $FE020004;
        kCardRecvBuf1Address  = $FE040000;

kTooBad          = -999;  { GF Addition }

TYPE

TwoAddrRec = RECORD
            phAddr : Handle;
            lgAddr : Handle;
        END;

PACKETHEADER = RECORD
            blockSize         : LONGINT;
            enableTransmission: LONGINT;
            resArray          : ARRAY [1..16] OF LONGINT;
            endTransArray     : ARRAY [1..6] OF LONGINT;
        END;
        PACKETHEADERPtr = ^PACKETHEADER;

TFCDriver = OBJECT (TApplication)
            PROCEDURE TFCDriver.INothingApplication(itsMainFileType: OSType);
            FUNCTION  TFCDriver.DoMakeDocument(itsCmdNumber: CmdNumber): TDocument; OVERRIDE;
            PROCEDURE TFCDriver.DoSetupMenus; OVERRIDE;
            FUNCTION  TFCDriver.DoMenuCommand(aCmdNumber: CmdNumber): TCommand; OVERRIDE;
            PROCEDURE TFCDriver.SFGetParms(itsCmdNumber: CmdNumber;
                                          VAR dlgID: integer;
                                          VAR where: Point;
                                          VAR fileFilter, dlgHook, filterProc: ProcPtr;
                                          typeList: TypeListHandle); OVERRIDE;

PROCEDURE TFCDriver.DoSendTest(itsOpenCmd: CmdNumber; anAppFile: AppFile);
            PROCEDURE TFCDriver.LoReport(name : Str255; volRefnum : INTEGER ; fork, method : INTEGER; count, opTime : LONGINT);
            PROCEDURE TFCDriver.Free; OVERRIDE;
        END;

TNothingDocument = OBJECT (TDocument)
            fhPB:           HParamBlockRec;
            fhPBErr:        OSErr;
            fDataForkSize:  LONGINT;
            fBuffHdl:       TwoAddrRec;
            fBuffHdl:       TwoAddrRec;
            fHeaderLen:     INTEGER;
            fDataLen:       LONGINT;
            fReportType:    BOOLEAN;
            fBufferToCard:  INTEGER;
            fBufferToRead:  INTEGER;
            fInTransmit:    BOOLEAN;

PROCEDURE TNothingDocument.IDocument(itsFileType, itsCreator: OSType)
```

```
                             usesDataFork, usesRsrcFork: BOOLEAN;
                             keepsDataOpen, keepsRsrcOpen: BOOLEAN); OVERRIDE;
         PROCEDURE TNothingDocument.SetDocType(reportDoc: BOOLEAN);

PROCEDURE TNothingDocument.DoMakeViews(forPrinting: BOOLEAN); OVERRIDE;
         PROCEDURE TNothingDocument.DoNeedDiskSpace(VAR dataForkBytes, rsrcForkBytes: LONGINT); OVERRIDE;

PROCEDURE TNothingDocument.DoRead(aRefNum: INTEGER; rsrcExists, forPrinting: BOOLEAN); OVERRIDE;
         PROCEDURE TNothingDocument.DoWrite(aRefNum: INTEGER; makingCopy: BOOLEAN); OVERRIDE;

PROCEDURE TNothingDocument.DoFSRead(aRefNum: INTEGER; VAR count, fsTime : LONGINT; rsrcExists: BOOLEAN);
         PROCEDURE TNothingDocument.DoPBRead(aRefNum: INTEGER; VAR count, fsTime : LONGINT; rsrcExists: BOOLEAN);
         PROCEDURE TNothingDocument.DoFSWrite(aRefNum: INTEGER; VAR count, fsTime : LONGINT);
         PROCEDURE TNothingDocument.DoPBWrite(aRefNum: INTEGER; VAR count, fsTime : LONGINT);

FUNCTION  TNothingDocument.GetPhysicalAddr(fullAddr: Handle;
                             count: LongInt): OSErr;  { GP Addition }
         PROCEDURE TNothingDocument.WaitForCard(VAR fsTime : LONGINT);
         PROCEDURE TNothingDocument.CallCard;

PROCEDURE TNothingDocument.DoReport(name : Str255; volRefnum : INTEGER ; fork, method : INTEGER; count, opTime : LONGINT);
         PROCEDURE TNothingDocument.Free; OVERRIDE;
         END;

TReportDocument = OBJECT (TNothingDocument)
         PROCEDURE TReportDocument.Save(itsCmdNumber: CmdNumber;
                             askForFilename, makingCopy: BOOLEAN); OVERRIDE;
         FUNCTION TReportDocument.GetTheFileName(itsCmdNumber: CmdNumber;
                             makingCopy: BOOLEAN;
                             VAR filename: Str255;
                             VAR volRefnum: INTEGER): BOOLEAN;

PROCEDURE TReportDocument.DoRead(aRefNum: INTEGER; rsrcExists, forPrinting: BOOLEAN); OVERRIDE;
         PROCEDURE TReportDocument.DoWrite(aRefNum: INTEGER; makingCopy: BOOLEAN); OVERRIDE;

PROCEDURE TReportDocument.DoReport(name : Str255; volRefnum : INTEGER ; fork, method : INTEGER; count, opTime : LONGINT); OVER
         PROCEDURE TReportDocument.SFPutParms(itsCmdNumber: CmdNumber;
                             VAR dlgID: INTEGER;
                             VAR where: Point;
                             VAR defaultName, prompt: Str255;
                             VAR dlgHook, filterProc: ProcPtr); OVERRIDE;

END;

{ I M P L E M E N T A T I O N }
VAR
    gNothingApplication : TFCDriver;       { The application object }
    gReportDoc          : TReportDocument;

{--------------------------------------------------------------------------------}
{*
** Alert the user
*}
PROCEDURE AlertTheUser(aStr : Str255);

BEGIN
    SysBeep(11);

ParamText(aStr, '', '', '');
    StdAlert(kAlertTheUserViewID);
    gInhibitNestedHandling := FALSE;           { Used suppress nested event handling }
    ResetAlrtStage;
END;
{--------------------------------------------------------------------------------}

PROCEDURE TFCDriver.INothingApplication(itsMainFileType: OSType);

VAR
    aReportDoc  : TReportDocument;
    name, volRefnum : Str255;

BEGIN
    IApplication(itsMainFileType);

New(aReportDoc);
    FailNIL(aReportDoc);
    aReportDoc.SetDocType(TRUE);
    aReportDoc.IDocument(kFileType, kSignature, kUsesDataFork, NOT kUsesRsrcFork, NOT kDataOpen, NOT kRsrcOpen);
    gReportDoc := aReportDoc;

gReportDoc.Save(cSave, TRUE, TRUE);
    { So the linker doesn't dead strip class info }
    IF gDeadStripSuppression THEN
        BEGIN
            IF Member(TObject(NIL), TFCDriver) THEN ;
            IF Member(TObject(NIL), TNothingDocument) THEN ;
            IF Member(TObject(NIL), TReportDocument) THEN ;
        END;
END;
{--------------------------------------------------------------------------------}
PROCEDURE TFCDriver.Free; OVERRIDE;

VAR
    dataRefnum  : INTEGER;
    rsrcRefnum  : INTEGER;
    volRefnum   : INTEGER;
    err         : OSErr;

BEGIN
    dataRefnum  := gReportDoc.fDataRefnum;
    rsrcRefnum  := gReportDoc.fRsrcRefnum;
    volRefnum   := gReportDoc.fVolRefnum;

err := FlushVol(NIL, volRefnum);

err := CloseFile(dataRefnum, rsrcRefnum);
```

```pascal
        INHERITED Free;
END;
{------------------------------------------------------------------------------}
PROCEDURE TFCDriver.DoSendTest(itsOpenCmd: CmdNumber;
                               anAppFile: AppFile);

VAR
        aDocument:      TDocument;
        otherDoc:       TDocument;
        oldCodeReserve, oldMemReserve: Size;
        fi:             FailInfo;

PROCEDURE HdlOpenOld(error: integer;
                         message: LONGINT);

BEGIN
        FreeIfObject(aDocument);
        aDocument := NIL;

IF message = 0 THEN
            gErrorParm3 := anAppFile.fName;
        { Set the reserve back to where it was }
        SetReserveSize(oldCodeReserve, oldMemReserve);
        FailNewMessage(error, message, msgOpenFailed);
        END;

BEGIN
    aDocument := NIL;

CatchFailures(fi, HdlOpenOld);

{ Set reserve down a little to ensure that we can open existing documents }
    GetReserveSize(oldCodeReserve, oldMemReserve);
    SetReserveSize(oldCodeReserve, oldMemReserve DIV 2);

otherDoc := AlreadyOpen(anAppFile.fName, anAppFile.vRefnum);
    IF otherDoc <> NIL THEN
        BEGIN
            otherDoc.ReadFromFile(anAppFile, kForDisplay);
            otherDoc.Free;
        END
    ELSE
        BEGIN
            aDocument := DoMakeDocument(KindOfDocument(itsOpenCmd, @anAppFile));
            aDocument.ReadFromFile(anAppFile, kForDisplay);
            aDocument.Free;
        END;

Success(fi);
    END;
{------------------------------------------------------------------------------}
PROCEDURE TFCDriver.SFGetParms(itsCmdNumber: CmdNumber;
                               VAR dlgID: integer;
                               VAR where: Point;
                               VAR fileFilter, dlgHook, filterProc: ProcPtr;
                               typeList: TypeListHandle); OVERRIDE;

VAR
        dlgTemplate:    DialogTHndl;
        dialogRect:     Rect;

BEGIN
    dlgID := getDlgID;

{ compute the top-left location of the dialog }
    dlgTemplate := DialogTHndl(GetResource('DLOG', dlgID));
    IF dlgTemplate <> NIL THEN
        BEGIN
        dialogRect := dlgTemplate^^.boundsRect;
        CenterRectOnScreen(dialogRect, TRUE, TRUE, TRUE);
        where := dialogRect.topLeft;
        END
    ELSE
        SetPt(where, 100, 100);

fileFilter := NIL;
    dlgHook := NIL;
    filterProc := NIL;
    SetHandleSize(Handle(typeList), 0);
    FailMemError;
    END;
{------------------------------------------------------------------------------}
{*
** Menu commands
*}
FUNCTION TFCDriver.DoMenuCommand(aCmdNumber: CmdNumber):TCommand;OVERRIDE;

VAR
        anAppFile  : AppFile;
        aDoc       : TNothingDocument;
        {itsCmdNumber: CmdNumber;}

BEGIN
    CASE aCmdNumber OF
        cSendTest:
            BEGIN
                IF gApplication.ChooseDocument(cOpen, anAppFile) THEN
                    BEGIN
                        TFCDriver(gApplication).DoSendTest(cOpen, anAppFile);
                    END
                ELSE
                    BEGIN
                        SysBeep(5);
                        SysBeep(5);
                    END;
                DoMenuCommand := gNoChanges;    {return dummy command object; not Undoable}
            END;
```

```
                cRecvTest:
                    BEGIN
                        aDoc := TNothingDocument(gApplication.DoMakeDocument(cNew));
                        IF aDoc <> NIL THEN
                            BEGIN
                                aDoc.Save(cSaveAs, TRUE, TRUE);
                                aDoc.Free;
                            END
                        ELSE
                            BEGIN
                                SysBeep(5);
                                SysBeep(5);
                            END;

DoMenuCommand := gNoChanges;   {return dummy command object; not Undoable}
                    END;

cSave:
                    BEGIN
                        SysBeep(5);
                        DoMenuCommand := gNoChanges;   {return dummy command object; not Undoable}
                    END;

cFinderNew :
                    BEGIN
                        SysBeep(5);
                        DoMenuCommand := gNoChanges;   {return dummy command object; not Undoable}
                    END;

OTHERWISE                              {always do this, so other objects get a chance}
                    BEGIN
                        DoMenuCommand := INHERITED DoMenuCommand(aCmdNumber);
                    END;
            END; {case}
    END;
{----------------------------------------------------------------------------}
    PROCEDURE TFCDriver.DoSetupMenus; OVERRIDE;

BEGIN
        INHERITED DoSetupMenus;              {always do this, so other objects get chance}
        Enable(cSendTest, TRUE);
        Enable(cRecvTest, TRUE);
    END;
{----------------------------------------------------------------------------}
    FUNCTION TFCDriver.DoMakeDocument(itsCmdNumber: CmdNumber): TDocument; OVERRIDE;

VAR
            aNothingDocument:       TNothingDocument;

BEGIN
            New(aNothingDocument);
            FailNIL(aNothingDocument);
            aNothingDocument.SetDocType(FALSE);
            aNothingDocument.IDocument(kFileType, kSignature, kUsesDataFork, NOT kUsesRsrcFork, NOT kDataOpen, NOT kRsrcOpen);
            DoMakeDocument := TDocument(aNothingDocument);

END;
{----------------------------------------------------------------------------}
PROCEDURE TNothingDocument.DoNeedDiskSpace(VAR dataForkBytes, rsrcForkBytes: LONGINT);
    VAR
        hPB           : HParamBlockRec;
        freeBlks      : LONGINT;
        blkSize       : LONGINT;
        err           : OSErr;

BEGIN
        {Get information about the volume saving to}
        WITH hPB DO
            BEGIN
                ioNamePtr := NIL;
                ioVRefnum := fVolRefNum;
                ioVolIndex := 0;
            END;
        err := PBHGetVInfo(@hPB, FALSE);

IF err <> noErr THEN
            BEGIN
                SysBeep(5);
                EXIT(DoNeedDiskSpace);
            END;

{on HFS ioVFrBlk is an unsigned INTEGER; on MFS it is
         limited to a positive signed INTEGER}
        freeBlks := BAND(hPB.ioVFrBlk, $0000FFFF) - 1;    {-1 for some slop -- don't try to fill up
                                                           the disk completely}
        {compute size needed to save document}
        blkSize := hPB.ioVAlBlkSiz;

fDataForkSize := (freeBlks * blkSize * 7) DIV 10;

dataForkBytes := LONGINT(fDataForkSize);
        rsrcForkBytes := 0;
    END;

{----------------------------------------------------------------------------}
PROCEDURE TNothingDocument.DoRead(aRefNum: INTEGER; rsrcExists, forPrinting: BOOLEAN);
VAR
    readTime      : LONGINT;
    i             : INTEGER;

name          : Str255;
```

```
                volRefnum       : INTEGER;
                cInfo           : HParamBlockRec;
                aDataForkSize   : LONGINT;
                count           : LONGINT;
                headerPtr       : PACKETHEADERPtr;

err             : OSErr;

BEGIN
                LockHandleHigh(Handle(fTitle));
                name    := fTitle^;
                volRefnum := fVolRefNum;
                err := GetFileInfo(name, volRefnum, cInfo);
                IF err <> noErr THEN
                        BEGIN
                                SysBeep(5);
                                HUnlock(Handle(fTitle));
                                EXIT(DoRead);
                        END;
                HUnlock(Handle(fTitle));

fInTransmit     := TRUE;
                fhPB            := cInfo;
                aDataForkSize   := cInfo.ioFlLgLen;

count           := 1000*1024;
                fDataLen        := count;
                IF aDataForkSize >= count THEN
                        BEGIN
                        (*
                        ** Read the file content
                        *)
                        i := 2;
                        fBufferToCard   := 1;
                        fBufferToRead   := 1;

SELF.DoFSRead(aRefNum, count, readTime, rsrcExists);
                        SELF.CallCard;
                        WHILE   i <= aDataForkSize/count DO
                                BEGIN
                                        SELF.DoFSRead(aRefNum, count, readTime, rsrcExists);
                                        SELF.WaitForCard(readTime);
                                        SELF.CallCard;
                                        i := i + 1;
                                END;

(*
                        ** Mark end of file (instead of reading)
                        *)
                        IF (fBufferToRead = 1) THEN
                                BEGIN
                                        headerPtr := PACKETHEADERPtr (fBuffHdl1.lgAddrs^);
                                END
                        ELSE
                                BEGIN
                                        headerPtr := PACKETHEADERPtr (fBuffHdl2.lgAddrs^);
                                END;
                        headerPtr^.blockSize            := 0;
                        headerPtr^.enableTransmission   := 1;

SELF.WaitForCard(readTime); (* wait for last block to read *)
                        SELF.CallCard;              (* to read EOF *)
                        SELF.WaitForCard(readTime); (* wait for EOF read *)
                        END;
        END;
{--------------------------------------------------------------------------------}
PROCEDURE TNothingDocument.DoFSRead(aRefNum: INTEGER; VAR count, fsTime : LONGINT; rsrcExists: BOOLEAN);
VAR
        err             : OSErr;
        headerPtr       : PACKETHEADERPtr;
        dataPtr         : Ptr;
        cardAddressHdl  : Handle;

BEGIN
        IF (fBufferToRead = 1) THEN
                BEGIN
                        headerPtr       := PACKETHEADERPtr (fBuffHdl1.lgAddrs^);
                        dataPtr         := Ptr(ORD(fBuffHdl1.lgAddrs^) + fHeaderLen);
                        fBufferToRead   := 2;
                END
        ELSE
                BEGIN
                        headerPtr       := PACKETHEADERPtr (fBuffHdl2.lgAddrs^);
                        dataPtr         := Ptr(ORD(fBuffHdl2.lgAddrs^) + fHeaderLen);
                        fBufferToRead   := 1;
                END;
        err             := FSRead(aRefNum, count, dataPtr);

(*
        ** Fill header with the data size.
        *)
        headerPtr^.blockSize            := count;
        headerPtr^.enableTransmission   := 1;
        fsTime                          := TickCount;

IF err <> noErr THEN
                BEGIN
                END
        ELSE
                BEGIN
                END;
END;
{--------------------------------------------------------------------------------}
PROCEDURE TNothingDocument.CallCard;

VAR
        err             : OSErr;
        headerPtr       : PACKETHEADERPtr;
        cardAddressHdl  : Handle;
```

```
BEGIN
    IF (fBufferToCard = 1) THEN
        BEGIN
            headerPtr   := PACKETHEADERPtr (fBuffHdl1.pzAddrs^);
            fBufferToCard := 2;
        END
    ELSE
        BEGIN
            headerPtr   := PACKETHEADERPtr (fBuffHdl1.phAddrs^);
            fBufferToCard := 1;
        END;

(*
    ** Tell the card about the address
    **   of the block.
    *)
    cardAddressHdl      := Handle (hCardTransAddress);
    cardAddressHdl^     := Ptr (headerPtr);
END;
{-------------------------------------------------------------------------}
PROCEDURE TNothingDocument.WaitForCard(VAR fsTime : LONGINT);

VAR
    err         : OSErr;
    headerPtr   : PACKETHEADERPtr;

BEGIN
    IF (fBufferToCard = 1) THEN
        BEGIN
            headerPtr   := PACKETHEADERPtr (fBuffHdl1.lgAddrs^)
        END
    ELSE
        BEGIN
            headerPtr   := PACKETHEADERPtr (fBuffHdl1.lgAddrs^);
        END;

(*
    ** Fill header with the data size.
    *)
    WHILE headerPtr^.enableTransmission > 0 DO
        BEGIN
        END;

fsTime      := TickCount;
END;
{-------------------------------------------------------------------------}
PROCEDURE TFCDriver.DoReport(name : Str255; volRefnum : INTEGER ; fork, method : INTEGER; count, opTime : LONGINT);
BEGIN
{**
    gReportDoc.DoReport(name, volRefnum, fork, method , count, opTime);
**}
END;

{-------------------------------------------------------------------------}
PROCEDURE TNothingDocument.DoReport(name : Str255; volRefnum : INTEGER ; fork, method : INTEGER; count, opTime : LONGINT);
BEGIN
{**
    TFCDriver (gApplication).DoReport(name, volRefnum, fork, method , count, opTime);
**}
END;

{-------------------------------------------------------------------------}
PROCEDURE TNothingDocument.DoPBRead(aRefNum: INTEGER; VAR count, fsTime : LONGINT; rsrcExists: BOOLEAN);
BEGIN
END;
{-------------------------------------------------------------------------}
PROCEDURE TNothingDocument.DoPBWrite(aRefNum: INTEGER; VAR count, fsTime : LONGINT);
BEGIN
END;
{-------------------------------------------------------------------------}
PROCEDURE TNothingDocument.SetDocType(reportDoc: BOOLEAN);
BEGIN
    fReportType := reportDoc;
END;
{-------------------------------------------------------------------------}
PROCEDURE TNothingDocument.IDocument(itsFileType, itsCreator: OSType;
                                     usesDataFork, usesRsrcFork: BOOLEAN;
                                     keepsDataOpen, keepsRsrcOpen: BOOLEAN); OVERRIDE;

VAR
    BuffHdl     : Handle;
    BuffPtr     : Ptr;
    err         : OSErr;

BEGIN
    IF fReportType = FALSE THEN
        BEGIN
            (*
            ** Allocate a block for the card
            *)
            fHeaderLen  := SIZEOF(PACKETHEADER);
            fDataLen    := 1000*1024;
            BuffHdl     := NewHandleClear(fDataLen + fHeaderLen );
            FailNil(BuffHdl);
            HLock(BuffHdl);

fBuffHdl1.lgAddrs   := BuffHdl;

fBuffHdl1.phAddrs   := Handle(NewPtr(sizeof(Ptr)));
            fBuffHdl1.phAddrs^  := fBuffHdl1.lgAddrs^;
```

```
                { GP Addition }
                err := SELF.GetPhysicalAddr(fBuffHdl1.phAddrs, (DataLen + fHeaderLen ));
                IF err <> noErr THEN
                    BEGIN
                        SysBeep(5);
                        EXIT(IDocument);
                    END;
                { GP Addition }

BuffHdl       := NewHandleClear (fDataLen + fHeaderLen );
                FailNil(BuffHdl);
                HLock(BuffHdl);

fBuffHdl2.lgAddrs    := BuffHdl;

fBuffHdl2.phAddrs := Handle(NewPtr(sizeof(Ptr)));
                fBuffHdl2.phAddrs^ := fBuffHdl2.lgAddrs^;

{ GP Addition }
                err := SELF.GetPhysicalAddr(fBuffHdl2.phAddrs, (DataLen + fHeaderLen ));
                IF err <> noErr THEN
                    BEGIN
                        SysBeep(5);
                        EXIT(IDocument);
                    END;
                { GP Addition }
        END;

INHERITED IDocument(itsFileType, itsCreator, usesDataFork, usesRsrcFork, keepsDataOpen, keepsRsrcOpen);
END;

{----------------------------------------------------------------------------------}
{ GP Addition }
FUNCTION TNothingDocument.GetPhysicalAddr(fullAddr: Handle; count: LongInt): OSErr;

VAR
    table:                  LogicalToPhysicalTable;
    physicalEntryCount:     LONGINT;
    fullAddrPtr:            Ptr;
    vmError:                OSErr;

BEGIN
    IF (NOT TrapExists(_MemoryDispatch)) THEN
        GetPhysicalAddr := noErr
    ELSE
        BEGIN
            fullAddrPtr := Ptr(fullAddr^);
            vmError     := LockMemoryContiguous(fullAddrPtr, count);

IF (vmError <> noErr) THEN
                GetPhysicalAddr := vmError
            ELSE
                BEGIN
                    table.logical.address    := fullAddrPtr;
                    table.logical.count      := count;

physicalEntryCount       := sizeof(table) DIV sizeof(MemoryBlock) - 1;
                    vmError                  := GetPhysical(table, physicalEntryCount);

{ Is it Contiguous ? }
                    IF (vmError <> noERR) THEN
                        GetPhysicalAddr      := vmError
                    ELSE IF (physicalEntryCount > 1) THEN
                        GetPhysicalAddr      := kTooBad
                    ELSE
                        BEGIN
                            fullAddr^        := Ptr (table.physical[0].address);
                            GetPhysicalAddr  := vmError;
                        END;
                END;
        END;
END;
{ GP Addition }

{----------------------------------------------------------------------------------}
PROCEDURE TNothingDocument.Free;  OVERRIDE;
BEGIN
    {*
    ** Free the allocated block
    *} fBuffHdl1.lgAddrs := DisposeIfHandle(fBuffHdl1.lgAddrs);
    fBuffHdl2.lgAddrs := DisposeIfHandle(fBuffHdl2.lgAddrs);

INHERITED Free;
END;

{----------------------------------------------------------------------------------}
PROCEDURE TNothingDocument.DoMakeViews(forPrinting: BOOLEAN);OVERRIDE;
BEGIN
END;
{----------------------------------------------------------------------------------}
{*
** Read a block of 3000*1024 bytes.
*}
PROCEDURE TNothingDocument.DoWrite(aRefNum: INTEGER; makingCopy: BOOLEAN);

VAR
    err         : OSErr;
    headerPtr   : PACKETHEADERPtr;
    dataPtr     : Ptr;
    count       : LONGINT;
```

```
    total              : LONGINT;
    cardAddressHdl     : Handle;
    whichBuffer        : INTEGER;
BEGIN
    fInTransmit       := FALSE;

(*
    ** Get header with the data size.
    *)
    headerPtr   := PACKETHEADERPtr ((fBuffHdl1.lgAddrs^);
    headerPtr^.blockSize         := fDataLen;
    headerPtr^.enableTransmission := 0;

headerPtr   := PACKETHEADERPtr ((fBuffHdl1.lgAddrs^);
    headerPtr^.blockSize         := fDataLen;
    headerPtr^.enableTransmission := 0;

(*
    ** Tell the card about the addresses
    **  of the two blocks.
    *)
    cardAddressHdl    := Handle (hCardRecvBuf1Address);
    cardAddressHdl^   := Ptr (fBuffHdl1.phAddrs^);

cardAddressHdl    := Handle (hCardRecvBuf2Address);
    cardAddressHdl^   := Ptr (fBuffHdl2.phAddrs^);

whichBuffer := 1;
    total       := 0;
    dataPtr     := Ptr(ORD(fBuffHdl1.lgAddrs^) + fHeaderLen);

WHILE  headerPtr^.enableTransmission <> 2  DO
        BEGIN

WHILE  headerPtr^.enableTransmission = 0 DO
                BEGIN
                END;

(*
            ** Write to disk.
            *)
            count                      := headerPtr^.blockSize;
            total                      := total + count;

headerPtr^.blockSize       := fDataLen;
            IF (headerPtr^.enableTransmission  <> 2)  THEN
                headerPtr^.enableTransmission := 0;

IF (count > 0) THEN
            BEGIN
                err := FSWrite(aRefNum, count, dataPtr);
                IF (err <>0) THEN
                    DebugStr( '\p FSWrite error  ');
                (*
                ** Get header with the data size.
                *)
                IF (whichBuffer = 1) THEN
                    BEGIN
                        headerPtr   := PACKETHEADERPtr (fBuffHdl2.lgAddrs^);
                        dataPtr     := Ptr(ORD(fBuffHdl2.lgAddrs^) + fHeaderLen);
                        whichBuffer := 2;
                    END
                ELSE
                    BEGIN
                        headerPtr   := PACKETHEADERPtr (fBuffHdl1.lgAddrs^);
                        dataPtr     := Ptr(ORD(fBuffHdl1.lgAddrs^) + fHeaderLen);
                        whichBuffer := 1;
                    END;
            END
        END;
    headerPtr^.enableTransmission := 0;
END;

{----------------------------------------------------------------------------}
PROCEDURE TNothingDocument.DoFSWrite(aRefNum: INTEGER; VAR count, fxTime : LONGINT);

BEGIN
    END;

{----------------------------------------------------------------------------}
PROCEDURE TReportDocument.SFPutParms(itsCmdNumber: CmdNumber;
                                    VAR dlgID: INTEGER;
                                    VAR where: Point;
                                    VAR defaultName, prompt: Str255;
                                    VAR dlgHook, filterProc: ProcPtr); OVERRIDE;

BEGIN
    INHERITED SFPutParms(itsCmdNumber, dlgID, where , defaultName, prompt, dlgHook, filterProc );

prompt := 'Enter the report file name ';
END;
{----------------------------------------------------------------------------}
PROCEDURE TReportDocument.Save(itsCmdNumber: CmdNumber; askForFilename, makingCopy: BOOLEAN); OVERRIDE;
VAR
    name:        Str255;
    volRefnum:   INTEGER;
    dataRefnum:  INTEGER;
    rsrcRefnum:  INTEGER;

err:         OSErr;

BEGIN
    IF NOT GetTheFileName(itsCmdNumber, makingCopy, name, volRefnum) THEN
        EXIT(Save);
```

```
                                                                                                                    Page 1

{* ** ***************** ***** ****************** **** ****** ****** ****** ******* *}

{** ** *** ********* *****}
                           vo lRefNum,
                           fDataRefNum,
                           NOT (fResourceFork..
                           fzFBMPerm,
                           forkPerm,
                           dataRefNum,
                           rsrcRefNum);

fDataRefNum := fdcRefNum;
    fRsrcRefNum := rsrcRefnum;
    fVolRefNum  := volRefnum;
  END;

{---------------------------------------- ------------------------ ------------------------------}
  {*
  ** Report the following (for each read)
  ** File Name; Fork; file size; Buf size; Ticks
  *}
  PROCEDURE TReportDocument.DoReport(name : str255; volRefnum : INTEGER ; fork, method : INTEGER; count, opTime : LONGINT); OVERRIDE;

VAR
      row             : Str255;

opTimeStr       : Str255;
      forkStr         : Str255;
      readMethodStr:    Str255;
      countStr        : Str255;

aRefNum         : INTEGER;
      buffPtr         : Ptr;
      err             : OSErr;

BEGIN

{*
      ** Convert to ascii
      *}
      NumToString(LONGINT (count), countStr);            { the number of bytes }
      NumToString(LONGINT (opTime), opTimeStr);          { the read/write time }
      IF fork = kDataFork THEN                           { the fork }
          forkStr := 'Data Fork'
      ELSE
          forkStr := 'Rsrc Fork';

IF method = kFGRead THEN                           { the fork }
          readMethodStr := 'Chunck ready'
      ELSE IF method = kFBRead THEN
          readMethodStr := 'Chunck GONE'
      ELSE IF method = kFSWrite THEN
          readMethodStr := 'FSWrite'
      ELSE IF method = kFBWrite THEN
          readMethodStr := 'First Time'
      ELSE
          readMethodStr := 'UnKnown';
      IF fBufferToRead = 1 THEN
          name := 'Buf 1'
      ELSE
          name := 'Buf 2';

row := Concat (name, chTab, readMethodStr, chTab, countStr, 'R ', chTab, opTimeStr, chReturn);
      {*
      ** Set write mark after the logical EOF
      *}
      aRefNum := fDataRefNum;
      err     := SetFPos(aRefNum, fsFromLEOF, 0);

{*
      ** Write the data
      *}
      buffPtr := @row[1];
      count   := LENGTH(row);
      err     := FSWrite(aRefNum, count, buffPtr);
      SELF.SetChangeCount(0);
  END;

{-----------------------------------------------------------------------------------------------}
  PROCEDURE TReportDocument.DoWrite(aRefNum: INTEGER; makingCopy: BOOLEAN); OVERRIDE;
  BEGIN
  END;

{-----------------------------------------------------------------------------------------------}
  PROCEDURE TReportDocument.DoRead(aRefNum: INTEGER; rsrcExists, forPrinting: BOOLEAN); OVERRIDE;
  BEGIN
  END;

{-----------------------------------------------------------------------------------------------}
  FUNCTION TReportDocument.GetTheFileName(itsCmdNumber: CmdNumber;
                             makingCopy: BOOLEAN;
                             VAR filename: Str255;
                             VAR volRefnum: INTEGER): BOOLEAN;

VAR
      reply:          SFReply;
      dlgID:          INTEGER;
      prompt:         Str255;
      dlgLoc:         Point;
      dlgHook:        ProcPtr;
      filterProc:     ProcPtr;
      otherDoc:       TDocument;
      err:            OSErr;

BEGIN
```

```
filename := ITitle'';
SFPutFile(ssssssssssBrber, d|p|D, d|p|d, f, -id-e, p, op) d|p, s, d|tter,s,e {Update all the windows to avoid a jam in someone's file on disk.
You can't mount a disk correctly when window updates are pending.}
gApplication.UpdateAllWindows;

sFsPutFile(d,p,dcc prompt, filename  c,d;c), reply, d;p)  c;ltersn,,,

IF reply.good THEN
    BEGIN
        filename := reply.fName;
        volRefnum := reply.vRefnum;

{See if there is an open document with the same name. If there
         is, tell it we're trying to save it again which will
         ordinarily result in failure.}
        otherDoc := gApplication.AlreadyOpen(filename, volRefnum);
        IF otherDoc <> NIL THEN
            otherDoc.SaveAgainInItsOldNumber(makingCopy, SELF);

{User has already confirmed deleting target in this case.
         So trash file and get maximum disk space.}
        err := DeleteFile(@filename, volRefnum);
        IF (err <> noErr) & (err <> fnfErr) THEN
            Failure(err, 0);
        GetTheFileName := TRUE.
    END
ELSE
    BEGIN
        SysBeep(5);                       {user cancelled}
        GetTheFileName := FALSE;
    END;
END;

{----- ------------------- -------------------------- ------------------ ----------------}
{ T H E   M A I N   P R O G R A M }

BEGIN
InitUMacApp(8);                         {Initialize MacApp: 8 calls to MoreMasters
                                         We will rely on InitUMacApp automatically
                                         initializing the toolbox for us (InitToolBox)
                                         and making sure we can run in the current
                                         environment (ValidateConfiguration StdAlert).
                                         This approach, while easier, doesn't give you
                                         validation early enough for some needs. See
                                         the other examples for alternate way.
                                         If you will be using a splash screen see the
                                         Cant example for details.}
InitUPrinting;                          { Initialize the UPrinting unit;}

New(gNothingApplication);               { Allocate a new TPiDriver
                                          object.}
FailNIL(gNothingApplication);
gNothingApplication.INothingApplication(kFileType);  { Initialize that new object;} gNothingApplication.Run;                { Run the application. When it's done
                                          exit.}
END.
```

```
3/31/93 6:34 PM    105  HD:Desktop Folder:YARON:ECard Tester...:CardCon.r.§        Page 1 ifdef _____
ifndef __FILES_R__
#include "Files.r"
endif ifndef __TYPES_R__
include "Types.r"
endif ifndef __MacAppTypes__
include "MacAppTypes.r"
endif ifndef __SYSTYPES_R__
include "SysTypes.r"
endif if qTemplateViews
ifndef __ViewTypes__
#include "ViewTypes.r"
#endif
endif if qDebug
include "Debug.rsrc";
endif include "MacApp.rsrc";
include "Dialog.rsrc";

include $$shell("ObjApp")$$Shell("AppName") ".rsrc";

include "Defaults.rsrc" 'cmnu' (mApple);    /* Grab the default Apple menu */ resource 'cmnu' (mFile) {
    mFile,
    textMenuProc,
    0x7FFFFBBB,
    enabled,
    "File",
    {
        "Save",  noIcon, "S", noMark, plain, cSave;
        "Close", noIcon, "W", noMark, plain, cClose;
        "Quit",  noIcon, "Q", noMark, plain, cQuit
    }
};

include "Defaults.rsrc" 'cmnu' (mEdit);     /* Grab the default Edit menus */ resource 'cmnu' (4) {
    4,
    textMenuProc,
    0x7FFFFBBB,
    enabled,
    "Special",
    {
        /* [1] */
        "Send Test...", noIcon, "P", noMark, plain, 4000;
        /* [1] */
        "Recv Test...", noIcon, "L", noMark, plain, 4001
    }
};

resource 'MBAR' (kMBarDisplayed) { {mApple; mFile; mEdit, 4} };

resource 'SIZE' (-1) {
    saveScreen,
    acceptSuspendResumeEvents,
    enableOptionSwitch,
    canBackground,
    multiFinderAware,
    backgroundAndForeground,
    getFrontClicks,
    ignoreChildDiedEvents,
    is32BitCompatible,
    reserved,
    reserved,
    reserved,
    reserved,
    reserved,
    reserved,
    reserved,
    2746816,
    1251904
};
```

```
3/31/93 6:34 PM   105 HD:Desktop Folder:YARON:ECard Tester...:CardCon.r.§          Page 2 resource 'DITL' (10000, "Creating new #", purgeable) {
    { /* array DITLarray: 3 elements */
        /* [1] */
        {26, 30, 44, 262},
        Button {
            enabled,
            "OK"
        },
        /* [2] */
        {12, 59, 52, 293},
        StaticText {
            disabled,
            " "
        },
        /* [3] */
        {12, 17, 44, 49},
        Icon {
            disabled,
            1
        }
    }
};

resource 'ALRT' (10000, purgeable) {
    {128, 76, 205, 443},
    10000,
    { /* array: 4 elements */
        /* [1] */
        OK, visible, silent,
        /* [2] */
        OK, visible, silent,
        /* [3] */
        OK, visible, silent,
        /* [4] */
        OK, visible, silent
    }
};
```

APPENDIX D

```
Client.c                                                              Page 1
EÂÌ††Â†28†Ò¯ÒÛ†1993   22:01
```

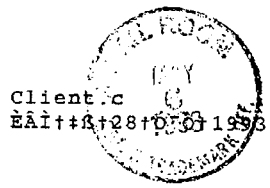

```
/*
;_____
;
;   Copyright RAN, Inc. 1990-1992
;   All rights reserved.
;
;   Created By  :   Yavin Riener          July    1992
;   Added By    :   Anat Finkelshtain     Aug     1992
;   Added By    :   Liran Eshel           Nov     1992
;   Revised By  :   Yavin Reiner          Feb     1993
;                   Implimant protocol V5
;_____
*/

/* include files */
ifdef THINK_C include    <Appletalk.h>
    #include    "RanNet.h"
    #include    "Client.h"
    #include    "RateControl.h"
    #include    <string.h>
    #include    <limits.h> else ifndef __CLIENT__
    #include "Client.h"
    #endif ifndef __ERRORS__
    #include <Errors.h>
    #endif ifndef __RANNET__
    #include "RanNet.h"
    #endif ifndef __RATECONTROL__
    #include "RateControl.h"
    #endif ifndef __STRING__
    #include <string.h>
    #endif ifndef __LIMITS__
    #include <limits.h>
    #endif endif extern Ptr  RCVCTRL();
```

```
Client.c                                                                Page 2
ÈÂÌ††ß†28†ó¯ò†1993  22:01 extern Ptr     RCVRATE();
extern Ptr     SETUPTRANSFERTIMETASK(void);
extern Ptr     SETUPCHUNKTIMETASK(void);
extern Ptr     SETUPTCTIMETASK(void);
extern void    INITRCVDATA(void);

#ifdef THINK_C
    OSErr    InitClient (void);
    OSErr    ClientOpenSession(AddrBlock serverAddress);
    void     ClientHandleOpenSessionAck(void);

void     ClientCreateFile(void);
    void     ClientStartSendingFile(void);
    OSErr    ClientHandleChunck(void);
    OSErr    ClientHandleCorrections(void);      /* TBD */ void     ClientStartSendingRateOctet(void);
    OSErr    ClientHandleOctet(void);
    void     ClientSendClosingSession(void);
    void     ClientEndClosingSession(void);
    void     ClientHandleEndOfFile(void);

Boolean  ClientCheckPacketValidity(RanControlPacket *aControlPacket);
    Boolean  ClientCheckDataPacketValidity(RanDataPacketTemplate *aDataPacket);

OSErr    ClientReportError(short what);
    OSErr    ClientSendPacket(Ptr sendPacketPtr, AddrBlock ServerAddress, int Len);
    void     ClientHandleSendErr(void);           /* TBD */
    void     ClientHandleError(OSErr Err);        /* TBD */
    void     ClientCloseFile(void);
    void     ClientProcessEOC(RanControlPacket *aControlPacket);

void     FreeTransferTime(void);
    void     ReSetTransferTime(void);
    OSErr    ClientSendDebugChunkTime(unsigned long timeToSend);

long     GetLAPType(void);

endif include   "RateControl.proto.h"

ifndef THINK_C
    #pragma segment ARanNet
#endif

/* define global vars */
extern ClientGlobals         *gClientGlobalsPtr;
extern short                 gWhoIsActive;
extern RanControlListnerPB   *gRanRateControlListnerPB;
extern RanControlListnerPB   *gRanControlListnerPB;
extern RanControlListnerPB   *gRanTransportListnerPB;
extern RanDataListnerPB      *gRanDataListnerPB;
```

```
Client.c                                                                    Page 3
ÈÂÌ‡ß†28†ó¯ò†1993  22:01 extern RanDataListnerPB     *gRanOctetListnerPB;
extern ChunkTimeTaskPtr     gOctetTimeTask;
extern ChunkTimeTaskPtr     gChunkTimeTask;
extern RanNetDebugger       gRanDebug;
extern SizeDataRec          gSizeData;
ChunkTimeTaskPtr            gTransferTimeTask;
ChunkInfo                   *CurrentChunkInfo;

OSErr InitClient (void)
{
    OSErr                   err;
    SendControlPacket       *aControlPacket,*aTarnsportPacket;
#ifdef RANEchoer
    SendControlPacket       *aRatePacket;
endif short                   myNode;
    short                   myNet;

/*
    ** Create the global.
    */
    gClientGlobalsPtr = (ClientGlobals *)NewPtrClear(sizeof(ClientGlobals));
    if (!gClientGlobalsPtr) {
        gClientGlobalsPtr = nil;
        return(memFullErr );
        } gClientGlobalsPtr->myDataAddress    = gRanDataListnerPB->MyNTEPtr->nt.nteAddre
    gClientGlobalsPtr->myOctetAddress   = gRanOctetListnerPB->MyNTEPtr->nt.nteAddr /*
    ** Create a control packet to receive/send (including data).
    */
    aControlPacket = (SendControlPacket *) NewPtrClear(sizeof(SendControlPacket));
    if (!aControlPacket) {
        DisposPtr((Ptr) gClientGlobalsPtr);
        gClientGlobalsPtr = nil;
        return(memFullErr);
        }
    gClientGlobalsPtr->aControlPacket   = aControlPacket;

/*
    ** Set the AddrBlock
    */
    aControlPacket->header.senderAddress = gRanControlListnerPB->MyNTEPtr->nt.nteAd /*
    ** Create a control packet to receive/send (including data).
    */
    aTarnsportPacket = (SendControlPacket *) NewPtrClear(sizeof(SendControlPacket));
    if (!aTarnsportPacket) {
        DisposPtr((Ptr) gClientGlobalsPtr);
```

```
Client.c                                                              Page 4
ÈÂÌt‡ßt28tó¯òt1993  22:01 gClientGlobalsPtr = nil;
            return(memFullErr);
            }
        gClientGlobalsPtr->aTransportPacket = aTarnsportPacket;

/*
        ** Set the AddrBlock
        */
        aTarnsportPacket->header.senderAddress   = gRanTransportListnerPB->MyNTEPtr->nt.nte
#ifdef RANEchoer
        /*
        ** Create a rate packet to receive/send (including data).
        */
        aRatePacket = (SendControlPacket *) NewPtrClear(sizeof(SendControlPacket));
        if (!aRatePacket) {
            DisposPtr((Ptr) aControlPacket);
            DisposPtr((Ptr) gClientGlobalsPtr);
            gClientGlobalsPtr = nil;
            return(memFullErr);
            }
        aRatePacket->header.senderAddress     = gRanControlListnerPB->MyNTEPtr->nt.nteAd
        aRatePacket->header.csCode            = kcRateReq;
        aRatePacket->header.len               = sizeof(RateControlReq);
        gClientGlobalsPtr->aRatePacket        = aRatePacket;
endif /*
        ** Set the AddrBlock
        */
        err = GetNodeAddress(&myNode, &myNet);
        if (err == noErr) {
            gClientGlobalsPtr->myDataAddress.aNet         = myNet;
            gClientGlobalsPtr->myOctetAddress.aNet        = myNet;
            aControlPacket->header.senderAddress.aNet     = myNet;
            aTarnsportPacket->header.senderAddress.aNet   = myNet;
#ifdef RANEchoer
            aRatePacket->header.senderAddress.aNet        = myNet;
#endif
            };

gClientGlobalsPtr->fileChunckBuffer   = gRanDataListnerPB->RecvDataBuf;
        gClientGlobalsPtr->chunckLen          = kChunckSize;
        gClientGlobalsPtr->Status             = kclstNA;
        gClientGlobalsPtr->transferInProgress = FALSE;

#ifndef THINK_C
        gClientGlobalsPtr->specPtr = (FSSpec *) NewPtrClear(sizeof(FSSpec));
        gClientGlobalsPtr->srcSpecPtr = (FSSpec *) NewPtrClear(sizeof(FSSpec));
        gClientGlobalsPtr->srcFolderSpecPtr = (FSSpec *) NewPtrClear(sizeof(FSSpec));

gClientGlobalsPtr->fileIsOpen = false;
#endif
```

```
    Client.c                                                            Page 5
    ÈÂÌ††ß†28†ó¯ò†1993  22:01

/*
    **   Create the Octet Time Task structuer.
    */
    gOctetTimeTask = (ChunkTimeTaskPtr) SETUPOTIMETASK();
    if(gOctetTimeTask != nil) {
        gOctetTimeTask->tmAddr        = nil;
        gOctetTimeTask->rateInterval  = LONG_MIN;
    }
    else
        return(memFullErr);

/*
    **   Create the Chunk Time Task structuer.
    */
    gChunkTimeTask = (ChunkTimeTaskPtr) SETUPCHUNKTIMETASK();
    if(gChunkTimeTask != nil) {
        gChunkTimeTask->tmAddr        = nil;
        gChunkTimeTask->rateInterval  = LONG_MIN;
    }
    else
        return(memFullErr);

/*
    **   Create the Transfer Time Task structuer.
    */
    gTransferTimeTask = (ChunkTimeTaskPtr) SETUPTRANSFERTIMETASK();
    if(gTransferTimeTask != nil) {
        gTransferTimeTask->tmAddr        = nil;
        gTransferTimeTask->rateInterval  = LONG_MIN;
    }
    else
        return(memFullErr);

CurrentChunkInfo = (ChunkInfo *) NewPtrClear (sizeof (ChunkInfo));
    if (!CurrentChunkInfo) {
        CurrentChunkInfo = nil;
        return(memFullErr);
        };

return(noErr);
} void FreeTransferTime(void)
{
    if(gTransferTimeTask != nil)
        RmvTime((QElemPtr)gTransferTimeTask);
    gTransferTimeTask = nil;
} void ReSetTransferTime(void)
{
    gTransferTimeTask->qLink        = nil;
```

Client.c                                                                  Page 6
ÈÂÌ†‡ß†28†ó¯ò†1993  22:01

```
    gTransferTimeTask->qType       = 0;
    gTransferTimeTask->tmCount     = 0;
    gTransferTimeTask->tmWakeUp    = 0;
    gTransferTimeTask->tmReserved  = 0;
    gTransferTimeTask->rateInterval = LONG_MIN;
}

/*
**  Open a session
**
**  1. Activate the client code, and zero session id (gWhoIsActive=kClient)
**  2. Send suggested buffer size, and client data socket address.
**  3. Change status to kcBecomingAClient.
**  4. Send the clientFS, fullFileName and folderTransfr.
**
*/
#ifndef THINK_C
OSErr   ClientOpenSession(AddrBlock serverAddress, char * fullFileName, FSSpec* saveSp
            ScriptCode saveScriptTag, FSSpec* srcSpecPtr, Str255 volName, short alread
#else
OSErr   ClientOpenSession(AddrBlock serverAddress)
#endif
{ register    ClientGlobals           *regClientGlobalsPtr;
register    SendControlPacket       *regClientControlPacket;
register    OpenSessionReqControl   *regClientControlPacketData;

OSErr   err;
FInfo   fndrInfo;
Handle  aFolderObject;

/* speed it */
    regClientGlobalsPtr   = gClientGlobalsPtr;
    regClientControlPacket = regClientGlobalsPtr->aControlPacket;

#ifndef THINK_C
    /*
    ** Set the file name and info from the user interface
    ** If the chosen item is a folder then the full path name will end with a '@'
    */
    strcpy (regClientGlobalsPtr->fileName,
            (Ptr) fullFileName);
    c2pstr(regClientGlobalsPtr->fileName);

//if (regClientGlobalsPtr->fileName[regClientGlobalsPtr->fileName[0]] == '&')
    //{
    //  memcpy(regClientGlobalsPtr->srcFolderSpecPtr, srcSpecPtr, sizeof(FSSpec));

/*
        ** Error checking should be added in the future
        */
```

Client.c                                                                                        Page 7
ÈÂÌ††ß†28†ó¯ò†1993  22:01

```
//    err = MakeNewFolderObject(aFolderObject);
//    err = GetFolderInfo(aFolderObject);

//    regClientGlobalsPtr->srcFolderObject = aFolderObject;

//}
//else
        memcpy(regClientGlobalsPtr->srcSpecPtr, srcSpecPtr, sizeof(FSSpec));

memcpy(regClientGlobalsPtr->specPtr, saveSpecPtr, sizeof(FSSpec));
    regClientGlobalsPtr->scriptTag = saveScriptTag;

memcpy(regClientGlobalsPtr->mountedVolName, volName, volName[0]-1);
    regClientGlobalsPtr->volAlreadyMounted = alreadyMounted;
#else
    /*
    **  Set the default file name.
    */
    memcpy (regClientGlobalsPtr->fileName,
            (Ptr) kFileToTransfer,
            kFileToTransferLen);
endif /*
    **  Check if the set a new chunk len if so set it
    */
    if (gSizeData.DataValid)
        regClientGlobalsPtr->chunckLen  = (long)(gSizeData.MaxPacketNum * kDataBlockSi
    else
        regClientGlobalsPtr->chunckLen  = kChunckSize;

/*
    **  Get the server address
    */
    regClientGlobalsPtr->serverControlAddress    = serverAddress;

/*
    **  Set the active entity to client.
    */
    gWhoIsActive = kClient;

/*
    **  Define client status
    */
    regClientGlobalsPtr->Status                = kclstBecomingAClient;
    regClientControlPacket->header.sessionId   = 0;    /* NA session id */

/*
    **  Send openSessionReq to the server with the proposed buffer size
    **  and the client data socket address.
    **  set the csCode, data len in the control packet.
    */
```

```
Client.c                                                                Page 8
ÈÂÏ†‡ß†28†ó¯ò†1993  22:01 regClientControlPacket->header.csCode         = kcOpenSessionReq;
        regClientControlPacket->header.len            = sizeof(OpenSessionReqControl);

regClientControlPacketData = (OpenSessionReqControl *) ®ClientControlPacket->da
        regClientControlPacketData->dataSocketAddr       = regClientGlobalsPtr->myDataAddr
        regClientControlPacketData->octetSocketAddr      = regClientGlobalsPtr->myOctetAdd
        regClientControlPacketData->transportSocketAddr  = regClientGlobalsPtr->aTransport
        regClientControlPacketData->bufferSize           = regClientGlobalsPtr->chunckLen;
        regClientControlPacketData->myLAPType            = GetLAPType();

/* sending the packet */
        regClientGlobalsPtr->sendStatus =
                        ClientSendPacket((Ptr)regClientControlPacket,
                                    regClientGlobalsPtr->serverControlAddress,
                                    regClientControlPacket->header.len + sizeof(Ra /*
        ** Check the send status and act
        */
        if (regClientGlobalsPtr->sendStatus != noErr)
            ClientHandleSendErr();
    }

/*
    ** ClientHandleOpenSessionAck
    **
    ** 1. Get the server optimal buffer size and the session id.
    ** 2. Change status to kcStartSendingOctet.
    **
    */
    void    ClientHandleOpenSessionAck(void)
    {
    register    ClientGlobals           *regClientGlobalsPtr;
    register    SendControlPacket       *regClientControlPacket,
                                        *regServerControlPacket;
                OSErr                   err;

/* speed it */
        regClientGlobalsPtr     = gClientGlobalsPtr;
        regClientControlPacket  = regClientGlobalsPtr->aControlPacket;
        regServerControlPacket  = (SendControlPacket *) gRanControlListnerPB->RecvPacketsB /*
        ** Get the final buffer size for the session,
        ** and the session id.
        */
        regClientGlobalsPtr->chunckLen                = (*(OpenSessionAckControl*)®Se
        regClientControlPacket->header.sessionId      = regServerControlPacket->header.s regClientGlobalsPtr->serverTransportAddress              = (*(OpenSessionAckControl
        regClientGlobalsPtr->aTransportPacket->header.sessionId = regServerControlPacket-> ifdef RANEchoer
```

```
Client.c                                                          Page 9
ÈÂÌ††ß†28†ó¯ò†1993  22:01 regClientGlobalsPtr->serverRateControlAddress       = (*(OpenSessionAckControl*)&r
    regClientGlobalsPtr->aRatePacket->header.sessionId  = regServerControlPacket->head
#endif

} void    ClientStartSendingRateOctet(void)
{
OSErr      err;
register   ClientGlobals          *regClientGlobalsPtr;
register   SendControlPacket      *regClientControlPacket;

/* speed it */
    regClientGlobalsPtr    = gClientGlobalsPtr;
    regClientControlPacket = gClientGlobalsPtr->aControlPacket;

/*
    ** Change the client's status
    */
    regClientGlobalsPtr->Status               = kclstRecievingOctetData;

/*
    ** Send kcStartOctetSending to the server.
    */
    regClientControlPacket->header.csCode  = kcStartOctetSending;
    regClientControlPacket->header.len     = 0;

/* sending the packet */
    regClientGlobalsPtr->sendStatus =
                        ClientSendPacket((Ptr)regClientControlPacket,
                                        regClientGlobalsPtr->serverControlAddress,
                                        regClientControlPacket->header.len + sizeof(Ra /*
    ** Check the send status and act
    */
    if (regClientGlobalsPtr->sendStatus != noErr)
        ClientHandleSendErr();
}

/*
** Open the file forks.
** Change status to kclstRecievingData.
*/
void    ClientCreateFile(void)
{
Str255     volName;
int        vRefNum;
FInfo      fndrInfo;
OSErr      err;
register   ClientGlobals          *regClientGlobalsPtr;
register   IOParam                *regPb;
```

```
Client.c                                                                  Page 10
ÈÂÌ†‡ß†28†ó¯ò†1993  22:01

/* speed it */
    regClientGlobalsPtr     = gClientGlobalsPtr;
    regPb                   = ®ClientGlobalsPtr->pb;

#ifndef THINK_C

/* create the file if it does not exist */ err = FSpGetFInfo(regClientGlobalsPtr->specPtr, &fndrInfo);
    if (err == fnfErr)
        err = FSpCreate(regClientGlobalsPtr->specPtr, '????', '????',
                    regClientGlobalsPtr->scriptTag);
    else if (err != noErr) {
        ClientHandleError(err);
        return;
        }

/* open the file */
    err = FSpOpenDF(regClientGlobalsPtr->specPtr, fsCurPerm,
                    ®ClientGlobalsPtr->fileDataRefNum);
    err = FSpOpenRF(regClientGlobalsPtr->specPtr, fsCurPerm,
                    ®ClientGlobalsPtr->fileRsrcRefNum);

regClientGlobalsPtr->fileIsOpen = true;

else err = GetVol(&volName,®ClientGlobalsPtr->volumeRefNum);
    if (err != noErr) {
        ClientHandleError(err);
        return;
        }

/* create the file if it does not exist */
    err = GetFInfo((StringPtr)regClientGlobalsPtr->fileName,
                    regClientGlobalsPtr->volumeRefNum, &fndrInfo);
    if (err == fnfErr)
        err = Create((StringPtr)regClientGlobalsPtr->fileName,
                    regClientGlobalsPtr->volumeRefNum, '????', '????');
    else if (err != noErr) {
        ClientHandleError(err);
        return;
        }

/* open the file */
    err = FSOpen((StringPtr)regClientGlobalsPtr->fileName,
                regClientGlobalsPtr->volumeRefNum,
                ®ClientGlobalsPtr->fileDataRefNum);
    if (err != noErr) {
        ClientHandleError(err);
        return;
        }
```

```
Client.c                                                                Page 11
ÈÂÌ††ß†28†ó¯ò†1993  22:01 endif
    /*
    **   Init the pb
    */
    regPb->ioCompletion                 = nil;
    regPb->ioPosMode                    = fsAtMark; /* start from current file mark */
    regPb->ioPosOffset                  = 0L;
    regClientGlobalsPtr->curFileFork    = kDataFork;
    regPb->ioRefNum                     = regClientGlobalsPtr->fileDataRefNum;
}

/*
**   Send GetFileReq to the server
*/
void    ClientStartSendingFile(void)
{
Str255      volName;
int         vRefNum;
FInfo       fndrInfo;
OSErr       err;
register    ClientGlobals       *regClientGlobalsPtr;
register    SendControlPacket   *regClientControlPacket;

/* speed it */
    regClientGlobalsPtr     = gClientGlobalsPtr;
    regClientControlPacket  = gClientGlobalsPtr->aControlPacket;

/*
    **   Set the new Client status and the block number
    */
    regClientGlobalsPtr->Status         = kClstRecievingData;
    regClientGlobalsPtr->curBlockNum    = 1;

/*
    **   Send kcStartFileSending to the server.
    **   set the csCode, data len and the file name.
    **   (the session id is set in open session call.)
    */
    regClientControlPacket->header.csCode   = kcStartFileSending;
    regClientControlPacket->header.len      = regClientGlobalsPtr->fileName[0]+1;
    memcpy (regClientControlPacket->data,
            (Ptr) regClientGlobalsPtr->fileName,
            regClientGlobalsPtr->fileName[0]+1);

/* sending the packet */
    regClientGlobalsPtr->sendStatus =
                    ClientSendPacket((Ptr)regClientControlPacket,
                                regClientGlobalsPtr->serverControlAddress,
                                regClientControlPacket->header.len + sizeof(Ra
    /*
    **   Check the send status and act
```

```
Client.c                                                                Page 12
ÈÂÌ†‡ß†28†ó¯ò†1993  22:01

*/
    if (regClientGlobalsPtr->sendStatus != noErr)
        ClientHandleSendErr();

regClientGlobalsPtr->transferInProgress = TRUE;
}

/*
**      ClientHandleCorrections
*/
OSErr   ClientHandleCorrections(void)
{
    return(noErr);
}

/*
**      Check that the octal data is correct, and then
**      send the server a rate report.
*/
OSErr   ClientHandleOctet(void)
{
register    RanDataPacketTemplate   *regDataPacket;
register    RingBuff                *regRingBuffPtr;
register    ClientGlobals           *regClientGlobalsPtr;
register    SendControlPacket       *regClientTransportPacket;
register    RateAckPacket           *regClientTransportPacketData;
            short                   csCode;
            long                    i;
            Boolean                 tooBad;
            AddrBlock               senderAddress;
            long                    *octetChunkBuffer;

/* speed it */
    regClientGlobalsPtr       = gClientGlobalsPtr;
    regClientTransportPacket  = gClientGlobalsPtr->aTransportPacket;

/*
    ** Check the validity of all rate data items in the ring.
    ** Identify the list of data items that need correction.
    */
    regRingBuffPtr = (RingBuff *) gRanOctetListnerPB->RecvPacketsBuf;
    regDataPacket  = (RanDataPacketTemplate *) regRingBuffPtr->Data;
    csCode         = regDataPacket->csCode;
    senderAddress  = regDataPacket->senderAddress;
    i              = 1;
    tooBad         = false;
    while (regRingBuffPtr->State != kEmpty) {
        /* check validity of :
        **  senderAddress,
        **  sessionId,
        **  fileFork,
        **  blockNum.
        */
```

```
           if ((i == 1) &&
               !( (regDataPacket->csCode == ksGetFirstOctalPacketReq) && (regDataPacket-
                   tooBad = true;
           else if ((i == kMaxOctalSeqNumber) &&
               !( (regDataPacket->csCode == ksGetLastOctalPacketReq) && (regDataPacke
                   tooBad = true;
           else if ((regDataPacket->csCode == ksGetNextOctalPacketReq &&
                (regDataPacket->seqNum != i))
                   tooBad = true;
           if (!(
                ((regDataPacket->senderAddress.aNet)    == (regClientGlobalsPtr->serverTransp
                ((regDataPacket->senderAddress.aNode)   == (regClientGlobalsPtr->serverTrans
                ((regDataPacket->senderAddress.aSocket) == (regClientGlobalsPtr->serverTra
                ))
                   tooBad = true;
           if (regDataPacket->sessionId != regClientGlobalsPtr->aTransportPacket->header.
                   tooBad = true;
           if (regDataPacket->fileFork != kOctetFork)
                   tooBad = true;
           if (regDataPacket->blockNum != kOctetBlockNum)
                   tooBad = true;

regRingBuffPtr->State    = kEmpty;    /* set it to kEmpty */

/* go to next data header */
           regRingBuffPtr  = regRingBuffPtr->next;
           regDataPacket   = (RanDataPacketTemplate *) regRingBuffPtr->Data;
           i++;
       };

/*
       ** Set the new client status
       */
       regClientGlobalsPtr->Status              = kClstWaitingForClockSync;

/*
       ** Update the RecvPacketsBuf pointer
       ** to the next item to process.
       */
       gRanOctetListnerPB->RecvPacketsBuf       = regRingBuffPtr;
       gRanOctetListnerPB->RcvPacketCount       = kWaitForFirst;

/*
       ** Return in case of problem, and return
       */
       if (tooBad)
           return(kTooBadErr);

/*
       ** Check the data validity
       */
       octetChunkBuffer = (long *) gRanOctetListnerPB->RecvDataBuf;
```

```
Client.c                                                                Page 14
ÈÂÌ‡‡ß†28†ó¯ò†1993  22:01
```

```c
        tooBad = *octetChunkBuffer;
        for (i = 1; i < (kMaxOctalSeqNumber*kDataBlockSize)/sizeof(long) ; i++) {
            if (*(octetChunkBuffer + i) != i)
                tooBad = true;
        }

/*
        ** Return in case of problem, and return
        */
        if (tooBad)
            return(kTooBadErr);

/*
        ** Send kcAckRate to the server.
        ** (the session id is set in open session call.)
        */
        regClientTransportPacket->header.csCode    = kcAckRate;
        regClientTransportPacket->header.len       = sizeof (RateAckPacket);

regClientTransportPacketData               = (RateAckPacket *) ®ClientTranspor
        regClientTransportPacketData->DeltaTime    = gOctetTimeTask->tmCount;

ReSetOctetTime();

/* sending the packet */
        regClientGlobalsPtr->sendStatus =
                            ClientSendPacket((Ptr)regClientTransportPacket,
                                            regClientGlobalsPtr->serverTransportAddress,
                                            regClientTransportPacket->header.len + sizeof( /*
        ** Check the send status and act
        */
        if (regClientGlobalsPtr->sendStatus != noErr)
            ClientHandleSendErr();
        else
            return(noErr);
}

/*
**      Check if got all the data items in the block.
**      Send  kcAckChunk / kcCorrectionReq
**      Set status to kcIstRecievingData
**      NOTE : divide this call into two calls : Handle and Send.
*/
OSErr   ClientHandleChunck(void)
{ register    RanDataPacketTemplate   *regDataPacket;
register    RingBuff                *regRingBuffPtr;
register    ClientGlobals           *regClientGlobalsPtr;
register    SendControlPacket       *regClientControlPacket;
register    IOParam                 *regPb;
```

```
Client.c
ÈÂÌ†‡ß†28†ó¯ò†1993  22:01                                                Page 15 short           csCode;
  static    unsigned long   totalLen = 0;
            CorrectionReq   *CorrectionReqData;
            unsigned long   seqNum;
            short           i;
            Boolean         tooBad;
            Boolean         badChunk;
            short           bitsLeftNo;
            unsigned long   bitsLeftMask;
            unsigned long   checkBitMap;
            unsigned long   clientChecksumValue;
            unsigned short  totalNumberOfPackets;

#if RanDebug && RINGDUMP
            IOParam         ioParam;
            OSErr           error;
  static    Ptr             aHeaderPtr;
  static    Boolean         first = true;
endif /* speed it */
    regClientGlobalsPtr     = gClientGlobalsPtr;
    regClientControlPacket  = gClientGlobalsPtr->aControlPacket;
    regPb                   = ®ClientGlobalsPtr->pb;

/*
    ** notify the debugger about the transfer time of the chunk
    */
#if RanDebug
    ClientSendDebugChunkTime (TimeMgr2Time(gChunkTimeTask->tmCount));
endif /*
    ** Check the validity of all data items in the ring.
    ** Identify the list of data items that need correction.
    */
    regRingBuffPtr  = (RingBuff *) gRanDataListnerPB->RecvPacketsBuf;
    regDataPacket   = (RanDataPacketTemplate *) regRingBuffPtr->Data;

regClientGlobalsPtr->curFileFork = regDataPacket->fileFork;

#if RanDebug && RINGDUMP
    error = FSDelete("\p RannetRingDump", 0);
    error = Create("\p RannetRingDump", 0, 'MPS ', 'TEXT');
    error = FSOpen("\p RannetRingDump", 0, &ioParam.ioRefNum);
    if (first) {
        aHeaderPtr      = (Ptr) gRanDataListnerPB->RecvPacketsBuf;  /* data buffer
        first = false;
    }
    ioParam.ioBuffer    = aHeaderPtr;
    ioParam.ioReqCount  = (sizeof(RingBuff) + kRanDataPacketRecSize)*(kRingMaxNumb
    ioParam.ioPosMode   = fsAtMark;
    ioParam.ioPosOffset = 0;
```

```
Client.c                                                                    Page 16
ÈÂÎ†‡ß†28†ó¯ò†1993  22:01 error = PBWrite ((ParmBlkPtr) &ioParam, false);
endif csCode       = regDataPacket->csCode;
    i            = 0;
    tooBad       = false;
    while (regRingBuffPtr->State != kEmpty) {
        /* check validity of :
        **          cscocde,
        **          senderAddress,
        **          sessionId,
        **          fileFork,
        **          and seqnum
        */ if (!(
            ((regDataPacket->senderAddress.aNet)  == (regClientGlobalsPtr->serverContr
            ((regDataPacket->senderAddress.aNode) == (regClientGlobalsPtr->serverContr
            ((regDataPacket->senderAddress.aSocket) == (regClientGlobalsPtr->serverCon
            ))
                tooBad  = true;
        if (regDataPacket->sessionId != regClientGlobalsPtr->aControlPacket->header.se
                tooBad  = true;
        if (regDataPacket->fileFork ==  kOctetFork)
                tooBad  = true;
        if (regDataPacket->blockNum != regClientGlobalsPtr->curBlockNum)
                tooBad  = true;

regRingBuffPtr->State   = kEmpty;    /* set it to kEmpty */

/*
        ** Create the "Block bit map " 2000 bit for 2000 packet
        */
        if (!tooBad) {
            seqNum = regDataPacket->seqNum - 1;
            CurrentChunkInfo->BitMap[seqNum/32] |= (0x80000000>>(seqNum%32));
            }

/* go to next data header */
        regRingBuffPtr = regRingBuffPtr->next;
        regDataPacket  = (RanDataPacketTemplate *) regRingBuffPtr->Data;
        tooBad = false;
        i ++;
    };
    /*
    ** check if the bit map is all ones. we can't check it inside the loop, because in
    ** an error and retransmition we check an old bit map
    */
    if (CurrentChunkInfo->LengthInBytes > totalLen)
        totalLen = CurrentChunkInfo->LengthInBytes;
    badChunk = false;
    checkBitMap = 0xffffffff;
    totalNumberOfPackets = CurrentChunkInfo->NumberOfPacketsInChunk;
```

```
Client.c                                                                 Page 17
ÈÂÌ†‡ß†28†ó¯ò†1993  22:01 for (i = 0 ; (i < totalNumberOfPackets / 32) && (checkBitMap == 0xffffffff) ; i +-
        checkBitMap &= CurrentChunkInfo->BitMap [i];
    if (checkBitMap == 0xffffffff) {
        /*
        ** check the last word of the bit map
        */
        bitsLeftNo = totalNumberOfPackets % 32;
        bitsLeftMask = ((1L << bitsLeftNo) - 1) << (32 - bitsLeftNo ;
        if (bitsLeftMask != CurrentChunkInfo->BitMap [i])
            badChunk = true;
        }
    else
        badChunk = true;

#if CALC_XOR
    if (!badChunk) {
        clientChecksumValue = CALC_XOR_BITMAP (regClientGlobalsPtr->fileChunckBuffer,
        if (clientChecksumValue != CurrentChunkInfo->ChecksumValue  {
            badChunk = true;
            for (i = 0 ; i <= kMaxDataItem / 32 ; i +-)
                CurrentChunkInfo->BitMap [i] = 0;
            }
        }
endif if (badChunk)
        {
        /*
        ** Send kcAckChunk to the server so it can read next chunck while
        ** I am writing to current chunck to disk.
        */
        regClientControlPacket->header.csCode   = kcCorrectionReq;
        regClientControlPacket->header.len      = sizeof(CorrectionReq);
        CorrectionReqData = (CorrectionReq *) ®ClientControlPacket->data;
        CorrectionReqData->clientChunckTime = gChunkTimeTask->tmCount;
        CorrectionReqData->goodPackets = gRanDataListnerPB->RcvPacketCount;
        CorrectionReqData->badPackets = gRanDataListnerPB->BadPacketCount;
        CorrectionReqData->numOfPackets = kMaxDataItem;
        memcpy (CorrectionReqData->bitMap,(Ptr) CurrentChunkInfo->BitMap,
                sizeof(CurrentChunkInfo->BitMap));

/* sending the packet */
        regClientGlobalsPtr->sendStatus =
                        ClientSendPacket((Ptr)regClientControlPacket,
                                        regClientGlobalsPtr->serverControlAddress,
                                        regClientControlPacket->header.len + sizeof(Ra /*
        ** Check the send status and act
        */
        if (regClientGlobalsPtr->sendStatus != noErr)
            ClientHandleSendErr();
```

```
Client.c                                                                Page 18
ÈÂÌ†‡ß†28†ó¯ò†1993  22:01

/*
        **  Define Client status
        **  If no need for corrections then the status is kclstRecievingData,
        **  otherwise the status is kclstRecievingDataCorrections
        */
        regClientGlobalsPtr->Status             = kclstRecievingData;
        gRanDataListnerPB->RecvPacketsBuf       = regRingBuffPtr;
        ReSetChunkTime();
        ;
    else {
        /*
        ** Increment the chunk num counter
        */
        regClientGlobalsPtr->curBlockNum ++;

/*
        **  Send kcAckChunk to the server so it can read next chunck while
        **  I am writing to current chunck to disk.
        */
        regClientControlPacket->header.csCode   = kcAckChunk;
        regClientControlPacket->header.len      = 0;

/* sending the packet */
        regClientGlobalsPtr->sendStatus =
                        ClientSendPacket((Ptr)regClientControlPacket,
                                    regClientGlobalsPtr->serverControlAddress,
                                    regClientControlPacket->header.len + sizeo /*
        **  Check the send status and act
        */
        if (regClientGlobalsPtr->sendStatus != noErr)
            ClientHandleSendErr();

/*
        **  Define Client status
        */
        regClientGlobalsPtr->Status             = kclstRecievingData;

gRanDataListnerPB->RcvPacketCount       = kWaitForFirst;
        gRanDataListnerPB->RecvPacketsBuf       = regRingBuffPtr;
        /*
        ** clear the chunk bit map
        */
        for (i = 0 ; i <= kMaxDataItem / 32 ; i ++)
            CurrentChunkInfo->BitMap [i] = 0;
        ReSetChunkTime();

/*
        **  Write the block to the file :
        **  1. Find which fork to write too.
        **  2. Compute the chunck length. (the
        **     sum of all the lengths in the
```

Client.c                                                                 Page 19
ÈÃÌ†‡ß†28†ó¯ò†1993  22:01

```
    **      data header.)
    */
    regPb->ioReqCount                = totalLen;
    regPb->ioBuffer                  = regClientGlobalsPtr->fileChunckBuffer;
    if (regClientGlobalsPtr->curFileFork == kDataFork)
        regPb->ioRefNum              = regClientGlobalsPtr->fileDataRefNum;
    else
        regPb->ioRefNum              = regClientGlobalsPtr->fileRsrcRefNum;

regClientGlobalsPtr->writeStatus = PBWrite  ((ParmBlkPtr) regPb, false);

/*
    **  Send kcSendNextChunk to the server, so it will
    **  continue sending data of next chunk.
    */
    regClientControlPacket->header.csCode    = kcSendNextChunk;
    regClientControlPacket->header.len       = 0;
    totalLen                                 = 0;
    /* sending the packet */
    regClientGlobalsPtr->sendStatus =
                        ClientSendPacket((Ptr)regClientControlPacket,
                                          regClientGlobalsPtr->serverControlAddress,
                                          regClientControlPacket->header.len + sizec
    } return(noErr);
}

/*
**  Send kcCloseSessionReq with the session id.
**  Change status to kclstClosingSession
*/
void    ClientSendClosingSession(void)
{
OSErr       err;
register    ClientGlobals       *regClientGlobalsPtr;
register    SendControlPacket   *regClientControlPacket;

/* speed it */
    regClientGlobalsPtr         = gClientGlobalsPtr;
    regClientControlPacket      = gClientGlobalsPtr->aControlPacket;

/*
    **  Define Client status
    */
    regClientGlobalsPtr->Status         = kclstClosingSession;

/*
    **  Send kcCloseSessionReq to the server.
    **  set the csCode.
    */
```

```
Client.c                                                                  Page 20
ÈÂÌ†‡ß†28†ó¯ò†1993  22:01 regClientControlPacket->header.csCode   = kcCloseSessionReq;
    regClientControlPacket->header.len      = 0;

/* sending the packet */
    regClientGlobalsPtr->sendStatus =
                    ClientSendPacket((Ptr)regClientControlPacket,
                                    regClientGlobalsPtr->serverControlAddress,
                                    regClientControlPacket->header.len + sizeof(Ra /*
    ** Check the send status and act
    */
    if (regClientGlobalsPtr->sendStatus != noErr)
        ClientHandleSendErr();
}

/*
** Send kcClientSessionDone.
** Change status to kSocketListner
*/
void    ClientEndClosingSession(void)
{

OSErr       err;
register    ClientGlobals       *regClientGlobalsPtr;
register    SendControlPacket   *regClientControlPacket;

/* speed it */
    regClientGlobalsPtr         = gClientGlobalsPtr;
    regClientControlPacket      = gClientGlobalsPtr->aControlPacket;

/*
    ** Define Client status
    */
    gWhoIsActive                = kSocketListner;
    regClientGlobalsPtr->Status = kclstNA;

/*
    ** Send kcClientSessionDone to the server.
    */
    regClientControlPacket->header.csCode   = kcClientSessionDone;
    regClientControlPacket->header.len      = 0;

/* sending the packet */
    regClientGlobalsPtr->sendStatus =
                    ClientSendPacket((Ptr)regClientControlPacket,
                                    regClientGlobalsPtr->serverControlAddress,
                                    regClientControlPacket->header.len + sizeof(Ra /*
    ** Check the send status and act
    */
```

```
Client.c                                                                                    Page 21
ÈÂÌ†‡ß†28†ó¯ò†1993  22:01 if (regClientGlobalsPtr->sendStatus != noErr)
            ClientHandleSendErr();
}

/*
**  Close the file.
**  Change status to kclstClosingSession
*/
void    ClientHandleEndOfFile(void)
{
    unsigned long   theTransferTime;
    TransferTimeRsp *TransferTimeData;

OSErr           err;
    register    ClientGlobals        *regClientGlobalsPtr;
    register    SendControlPacket    *regClientControlPacket;

/* speed it */
    regClientGlobalsPtr         = gClientGlobalsPtr;
    regClientControlPacket      = gClientGlobalsPtr->aControlPacket;

ClientCloseFile();

regClientGlobalsPtr->transferInProgress = FALSE;

#if RanDebug
    /*
    **  Calculate the real times
    */
    theTransferTime = TimeMgr2Time(gTransferTimeTask->tmCount);
    ReSetTransferTime();

/*
    **  Send kcTransferTime to the debugger.
    */
    regClientControlPacket->header.csCode   = kcTransferTime;
    regClientControlPacket->header.len      = sizeof(TransferTimeRsp);
    TransferTimeData = (TransferTimeRsp *) ®ClientControlPacket->data;
    TransferTimeData->theTime = theTransferTime;

/* sending the packet */
    regClientGlobalsPtr->sendStatus =
                        ClientSendPacket((Ptr)regClientControlPacket,
                                        gRanDebug.address,
                                        regClientControlPacket->header.len + sizeof(Ra
    /*
    **  Check the send status and act
    */
    if (regClientGlobalsPtr->sendStatus != noErr)
        ClientHandleSendErr();
#endif
```

```
Client.c                                                                        Page 22
ÈÂÌ††ß†28†ó¯ò†1993  22:01

}
/*
**  close the current open file.
*/
void ClientCloseFile(void)
{
    register    ClientGlobals          *regClientGlobalsPtr;

Boolean         doSetFInfo = true;

#ifndef THINK_C
    DTPBRec     aDTPBRec;
    FInfo       fndrInfo;
    short       srcDTRefNum, destDTRefNum;
    OSErr       srcErr, destErr;
endif regClientGlobalsPtr              = gClientGlobalsPtr;

ifndef THINK_C
    if (regClientGlobalsPtr->fileIsOpen)
        {
#endif
    /* data fork */
    if (regClientGlobalsPtr->fileDataRefNum != kBadFileRefNum) {
        regClientGlobalsPtr->writeStatus     = FSClose(regClientGlobalsPtr->fileDataRef
        regClientGlobalsPtr->fileDataRefNum = kBadFileRefNum;
    }
    else doSetFInfo = false;

/* resource fork */
    if (regClientGlobalsPtr->fileRsrcRefNum != kBadFileRefNum) {
        regClientGlobalsPtr->writeStatus     = FSClose(regClientGlobalsPtr->fileRsrcRef
        regClientGlobalsPtr->fileRsrcRefNum = kBadFileRefNum;
    }
    else doSetFInfo = false;

#ifndef THINK_C
    if (doSetFInfo)
        {
            if (FSpGetFInfo(regClientGlobalsPtr->srcSpecPtr, &fndrInfo) == noErr)
            {
                FSpSetFInfo(regClientGlobalsPtr->specPtr, &fndrInfo);

/* Initialize the Desktop Params Block Record */
                aDTPBRec.ioNamePtr = nil;
                aDTPBRec.ioCompletion = nil;
                aDTPBRec.ioResult = noErr;
                aDTPBRec.ioFileCreator = fndrInfo.fdCreator;
                aDTPBRec.ioTagInfo = 0L;

/* Get the Desktop VRefNum for the src file */
```

```
Client.c                                                                Page 23
ÈÂÌ†‡ß†28†ó¯ò†1993  22:01 aDTPBRec.ioVRefNum = (regClientGlobalsPtr->srcSpecPtr)->vRefNum;
                        srcErr = PBDTGetPath(&aDTPBRec);
                        srcDTRefNum = aDTPBRec.ioDTRefNum;

/* Get the Desktop VRefNum for the dest file */
                        aDTPBRec.ioVRefNum = (regClientGlobalsPtr->specPtr ->vRefNum;
                        destErr = PBDTGetPath(&aDTPBRec);
                        destDTRefNum = aDTPBRec.ioDTRefNum;

if ((srcErr == noErr) && (destErr == noErr))
                        {
                            if ((srcDTRefNum != 0) && (destDTRefNum != 0))
                            {
                                if ((aDTPBRec.ioDTBuffer = NewPtrClear(kLarge8BitIconSize)) !=
                                {
                                    for (aDTPBRec.ioIndex = 1; aDTPBRec.ioResult == noErr;
                                            aDTPBRec.ioIndex++)
                                    {
                                        aDTPBRec.ioDTRefNum = srcDTRefNum;
                                        if (PBDTGetIconInfo(&aDTPBRec, false) == noErr)
                                        {
                                            aDTPBRec.ioDTReqCount = aDTPBRec.ioDTActCount;
                                            if (PBDTGetIcon(&aDTPBRec, false) == noErr)
                                            {
                                                aDTPBRec.ioDTRefNum = destDTRefNum;
                                                PBDTAddIcon(&aDTPBRec, false);
                                            }
                                        }
                                    }
                                    DisposPtr(aDTPBRec.ioDTBuffer);
                                }
                            }
                        }
                    }
            // if it is the last file on the list:
            if (!regClientGlobalsPtr->volAlreadyMounted)
                UnmountVol(regClientGlobalsPtr->mountedVolName, (regClientGlobalsPtr->srcS
        }
endif
}

/*
**  Send the this client packet.
*/
OSErr   ClientSendPacket(Ptr sendPacketPtr, AddrBlock ServerAddress, int Len)
{
    MPPParamBlock   ClientMPP;
    WDSElement      ClientWDS[kDDPWDSSize];
    unsigned char   ClientHdr[kDDPHeaderSize];
    OSErr           err;

memset(ClientHdr, 0, (long) kDDPHeaderSize);
```

```
Client.c                                                                    Page 24
ÈÂÎ†‡ß†28†ó¯ò†1993  22:01

ClientMPP.DDPlistener       = (Ptr) RCVCTRL;
        ClientMPP.DDPsocket         = gClientGlobalsPtr->aControlPacket->header.senderAddr
        ClientMPP.DDPchecksumFlag   = false;
        ClientMPP.DDPwdsPointer     = (Ptr)ClientWDS;

BuildDDPwds((Ptr)ClientWDS, (Ptr)ClientHdr, sendPacketPtr, ServerAddress, kRanNetP err = PWriteDDP(&ClientMPP, false);
if RanDebug
        if (err == noErr) {
            if (ServerAddress.aSocket == gClientGlobalsPtr->serverControlAddress.aSocket)
                memset(ClientHdr, 0, (long) kDDPHeaderSize);

ClientMPP.DDPlistener       = (Ptr) RCVCTRL;
                ClientMPP.DDPsocket         = gClientGlobalsPtr->aControlPacket->header.se
                ClientMPP.DDPchecksumFlag   = false;
                ClientMPP.DDPwdsPointer     = (Ptr)ClientWDS;

BuildDDPwds((Ptr)ClientWDS,
                            (Ptr)ClientHdr,
                            sendPacketPtr,
                            gRanDebug.address,
                            kRanNetProtocolType, Len);

err = PWriteDDP(&ClientMPP, false);
        }
    }
endif
    return(err);
}

/*
**  Check that the session number are legal.
*/
Boolean ClientCheckPacketValidity(RanControlPacket *aControlPacket
{
    if (gClientGlobalsPtr->aControlPacket->header.sessionId == aControlPacket->session
        return(true);

return(false);
}

/*
**  Check that the session number are legal.
*/
Boolean ClientCheckDataPacketValidity(RanDataPacketTemplate *aDataPacket)
{
    if (gClientGlobalsPtr->aControlPacket->header.sessionId == aDataPacket->sessionId
        return(true);

return(false);
}
```

```
Client.c                                                                    Page 25
ÈÂÌ††ß†28†ó¯ò†1993  22:01

/*
** Handle error
*/
void    ClientHandleSendErr (void)
{
    ClientReportError (gClientGlobalsPtr->sendStatus);
} void    ClientHandleError(OSErr Err)
{
            /* TBD */
}

OSErr   ClientReportError(short what)
{
register    ClientGlobals       *regClientGlobalsPtr;
register    SendControlPacket   *regClientControlPacket;

#if RanDebug
    /* speed it */
    regClientGlobalsPtr                     = gClientGlobalsPtr;
    regClientControlPacket                  = regClientGlobalsPtr->aControlPacket;

regClientControlPacket->header.csCode   = what;
    regClientControlPacket->header.len      = 0;

regClientGlobalsPtr->sendStatus = ClientSendPacket(
                                    (Ptr) regClientControlPacket,
                                    gRanDebug.address,
                                    regClientControlPacket->header.len + sizeof(Ra
#endif
}
void    ClientProcessEOC(register RanControlPacket *aControlPacket)
{
register    EOChunk     *regReadChunkInfo;

/*
    ** copy the end fo chunk data into the CurrentChunkInfo
    */
    regReadChunkInfo = (EOChunk *)aControlPacket->data;
    CurrentChunkInfo->LengthInBytes = regReadChunkInfo->LengthInBytes;
    CurrentChunkInfo->NumberOfPacketsInChunk = regReadChunkInfo->NumberOfPacketsIn
    CurrentChunkInfo->ChecksumValue = regReadChunkInfo->ChecksumValue;

}
if RanDebug
/*
** Send the this server echo request packet.
*/
OSErr   ClientSendDebugChunkTime(unsigned long timeToSend)
{
```

```
Client.c                                                                    Page 26
ÈÂÌ†‡ß†28†ó¯ò†1993  22:01

MPPParamBlock     ClientMPP;
WDSElement        ClientWDS[kDDPWDSSize];
unsigned char     ClientHdr[kDDPHeaderSize];
OSErr             err;
long              time;

register   ClientGlobals       *regClientGlobalsPtr;
register   SendControlPacket   *regClientControlPacket;

#if RanDebug

/* speed it */
    regClientGlobalsPtr            = gClientGlobalsPtr;
    regClientControlPacket         = regClientGlobalsPtr->aControlPacket;

/*
    **  Send ksDebugRate to the debugger.
    */
    regClientControlPacket->header.csCode   = kcChunkTime;
    regClientControlPacket->header.len      = sizeof (long);
    *((long *) regClientControlPacket->data)    = timeToSend;

memset(ClientHdr, 0, (long) kDDPHeaderSize);

ClientMPP.DDPlistener       = (Ptr) RCVCTPL;
    ClientMPP.DDPsocket         = gClientGlobalsPtr->aControlPacket->header.senderAddr
    ClientMPP.DDPchecksumFlag   = false;
    ClientMPP.DDPwdsPointer     = (Ptr)ClientWDS;

BuildDDPwds((Ptr)ClientWDS,
                (Ptr)ClientHdr,
                (Ptr) regClientControlPacket,
                gRanDebug.address,
                kRanNetProtocolType,
                regClientControlPacket->header.len + sizeof(RanControlPacket));

ClientMPP.DDPchecksumFlag = false;
    ClientMPP.DDPwdsPointer = (Ptr)ClientWDS;

err = PWriteDDP(&ClientMPP, false);
    return(err);

#endif

}
endif
```

```
Server.c                                                                Page 1
ÈÂÌ†,ß†30†ó¯ò†1993  19:23

/*
;_____
;
;    Copyright RAN, Inc. 1990-1993
;    All rights reserved.
;
;    Created By :   Anat Finkelshtain    July   1992
;    Added By   :   Liran Eshel          Nov    1992
;    Changed By :   Anat Finkelshtain    Jan    1993
;                   CleanUp !
;    Revised By :   Benny Daon           Jan    1993
;                   Adding correction list !
;    Revised By :   Yavin Reiner         Feb    1993
;                   Implimant protocol V5
;_____
*/

/* include files */
ifdef THINK_C
    #include    <Appletalk.h>
    #include    "RanNet.h"
    #include    "Server.h"
    #include    <string.h>
    #include    <limits.h> include    "Client.h"
    #include    "RateControl.h"

#include    "RateControl.proto.h"
    #include    "RanNet.proto.h"
#else
    #ifndef __ERRORS__
    #include    <Errors.h>
    #endif ifndef __RANNET__
    #include "RanNet.h"
    #endif ifndef __SERVER__
    #include "Server.h"
    #endif ifndef __LIMITS__
    #include <limits.h>
    #endif ifndef __CLIENT__
    #include "Client.h"
    #endif ifndef __RATECONTROL__
    #include "RateControl.h"
```

```
Server.c                                                                Page 2
ÈÂÌ†,ß†30†ó¯ò†1993  19:23 endif ifndef __STRING__
    #include <string.h>
    #endif
endif ifndef THINK_C
pragma segment ARanNet
endif extern Ptr  RCVCTRL();
extern Ptr  RCVRATE();

extern Ptr  SETUPFIRSTTIMETASK(void);
extern Ptr  SETUPSECONDTIMETASK(void);
extern Ptr  SETUPTHIRDTIMETASK(void);

#ifndef THINK_C
OSErr MakeSharedFSSpec(char *fileName, FSSpecPtr specPtr);
endif /* prototypes */
OSErr   initServer (void);
void    ServerOpenSession(void);

void    ServerSendOctet (void);
OSErr   ServerHandleRateAck(void);
void    ServerSyncClocks(void);

OSErr   ServerOpenFile(void);
OSErr   ServerSendCloseSession(void);
OSErr   ServerStartSendingFile (void);
OSErr   ServerContinueSendingFile(void);
void    ServerGetNextChunck (void);
void    ServerSendChunck (void);
void    ServerSendEndOfFile(void);
void    ServerCloseFile(void);
void    ServerEndClosingSession(void);
void    ServerSendAbortSession(void);      /* TBD */
void    ServerHandleSendErr(void);         /* TBD */
void    ServerSendCancelRequest(void);     /* TBD */

OSErr   ServerSendPacket(Ptr sendPacketPtr, AddrBlock clientAddress, int Len);
Boolean ServerCheckPacketValidity(RanControlPacket *aControlPacket);
Boolean ServerCheckTransportPacketValidity(RanControlPacket *aTransportPacket);
void    ServerCheckDelay(short csCode);
OSErr   ServerSendEchoPacket(Ptr sendPacketPtr, AddrBlock clientAddress, int Len);
OSErr   ServerSendRateDebugPacket(void);
OSErr   ServerSendStopDebugPacket(short LastTransmitedSeqNumber,
                                  short RateReplaySeqNumber,
                                  short RetryCounter);
OSErr   ServerReportError(short what);
```

```
Server.c                                                                Page 3
ÈÂÌ†,ß†30†Ó¯Ò†1993  19:23 void     ServerSendCorrectionChunck(RanControlPacket *aControlPacket ;
Ptr      GETDATAPTRS(void);
void     ServerSendEOChunk(void);
Boolean  WaitingForOctetReplay(void);
void     ServerDebugSyncClocks(void);
OSErr    ServerSendDebugPacket(Ptr sendPacketPtr, AddrBlock clientAddress, int Len);

/* define global vars */
extern ServerGlobals          *gServerGlobalsPtr;
extern short                  gWhoIsActive;
extern RanControlListnerPB    *gRanControlListnerPB;
extern RanDataListnerPB       *gRanDataListnerPB;
extern RanDataListnerPB       *gRanOctetListnerPB;
extern RanControlListnerPB    *gRanRateControlListnerPB;
extern RanControlListnerPB    *gRanTransportListnerPB;

#if _1On1_
extern ClockTaskPtr           g4tcClockTask;
extern Boolean                g4tcClockStruck;
endif extern ClockTaskPtr           gClockTask;
extern Boolean                gClockStruck;
extern V5ParameterBlockPtr    gRatePBPtr;
extern SizeDataRec            gSizeData;

#if RanDebug
extern RanNetDebugger         gRanDebug;
#endif

TimeTaskPtr gFirstTimeTask,
            gSecondTimeTask,
            gThirdTimeTask;

#define kHightOrderBit  0x8000
#define kItemNotInUse   0x0000

/*
**  Declare, allocate and init defaults
**  The following parameters are set:
    Ptr             fileChunckBuffer;
    int             chunckLen;
*/
OSErr
initServer (void)
{
RanDataPacketTemplate    *aDataPacket,*aOctetPacket;
SendControlPacket        *aControlPacket,*aTarnsportPacket;
Ptr              tmpPtr;
short            myNode;
short            myNet;
OSErr            err;
```

```
Server.c                                                                    Page 4
ÈÂÌ†,ß†30†ó¯Ò†1993  19:23

/*
** Create the global.
*/
gFirstTimeTask = (TimeTaskPtr) SETUPFIRSTTIMETASK();
if(gFirstTimeTask != nil) {
    gFirstTimeTask->tmAddr      = nil;
}
else
    return(memFullErr);

gSecondTimeTask = (TimeTaskPtr) SETUPSECONDTIMETASK();
if(gSecondTimeTask != nil) {
    gSecondTimeTask->tmAddr     = nil;
}
else
    return(memFullErr);

gThirdTimeTask = (TimeTaskPtr) SETUPTHIRDTIMETASK();
if(gThirdTimeTask != nil) {
    gThirdTimeTask->tmAddr      = nil;
}
else
    return(memFullErr);

gServerGlobalsPtr = (ServerGlobals *) NewPtrClear(sizeof(ServerGlobals));
if (!gServerGlobalsPtr) {
    gServerGlobalsPtr = nil;
}

/*
** Create a data packet to send (including data).
*/
aDataPacket = (RanDataPacketTemplate *) NewPtrClear(sizeof(RanDataPacketTemplate))
if (!aDataPacket) {
    DisposPtr((Ptr) gServerGlobalsPtr);
    gServerGlobalsPtr = nil;
    return(memFullErr);
    }
aDataPacket->sessionId                 = 0;
aDataPacket->fileFork                  = kDataFork;
gServerGlobalsPtr->aDataPacketTemplate = aDataPacket;

/*
** Create a octet packet to send (including data).
*/
aOctetPacket = (RanDataPacketTemplate *) NewPtrClear(sizeof(RanDataPacketTemplate)
if (!aOctetPacket) {
    DisposPtr((Ptr) gServerGlobalsPtr->aDataPacketTemplate);
    DisposPtr((Ptr) gServerGlobalsPtr);
    gServerGlobalsPtr = nil;
    return(memFullErr);
    }
```

```
Server.c                                                                Page 5
ÈÂÌ†,ß†30†ó¯ò†1993  19:23 aDataPacket->sessionId                  = 0;
        aDataPacket->fileFork                   = kOctetFork;
        gServerGlobalsPtr->aOctetPacketTemplate = aOctetPacket;

/*
        **  Create a control packet to send (including data).
        */
        aControlPacket = (SendControlPacket *) NewPtrClear(sizeof(SendControlPacket));
        if (!aControlPacket) {
            DisposPtr((Ptr) gServerGlobalsPtr->aDataPacketTemplate);
            DisposPtr((Ptr) gServerGlobalsPtr->aOctetPacketTemplate);
            DisposPtr((Ptr) gServerGlobalsPtr);
            gServerGlobalsPtr = nil;
            return(memFullErr);
            }
        gServerGlobalsPtr->aControlPacket  = aControlPacket;

/*
        **  Create a transport packet to send (including data).
        */
        aTarnsportPacket = (SendControlPacket *) NewPtrClear(sizeof(SendControlPacket));
        if (!aTarnsportPacket) {
            DisposPtr((Ptr) gServerGlobalsPtr->aDataPacketTemplate);
            DisposPtr((Ptr) gServerGlobalsPtr->aOctetPacketTemplate);
            DisposPtr((Ptr) gServerGlobalsPtr->aControlPacket);
            DisposPtr((Ptr) gServerGlobalsPtr);
            gServerGlobalsPtr = nil;
            return(memFullErr);
            }
        gServerGlobalsPtr->aTarnsportPacket = aTarnsportPacket;

/*
        **  Set the AddrBlock
        */
        aDataPacket->senderAddress              = gRanControlListnerPB->MyNTEPtr->nt.nteAd
        aOctetPacket->senderAddress             = gRanTransportListnerPB->MyNTEPtr->nt.nte
        aControlPacket->header.senderAddress    = gRanControlListnerPB->MyNTEPtr->nt.nteAd
        aTarnsportPacket->header.senderAddress  = gRanTransportListnerPB->MyNTEPtr->nt.nte
        gServerGlobalsPtr->MyRateControlAddress = gRanRateControlListnerPB->MyNTEPtr->nt.n /*
        **  Set the AddrBlock
        */
        err = GetNodeAddress(&myNode, &myNet);
        if (err == noErr) {
            aDataPacket->senderAddress.aNet             = myNet;
            aOctetPacket->senderAddress.aNet            = myNet;
            aControlPacket->header.senderAddress.aNet   = myNet;
            aTarnsportPacket->header.senderAddress.aNet = myNet;
            gServerGlobalsPtr->MyRateControlAddress.aNet= myNet;
            };

gServerGlobalsPtr->fileChunckBuffer = gRanDataListnerPB->RecvDataBuf;
```

```
Server.c                                                            Page 6
ÈÂÌ†,ß†30†ó¯ò†1993  19:23 if (gSizeData.DataValid)
                gServerGlobalsPtr->chunckLen    = (long)(gSizeData.MaxPacketNum * kDataBlockSi
        else
                gServerGlobalsPtr->chunckLen    = kChunckSize;

gServerGlobalsPtr->Status               = ksvstNA;

return(noErr);
}

/*
**   Open a session
**
**   1. Activate the server code, and bump up session id (gWhoIsActive=kServer)
**   2. Get the client control and data sockets addresses, optimal buffer size and rate
**   3. Ack for open session with the final buffer size and the session id.
**
*/
void    ServerOpenSession(void)
{
register    ServerGlobals       *regServerGlobalsPtr;
register    SendControlPacket   *regServerControlPacket;
            RanControlPacket    *aClientControlPacket;
            OSErr               err;
            Size                clientBufferSize;
            short               sesionId;

/* speed it */
    regServerGlobalsPtr                 = gServerGlobalsPtr;
    regServerControlPacket              = regServerGlobalsPtr->aControlPacket;

/*
    **  Set the active entity to server.
    */
    gWhoIsActive                        = kServer;

/*
    **  Set the server status
    */
    regServerGlobalsPtr->Status         = ksvstBecomingAServer;

/*
    **  Check if the set a new chunk len if so set it
    */
    if (gSizeData.DataValid)
        regServerGlobalsPtr->chunckLen = (long)(gSizeData.MaxPacketNum * kDataBlockSi
    else
        regServerGlobalsPtr->chunckLen = kChunckSize;

sesionId                            = regServerGlobalsPtr->aDataPacketTemplate
    if (sesionId >= kMaxSessionNumber ) {
        regServerGlobalsPtr->aDataPacketTemplate->sessionId     = 1;
```

```
Server.c                                                                    Page 7
ÈÂÌt,ßt30tó¯òt1993  19:23 regServerControlPacket->header.sessionId              = 1;
        }
    else {
            regServerGlobalsPtr->aDataPacketTemplate->sessionId    = regServerGlobalsPtr-
            regServerGlobalsPtr->aOctetPacketTemplate->sessionId   = regServerGlobalsPtr-
            regServerControlPacket->header.sessionId               = regServerGlobalsPtr-
        }

/*
    ** Get the buffer size and the client address
    ** from the openSession control packet
    */
    aClientControlPacket                    = (RanControlPacket *) gRanControlList
    regServerGlobalsPtr->clientControlAddress = aClientControlPacket->senderAddress;

/*
    ** set the client echo address by copying the client control address
    ** from the openSession control packet and change the Socket to kEchoSocket
    */
    regServerGlobalsPtr->clientEchoAddress  = aClientControlPacket->senderAddress;
    regServerGlobalsPtr->clientEchoAddress.aSocket = kEchoSocket;

/*
    **  choose the smaller buffer size of the
    **  two proposed buffer size for the data exchange
    */
    clientBufferSize                    = ((OpenSessionReqControl *  aClientControlPac
    regServerGlobalsPtr->chunckLen      = (clientBufferSize < regServerGlobalsPtr->chu
                                          clientBufferSize : regServerGlobalsPtr->chunck
    /*
    **   get the client data socket address
    */
    regServerGlobalsPtr->clientDataAddress  = ((OpenSessionReqControl *) aClientContro /*
    **   get the client octet socket address
    */
    regServerGlobalsPtr->clientOctetAddress = ((OpenSessionReqControl *) aClientContro /*
    **   get the client transport socket address
    */
    regServerGlobalsPtr->clientTransportAddress = ((OpenSessionReqControl *) aClientCo /*
    **   get the client LAP type
    */
    regServerGlobalsPtr->OnLocalTalk    = (((OpenSessionReqControl *) aClientControlPa /*
    **   Send ksrstOpenSessionAck to the client
    **   with the proposed buffer size.
    **   set the csCode, data len, and session id in the control packet.
```

```
Server.c                                                                    Page 8
ÈÂÌ†,ß†30†ó¯Ò†1993  19:23

*/
    regServerControlPacket->header.csCode    = ksOpenSessionAck;
    regServerControlPacket->header.len       = sizeof (OpenSessionAckControl);
    ((OpenSessionAckControl *) regServerControlPacket->data)->bufferSize       =
    ((OpenSessionAckControl *) regServerControlPacket->data)->transportSocketAddr =
    ((OpenSessionAckControl *) regServerControlPacket->data)->rateSocketAddr   =

/* sending the packet */
    regServerGlobalsPtr->sendStatus = ServerSendPacket(
                                        (Ptr) regServerControlPacket,
                                        regServerGlobalsPtr->clientControlAddress,
                                        regServerControlPacket->header.len + sizeof(Ra /*
    ** Check the send status and act
    */
    if (regServerGlobalsPtr->sendStatus != noErr)
        ServerHandleSendErr();
}

/*
** Open the two forks of the file.
**
** The following parameters are going to be set :

char         fileName[kMaxFileNameLen];
    int          fileDataRefNum;
    int          fileRsrcRefNum;
    int          volumeRefNum;
    IOParam      pb;
    short        blockNum;
*/
OSErr   ServerOpenFile()
{
register    ServerGlobals       *regServerGlobalsPtr;
register    RanControlPacket    *aClientControlPacket;
register    IOParam             *regPb;
char        volname[255];

#ifndef THINK_C
    FSSpec      spec;
    FSSpecPtr   specPtr;
#endif

/* speed it */
    regServerGlobalsPtr         = gServerGlobalsPtr;
    regPb                       = ®ServerGlobalsPtr->pb;

/*
    ** Get the file name from the control packet
    */
#ifndef THINK_C
```

```
Server.c                                                                    Page 9
ÈÂÌ†,ß†30†ó⁻ò†1993  19:23 aClientControlPacket = (RanControlPacket *) gRanControlListenerFB->RecvPacketsBuf-memcpy (gServerGlobalsPtr->fileName,
            (Ptr) aClientControlPacket->data,
            aClientControlPacket->len);
#else
    memcpy (gServerGlobalsPtr->fileName,
            (Ptr) kFileToTransfer,
            kFileToTransferLen);
endif /*
    ** Check if file exist, and open its forks
    */
#ifndef THINK_C
    specPtr = &spec;

if ((regServerGlobalsPtr->readStatus = MakeSharedFSSpec(regServerGlobalsPtr->fileN
    {
        regServerGlobalsPtr->readStatus = FSpOpenDF(specPtr, fsRdPerm,
                            ®ServerGlobalsPtr->fileDataRefNum);
        if (regServerGlobalsPtr->readStatus == noErr)
            regServerGlobalsPtr->readStatus = FSpOpenRF(specPtr, fsRdPerm,
                                ®ServerGlobalsPtr->fileRsrcRefNum);
    }
    if (regServerGlobalsPtr->readStatus != noErr) {
        regServerGlobalsPtr->fileDataRefNum = kBadFileRefNum;
        regServerGlobalsPtr->fileRsrcRefNum = kBadFileRefNum;
        ServerSendCancelRequest();
        return(regServerGlobalsPtr->readStatus);
    } else
    GetVol( volname, ®ServerGlobalsPtr->volumeRefNum );

/* data fork */
    regServerGlobalsPtr->readStatus = FSOpen(regServerGlobalsPtr->fileName,
                                    regServerGlobalsPtr->volumeRefNum,
                                    ®ServerGlobalsPtr->fileDataRefNum);
    if (regServerGlobalsPtr->readStatus != noErr) {
        regServerGlobalsPtr->fileDataRefNum = kBadFileRefNum;
        regServerGlobalsPtr->fileRsrcRefNum = kBadFileRefNum;
        ServerSendCancelRequest();
        return(regServerGlobalsPtr->readStatus);
    }

/* resource fork */
    regServerGlobalsPtr->readStatus = OpenRF(regServerGlobalsPtr->fileName,
                                    regServerGlobalsPtr->volumeRefNum,
                                    ®ServerGlobalsPtr->fileRsrcRefNum);
    if (regServerGlobalsPtr->readStatus != noErr) {
        regServerGlobalsPtr->fileRsrcRefNum = kBadFileRefNum;
        ServerSendCancelRequest();
```

Server.c                                                                    Page 10
ÈÂÌ†,ß†30†ó¯ò†1993  19:23

```
        return(regServerGlobalsPtr->readStatus);
    }
endif return(noErr);
}

/*
**  Server Start Sending File
*/
OSErr
ServerStartSendingFile (void)
{
register    ServerGlobals    *regServerGlobalsPtr;
register    IOParam          *regPb;
short       refNum;
char        volname[255];
short       i;

/* speed it */
    regServerGlobalsPtr       = gServerGlobalsPtr;
    regPb                     = ®ServerGlobalsPtr->pb;

/*
    ** Set new status for the server
    */
    regServerGlobalsPtr->Status = ksvstWaitingForAck;

/*
    ** Set block numbers to 1, and OSErr to noErr
    */
    regServerGlobalsPtr->aDataPacketTemplate->blockNum = 0;
    regServerGlobalsPtr->readStatus                    = noErr;

/*
    ** Prepare to send the first chunck
    */
    if (regServerGlobalsPtr->fileDataRefNum != kBadFileRefNum) {
        regServerGlobalsPtr->curFileFork  = kDataFork;
        regPb->ioRefNum                   = regServerGlobalsPtr->fileDataRefNum;  /*
    }
    else {
        regServerGlobalsPtr->curFileFork  = kResourcFork;
        regPb->ioRefNum                   = regServerGlobalsPtr->fileRsrcRefNum;  /*
    }
    regPb->ioReqCount   = regServerGlobalsPtr->chunckLen;
    regPb->ioPosMode    = fsAtMark;                          /* start from current
    regPb->ioPosOffset  = 0L;
    regPb->ioCompletion = NULL;
    regPb->ioBuffer     = regServerGlobalsPtr->fileChunckBuffer; /* data buffer */

/*
    ** Read, calculate the checksum and send the first chunck
```

```
Server.c                                                                Page 11
ÈÂÌ†,ß†30†ó¯ò†1993  19:23

*/
        ServerGetNextChunck();

if (regServerGlobalsPtr->readStatus == noErr      ||
            ((regServerGlobalsPtr->readStatus == eofErr) &&
             (regServerGlobalsPtr->actualRead > 0) )           ) {
            /*
            **  There is some stuff to send
            */
            #if CALC_XOR
            gServerGlobalsPtr->ServerChunckXorValue = CALC_XOR_BITMAP(gServerGlobalsPtr->f
            #endif
            regServerGlobalsPtr->aDataPacketTemplate->blockNum ++;
            ServerSendChunck();
        }
        else {
            /* nothing to send at all */
            regServerGlobalsPtr->Status         = ksvstClosingSession;
            ServerCloseFile();
            ServerSendEndOfFile();
            return(regServerGlobalsPtr->readStatus);
        };

return(noErr);
}

/*
**  Server Continue Sending File
*/
OSErr
ServerContinueSendingFile (void)
{
register    ServerGlobals   *regServerGlobalsPtr;

/* speed it */
    regServerGlobalsPtr         = gServerGlobalsPtr;

#if FALSE
    /*
    **  Get out of here if we finished sending the file
    */
    if (regServerGlobalsPtr->Status == ksvstExpectingFileName)
        return(noErr);
endif if (regServerGlobalsPtr->readStatus == noErr      ||
        ((regServerGlobalsPtr->readStatus == eofErr) &&
         (regServerGlobalsPtr->actualRead > 0) )           ) {
        /*
        **  There is some stuff to send
        */
        regServerGlobalsPtr->aDataPacketTemplate->blockNum ++;
        ServerSendChunck();
```

```
Server.c                                                         Page 12
ÈÂÌ†,ß†30†ó¯ò†1993  19:23 return(noErr);
        }
        else {
            /* nothing to send at all */
            regServerGlobalsPtr->Status        = ksvstClosingSession;
            ServerCloseFile();
            ServerSendEndOfFile();
            return(regServerGlobalsPtr->readStatus);
        };
}

/*
**  Read the next data form the data/resource fork.
*/
void
ServerGetNextChunck (void)
{
register    ServerGlobals    *regServerGlobalsPtr;
short       i;

/* speed it */
    regServerGlobalsPtr        = gServerGlobalsPtr;

/*
    ** zero out the bit map and increment the block num
    */
    for (i = 0 ; i <= kMaxDataItem / 32 ; i++)
        gServerGlobalsPtr->BitMap[i] = 0L;

/*
    **  Read kRanDataPacketRecSize bytes past
    **  the begining of the pointer.
    */
    regServerGlobalsPtr->readStatus = PBRead ((ParmBlkPtr) ®ServerGlobalsPtr->pb ,f /*
    **  If end of data fork then start reading the
    **  resource fork, if end of resource fork then
    **  change Status to ksvstClosingSession, and return.
    */
    if ((regServerGlobalsPtr->readStatus == eofErr) &&
        (regServerGlobalsPtr->pb.ioActCount == 0)) {
        /*
        **  Read the resource fork now.
        */
        if (regServerGlobalsPtr->curFileFork == kDataFork)  {
            if (regServerGlobalsPtr->fileRsrcRefNum != kBadFileRefNum)   {
                regServerGlobalsPtr->curFileFork    = kResourcFork;
                regServerGlobalsPtr->pb.ioRefNum    = regServerGlobalsPtr->fileRsrcRef /*
                ** Read the resource fork so it could be sent
```

Server.c                                                                    Page 13
ÈÂÌ†,ß†30†ó¯ò†1993  19:23

```
                */
                regServerGlobalsPtr->readStatus = PBRead ((ParmBlkPtr) ®ServerGloba
                //  regServerGlobalsPtr->chunckLen    = kChunckSize;
                }
            /*
            **  No resource fork. No more chuncks !
            */
            else {
                //  regServerGlobalsPtr->chunckLen    = kChunckSize;
                regServerGlobalsPtr->Status       = ksvstClosingSession;
                ServerCloseFile();
                ServerSendEndOfFile();
                return;
                }
            }
        /*
        **  End of file (already read both resources)
        **  Change server Status to ksvstClosingSession
        */
        else {
            //  regServerGlobalsPtr->chunckLen    = kChunckSize;
            regServerGlobalsPtr->Status       = ksvstClosingSession;
            ServerCloseFile();
            ServerSendEndOfFile();
            return;
            }
        }
    else if ((regServerGlobalsPtr->readStatus != noErr) &&
             (regServerGlobalsPtr->readStatus != eofErr)) {
        //  regServerGlobalsPtr->chunckLen    = kChunckSize;
        ServerSendCancelRequest();
        return;
        }

/* Set chunk real len */
    regServerGlobalsPtr->actualRead = regServerGlobalsPtr->pb.ioActCount;
    //  if (regServerGlobalsPtr->pb.ioActCount > 0)
}

/*
**  Sent the octal data to determine the
**  rate delta time.
*/
void
ServerSendOctet (void)
{
short       seqNumber;
long        i;
short       numberOfPacketsInOctet;
char        headerSwap[kRanDataPacketRecSize];
register    ServerGlobals          *regServerGlobalsPtr;
register    RanDataPacketTemplate  *regOctetPacketTemplate;
```

Server.c                                                                Page 14

```c
register    RanDataBlock        *regSendDataPacket;
OSErr       Err;
TMTask      octetTimerTask;     /* measures the time to send an octet */
long        *octetChunkBuffer;

/* speed it */
    regServerGlobalsPtr                  = gServerGlobalsPtr;
    regOctetPacketTemplate               = gServerGlobalsPtr->aOctetPacketTemplate;
    regSendDataPacket                    = (RanDataBlock *) (gRanOctetListnerPB->RecvDa
    regOctetPacketTemplate->blockNum     = kOctetBlockNum;
    regOctetPacketTemplate->fileFork     = kOctetFork;
    numberOfPacketsInOctet               = kMaxOctalSeqNumber;
    octetChunkBuffer                     = (long *) gRanOctetListnerPB->RecvDataBuf;

/*
    ** Set new status for the server
    */
    regServerGlobalsPtr->status          = ksvstWaitingForRateAck;

/*
    ** Create kMaxOctalSeqNumber*512 bytes numbered from
    ** 1 to kMaxOctalSeqNumber*512/4
    */

*octetChunkBuffer = 0;

for (i = 1; i < (kMaxOctalSeqNumber*kDataBlockSize)/sizeof(long); i++) {
        *(octetChunkBuffer + i) = i;
    }

/*
    ** Triger The "FirstTimer" and
    ** Sent the first echo (t1) and wait for it to return.
    */
    gFirstTimeTask->tmCount     = 0;
    gFirstTimeTask->tmAddr      = nil;
    gFirstTimeTask->tmWakeUp    = 0;
    gFirstTimeTask->tmReserved  = 0;
    InsXTime((QElemPtr) gFirstTimeTask);
    PrimeTime((QElemPtr) gFirstTimeTask, LONG_MIN);
    ServerCheckDelay(ksFirstTimer);

for(;;) {
        if (pendingRateControl()) {
            releaseRateControlPacket();
            if ((gFirstTimeTask->qType & kHightOrderBit) != kItemNotInUse)
                continue;
            break;
        }
    }

/*
    ** Do it all over fo the second echo (t2).
```

```
Server.c                                                                Page 15
ÈÂÌ†,ß†30†ó¯ò†1993  19:23

**
*/
gSecondTimeTask->tmCount   =   0;
gSecondTimeTask->tmAddr    =   nil;
gSecondTimeTask->tmWakeUp  =   0;
gSecondTimeTask->tmReserved =  0;
InsXTime((QElemPtr) gSecondTimeTask);
PrimeTime((QElemPtr) gSecondTimeTask, LONG_MIN);
ServerCheckDelay(ksSecondTimer);

for(;;) {
    if (pendingRateControl()) {
        releaseRateControlPacket();
        if ((gSecondTimeTask->qType & kHightOrderBit) != kItemNotInUse)
            continue;
        break;
    }
}

/*
** Store the timers value.
*/
gServerGlobalsPtr->firstDeltaTime    = TimeMgr2Time(gFirstTimeTask->tmCount);
gServerGlobalsPtr->secondDeltaTime   = TimeMgr2Time(gSecondTimeTask->tmCount);

/*
**  Send first packet
*/
regOctetPacketTemplate->csCode    = ksGetFirstOctalPacketReq;
regOctetPacketTemplate->seqNum    = 1;
regOctetPacketTemplate->len       = kDataBlockSize;

/* copy the header */
memcpy((Ptr) regSendDataPacket, (Ptr) regOctetPacketTemplate, kRanDataPacketRecSiz /* send now */
regServerGlobalsPtr->sendDataPacketPtr = (SendDataPacket *) regSendDataPacket;

regServerGlobalsPtr->sendStatus = ServerSendPacket(
                                    (Ptr) regSendDataPacket,
                                    regServerGlobalsPtr->clientOctetAddress,
                                    regOctetPacketTemplate->len+kRanDataPacketRecS /*
**  Check the send status and act
*/
if (regServerGlobalsPtr->sendStatus != noErr) {
    short i = 0;
    ServerHandleSendErr();
    /*
    ** Retry loop when in excess Collsns state.
    */
    while((regServerGlobalsPtr->sendStatus == excessCollsns) && (i < kMaxReTry)) {
```

```
Server.c                                                              Page 16
ÈÂÌ†,ß†30†ó¯ò†1993   19:23 regServerGlobalsPtr->sendStatus = ServerSendPacket(
                                                (Ptr) regSendDataPacket,
                                                regServerGlobalsPtr->clientOctetAddress
                                                regOctetPacketTemplate->len);
            if (regServerGlobalsPtr->sendStatus != noErr)
                ServerHandleSendErr();
            i++;
        }
        if (i > kMaxReTry) {
            ServerReportError(kAbortSesion);
            return;
        }
    }
    /*
    ** Start timer to evaluate the time to send 7 packets with 7 gaps.
    ** Send each packet in the data Octet.
    */
    octetTimerTask.tmCount      =   0;
    octetTimerTask.tmAddr       =   nil;
    octetTimerTask.tmWakeUp     =   0;
    octetTimerTask.tmReserved   =   0;
    InsXTime((QElemPtr) &octetTimerTask);
    PrimeTime((QElemPtr) &octetTimerTask, LONG_MIN);

/*
    ** Send each packet in the data Chunck ?????
    */
    regOctetPacketTemplate->csCode = ksGetNextOctalPacketReq;
    for (seqNumber = 2; seqNumber < numberOfPacketsInOctet ; seqNumber++) {
        /* set seq number */
        regOctetPacketTemplate->seqNum              = seqNumber;

/*
        ** Swap kRanDataPacketRecSize in fileChunckBuffer
        ** with the header bytes. So the data to send
        ** will be prefixed with its header
        */
        regSendDataPacket++;
        memcpy((Ptr) headerSwap, (Ptr) regSendDataPacket, kRanDataPacketRecSize);
        memcpy((Ptr) regSendDataPacket, (Ptr) regOctetPacketTemplate, kRanDataPacketRe /* send now regSendDataPacket+offset */
        regServerGlobalsPtr->sendDataPacketPtr = (SendDataPacket *) regSendDataPacket;
        regServerGlobalsPtr->sendStatus = ServerSendPacket(
                                                (Ptr) regSendDataPacket,
                                                regServerGlobalsPtr->clientOctetAddress,
                                                regOctetPacketTemplate->len + kRanDataPack /* copy backup now */
        memcpy((Ptr) regSendDataPacket, (Ptr) headerSwap, kRanDataPacketRecSize);

/*
        ** Check the send status and act
```

Server.c                                                                                              Page 17
ÈÁÌ†‚ß†30†ó⁻ò†1993  19:23

```
        */
        if (regServerGlobalsPtr->sendStatus != noErr) {
            short i = 0;
            ServerHandleSendErr();
            /*
            ** Retry loop when in excess Collsns state.
            */
            while((regServerGlobalsPtr->sendStatus == excessCollsns  && (i < kMaxReTry
                regServerGlobalsPtr->sendStatus = ServerSendPacket
                                                       (Ptr) regSendDataPacket,
                                                       regServerGlobalsPtr->clientOctetAd
                                                       regOctetPacketTemplate->len + kRan
                if (regServerGlobalsPtr->sendStatus != noErr)
                    ServerHandleSendErr();
                i++;
            }
            if (i > kMaxReTry) {
            ServerReportError(kAbortSesion);
            return;
            }
        }
    }

/*
    ** Send reminder data in last packet
    */
    regOctetPacketTemplate->csCode  = ksGetLastOctalPacketReq;
    regOctetPacketTemplate->len     = kDataBlockSize;
    regOctetPacketTemplate->seqNum  = seqNumber;

/* backup before sending */
    regSendDataPacket++;
    memcpy((Ptr) headerSwap,(Ptr) regSendDataPacket, kRanDataPacketRecSize);
    memcpy((Ptr) regSendDataPacket, (Ptr) regOctetPacketTemplate, kRanDataPacketRecSiz /* send now regSendDataPacket+offset */
    regServerGlobalsPtr->sendDataPacketPtr = (SendDataPacket *) regSendDataPacket;
    regServerGlobalsPtr->sendStatus = ServerSendPacket(
                                        (Ptr) regSendDataPacket,
                                        regServerGlobalsPtr->clientOctetAddress,
                                        regOctetPacketTemplate->len + kRanDataPacketRe /* copy backup now */
    memcpy((Ptr) regSendDataPacket,(Ptr)  headerSwap, kRanDataPacketRecSize);

/*
    ** Check the send status and act
    */
    if (regServerGlobalsPtr->sendStatus != noErr) {
        short i = 0;
        ServerHandleSendErr();
        /*
        ** Retry loop when in excess Collsns state.
```

```
Server.c                                                                    Page 18

*/
       while((regServerGlobalsPtr->sendStatus == excessCollsns) && (i < kMaxReTry)) {
           regServerGlobalsPtr->sendStatus = ServerSendPacket(
                                       (Ptr) regSendDataPacket,
                                       regServerGlobalsPtr->clientOctetAddres
                                       regOctetPacketTemplate->len + kRanData
           if (regServerGlobalsPtr->sendStatus != noErr)
               ServerHandleSendErr();
           i++;
       }
       if (i > kMaxReTry) {
           ServerReportError(kAbortSesion);
           RmvTime((QElemPtr) &octetTimerTask);
           return;
       }
   }

RmvTime((QElemPtr) &octetTimerTask);

gServerGlobalsPtr->severOctetDeltaTime = octetTimerTask.tmCount;

}

/*
**  Determine the rate delta time.
**
*/
 OSErr  ServerHandleRateAck(void)
{
RanControlPacket  *aClientTransportPacket;
register long          clientOctetDeltaTime,
                       severOctetDeltaTime,
                       theDelte = 0;

/*
   ** Get the the rate delta time
   ** from the client's control packet
   */
   aClientTransportPacket  = (RanControlPacket *) gRanTransportListnerPB->RecvPackets
   clientOctetDeltaTime    = ((RateAckPacket *) aClientTransportPacket->data)->DeltaT /*
   **  Calculate the time used by each timer [in positive micro sec]
   */
   severOctetDeltaTime                          = TimeMgr2Time(gServerGlobalsPtr->severOct
   clientOctetDeltaTime                         = TimeMgr2Time(clientOctetDeltaTime);
   gServerGlobalsPtr->severOctetDeltaTime       = severOctetDeltaTime;
   gServerGlobalsPtr->clientOctetDeltaTime      = clientOctetDeltaTime;

/*
   **  Calculate the basic time unit used by the server
   */
   if ((clientOctetDeltaTime != 0) && (severOctetDeltaTime != 0)) {
```

```
Server.c                                                                        Page 19
ÈÂÌ†,ß†30†ó¯ò†1993   19:23 theDelte = (clientOctetDeltaTime *10) / severOctetDeltaTime;
            gServerGlobalsPtr->Tc = (
                                     (clientOctetDeltaTime > severOctetDeltaTime) ?
                                     clientOctetDeltaTime : severOctetDeltaTime
                                    );
            if (theDelte < kLowerLimit)
                gRatePBPtr->State = kFastRate;
            return(noErr);
        }
        else
            return(kTooBadErr);
}

/*
**  Sync clocks with the client
**
*/
void    ServerSyncClocks(void)
{
register    ServerGlobals       *regServerGlobalsPtr;
register    SendControlPacket   *regServerControlPacket;
register    RateSyncClockReq    *regServerControlPacketData;

/* speed it */
    regServerGlobalsPtr     = gServerGlobalsPtr;
    regServerControlPacket  = regServerGlobalsPtr->aControlPacket;

/*
    **  Set new status for the server
    */
    regServerGlobalsPtr->Status = ksvstSyncingClocks;

/*
    **  Send the sync clock request to the client.
    **  Stuff the packet with some parameters that
    **  will be printed by the RANetDebugger.
    **  [a copy of this control packet is sent to the RANetDebugger]
    */
    regServerControlPacket->header.csCode   = ksSyncClock;
    regServerControlPacket->header.len      = sizeof(RateSyncClockReq);

regServerControlPacketData = (RateSyncClockReq *) ®ServerControlPacket->data;

regServerControlPacketData->severOctetDeltaTime         = regServerGlobalsPtr->se
    regServerControlPacketData->clientOctetDeltaTime        = regServerGlobalsPtr->cl
    regServerControlPacketData->Tc                          = regServerGlobalsPtr->Tc
    regServerControlPacketData->firstDeltaTime              = regServerGlobalsPtr->fi
    regServerControlPacketData->secondDeltaTime             = regServerGlobalsPtr->se
    regServerControlPacketData->DelayLowerLimit             = gRatePBPtr->DelayLowerL
    regServerControlPacketData->MaxDelay                    = gRatePBPtr->MaxDelay;
    regServerControlPacketData->State                       = gRatePBPtr->State;
    regServerControlPacketData->tcInterPacketTimeInterval   = gRatePBPtr->tcInterPack
```

Server.c                                                                  Page 20
ÈÂÌ†,ß†30†ó¯ò†1993  19:23

```c
        regServerGlobalsPtr->sendStatus = ServerSendPacket(
                                    (Ptr) regServerControlPacket,
                                    regServerGlobalsPtr->clientControlAddress,
                                    regServerControlPacket->header.len + sizeof(Ra
        /*
        ** Check the send status
        */
        if (regServerGlobalsPtr->sendStatus != noErr)
            ServerHandleSendErr();
}
if RanDebug
/*
** tell the debugger that we have just finished an octet
**
*/
void    ServerDebugSyncClocks(void)
{
register    ServerGlobals       *regServerGlobalsPtr;
register    SendControlPacket   *regServerControlPacket;
register    RateSyncClockReq    *regServerControlPacketData;

/* speed it */
        regServerGlobalsPtr       = gServerGlobalsPtr;
        regServerControlPacket    = regServerGlobalsPtr->aControlPacket;

/*
        ** Set new status for the server
        */
        regServerGlobalsPtr->Status = ksvstSyncingClocks;

/*
        ** Send the sync clock request to the client.
        ** Stuff the packet with some parameters that
        ** will be printed by the RANetDebugger.
        ** [a copy of this control packet is sent to the RANetDebugger]
        */
        regServerControlPacket->header.csCode  = ksSyncClock;
        regServerControlPacket->header.len     = sizeof(RateSyncClockReq);

regServerControlPacketData = (RateSyncClockReq *) ®ServerControlPacket->data;

regServerControlPacketData->severOctetDeltaTime       = regServerGlobalsPtr->se
        regServerControlPacketData->clientOctetDeltaTime      = regServerGlobalsPtr->cl
        regServerControlPacketData->Tc                         = regServerGlobalsPtr->Tc
        regServerControlPacketData->firstDeltaTime             = regServerGlobalsPtr->fi
        regServerControlPacketData->secondDeltaTime            = regServerGlobalsPtr->se
        regServerControlPacketData->DelayLowerLimit            = gRatePBPtr->DelayLowerL
        regServerControlPacketData->MaxDelay                   = gRatePBPtr->MaxDelay;
        regServerControlPacketData->State                      = gRatePBPtr->State;
        regServerControlPacketData->tcInterPacketTimeInterval  = gRatePBPtr->tcInterPack regServerGlobalsPtr->sendStatus = ServerSendDebugPacket(
```

Server.c                                                                                           Page 21
ÈÂÌ†,ß†30†ó¯ò†1993  19:23

```
                                        (Ptr) regServerControlPacket,
                                        regServerGlobalsPtr->clientControlAddress,
                                        regServerControlPacket->header.len + sizeof(Ra /*
        ** Check the send status
        */
        if (regServerGlobalsPtr->sendStatus != noErr)
            ServerHandleSendErr();
}
endif
/*
**
        The following fields are define by now:
        _____
        regDataPacketTemplate->fileFork
        regDataPacketTemplate->senderAddress
        regDataPacketTemplate->sessionId The following fields are needed to be define:
        _____
        regDataPacketTemplate->blockNum
        regDataPacketTemplate->csCode
        regDataPacketTemplate->seqNum
        regDataPacketTemplate->len
**
*/
void ServerSendChunck (void)
{
short       seqNumber;
short       numberOfPacketsInChunck;
short       reminderData;
char        headerSwap[kRanDataPacketRecSize];
register    ServerGlobals              *regServerGlobalsPtr;
register    RanDataPacketTemplate      *regDataPacketTemplate;
register    Ptr                        regSendDataPacket;
OSErr       Err;
Boolean     waitingForDelayAck,newRate;
long        tcInterPacketTimeInterval;
short       TcTransmitedPacketsCounter, MaxDelay, index, transmitedPacketsNo,DelayLowe
extern      Ptr            DATAPTRS;
RanDataPtrArray *dataPtrArray;

/* speed it */
        regServerGlobalsPtr                  = gServerGlobalsPtr;
        regDataPacketTemplate                = regServerGlobalsPtr->aDataPacketTemplate;
        regDataPacketTemplate->fileFork      = regServerGlobalsPtr->curFileFork;
        dataPtrArray                         = (RanDataPtrArray *)GETDATAPTRS();

/*
        ** We want the time of single packte.
        ** Be ware from the divition of small number !!
        */
```

Server.c                                                                Page 22
ÈÀÌ†,ß†30†ó⁻ò†1993  19:23

```c
       gRatePBPtr->EarlyRateArrivalCounter = 0;
       gClockStruck              = FALSE;
       MaxDelay                  = gRatePBPtr->MaxDelay;
       DelayLowerLimit           = gRatePBPtr->DelayLowerLimit;
       tcInterPacketTimeInterval = gRatePBPtr->tcInterPacketTimeInterval * -1;

/*
       ** Empty the rate control ring. Ignore old rate messages.
       */
       while (pendingRateControl()) {
           releaseRateControlPacket();
       }
       gRatePBPtr->LastTransmitedEchoSeqNumber = 0;
       gRatePBPtr->LastTransmitedPingSeqNumber = 0;
       gRatePBPtr->PingBlockSeqNumber          = 0;

/*
       ** Calculate the number of packets to be sent
       ** WE SHOULD BETTER CHANGE THIS PART BECAUSE IT SLOWS THINGS DOWN
       */
       numberOfPacketsInChunck = 0;
       for (index = 0 ;
            (index < regServerGlobalsPtr->actualRead / kDataBlockSize) ;
            index++)
           if (!BitTst (regServerGlobalsPtr->BitMap, index))
               numberOfPacketsInChunck ++;
       if (numberOfPacketsInChunck != regServerGlobalsPtr->actualRead / kDataBlockSize)
           reminderData = 0;
       else
           reminderData = regServerGlobalsPtr->actualRead % kDataBlockSize;

/*
       ** find the first packet we need to send
       */
       for (index = 0 ;
            (index < gSizeData.MaxPacketNum) && BitTst (regServerGlobalsPtr->BitMap, inde
            index++)
            ;
       seqNumber = index + 1;
       /*
       ** Send first packet
       */
       regDataPacketTemplate->seqNum    = seqNumber;
       regSendDataPacket                = (Ptr)((*dataPtrArray)[index] - (Ptr)kRanData if (regServerGlobalsPtr->actualRead < kDataBlockSize) {
           /* so little to send */
           regDataPacketTemplate->len       = regServerGlobalsPtr->actualRead;
           regDataPacketTemplate->csCode    = ksGetLastPacketReq;
           }
       else {
           regDataPacketTemplate->len       = kDataBlockSize;
```

Server.c                                                                                                    Page 23
ÈÂÌ†,߆30†ó¯ò†1993  19:23

```
        regDataPacketTemplate->csCode     = ksGetFirstPacketReq;
    }

InsXTime((QElemPtr) gClockTask);
    PrimeTime((QElemPtr) gClockTask, tcInterPacketTimeInterval);

/* copy the header */
    memcpy((Ptr) headerSwap, regSendDataPacket, kRanDataPacketRecSize);
    memcpy(regSendDataPacket, (Ptr) regDataPacketTemplate, kRanDataPacketRecSize);

/* send now */
    regServerGlobalsPtr->sendDataPacketPtr = (SendDataPacket *) regSendDataPacket;

regServerGlobalsPtr->sendStatus = ServerSendPacket(
                                    regSendDataPacket,
                                    regServerGlobalsPtr->clientDataAddress,
                                    regDataPacketTemplate->len - kRanDataPacketRec
    /*
    ** Check the send status and act
    */
    if (regServerGlobalsPtr->sendStatus != noErr) { short i = 0;

ServerHandleSendErr();
        /*
        ** Retry loop when in excess Collsns state.
        */
        while((regServerGlobalsPtr->sendStatus == excessCollsns) && i < kMaxReTry) {
            regServerGlobalsPtr->sendStatus = ServerSendPacket(
                                    regSendDataPacket,
                                    regServerGlobalsPtr->clientDataAddress
                                    regDataPacketTemplate->len + kRanDataP
            if (regServerGlobalsPtr->sendStatus != noErr)
                ServerHandleSendErr();
            i++;
        }
        if (i > kMaxReTry) {
            ServerReportError(kAbortSesion);
            return;
        }
    }

/* copy backup now */
    memcpy(regSendDataPacket, (Ptr) headerSwap, kRanDataPacketRecSize);

while(!gClockStruck);        // wait until end of InterPacketTimeInterval

/*
    ** if only one packet in the chunk return now and save a lot of trouble deeling wi
    ** cases.
    */
```

```c
        if (numberOfPacketsInChunck <= 1) {
            ServerSendEOChunk();
            return ;
            }
    /*
    **  Send each packet in the data Chunck ??????
    */ regDataPacketTemplate->csCode   = ksGetNextPacketReq;
    transmitedPacketsNo = 2;
    while (transmitedPacketsNo < numberOfPacketsInChunck) {
        gRatePBPtr->LastTransmitedEchoSeqNumber = transmitedPacketsNo;
        ServerCheckDelay(ksFirstTimer);
        waitingForDelayAck = TRUE;
        for (ToTransmitedPacketsCounter = 0;
            (transmitedPacketsNo < numberOfPacketsInChunck) &&
            (ToTransmitedPacketsCounter < DelayLowerLimit);) {

//check for rate replay and calc new rate.
            if (waitingForDelayAck && pendingRateControl()) {
                gRatePBPtr->LastTransmitedSeqNumber = transmitedPacketsNo;
                releaseRateControlPacket();
                waitingForDelayAck   = FALSE;
            } for (index++ ;
                (index < kMaxDataItem) && BitTst (regServerGlobalsPtr->BitMap, index)
                index++);
            seqNumber = index + 1;
            regDataPacketTemplate->seqNum = seqNumber;

/*
            **  Swap kRanDataPacketRecSize in fileChunckBuffer
            **  with the header bytes. So the data to send
            **  will be prefixed with its header
            */
            regSendDataPacket = (*dataPtrArray)[index] - kRanDataPacketRecSize;
            memcpy((Ptr) headerSwap, regSendDataPacket, kRanDataPacketRecSize);
            memcpy(regSendDataPacket, (Ptr) regDataPacketTemplate, kRanDataPacketRecSi /* send now regSendDataPacket+offset */
            regServerGlobalsPtr->sendDataPacketPtr = (SendDataPacket *) regSendDataPac regServerGlobalsPtr->sendStatus = ServerSendPacket(
                                            regSendDataPacket,
                                            regServerGlobalsPtr->clientDataAddress
                                            regDataPacketTemplate->len + kRanDataP /*
            **  Check the send status and act
            */
            if (regServerGlobalsPtr->sendStatus != noErr) {
```

Server.c  Page 25

```c
        short i = 0;

ServerHandleSendErr();
        /*
        ** Retry loop when in excess Collsns state.
        */
        while((regServerGlobalsPtr->sendStatus == excessCollsns) && i < kMaxRe
            regServerGlobalsPtr->sendStatus = ServerSendPacket(
                                                regSendDataPacket,
                                                regServerGlobalsPtr->clientDat
                                                regDataPacketTemplate->len + k
            if (regServerGlobalsPtr->sendStatus != noErr)
                ServerHandleSendErr();
            i++;
        }
        if (i > kMaxReTry) {
            ServerReportError(kAbortSesion);
            return;
        }
    }

/* copy backup now */
    memcpy(regSendDataPacket, (Ptr) headerSwap, kRanDataPacketRecSize);

TcTransmitedPacketsCounter++;
    transmitedPacketsNo++;

if ((!gRatePBPtr->UserSelectFastRate)&&(gRatePBPtr->State != kFastRate)) {
        while(!gClockStruck);   // wait until end of InterPacketTimeInterval
        gClockStruck         = FALSE;
        gClockTask->tmCount  = 0;
        gClockTask->tmWakeUp = 0;
        gClockTask->tmReserved = 0;
        PrimeTime((QElemPtr) gClockTask, tcInterPacketTimeInterval);
    }
} for (TcTransmitedPacketsCounter = DelayLowerLimit;
    (transmitedPacketsNo < numberOfPacketsInChunck) &&
    (TcTransmitedPacketsCounter < MaxDelay);) { for (index++ ;
        (index < kMaxDataItem) && BitTst (regServerGlobalsPtr->BitMap, index)
        index++);
    seqNumber = index + 1;
    regDataPacketTemplate->seqNum = seqNumber;

/*
    ** Swap kRanDataPacketRecSize in fileChunckBuffer
    ** with the header bytes. So the data to send
    ** will be prefixed with its header
    */
    regSendDataPacket = (*dataPtrArray)[index] - kRanDataPacketRecSize;
```

Server.c                                                                                          Page 26
ÈÂÌ†,ß†30†ó¯ò†1993  19:23

```c
        memcpy((Ptr) headerSwap, regSendDataPacket, kRanDataPacketRecSize);
        memcpy(regSendDataPacket, (Ptr) regDataPacketTemplate, kRanDataPacketRecSi /* send now regSendDataPacket+offset */
        regServerGlobalsPtr->sendDataPacketPtr = (SendDataPacket *) regSendDataPa regServerGlobalsPtr->sendStatus = ServerSendPacket(
                                            regSendDataPacket,
                                            regServerGlobalsPtr->clientDataAddress
                                            regDataPacketTemplate->len + kRanDataP /*
        ** Check the send status and act
        */
        if (regServerGlobalsPtr->sendStatus != noErr) { short i = 0;

ServerHandleSendErr();
            /*
            ** Retry loop when in excess Collsns state.
            */
            while((regServerGlobalsPtr->sendStatus == excessCollsns) && i < kMaxRe
                regServerGlobalsPtr->sendStatus = ServerSendPacket(
                                                    regSendDataPacket,
                                                    regServerGlobalsPtr->clientDat
                                                    regDataPacketTemplate->len + k
                if (regServerGlobalsPtr->sendStatus != noErr)
                    ServerHandleSendErr();
                i++;
            }
            if (i > kMaxReTry) {
                ServerReportError(kAbortSesion);
                return;
            }
        }

/* copy backup now */
        memcpy(regSendDataPacket, (Ptr) headerSwap, kRanDataPacketRecSize);

TcTransmitedPacketsCounter++;
        transmitedPacketsNo++;

if ((!gRatePBPtr->UserSelectFastRate)&&(gRatePBPtr->State != kFastRate)) {
            while(!gClockStruck);    // wait until end of InterPacketTimeInterval
            gClockStruck          = FALSE;
            gClockTask->tmCount   =    0;
            gClockTask->tmWakeUp  =    0;
            gClockTask->tmReserved =   0;
            PrimeTime((QElemPtr) gClockTask, tcInterPacketTimeInterval);
        }
    }
```

Server.c    Page 27
ÈÂÌ†,ß†30†ó¯ò†1993  19:23

```c
        //check for rate replay.
        if (waitingForDelayAck && pendingRateControl()) {
            gRatePBPtr->LastTransmitedSeqNumber = transmitedPacketsNo;
            releaseRateControlPacket();
            waitingForDelayAck  = FALSE;
        }

// check if we received a rate replay and calc new rate.
        if (!waitingForDelayAck) {
            if (gRatePBPtr->State != kFastRate) {
                newRate = CalcNewRate(gRatePBPtr);
                if (newRate) {
                    // if we have new rate value, get the new value from rate struct
                    ServerSendOctet();
                    while(WaitingForOctetReplay());
                    MaxDelay                 = gRatePBPtr->MaxDelay;
                    DelayLowerLimit          = gRatePBPtr->DelayLowerLimit;
                    tcInterPacketTimeInterval = gRatePBPtr->tcInterPacketTimeInterva
                    ServerSyncClocks();
/*
                    #if RanDebug
                    ServerDebugSyncClocks();
                    #endif
*/
                }
            }
            #if RanDebug
            (void) ServerSendRateDebugPacket();
            #endif
        }

// check for rate replay and calc new rate.
        // do we have to zero up the counter ?
        // we know that we are late !
        // maybe we have to count how many times we are late ???
        else {
            short i;
            //enter stop mechanizm
            gRatePBPtr->isEarlyRateArrival    = FALSE;
            gRatePBPtr->EarlyRateArrivalCounter = 0;

tcInterPacketTimeInterval = regServerGlobalsPtr->Tc * -2;
            for(i=1;i<=40;i++) {
                gClockStruck            = FALSE;
                gClockTask->tmCount     = 0;
                gClockTask->tmWakeUp    = 0;
                gClockTask->tmReserved  = 0;
                PrimeTime((QElemPtr) gClockTask, tcInterPacketTimeInterval);
                ServerCheckDelay(ksThirdTimer);
                while(!gClockStruck) {      // wait until end of InterPacketTimeInterv
                    if (pendingPingControl()) {
                        releaseRateControlPacket();
```

Server.c                                                                    Page 28
ÈÂÌ†,ß†30†ó¯ò†1993  19:23

```
                        gRatePBPtr->LastPingBlockSeqNumber = gRatePBPtr->PingBlockSeqN
                        gRatePBPtr->PingBlockSeqNumber++;
                        gClockStruck = true;
                        RmvTime((QElemPtr) gClockTask);
                        InsXTime((QElemPtr) gClockTask);
                        #if RanDebug
                        ServerSendStopDebugPacket(transmitedPacketsNo,gRatePBPtr->Rate
                        #endif
                        goto Exit;
                    }
                    if (pendingPingControl()) {
                        releaseRateControlPacket();
                        gRatePBPtr->LastPingBlockSeqNumber = gRatePBPtr->PingBlockSeqNumbe
                        gRatePBPtr->PingBlockSeqNumber++;
                        #if RanDebug
                        ServerSendStopDebugPacket(transmitedPacketsNo,gRatePBPtr->RateRepl
                        #endif
                        break;
                    }
                    else {
                        #if RanDebug
                        ServerSendStopDebugPacket(transmitedPacketsNo,0,i);
                        #endif
                    }
                }
/*
** this goto is for speed only !!!
*/
Exit:       if (i > 40) {
                RmvTime((QElemPtr) gClockTask);
                return;
            }
            tcInterPacketTimeInterval  = gRatePBPtr->tcInterPacketTimeInterval * -1;
        }
        if(seqNumber < numberOfPacketsInChunck) {
            if (gRatePBPtr->State != kFastRate) {
                while(!gClockStruck);       // wait until end of InterPacketTimeInterv
                gClockStruck            = FALSE;
                gClockTask->tmCount     = 0;
                gClockTask->tmWakeUp    = 0;
                gClockTask->tmReserved  = 0;
                PrimeTime((QElemPtr) gClockTask, tcInterPacketTimeInterval);
            }
        }
        else
            RmvTime((QElemPtr) gClockTask);

}

/*
**  Send reminder data in last packet
*/
```

Server.c  Page 29

```c
    for (index++ ;
         (index < kMaxDataItem) && BitTst (regServerGlobalsPtr->BitMap, index);
         index++)
        ;
    seqNumber = index + 1;
    regDataPacketTemplate->csCode   = ksGetLastPacketReq;
    regDataPacketTemplate->len      = (reminderData != 0 ? reminderData : kDataBlockSi
    regDataPacketTemplate->seqNum   = seqNumber;

/* backup before sending */
    regSendDataPacket           = (*dataPtrArray)[index] - kRanDataPacketRecSize;
    memcpy((Ptr) headerSwap, regSendDataPacket, kRanDataPacketRecSize);
    memcpy(regSendDataPacket, (Ptr) regDataPacketTemplate, kRanDataPacketRecSize);

/* send now regSendDataPacket+offset */
    regServerGlobalsPtr->sendDataPacketPtr = (SendDataPacket *) regSendDataPacket;
    regServerGlobalsPtr->sendStatus = ServerSendPacket(
                                    (Ptr) regSendDataPacket,
                                    regServerGlobalsPtr->clientDataAddress,
                                    regDataPacketTemplate->len + kRanDataPacketRec /* copy backup now */
    memcpy((Ptr) regSendDataPacket,(Ptr) headerSwap, kRanDataPacketRecSize);

/*
    ** Check the send status and act
    */
    if (regServerGlobalsPtr->sendStatus != noErr) { short i = 0;

ServerHandleSendErr();
        /*
        ** Retry loop when in excess Collsns state.
        */
        while((regServerGlobalsPtr->sendStatus == excessCollsns) && i < kMaxReTry) {
            regServerGlobalsPtr->sendStatus = ServerSendPacket(
                                            (Ptr) regSendDataPacket,
                                            regServerGlobalsPtr->clientDataAddress
                                            regDataPacketTemplate->len + kRanDataP
            if (regServerGlobalsPtr->sendStatus != noErr)
                ServerHandleSendErr();
            i++;
        }
        if (i > kMaxReTry) {
            ServerReportError(kAbortSesion);
            return;
        }
    }
}
/*
** send the client the end of chunk message
*/
ServerSendEOChunk();
```

```
Server.c                                                                    Page 30
ÈÂÌ†,߆30†ó¯ò†1993  19:23

}

/*
**  Check delay.
*/
void    ServerCheckDelay(short csCode)
{
register    ServerGlobals       *regServerGlobalsPtr;
register    SendControlPacket   *regServerControlPacket;

/* speed it */
    regServerGlobalsPtr             = gServerGlobalsPtr;
    regServerControlPacket          = regServerGlobalsPtr->aControlPacket;

/*
    **  Send delay packet (y), and mark it with the last
    **  data packet sequence number.
    */
    regServerControlPacket->header.csCode   = kEchoRequest | csCode;
    regServerControlPacket->header.len      = sizeof (DelayCheckControl);

((DelayCheckControl *) regServerControlPacket->data)->fromPacket        = gRat
    ((DelayCheckControl *) regServerControlPacket->data)->fromChunk         = regS
    ((DelayCheckControl *) regServerControlPacket->data)->PingBlockSeqNumber = gRat /* sending the packet */
    regServerGlobalsPtr->sendStatus = ServerSendEchoPacket(
                                        (Ptr) regServerControlPacket,
                                        regServerGlobalsPtr->clientEchoAddress,
                                        regServerControlPacket->header.len + sizeof(Ra
    /*
    **  Check the send status and act
    */
    if (regServerGlobalsPtr->sendStatus != noErr)
        ServerHandleSendErr();
}

/*
**  Send abort session packet.
*/
void    ServerSendAbortSession(void)
{
    /* TBD */
}

/*
**  Handle send error
*/
void    ServerHandleSendErr()
{
        ServerReportError(gServerGlobalsPtr->sendStatus);
}
```

Server.c                                                                   Page 31
ÈÂÌ†‚ß†30†ó¯ò†1993   19:23

```c
/*
** Send EOF packet to tell the client that
** the file is read.
** Send ksCloseSessionAck
** Change status to ksvstClosingSession
*/
void    ServerSendEndOfFile(void)
{
register    ServerGlobals       *regServerGlobalsPtr;
register    SendControlPacket   *regServerControlPacket;

/* speed it */
    regServerGlobalsPtr         = gServerGlobalsPtr;
    regServerControlPacket      = regServerGlobalsPtr->aControlPacket;

/*
    ** Set new status for the server
    */
    regServerGlobalsPtr->Status     = ksvstExpectingFileName;

/*
    ** Send openSessionAck to the client
    ** with the proposed buffer size.
    ** set the csCode, data len, and session id in the control packet.
    */
    regServerControlPacket->header.csCode   = ksEndOfFile;
    regServerControlPacket->header.len      = 0;

/* sending the packet */
    regServerGlobalsPtr->sendStatus = ServerSendPacket(
                                    (Ptr) regServerControlPacket,
                                    regServerGlobalsPtr->clientControlAddress,
                                    regServerControlPacket->header.len + sizeof(Ra /*
    ** Check the send status and act
    */
    if (regServerGlobalsPtr->sendStatus != noErr)
        ServerHandleSendErr();

}

/*
** Close the session
** Send ksCloseSessionAck
** Change status to ksvstClosingSession
*/
OSErr   ServerSendCloseSession(void)
{
register    ServerGlobals       *regServerGlobalsPtr;
register    SendControlPacket   *regServerControlPacket;
```

Server.c                                                                Page 32
ÈÂÌ†,ß†30†ó¯ò†1993  19:23

```c
        /* speed it */
        regServerGlobalsPtr             = gServerGlobalsPtr;
        regServerControlPacket          = regServerGlobalsPtr->aControlPacket;

/*
        ** Set new status for the server
        */
        regServerGlobalsPtr->Status     = ksvstClosingSession;

/*
        ** Send ksCloseSessionAck to the client
        */
        regServerControlPacket->header.csCode   = ksCloseSessionAck;
        regServerControlPacket->header.len      = 0;

/* sending the packet */
        regServerGlobalsPtr->sendStatus = ServerSendPacket(
                                        (Ptr) regServerControlPacket,
                                        regServerGlobalsPtr->clientControlAddress,
                                        regServerControlPacket->header.len + sizeof(Ra /*
        ** Check the send status and act
        */
        if (regServerGlobalsPtr->sendStatus != noErr)
            ServerHandleSendErr();
}

/*
** close the current open file.
*/
void ServerCloseFile(void)
{
        register    ServerGlobals       *regServerGlobalsPtr;

regServerGlobalsPtr             = gServerGlobalsPtr;

/* data fork */
        if (regServerGlobalsPtr->fileDataRefNum != kBadFileRefNum) {
            regServerGlobalsPtr->readStatus = FSClose(regServerGlobalsPtr->fileDataRefNum)
            regServerGlobalsPtr->fileDataRefNum = kBadFileRefNum;
        }

/* resource fork */
        if (regServerGlobalsPtr->fileRsrcRefNum != kBadFileRefNum) {
            regServerGlobalsPtr->readStatus = FSClose(regServerGlobalsPtr->fileRsrcRefNum)
            regServerGlobalsPtr->fileRsrcRefNum = kBadFileRefNum;
        }

}

/*
```

```c
Server.c                                                                Page 33
ÈÂÌ†,ß†30†ó¯ò†1993  19:23

**    Become a listner, and send ack to server.
*/
void    ServerEndClosingSession(void)
{
    gWhoIsActive                        = kSocketListner;
    gServerGlobalsPtr->Status           = ksvstNA;
}

/*
**    send error message to debugger
*/
OSErr   ServerReportError(short what)
{
register    ServerGlobals       *regServerGlobalsPtr;
register    SendControlPacket   *regServerControlPacket;

#if RanDebug

/* speed it */
    regServerGlobalsPtr                 = gServerGlobalsPtr;
    regServerControlPacket              = regServerGlobalsPtr->aControlPacket;

regServerControlPacket->header.csCode   = what;
    regServerControlPacket->header.len      = 0;

regServerGlobalsPtr->sendStatus = ServerSendPacket(
                                    (Ptr) regServerControlPacket,
                                    gRanDebug.address,
                                    regServerControlPacket->header.len + sizeof(Ra
#endif
}
/*
**    Send the this server packet.
*/
OSErr   ServerSendPacket(Ptr sendPacketPtr, AddrBlock clientAddress, int Len)
{
    MPPParamBlock   ServerMPP;
    WDSElement      ServerWDS[kDDPWDSSize];
    unsigned char   ServerHdr[kDDPHeaderSize];
    OSErr           err;

memset(ServerHdr, 0, (long) kDDPHeaderSize);

ServerMPP.DDPlistener       = (Ptr) RCVCTRL;
    ServerMPP.DDPsocket         = gServerGlobalsPtr->aControlPacket->header.senderAddr
    ServerMPP.DDPchecksumFlag   = false;
    ServerMPP.DDPwdsPointer     = (Ptr)ServerWDS;

BuildDDPwds((Ptr)ServerWDS,
                (Ptr)ServerHdr,
                sendPacketPtr,
                clientAddress,
```

Server.c                                                                                                                     Page 34
ÈÂÌ†,ß†30†ó¯ò†1993  19:23

```
                        kRanNetProtocolType,
                        Len);

ServerMPP.DDPchecksumFlag = false;
    ServerMPP.DDPwdsPointer = (Ptr)ServerWDS;

err = PWriteDDP(&ServerMPP, false);
#if RanDebug
    if (err == noErr) {
        /*
        **  Send a copy of control packets to the debugger too
        */
        if(clientAddress.aSocket == gServerGlobalsPtr->clientControlAddress.aSocket) { memset(ServerHdr, 0, (long) kDDPHeaderSize);

ServerMPP.DDPlistener       = nil;
            ServerMPP.DDPsocket         = gServerGlobalsPtr->aControlPacket->header.se
            ServerMPP.DDPchecksumFlag   = false;
            ServerMPP.DDPwdsPointer     = (Ptr)ServerWDS;

BuildDDPwds((Ptr)ServerWDS,
                        (Ptr)ServerHdr,
                        sendPacketPtr,
                        gRanDebug.address,
                        kRanNetProtocolType,
                        Len);

ServerMPP.DDPchecksumFlag = false;
            ServerMPP.DDPwdsPointer = (Ptr)ServerWDS;

err = PWriteDDP(&ServerMPP, false);
        }
    }
endif
    return(err);
}
if RanDebug
/*
** Send the this server packet.
*/
OSErr   ServerSendDebugPacket(Ptr sendPacketPtr, AddrBlock clientAddress, int Len)
{
    MPPParamBlock   ServerMPP;
    WDSElement      ServerWDS[kDDPWDSSize];
    unsigned char   ServerHdr[kDDPHeaderSize];
    OSErr           err;

memset(ServerHdr, 0, (long) kDDPHeaderSize);

ServerMPP.DDPlistener       = nil;
    ServerMPP.DDPsocket         = gServerGlobalsPtr->aControlPacket->header.senderAddr
    ServerMPP.DDPchecksumFlag   = false;
```

Server.c                                                                    Page 35
ÈÂÎ†,ß†30†ó¯ò†1993  19:23

```
    ServerMPP.DDPwdsPointer    = (Ptr)ServerWDS;

BuildDDPwds((Ptr)ServerWDS,
                (Ptr)ServerHdr,
                sendPacketPtr,
                gRanDebug.address,
                kRanNetProtocolType,
                Len);

ServerMPP.DDPchecksumFlag = false;
    ServerMPP.DDPwdsPointer = (Ptr)ServerWDS;

err = PWriteDDP(&ServerMPP, false);
    return(err);
}
endif

/*
** Send the this server echo request packet.
*/
OSErr    ServerSendEchoPacket(Ptr sendPacketPtr, AddrBlock clientAddress, int Len)
{
    MPPParamBlock    ServerMPP;
    WDSElement       ServerWDS[kDDPWDSSize];
    unsigned char    ServerHdr[kDDPHeaderSize];
    OSErr            err;

memset(ServerHdr, 0, (long) kDDPHeaderSize);

ServerMPP.DDPlistener      = nil;
    ServerMPP.DDPsocket        = gServerGlobalsPtr->MyRateControlAddress.aSocket;
    ServerMPP.DDPchecksumFlag  = false;
    ServerMPP.DDPwdsPointer    = (Ptr)ServerWDS;

BuildDDPwds((Ptr)ServerWDS,
                (Ptr)ServerHdr,
                sendPacketPtr,
                clientAddress,
                kEchoProtocolType,
                Len);

ServerMPP.DDPchecksumFlag = false;
    ServerMPP.DDPwdsPointer = (Ptr)ServerWDS;

err = PWriteDDP(&ServerMPP, false);

#if CopyOfEchoToDebbuger && RANDebug
    if ((err == noErr)&& (!gRatePBPtr->FirstTime)) {
        memset(ServerHdr, 0, (long) kDDPHeaderSize);

ServerMPP.DDPlistener      = nil;
        ServerMPP.DDPsocket        = gServerGlobalsPtr->MyRateControlAddress.aSocket;
        ServerMPP.DDPchecksumFlag  = false;
```

Server.c                                                                    Page 36
ÈÂÌ†,ß†30†ó¯ò†1993  19:23

```
            ServerMPP.DDPwdsPointer    = (Ptr)ServerWDS;

BuildDDPwds((Ptr)ServerWDS,
                        (Ptr)ServerHdr,
                        sendPacketPtr,
                        gRanDebug.address,
                        kEchoProtocolType,
                        Len);

ServerMPP.DDPchecksumFlag = false;
            ServerMPP.DDPwdsPointer = (Ptr)ServerWDS;

err = PWriteDDP(&ServerMPP, false);
        }
endif
        return(err);
} if RanDebug
/*
** Send the this server echo request packet.
*/
OSErr   ServerSendRateDebugPacket()
{
MPPParamBlock   ServerMPP;
WDSElement      ServerWDS[kDDPWDSSize];
unsigned char   ServerHdr[kDDPHeaderSize];
OSErr           err;
register        ServerGlobals       *regServerGlobalsPtr;
register        SendControlPacket   *regServerControlPacket;

/* speed it */
    regServerGlobalsPtr             = gServerGlobalsPtr;
    regServerControlPacket          = regServerGlobalsPtr->aControlPacket;

/*
    ** Send ksDebugRate to the debugger.
    */
    regServerControlPacket->header.csCode  = ksDebugRate;
    regServerControlPacket->header.len     = sizeof (RateDebugControl);
    ((RateDebugControl *) regServerControlPacket->data)->fromPacket         = gRatePBP
    ((RateDebugControl *) regServerControlPacket->data)->fromChunk          = regServe
    ((RateDebugControl *) regServerControlPacket->data)->PingBlockSeqNumber = gRatePBP
    memcpy((Ptr)&((RateDebugControl *) regServerControlPacket->data)->RateDebug,
            (Ptr)gRatePBPtr,
            sizeof (V5ParameterBlock));

memset(ServerHdr, 0, (long) kDDPHeaderSize);

ServerMPP.DDPlistener      = nil;
    ServerMPP.DDPsocket        = gServerGlobalsPtr->MyRateControlAddress.aSocket;
    ServerMPP.DDPchecksumFlag  = false;
    ServerMPP.DDPwdsPointer    = (Ptr)ServerWDS;
```

```
Server.c                                                            Page 37
ÈÂÎ†,ß†30†ó¯ò†1993   19:23

BuildDDPwds((Ptr)ServerWDS,
                   (Ptr)ServerHdr,
                   (Ptr) regServerControlPacket,
                   gRanDebug.address,
                   kRanNetProtocolType,
                   regServerControlPacket->header.len + sizeof(RanControlPacket));

ServerMPP.DDPchecksumFlag = false;
       ServerMPP.DDPwdsPointer  = (Ptr)ServerWDS;

err = PWriteDDP(&ServerMPP, false);
       return(err);

}
endif if RanDebug
/*
** Send the this server echo request packet.
*/
OSErr ServerSendStopDebugPacket(short  LastTransmitedSeqNumber,
                                short  RateReplaySeqNumber,
                                short  RetryCounter)
{
MPPParamBlock   ServerMPP;
WDSElement      ServerWDS[kDDPWDSSize];
unsigned char   ServerHdr[kDDPHeaderSize];
OSErr           err;
register        ServerGlobals       *regServerGlobalsPtr;
register        SendControlPacket   *regServerControlPacket;

/* speed it */
       regServerGlobalsPtr         = gServerGlobalsPtr;
       regServerControlPacket      = regServerGlobalsPtr->aControlPacket;

/*
       ** Send ksDebugRate to the debugger.
       */
       regServerControlPacket->header.csCode = ksDebugStop;
       regServerControlPacket->header.len    = sizeof (StopControl);

((StopControl *) regServerControlPacket->data)->fromPacket            = gRatePBP
       ((StopControl *) regServerControlPacket->data)->fromChunk             = regServe
       ((StopControl *) regServerControlPacket->data)->PingBlockSeqNumber    = gRatePBP
       ((StopControl *) regServerControlPacket->data)->LastTransmitedSeqNumber = LastTra
       ((StopControl *) regServerControlPacket->data)->RateReplaySeqNumber   = RateRep
       ((StopControl *) regServerControlPacket->data)->RetryCounter          = RetryCo memset(ServerHdr, 0, (long) kDDPHeaderSize);

ServerMPP.DDPlistener   = nil;
       ServerMPP.DDPsocket     = gServerGlobalsPtr->MyRateControlAddress.aSocket;
```

Server.c  Page 38
ÈÂÌ†,ß†30†ó⁻ò†1993  19:23

```c
        ServerMPP.DDPchecksumFlag   = false;
        ServerMPP.DDPwdsPointer     = (Ptr)ServerWDS;

BuildDDPwds((Ptr)ServerWDS,
                    (Ptr)ServerHdr,
                    (Ptr) regServerControlPacket,
                    gRanDebug.address,
                    kRanNetProtocolType,
                    regServerControlPacket->header.len + sizeof(RanControlPacket));

ServerMPP.DDPchecksumFlag = false;
        ServerMPP.DDPwdsPointer = (Ptr)ServerWDS;

err = PWriteDDP(&ServerMPP, false);
        return(err);
}
endif

/*
**  Send cancel request
*/
void    ServerSendCancelRequest(void)
{
        ServerReportError(gServerGlobalsPtr->readStatus);
}

/*
**  Check that the client's address and
**  session number are legal.
*/
Boolean ServerCheckPacketValidity(RanControlPacket *aControlPacket)
{
    if  (gServerGlobalsPtr->aDataPacketTemplate->sessionId ==
            aControlPacket->sessionId)
        return(true);

return(false);
}

/*
**  Check that the client's address and
**  session number are legal.
*/
Boolean ServerCheckTransportPacketValidity(RanControlPacket *aTransportPacket)
{
    if  (gServerGlobalsPtr->aOctetPacketTemplate->sessionId ==
            aTransportPacket->sessionId)
        return(true);

return(false);
}
```

```
Server.c                                                                Page 39
ÈÂÌ†,ß†30†ó¯ò†1993  19:23 void ServerSendCorrectionChunck(RanControlPacket *aControlPacket)
{
register    unsigned long       *regServerGlobalsBitMap;
register    unsigned long       *regControlPacketBitMap;
short       i;

/* speed it */
    regServerGlobalsBitMap          = gServerGlobalsPtr->BitMap;
    regControlPacketBitMap          = ((CorrectionReq *)(aControlPacket->data))->b for (i = 0 ; i< kMaxDataItem / 32 + 1; i++)
        *(regServerGlobalsBitMap+-) = *(regControlPacketBitMap++);

ServerSendChunck();

}
void ServerSendEOChunk(void)
{
    register    ServerGlobals       *regServerGlobalsPtr;
    register    SendControlPacket   *regServerControlPacket;
    EOChunk     *EOChunkData;
    short       numberOfPacketsInChunck;

/*
    ** send the End Of Chunk message to the client's control handler
    */
    regServerGlobalsPtr         = gServerGlobalsPtr;
    regServerGlobalsPtr->Status = ksvstWaitingForAck;
    regServerControlPacket      = regServerGlobalsPtr->aControlPacket;
    regServerControlPacket->header.csCode   = ksEOChunk;
    regServerControlPacket->header.len      = sizeof (EOChunk);
    EOChunkData                 = (EOChunk *)regServerControlPacket->data;

numberOfPacketsInChunck = (regServerGlobalsPtr->actualRead - 1) / kDataBlockSize +
    EOChunkData->LengthInBytes          = regServerGlobalsPtr->actualRead;
    EOChunkData->NumberOfPacketsInChunk = numberOfPacketsInChunck;
    EOChunkData->ChecksumValue          = regServerGlobalsPtr->ServerChunckXorValu /* sending the packet */ regServerGlobalsPtr->sendStatus = ServerSendPacket(
                                    (Ptr) regServerControlPacket,
                                    regServerGlobalsPtr->clientControlAddress,
                                    regServerControlPacket->header.len + sizeof(Ra
    /*
    **  Check the send status and act
    */
    if (regServerGlobalsPtr->sendStatus != noErr)
        ServerHandleSendErr();

}

Boolean WaitingForOctetReplay()
```

```
Server.c                                                                Page 40
ÈÂÌ†,ß†30†Ó¯Ò†1993  19:23

{
    short               csCode;
    OSErr               err;
    RanControlPacket    *aTransportPacket;

/*
    ** Check if a new transport packet had arrived.
    */
    if (pendingTransportPacket()) {
        /*
        ** Extract the current transport packet
        */
        aTransportPacket  = (RanControlPacket *) gRanTransportListnerPB->RecvPackets
        csCode            = aTransportPacket->csCode;

/*
        ** process next transport packet
        */
        if (csCode == kcAckRate){
            /*
            ** Check that the client's address and
            ** session number are legal.
            */
            if (!ServerCheckTransportPacketValidity(aTransportPacket)) {
                releaseTransportPacket();
                return(true);
            }

/*
            ** Determine the Rate delta time.
            */
            err = ServerHandleRateAck();

/*
            ** Sync clocks and change status.
            */
            if(err == noErr)
                InitRate();
        }
        releaseTransportPacket();
        return(false);
    }
    return (true);
}
```

I claim:

1. Apparatus for governing information transfer between a transmitter and a receiver along a network path interconnecting the transmitter and the receiver, which network path may include intermediate nodes, the apparatus comprising:
   a rate controller associated with the transmitter; and
   a rate monitor associated with the receiver, said rate controller and rate monitor being operative according to a rate based transport protocol which determines the rate of information transmission of said transmitter without rate oscillation while the network background load remains stable, said rate based transport protocol being operative to set the rate of information transmission to be at least partially dependent on the rate at which the receiver actually receives a plurality of packets when the transmitter and receiver are operated in a specific rate setting mode, wherein the transmitter transpits said plurality of packets without intentionally introducing delays and the receiver measures the rate at which that plurality of packets is received.

2. Apparatus according to claim 1 and also comprising a sensor for sensing the number of packets which are transmitted by a transmitter following transmission of an echo request packet prior to receipt of a queue clear indication from a receiver.

3. Apparatus according to claim 1 and wherein at least one of said rate controller and rate monitor is embodied in an information transfer governing network interface card operative to govern information transfer between said transmitter and said receiver.

4. Apparatus for governing information transfer between a transmitter and a receiver along a network path interconnecting the transmitter and the receiver, which network path may include intermediate nodes, the apparatus comprising:
   a rate controller associated with the transmitter, said rate controller being operative according to a rate based transport protocol operative to determine the information transmission rate of said transmitter based at least in part on transmission of a number of packets by said transmitter without intentionally introducing delays and without regard to whether any feedback from said receiver is received during the transmission of the packets and measurement by the rate controller of the actual rate at which the packets are transmitted, said rate based transport protocol being operative to set the information transmission rate to be at least partially dependent on the rate at which the receiver actually receives said packets when the transmitter is operated without intentionally introducing delays.

5. Apparatus according to claim 4 and also comprising a sensor for sensing the number of packets which are transmitted by said transmitter following transmission of an echo request and prior to receipt of a queue clear indication from said receiver.

6. Apparatus according to claim 4 which is at least partially embodied in an information transfer governing network interface card.

7. Apparatus for governing information transfer between a transmitter and a receiver along a network path interconnecting the transmitter and the receiver, which network path may include intermediate nodes, the apparatus comprising:
   a rate monitor associated with the receiver, said rate monitor being operative according to a rate based transport protocol operative to determine an information transmission rate of said transmitter by measuring the actual rate of receipt at said receiver, said rate based transport protocol being operative to set the rate of information transmission to be at least partially dependent on the rate at which the receiver actually receives a plurality of packets when the transmitter and receiver are operated in a specific rate setting mode, wherein the transmitter transmits said plurality of packets without intentionally introducing delays and the receiver measures the rate at which that plurality of packets is received.

8. Apparatus according to claim 7 and also comprising a sensor for sensing the number of packets which are transmitted by said transmitter following transmission of an echo request and prior to receipt of a queue clear indication from said receiver.

9. Apparatus according to claim 7 which is at least partially embodied in an information transfer governing network interface card.

10. Apparatus for governing information transfer between a transmitter and a receiver, which apparatus comprises a controller which is operative to transmit a first echo request packet and to cause a plurality of packets to be transmitted by a transmitter without regard to whether an echo return responsive to said echo request packet is received from a receiver, and thereafter, if an echo return has not been received, subsequent to said first echo request packet, to transmit at least one further echo request packet and not to transmit any further data packets until receipt of an echo return.

11. Apparatus according to claim 10 which is operative according to a rate based transport protocol.

12. Apparatus according to claim 10 and also comprising a sensor for sensing the number of packets which are transmitted by a transmitter following transmission of an echo request and prior to receipt of a queue clear indication from a receiver.

13. Apparatus according to claim 10 which is at least partially embodied in an information transfer governing network interface card.

14. Apparatus for governing information transfer between a transmitter and a receiver, said apparatus comprising:
   apparatus, associated with the transmitter, operative to transmit a first echo request packet and to cause a first plurality of packets to be transmitted by the transmitter without regard to whether an echo return responsive to said echo request packet is received from the receiver, and thereafter, if an echo return has not been received, subsequent to said first echo request packet, to transmit at least one further echo request packet and not to transmit any further data packets until receipt of an echo return;
   apparatus, associated with the transmitter, responsive to the time duration between transmission of an echo request packet and receipt of an echo return corresponding thereto for increasing the rate of transmission by the transmitter above the rate at which the receiver receives the data; and
   apparatus, associated with the transmitter, for comparing the rate at which the receiver receives transmissions in response to an increased rate of transmission of the transmitter with the rate at which the receiver received transmissions prior to increasing the rate of transmission.

15. A data network according to claim 14 and also comprising:
   apparatus responsive to a sensed increased rate of receiving transmissions which are transmitted at an increased rate, for causing the transmitter to increase the rate of data packet transmission.

16. Apparatus according to claim 14 and also comprising a sensor for sensing the number of packets which are transmitted by a transmitter following transmission of an echo request prior to receipt of a queue clear indication from a receiver.

17. Apparatus according to claim 14 which is at least partially embodied in an information transfer governing network interface card.

18. Apparatus for governing information transfer between a transmitter and a receiver along a network path interconnecting the transmitter and the receiver, the apparatus being operative to govern the data transmission rate of said transmitter and comprising:

apparatus for sensing the relationship between the duration of time required for transmission by the transmitter of a group of packets and the elapsed time from reception of a first one of said group of packets until reception of the last one of said group of packets by the receiver; and apparatus operative to non-continuously respond to said time durations and their relationship for increasing said data transmission rate above the current rate of reception of said receiver.

19. Apparatus according to claim 18 and also comprising a sensor for sensing the number of packets which are transmitted by a transmitter following transmission of an echo request prior to receipt of a queue clear indication from a receiver.

20. Apparatus according to claim 18 which is at least partially embodied in an information transfer governing network interface card.

21. Apparatus for governing information transfer between a transmitter and a receiver and including a data flow controller for governing a flow of data in accordance with a protocol containing separate error control and flow control mechanisms, including the transmission of echo request packets and the receipt of echo response packets from the receiver for receiver queue control purposes.

22. Apparatus according to claim 21 and also comprising a sensor for sensing the number of packets which are transmitted by a transmitter following transmission of an echo request and prior to receipt of a queue clear indication from a receiver.

23. Apparatus according to claim 21 which is at least partially embodied in an information transfer governing network interface card.

24. A data network comprising:

a plurality of data utilization elements including at least one transmitter and at least one receiver;

interconnection apparatus for interconnecting said plurality of data utilization elements and defining at least one network path between a transmitter and a receiver, which network path may include intermediate nodes; and apparatus for governing information transfer between said transmitter and said receiver along said network path, the apparatus comprising:

a rate controller associated with the transmitter; and a rate monitor associated with the receiver, said rate controller and said rate monitor being operative according to a rate based transport protocol operative to determine the rate of information transmission of said transmitter without rate oscillation while the network background load remains stable, said rate based transport protocol being operative to set the rate of information transmission to be at least partially dependent on the rate at which the receiver actually receives a plurality of packets when the transmitter and receiver are operated in a specific rate setting mode, wherein the transmitter transmits said plurality of packets without intentionally introducing delays and the receiver measures the rate at which that plurality of packets is received.

25. Apparatus according to claim 24 and also comprising a sensor for sensing the number of packets which are transmitted by a transmitter following transmission of an echo request prior to receipt of a queue clear indication from a receiver.

26. Apparatus according to claim 24 and wherein at least one of said rate controller and rate monitor is embodied in an information transfer governing network interface card operative to govern information transfer among a plurality of data utilization elements.

27. A data network comprising:

a plurality of data utilization elements including a transmitter and a receiver;

interconnection apparatus for interconnecting said plurality of data utilization elements; and apparatus for governing information transfer between said transmitter and said receiver, said apparatus for governing information transfer being operative according to a rate based transport protocol for determining an information transmission rate of said transmitter based at least in part on transmitting a group of packets by said transmitter, without regard to whether any feedback from said receiver is received during the transmission of the packets, and measuring the actual rate at which this group of packets is transmitted.

28. Apparatus according to claim 27 and also comprising a sensor for sensing the number of packets which are transmitted by a transmitter following transmission of an echo request prior to receipt of a queue clear indication from a receiver.

29. Apparatus according to claim 27 which is at least partially embodied in an information transfer governing network interface card.

30. A data network comprising:

a plurality of data utilization elements including a transmitter and a receiver;

interconnection apparatus for interconnecting said plurality of data utilization elements; and apparatus for governing information transfer between said transmitter and said receiver, said apparatus for governing information transfer being operative according to a rate based transport protocol for determining an information transmission rate of said transmitter by measuring the actual rate of receipt of packets at said receiver.

31. Apparatus according to claim 30 and also comprising a sensor for sensing the number of packets which are transmitted by a transmitter following transmission of an echo request prior to receipt of a queue clear indication from a receiver.

32. Apparatus according to claim 30 which is at least partially embodied in an information transfer governing network interface card.

33. A data network comprising:

a plurality of data utilization elements including a transmitter and a receiver;

interconnection apparatus for interconnecting said plurality of data utilization elements; and apparatus for governing information transfer between a transmitter and a receiver, which apparatus is operative to transmit a first echo request packet and to cause a plurality of packets to be transmitted by said transmitter without regard to whether an echo return responsive to said echo request packet is received from said receiver, and thereafter, if an echo return has not been received, subsequent to said first echo request packet, to transmit at least one further echo request packet and not to transmit any further data packets until receipt of an echo return.

34. Apparatus according to claim 33 and also comprising a sensor for sensing the number of packets which are transmitted by a transmitter following transmission of an echo request and prior to receipt of a queue clear indication from a receiver.

35. Apparatus according to claim 33 and wherein at least one of said rate controller and rate monitor is embodied in an information transfer governing network interface card operative to govern information transfer among a plurality of data utilization elements.

36. Apparatus for governing information transfer between a transmitter and a receiver along a network path interconnecting the transmitter and the receiver, the apparatus comprising:

a rate controller associated with the transmitter, said rate controller being operative to govern the data transmission rate by said transmitter for initially setting said data transmission rate and later for non-continuously causing the data transmission rate to increase;

and apparatus responsive to the duration of time required for transmission by the transmitter of a group of packets and the elapsed time from reception of a first one of said group of packets until reception of the last one of said group of packets by the receiver for initially setting said data transmission rate and later for non-continuously increasing the data transmission rate by the transmitter above the rate at which the receiver currently receives the data.

37. Apparatus according to claim 36 and also comprising:

apparatus responsive to a sensed increased rate of receiving transmissions which are transmitted at an increased rate, for causing the transmitter to increase the rate of data packet transmission.

38. A data network comprising:

a plurality of data utilization elements including a transmitter and a receiver;

interconnection apparatus for interconnecting said plurality of data utilization elements; and apparatus for governing information transfer between said transmitter and said receiver, which apparatus is operative to govern the data transmission rate of said transmitter and includes:

apparatus for sensing the duration of time required for transmission by the transmitter of a group of packets and the elapsed time from reception of a first one of said group of packets until reception of the last one of said group of packets by said receiver;

apparatus responsive to a relationship of said duration of time and said elapsed time for initially setting data transmission rate and later for non-continuously increasing the data transmission rate above the current rate of reception of the receiver;

apparatus responsive to said apparatus for sensing for comparing the rate at which said receiver receives transmissions in response to an increased rate of transmission of said transmitter with the rate at which said receiver received transmissions prior to increasing the rate of transmission and providing an output indication if the rate of reception increased as the result of the increased rate of transmission; and apparatus responsive to said output indication, for causing said transmitter to increase the rate of data packet transmission.

39. Apparatus according to claim 38 and also comprising a sensor for sensing the number of packets which are transmitted by a transmitter following transmission of an echo request and prior to receipt of a queue clear indication from a receiver.

40. Apparatus according to claim 38 which is at least partially embodied in an information transfer governing network interface card.

41. A data network comprising:

a plurality of data utilization elements including a transmitter and a receiver;

interconnection apparatus for interconnecting said plurality of data utilization elements; and apparatus for governing information transfer between said transmitter and said receiver, which apparatus is operative to cause transmission of a selected number of data packets in a generally unarrested sequence according to a rate based transport protocol whose rate is selected in accordance with that rate at which said receiver actually receives a plurality of data packets when the transmitter and receiver are operated in a specific rate setting mode, wherein the transmitter transmits said plurality of packets without intentionally introducing delays and the receiver measures the rate at which that plurality of packets is received, and wherein the number of packets in said sequence is selected based at least in part on the round trip delay in the network.

42. Apparatus according to claim 41 and wherein said generally unarrested sequence comprises a sequence of packets unarrested by the lack of echo return packets.

43. Apparatus according to claim 41 and wherein said generally unarrested sequences comprise a chunk of packets, the transmission of said chunk is uninterrupted by error correction activity.

44. Apparatus according to claim 41 and also comprising a sensor for sensing the number of packets which are transmitted by a transmitter following transmission of an echo request and prior to receipt of a queue clear indication from a receiver.

45. Apparatus according to claim 41 which is at least partially embodied in an information transfer governing network interface card.

46. Apparatus for governing information transfer between a transmitter and a receiver connected together by a network, which apparatus comprises a controller which is operative to cause transmission of a selected number of data packets in a generally unarrested sequence and wherein the number of packets in said sequence is selected based at least in part on the round trip delay in the network, wherein said generally unarrested sequence is included in a chunk of packets whose transmission is uninterrupted by error correction activity and wherein the number of packets in said chunk is based on the bandwidth of the network.

47. Apparatus according to claim 46 and wherein the number of packets in said chunk is at least partially based on the bandwidth of the network.

48. A data communication method useful with a network comprising a plurality of data utilization elements including at least one transmitter and at least one receiver and interconnection apparatus for interconnecting said plurality of data utilization elements and defining at least one network path between a transmitter and a receiver, which network path may include intermediate nodes, said method including the steps of:

operating said transmitter to transmit a group of packets without intentionally introducing delays; and setting the rate of information transmission to be at least partially dependent on the rate at which the receiver actually receives said group of packets when the transmitter and receiver are operated in a specific rate setting mode, wherein the transmitter transmits a plurality of packets without intentionally introducing delays and the receiver measures the rate at which that group of packets is received.

49. A method according to claim 48 and also including the step of non-continuously increasing the rate of transmission by the transmitter above the rate at which the receiver currently receives the data, responsive to the relationship between the duration of time required for transmission by the transmitter of a group of packets and the elapsed time from reception of a first one of said group of packets until reception of the last one of said group of packets by the receiver.

50. A method according to claim 48 and also comprising sensing a number of packets which is transmitted by a transmitter following an echo request packet prior to receipt of a queue clear indication from a receiver.

51. A data communication method useful with a network comprising a plurality of data utilization elements including a transmitter and a receiver and interconnection apparatus for interconnecting said plurality of data utilization elements and including the step of:

governing an information transfer rate between said transmitter and said receiver according to a rate based transport protocol and including the step of determining the rate of information transmission by said transmitter based at least in part on transmitting a number of packets by said transmitter without regard to whether any feedback from said receiver is received during the transmission of the packets, and measuring the actual rate at which the packets are transmitted.

52. A method according to claim 51 and also comprising the step of causing the transmitter to increase the rate of data packet transmission, responsive to a sensed increased rate of receiving transmissions which are transmitted at an increased rate.

53. A method according to claim 51 and wherein said step of governing information also comprises sensing the number of packets which are transmitted by a transmitter following transmission of an echo request and prior to receipt of a queue clear indication from a receiver.

54. A data communication method useful with a network comprising a plurality of data utilization elements including a transmitter and a receiver and interconnection apparatus for interconnecting said plurality of data utilization elements, the method including the step of governing an information transfer rate between said transmitter and said receiver according to a rate based transport protocol, wherein said step of governing includes the step of determining an information transmission rate of said transmitter by measuring the actual rate of receipt of packets at said receiver.

55. A method according to claim 54 and wherein said step of governing information also comprises sensing the number of packets which are transmitted by a transmitter following transmission of an echo request and prior to receipt of a queue clear indication from a receiver.

56. A data communication method useful with a network comprising a plurality of data utilization elements including a transmitter and a receiver and interconnection apparatus for interconnecting said plurality of data utilization elements and including the step of governing an information transfer rate between said transmitter and said receiver including the steps of:

transmitting a first echo request packet;

causing a plurality of packets to be transmitted by said transmitter without regard to whether an echo return responsive to said echo request packet is received from said receiver; and thereafter, if an echo return has not been received, subsequent to said first echo request packet, transmitting at least one further echo request and refraining from transmitting any further data packets until receipt of an echo return.

57. A method according to claim 56 and wherein said plurality of packets is selected based at least in part on the round trip delay in the network.

58. A method according to claim 56 and wherein said step of governing information also comprises sensing the number of packets which are transmitted by a transmitter following transmission of an echo request and prior to receipt of a queue clear indication from a receiver.

59. A data communication method useful with a network comprising a plurality of data utilization elements including at least one transmitter and at least one receiver; interconnection apparatus for interconnecting said plurality of data utilization elements and a sensor for sensing the rate at which a data utilization element receives data packets, said method including the step of governing information transfer between a transmitter and a receiver including the steps of:

governing the rate of data transmission by said transmitter including:

transmitting a first echo request packet and a plurality of packets without regard to whether an echo return responsive to said echo request packet is received from a receiver; and thereafter, if an echo return has not been received, subsequent to said first echo request packet, transmitting at least one further echo request packet and refraining from transmitting any further data packets until receipt of an echo return;

increasing the rate of transmission by the transmitter above the rate at which the receiver receives the data, responsive to the elapsed time between transmission of an echo request packet and receipt of an echo return corresponding thereto; and comparing the rate at which the receiver receives transmissions in response to an increased rate of transmission of the transmitter with the rate at which the receiver received transmissions prior to increasing the rate of transmission.

60. A method according to claim 59 and wherein the plurality of packets comprises a number of data packets between successive echo requests that is selected based at least in part on the round trip delay in the network.

61. A method according to claim 59 and wherein said step of governing also comprises sensing the number of packets which are transmitted by a transmitter following transmission of an echo request prior to receipt of a queue clear indication from a receiver.

62. A data communication method useful with a network comprising a plurality of data utilization elements including a transmitter and a receiver; interconnection apparatus for interconnecting said plurality of data utilization elements and a sensor for sensing the rate at which said receiver receives data packets, said method including the step of governing information transfer between said plurality of data utilization elements including the steps of:

governing the data transmission rate of said transmitter and including:

sensing the duration of time required for transmission by the transmitter of a group of packets and the elapsed time from reception of a first one of said group of packets until reception of the last one of said group of packets by said receiver;

responsive to the relationship between said duration of time and said elapsed time, initially setting data transmission rate and later non-continuously increasing the data transmission rate above the current rate of reception of the receiver;

responsive to said sensor, comparing the rate at which the receiver receives transmissions in response to an increased rate of transmission of the transmitter with the rate at which the receiver received transmissions prior to increasing the rate of transmission and providing an output indication if the rate of reception increased as the result of the increased rate of transmission; and responsive to said output indication, causing the transmitter to increase the rate of data packet transmission.

63. A method according to claim 62 and wherein said step of governing information also comprises sensing the number of packets which are transmitted by a transmitter following transmission of an echo request and prior to receipt of a queue clear indication from a receiver.

64. A data communication method useful with a network comprising a plurality of data utilization elements including a transmitter and a receiver and interconnection apparatus for interconnecting said plurality of data utilization elements, said method including the step of governing an information transfer rate between said transmitter and said receiver, including the step of causing transmission of a selected number of data packets in a generally unarrested sequence according to a rate based transport protocol whose rate is selected in accordance with that rate at which said receiver actually receives a plurality of data packets when the transmitter and receiver are operated in a specific rate setting mode, wherein the transmitter transmits said plurality of packets without intentionally introducing delays and the receiver measures the rate at which that plurality of packets is received, and wherein the number of packets in said sequence is selected based at least in part on the round trip delay in the network.

65. A method according to claim 64 and wherein said generally unarrested sequence comprises a sequence of packets uninterrupted by the lack of echo return packets.

66. A method according to claim 64 and wherein said generally unarrested sequence comprises a chunk of packets, the transmission of said chunk is uninterrupted by error correction activity.

67. A method according to claim 66 and wherein the number of packets in said chunk is selected also based on the bandwidth of the network.

68. A method according to claim 64 and wherein said step of governing information also comprises sensing the number of packets which are transmitted by a transmitter following transmission of an echo request and prior to receipt of a queue clear indication from a receiver.

69. A method for governing information transfer across an end-to-end path comprising a transmitter, a receiver and an interconnecting network portion, which network portion may include intermediate nodes, the method comprising the steps of:

monitoring the instantaneous throughput of the end-to-end path by the transmitter;

upon detection of a non-instantaneous occurrence of said path being underutilized, determining a new rate of information transmission by said transmitter by sensing the rate at which the receiver actually receives a plurality of packets when the transmitter and receiver are operated in a specific rate setting mode, wherein the transmitter transmits a plurality of packets without intentionally introducing delays, which increases path utilization without overloading the path; and transmitting information at the new rate.

70. A method for governing information transfer across a path comprising a transmitter, a receiver and an interconnecting network portion, which network portion may include intermediate nodes, the method comprising the steps of:

transmitting information at a first rate;

monitoring by the transmitter a decrease in the throughput of the path as indicated by later than expected receipt of an echo return response along the path;

upon detection, at the transmitter with the aid of the receiver, of an occurrence of reduced end-to-end effective path throughput, ceasing information transmission for a first time period and subsequently resuming information transmission at the first rate.

71. A method according to claim 70 wherein said step of transmitting comprises the steps of:

transmitting an echo request; and without waiting for an echo return responsive to the echo request, transmitting further information comprising at least a predetermined amount of information, and wherein said step of ceasing is carried out if no echo return has been received responsive to the echo request during transmittal of the further information.

72. A method according to claim 71 wherein said step of resuming comprises the step of resuming information transmission after receipt of the echo return.

73. Apparatus for governing information transfer between a transmitter and a receiver along a network path interconnecting the transmitter and the receiver, the apparatus comprising apparatus for governing a flow of data by transmitting echo request packets for receiver queue control purposes comprising:

apparatus for transmitting echo request packets;

apparatus for receiving transmitted echo request packets and providing echo response packets; and receiver queue control apparatus for sensing receipt of echo response packets and providing receiver queue control responsive thereto.

74. Apparatus for governing information transfer between a transmitter and a receiver connected together by a network, which apparatus comprises a controller which is operative to cause transmission of a selected number of data packets in a generally unarrested sequence and wherein the number of packets in said sequence is selected based at least in part on the round trip delay in the network, wherein the transmission of the selected number of data packets is carried out according to a rate based transport protocol.

75. Apparatus for governing information transfer across a path comprising a transmitter, a receiver and an interconnecting network portion, which network portion may include intermediate nodes, the apparatus comprising:

an instantaneous path throughput monitoring unit; and information transfer rate determining apparatus operative, upon detection of a non-instantaneous occurrence of the path being underutilized along the path between said transmitter and said receiver, as indicated by consecutive earlier than expected receipts of echo return responses along the path, to set a higher rate of information transfer which increases path utilization without overloading the path.

76. Apparatus for governing information transfer across a path comprising a transmitter transmitting information at a first rate, a receiver and an interconnecting network portion, which network portion may include intermediate nodes, the apparatus comprising:

apparatus for monitoring at the transmitter a decrease in the throughput of the path as indicated by later than expected receipt of an echo return response along the path; and information transmission control apparatus operative, upon detection, at the transmitter with the aid of the receiver, of an occurrence of reduced end-to-end effective path throughput, to cause information transmission to be ceased for a first time period and to subsequently be resumed at the first rate.

77. Apparatus according to claim 76 wherein said apparatus for monitoring comprises:

apparatus for transmitting an echo request; and apparatus causing further information comprising at least a predetermined amount of information to be transmitted without waiting for an echo return;

and wherein said information transmission control apparatus is operative to cease information transmission if no echo return has been received responsive to the echo request during transmittal of the further information.

78. Apparatus according to claim 77 wherein said information transmission control apparatus is operative to cause information transmission to be resumed after receipt of the echo return.

79. A data network comprising:

a plurality of data utilization elements including at least one transmitter and at least one receiver;

interconnection apparatus for interconnecting said plurality of data utilization elements and providing a path between said transmitter and said receiver, which path may include intermediate nodes; and apparatus for governing information transfer across said path, the apparatus comprising:

an instantaneous path throughput monitoring unit; and information transfer rate determining apparatus operative, upon detection of a non-instantaneous occurrence of said path being underutilized, as indicated by consecutive earlier than expected receipts of echo responses along the path, to set a higher rate of information transmission by said transmitter which increases path utilization without overloading the path.

80. A data network comprising:

a plurality of data utilization elements;

interconnection apparatus for interconnecting said plurality of data utilization elements; and apparatus for governing information transfer across a path comprising a transmitter transmitting information at a first rate, a receiver and an interconnecting network portion, which network portion may include intermediate nodes, the apparatus comprising:

apparatus for monitoring at the transmitter a decrease in the throughput of the path as indicated by later than expected receipt of an echo return response along the path; and information transmission control apparatus operative, upon detection, at the transmitter with the aid of the receiver, of an occurrence of reduced end-to-end effective path throughput, to cause information transmission to be ceased for a first time period and to subsequently be resumed at the first rate.

81. A data network according to claim 80 wherein said apparatus for monitoring comprises:

apparatus for transmitting an echo request; and apparatus for transmitting further information without waiting for an echo return;

and wherein said information transmission control apparatus is operative to cease information transmission if no echo return has been received responsive to the echo request during transmittal of the further information.

82. A data network according to claim 81 wherein said information transmission control apparatus is operative to cause information transmission to be resumed after receipt of the echo return.

83. A data network comprising:

plurality of data utilization elements including a transmitter and a receiver;

interconnection apparatus for interconnecting said plurality of data utilization elements;

a sensor for sensing the rate at which said receiver receives data packets; and apparatus for governing information transfer between said transmitter and said receiver, which apparatus is operative to govern the rate of data transmission by said transmitter by non-continuously causing the rate of data transmission to increase such that the rate at which the data is received by said receiver, also increases, and wherein said apparatus for governing information transfer also includes apparatus responsive to the relationship between the duration of time required for transmission by the transmitter of a group of packets and the elapsed time from reception of a first one of said group of packets until reception of the last one of said group of packets by the receiver for initially setting said data transmission rate and later for non-continuously increasing the transmission rate by the transmitter above the rate at which the receiver currently receives the data.

84. A method for governing information transfer across a path comprising a transmitter, a receiver and an interconnecting network portion, which network portion may include intermediate nodes, the method comprising:

monitoring instantaneous path throughput; and determining an information transfer rate by setting a higher rate of information transfer which increases path utilization without overloading the path, upon detection of a non-instantaneous occurrence of the path between said transmitter and said receiver being underutilized, as indicated by consecutive earlier than expected receipts of echo return responses along the path.

85. Apparatus for governing information transfer between a transmitter and a receiver along a network path interconnecting the transmitter and the receiver, which network path may include intermediate nodes, the apparatus comprising:

a rate controller; and a rate monitor, said rate controller and rate monitor being operative according to a rate based transport protocol operative to determine the rate of information transmission of said transmitter, said rate based transport protocol being operative to set the rate of information transmission according to the rate at which the receiver actually receives a plurality of packets when the transmitter and receiver are operated in a specific rate setting mode, wherein the transmitter transmits said plurality of packets without intentionally introducing delays and the rate monitor monitors the rate at which that plurality of packets is received.

86. Apparatus for governing information transfer between a transmitter and a receiver along a network path interconnecting connecting the transmitter and the receiver, which network path may include intermediate nodes, the apparatus comprising:

a rate monitor operating according to a rate based transport protocol operative to determine an information transmission rate of said transmitter by receiving an indication of the actual rate of receipt by said receiver, said rate based transport protocol being operative to set the rate of information transmission to be at least partially dependent on the rate at which the receiver actually receives a plurality of packets when the transmitter and receiver are operated in a specific rate setting mode, wherein the transmitter transmits a plurality of packets without intentionally introducing delays and the rate at which the plurality of packets are received by the receiver is indicated.

87. A data network comprising:

a plurality of data utilization elements including at least one transmitter and at least one receiver;

interconnection apparatus for interconnecting said plurality of data utilization elements and defining at least one network path between a transmitter and a receiver, which network path may include intermediate nodes; and apparatus for governing information transfer between said transmitter and said receiver along said network path, the apparatus comprising:

a rate controller; and a rate monitor, said rate controller and rate monitor being operative according to a rate based transport protocol operative to determine the rate of information transmission of said transmitter, said rate based transport protocol being operative to set the rate of information transmission according to the rate at which the receiver actually receives a plurality of packets when the transmitter and receiver are operated in a specific rate setting mode, wherein the transmitter transmits said plurality of packets without intentionally introducing delays and the rate monitor monitors the rate at which that plurality of packets is received.

88. A data communication method useful with a network comprising a plurality of data utilization elements including at least one transmitter and at least one receiver and interconnection apparatus for interconnecting said plurality of data utilization elements and defining at least one network path between a transmitter and a receiver, which network path may include intermediate nodes, said method including the steps of:

operating said transmitter to transmit packets without intentionally introducing delays; and setting the rate of information transmission to be at least partially dependent on the rate at which the receiver actually receives said packets when the transmitter and receiver are operated in a specific rate setting mode, wherein the transmitter transmits a plurality of packets without intentionally introducing delays and the rate at which the packets are received by the receiver is measured.

* * * * *

UNITED STATES PATENT AND TRADEMARK OFFICE
CERTIFICATE OF CORRECTION

PATENT NO. : 5,631,935
DATED : May 20, 1997
INVENTOR(S) : Dror Ginossar

It is certified that error appears in the above-indentified patent and that said Letters Patent is hereby corrected as shown below:

Page 2, 2nd Column, 5th line, "Arimill" should read --Arimilli--;

Column 1, line 22, "Measure" should read --Measures--;

Column 3, line 53, "operative" should read --is operative--;

Column 3, lines 58-60, delete "of the transmitter without rate oscillation. The rate based transport protocol operates to set the rate of information transmission";

Column 4, lines 55-56, delete "and receipt of such data by the receiving data utilization element";

Column 4, line 58, "receives" should read --currently receives--;

Column 12, line 37, "selected also" should read --selected--;

Column 343, line 17, "transpits" should read --transmits--.

Signed and Sealed this

Seventh Day of July, 1998

Attest:

BRUCE LEHMAN

*Attesting Officer*         *Commissioner of Patents and Trademarks*